US012147648B2

(12) United States Patent
Behzadi et al.

(10) Patent No.: US 12,147,648 B2
(45) Date of Patent: Nov. 19, 2024

(54) USER INTERFACES FOR SHARING CONTENT WITH OTHER ELECTRONIC DEVICES

(71) Applicant: Apple Inc., Cupertino, CA (US)

(72) Inventors: Arian Behzadi, San Francisco, CA (US); Christopher Patrick Foss, San Francisco, CA (US); Corey Keiko Wang, San Francisco, CA (US); Marcel Van Os, San Francisco, CA (US); Marco Triverio, San Francisco, CA (US); Nicole R. Ryan, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/589,309

(22) Filed: Jan. 31, 2022

(65) Prior Publication Data

US 2022/0155920 A1 May 19, 2022

Related U.S. Application Data

(63) Continuation of application No. 17/086,205, filed on Oct. 30, 2020, now Pat. No. 11,256,394, which is a (Continued)

(51) Int. Cl.
*G06F 3/0482* (2013.01)
*G06F 3/01* (2006.01)
(Continued)

(52) U.S. Cl.
CPC ............ *G06F 3/0482* (2013.01); *G06F 3/017* (2013.01); *H04L 67/06* (2013.01); *H04L 67/10* (2013.01)

(58) Field of Classification Search
CPC ....... G06F 3/0482; G06F 3/017; H04L 67/06; H04L 67/10
See application file for complete search history.

(56) References Cited

U.S. PATENT DOCUMENTS 5,483,261 A 1/1996 Yasutake
5,488,204 A 1/1996 Mead et al.
(Continued)

FOREIGN PATENT DOCUMENTS

CN 104246678 A 12/2014
EP 2073514 A2 6/2009
(Continued)

OTHER PUBLICATIONS

Corrected Notice of Allowability received for U.S. Appl. No. 17/086,205, dated Nov. 10, 2021, 2 pages.
(Continued)

*Primary Examiner* — Andrew T Chiusano
(74) *Attorney, Agent, or Firm* — Kubota & Basol LLP

(57) ABSTRACT

In some embodiments, an electronic device presents an option that is selectable to share content with a second electronic device towards which the first electronic device is oriented. In some embodiments, an electronic device presents an indication to change the orientation of the electronic device when the orientation of the electronic device is outside of a range of orientations in which circuitry that identifies another electronic device with which to share content is able to function with desired reliability. In some embodiments, an electronic device presents a sharing user interface within an action user interface of an application. In some embodiments, an electronic device presents one or more options for changing one or more settings associated with an item of content before sharing the content.

66 Claims, 120 Drawing Sheets

Related U.S. Application Data continuation of application No. 16/584,685, filed on Sep. 26, 2019, now Pat. No. 10,852,915.

(60) Provisional application No. 62/897,741, filed on Sep. 9, 2019, provisional application No. 62/843,958, filed on May 6, 2019.

(51) Int. Cl.
*H04L 67/06* (2022.01)
*H04L 67/10* (2022.01)

(56) References Cited

U.S. PATENT DOCUMENTS 5,825,352 A 10/1998 Bisset et al.
5,835,079 A 11/1998 Shieh
5,880,411 A 3/1999 Gillespie et al.
6,188,391 B1 2/2001 Seely et al.
6,310,610 B1 10/2001 Beaton et al.
6,323,846 B1 11/2001 Westerman et al.
6,570,557 B1 5/2003 Westerman et al.
6,677,932 B1 1/2004 Westerman
6,690,387 B2 2/2004 Zimmerman et al.
6,839,741 B1 1/2005 Tsai
7,015,894 B2 3/2006 Morohoshi
7,184,064 B2 2/2007 Zimmerman et al.
7,277,901 B2 10/2007 Parker et al.
7,614,008 B2 11/2009 Ording
7,633,076 B2 12/2009 Huppi et al.
7,653,883 B2 1/2010 Hotelling et al.
7,657,849 B2 2/2010 Chaudhri et al.
7,663,607 B2 2/2010 Hotelling et al.
7,756,935 B2 7/2010 Gaucas
7,844,914 B2 11/2010 Andre et al.
7,957,762 B2 6/2011 Herz et al.
8,006,002 B2 8/2011 Kalayjian et al.
8,108,464 B1 1/2012 Rochelle et al.
8,239,784 B2 8/2012 Hotelling et al.
8,279,180 B2 10/2012 Hotelling et al.
8,381,135 B2 2/2013 Hotelling et al.
8,479,122 B2 7/2013 Hotelling et al.
8,806,382 B2 8/2014 Matsuda
8,826,148 B2 9/2014 Yuniardi et al.
9,031,543 B2 5/2015 Lee
9,165,285 B2 10/2015 Schultz et al.
9,282,167 B2 3/2016 Jo et al.
9,348,458 B2 5/2016 Hotelling et al.
9,603,123 B1 3/2017 Jackson et al.
9,703,468 B2 7/2017 Reeves et al.
9,852,761 B2 12/2017 Anzures
9,933,937 B2 4/2018 Lemay et al.
10,185,932 B2 1/2019 Costenaro et al.
10,318,034 B1 6/2019 Hauenstein et al.
11,079,995 B1 8/2021 Hulbert et al.
11,310,178 B2 4/2022 Crevier et al.
11,310,181 B2 * 4/2022 Park ...................... H04L 51/214
11,422,765 B2 8/2022 Sun et al.
2002/0015024 A1 2/2002 Westerman et al.
2005/0190059 A1 9/2005 Wehrenberg
2006/0017692 A1 1/2006 Wehrenberg et al.
2006/0033724 A1 2/2006 Chaudhri et al.
2006/0197753 A1 9/2006 Hotelling
2006/0256008 A1 11/2006 Rosenberg
2007/0049258 A1 3/2007 Thibeault
2007/0222768 A1 9/2007 Geurts et al.
2008/0028017 A1 1/2008 Garbow et al.
2008/0298720 A1 * 12/2008 Klassen ............. H04N 1/00307 382/298
2009/0019392 A1 * 1/2009 Nomura .................. G06F 16/54 715/810
2009/0037605 A1 * 2/2009 Li .......................... G06Q 20/12 709/246
2009/0322689 A1 12/2009 Kwong et al.
2010/0081475 A1 4/2010 Chiang et al.
2010/0184375 A1 7/2010 Ohkita
2010/0235746 A1 9/2010 Anzures
2010/0287513 A1 11/2010 Singh et al.
2011/0066685 A1 3/2011 Kitada et al.
2011/0078573 A1 3/2011 Ooba
2011/0083111 A1 4/2011 Forutanpour et al.
2011/0107234 A1 * 5/2011 Lee ......................... G06F 16/10 709/224
2011/0209102 A1 8/2011 Hinckley et al.
2011/0225178 A1 * 9/2011 Ingrassia ................. G06F 16/48 707/769
2012/0131491 A1 5/2012 Lee
2012/0136951 A1 5/2012 Mulder
2012/0154294 A1 6/2012 Hinckley et al.
2012/0284344 A1 11/2012 Costenaro et al.
2012/0284345 A1 11/2012 Costenaro et al.
2012/0289203 A1 11/2012 Santo et al.
2012/0317489 A1 12/2012 Kuulusa et al.
2013/0024778 A1 1/2013 Reeves et al.
2013/0036364 A1 * 2/2013 Johnson .................. G06F 21/16 715/738
2013/0076595 A1 3/2013 Sirpal et al.
2013/0321340 A1 12/2013 Seo et al.
2014/0006994 A1 1/2014 Koch et al.
2014/0101575 A1 4/2014 Kwak et al.
2014/0101578 A1 4/2014 Kwak et al.
2014/0101579 A1 4/2014 Kim et al.
2014/0104643 A1 * 4/2014 Park ...................... G06F 3/1228 358/1.15
2014/0115469 A1 * 4/2014 Pendergast .......... G06F 16/7867 715/719
2014/0123038 A1 5/2014 Ahn et al.
2014/0152576 A1 6/2014 Kim et al.
2014/0187162 A1 7/2014 Mei
2014/0188989 A1 7/2014 Stekkelpak et al.
2014/0195928 A1 7/2014 Carlen
2014/0247207 A1 9/2014 Pahud et al.
2014/0247346 A1 9/2014 Bozarth et al.
2014/0280748 A1 9/2014 Hinckley et al.
2014/0323162 A1 10/2014 Ezra et al.
2014/0365912 A1 * 12/2014 Shaw .................... G06F 3/0488 715/748
2014/0372390 A1 * 12/2014 Matsuzawa ............ G06F 16/51 707/693
2015/0009189 A1 1/2015 Nagara
2015/0026595 A1 1/2015 Lu et al.
2015/0061968 A1 3/2015 Park et al.
2015/0074615 A1 3/2015 Han et al.
2015/0095430 A1 4/2015 Kaushik et al.
2015/0121535 A1 * 4/2015 Fiss ..................... G06F 21/6218 726/26
2015/0143211 A1 * 5/2015 Kaufthal ............... G06F 40/166 715/205
2015/0195220 A1 7/2015 Hawker et al.
2015/0220493 A1 8/2015 Hayashi et al.
2015/0264111 A1 9/2015 Aleksandrov
2015/0338888 A1 11/2015 Kim et al.
2015/0347368 A1 12/2015 Carlen et al.
2015/0350134 A1 * 12/2015 Yang ................... H04L 67/1095 709/206
2016/0035312 A1 2/2016 Lee et al.
2016/0124698 A1 5/2016 Reeves et al.
2016/0198499 A1 7/2016 Lee et al.
2016/0234659 A1 8/2016 Luo
2017/0164140 A1 6/2017 Li et al.
2017/0177194 A1 * 6/2017 Lyons ..................... H04L 67/06
2017/0187656 A1 6/2017 Bastide et al.
2017/0273050 A1 9/2017 Levak et al.
2018/0095611 A1 4/2018 Kuscher et al.
2018/0246933 A1 8/2018 Darrow et al.
2019/0334847 A1 10/2019 Genovese et al.
2019/0361950 A1 11/2019 Ganesan et al.
2020/0019367 A1 1/2020 Sun et al.
2020/0125792 A1 4/2020 Rochelle et al.
2020/0356221 A1 11/2020 Behzadi et al.
2021/0103366 A1 4/2021 Behzadi et al.

(56) References Cited

U.S. PATENT DOCUMENTS

| | | | |
|---|---|---|---|
| 2021/0357169 A1 | 11/2021 | Hulbert et al. |
| 2023/0078889 A1 | 3/2023 | Sun et al. |
| 2024/0143553 A1 | 5/2024 | Chang et al. |

FOREIGN PATENT DOCUMENTS

| | | | |
|---|---|---|---|
| EP | 2293531 A1 | 3/2011 |
| EP | 3041313 A1 | 7/2016 |
| JP | 2000-163031 A | 6/2000 |
| JP | 2002-342033 A | 11/2002 |
| JP | 2003-152615 A | 5/2003 |
| WO | 2013/169849 A2 | 11/2013 |
| WO | 2014/105276 A1 | 7/2014 |
| WO | 2017/176036 A1 | 10/2017 |

OTHER PUBLICATIONS

International Search Report received for PCT Patent Application No. PCT/US2020/031732, dated Sep. 28, 2020, 5 pages.
Invitation to Pay Additional Fees received for PCT Patent International Application No. PCT/US2020/031732, mailed on Aug. 3, 2020, 14 pages.
Non-Final Office Action received for U.S. Appl. No. 16/584,685, dated Jan. 2, 2020, 17 pages.
Notice of Allowance received for U.S. Appl. No. 16/584,685, dated Jul. 27, 2020, 10 pages.
Notice of Allowance received for U.S. Appl. No. 17/086,205, dated Oct. 20, 2021, 10 pages.
Supplemental Notice of Allowability received for U.S. Appl. No. 17/086,205, dated Dec. 30, 2021, 5 pages.
Dearman et al., “Determining the orientation of proximate mobile devices using their back facing camera.”, Proceedings of the SIGCHI Conference on Human Factors in Computing Systems., May 2012, 4 pages.
Gostner et al., “Usage of Spatial Information for Selection of Co-located Devices”, Proceedings of the 10th International Conference on Human Computer Interaction with Mobile Devices and Services, Sep. 2008.
Hazas et al., “A Relative Positioning System for Co-located Mobile Devices”, Proceedings of the 3rd International Conference on Mobile Systems, Aapplications, and Services, Jun. 2005.
Kortuem et al., “Sensing and Visualizing Spatial Relations of Mobile Devices”, Proceedings of the 18th Annual ACM Symposium on User Interface Software and Technology, Oct. 2005.
Corrected Notice of Allowance received for U.S. Appl. No. 16/506,697, dated Jul. 18, 2022, 2 pages.
Final Office Action received for U.S. Appl. No. 16/147,183, dated Oct. 14, 2020, 18 pages.
Final Office Action received for U.S. Appl. No. 16/506,697, dated Mar. 25, 2021, 15 pages.
International Search Report received for PCT Patent Application No. PCT/US2023/024377, dated Sep. 25, 2023, 4 pages.
Non-Final Office Action received for U.S. Appl. No. 16/147,183, dated Mar. 5, 2020, 16 pages.
Non-Final Office Action received for U.S. Appl. No. 16/506,697, dated Sep. 7, 2021, 15 pages.
Non-Final Office Action received for U.S. Appl. No. 16/506,697, dated Sep. 15, 2020, 13 pages.
Non-Final Office Action received for U.S. Appl. No. 17/389,041, dated May 3, 2023, 13 pages.
Notice of Allowance received for U.S. Appl. No. 16/147,183, dated Apr. 2, 2021, 6 pages.
Notice of Allowance received for U.S. Appl. No. 16/506,697, dated Apr. 8, 2022, 8 pages.
Notice of Allowance received for U.S. Appl. No. 17/389,041, dated Dec. 13, 2023, 6 pages.
Lee et al., “A Multi-Touch Three Dimensional Touch-Sensitive Tablet”, CHI’85 Proceedings, Apr. 1985, pp. 21-25.
Rubine, Dean, “Combining Gestures and Direct Manipulation”, CHI’92, May 3-7, 1992, pp. 659-660.
Rubine, Dean H., “The Automatic Recognition of Gestures”, CMU-CS-91-202, Submitted in Partial Fulfillment of the Requirements for the Degree of Doctor of Philosophy in Computer Science at Carnegie Mellon University, Dec. 1991, 285 pages.
Westerman, Wayne, “Hand Tracking, Finger Identification, and Chordic Manipulation on a Multi-Touch Surface”, A Dissertation Submitted to the Faculty of the University of Delaware in Partial Fulfillment of the Requirements for the Degree of Doctor of Philosophy in Electrical Engineering, 1999, 363 pages.
Search Report received for Chinese Patent Application No. 202210128123.8, dated Dec. 9, 2023, 4 pages.
Non-Final Office Action received for U.S. Appl. No. 17/821,457, dated Jan. 30, 2024, 10 pages.
Non-Final Office Action received for U.S. Appl. No. 18/328,704, mailed on Mar. 26, 2024, 26 pages.
Notice of Allowance received for U.S. Appl. No. 17/821,457, mailed on May 16, 2024, 5 pages.

* cited by examiner

Figure 7L:
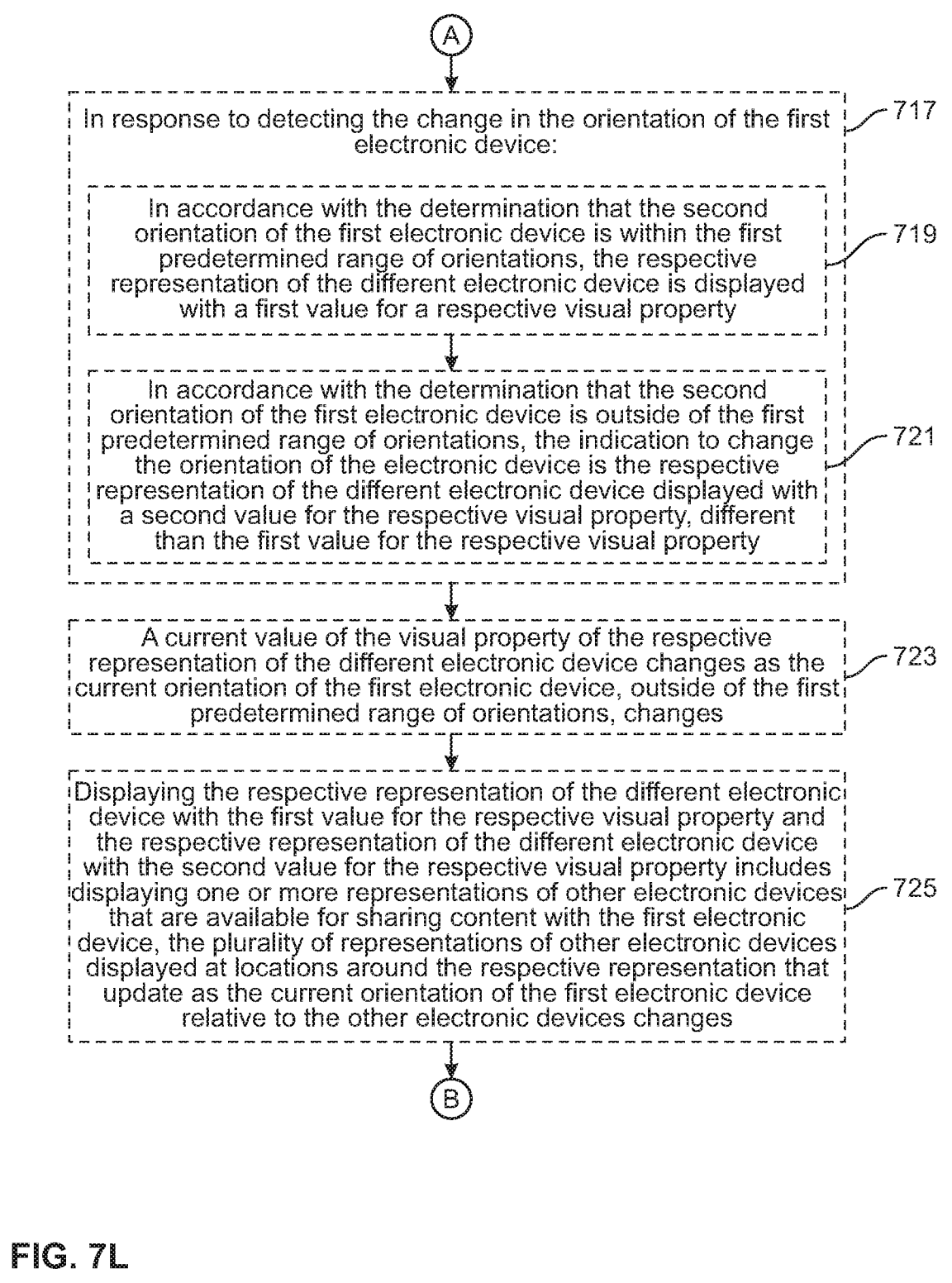

A

717 In response to detecting the change in the orientation of the first electronic device:

719 In accordance with the determination that the second orientation of the first electronic device is within the first predetermined range of orientations, the respective representation of the different electronic device is displayed with a first value for a respective visual property 721 In accordance with the determination that the second orientation of the first electronic device is outside of the first predetermined range of orientations, the indication to change the orientation of the electronic device is the respective representation of the different electronic device displayed with a second value for the respective visual property, different than the first value for the respective visual property 723 A current value of the visual property of the respective representation of the different electronic device changes as the current orientation of the first electronic device, outside of the first predetermined range of orientations, changes 725 Displaying the respective representation of the different electronic device with the first value for the respective visual property and the respective representation of the different electronic device with the second value for the respective visual property includes displaying one or more representations of other electronic devices that are available for sharing content with the first electronic device, the plurality of representations of other electronic devices displayed at locations around the respective representation that update as the current orientation of the first electronic device relative to the other electronic devices changes

USER INTERFACES FOR SHARING CONTENT WITH OTHER ELECTRONIC DEVICES

CROSS-REFERENCE TO RELATED APPLICATIONS

This application is a continuation of U.S. application Ser. No. 17/086,205, filed on Oct. 30, 2020 (now published as U.S. Publication No. 2021-0103366 A1), which is a continuation of U.S. application Ser. No. 16/584,685, filed on Sep. 26, 2019 (now issued as U.S. Pat. No. 10,852,915), which claims benefit of U.S. Provisional Patent Application Nos. 62/843,958, filed May 6, 2019 and 62/897,741, filed Sep. 9, 2019, the contents of all of which are hereby incorporated by reference in their entirety for all purposes.

FIELD OF THE DISCLOSURE

This relates generally to electronic devices that display user interfaces for sharing content with other electronic devices, and user interactions with such devices.

BACKGROUND

User interaction with electronic devices has increased significantly in recent years. These devices can be devices such as computers, tablet computers, televisions, multimedia devices, mobile devices, and the like.

In some circumstances, users wish to share content with other electronic devices. Enhancing these interactions improves the user's experience with the device and decreases user interaction time, which is particularly important where input devices are battery-operated.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

SUMMARY

Some embodiments described in this disclosure are directed to one or more first electronic devices that present an option that is selectable to share content with a second electronic device towards which the first electronic device is oriented. Some embodiments described in this disclosure are directed to one or more first electronic devices that present an indication to change the orientation of the electronic device when the orientation of the electronic device is outside of a range of orientations in which circuitry that identifies another electronic device with which to share content is able to function with desired reliability. Some embodiments described in this disclosure are directed to one or more electronic devices that present a sharing user interface within an action user interface associated with an application on the electronic device. Some embodiments described in this disclosure are directed to one or more electronic devices that present user interfaces for modifying content according to one or more settings before sharing the content with another electronic device.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

FIGS. 5I-5N provide a set of sample tactile output patterns that may be used, either individually or in combination, either as is or through one or more transformations (e.g., modulation, amplification, truncation, etc.), to create suitable haptic feedback in various scenarios and for various purposes, such as those mentioned above and those described with respect to the user interfaces and methods discussed herein.

FIGS. 7K-7P are flow diagrams illustrating a method of presenting an indication to change the orientation of the electronic device when the orientation of the electronic device is outside of a range of orientations in which circuitry that identifies another electronic device with which to share content is able to function with desired reliability in accordance with some embodiments of the disclosure.

DETAILED DESCRIPTION

Description of Embodiments

Figure 1A:
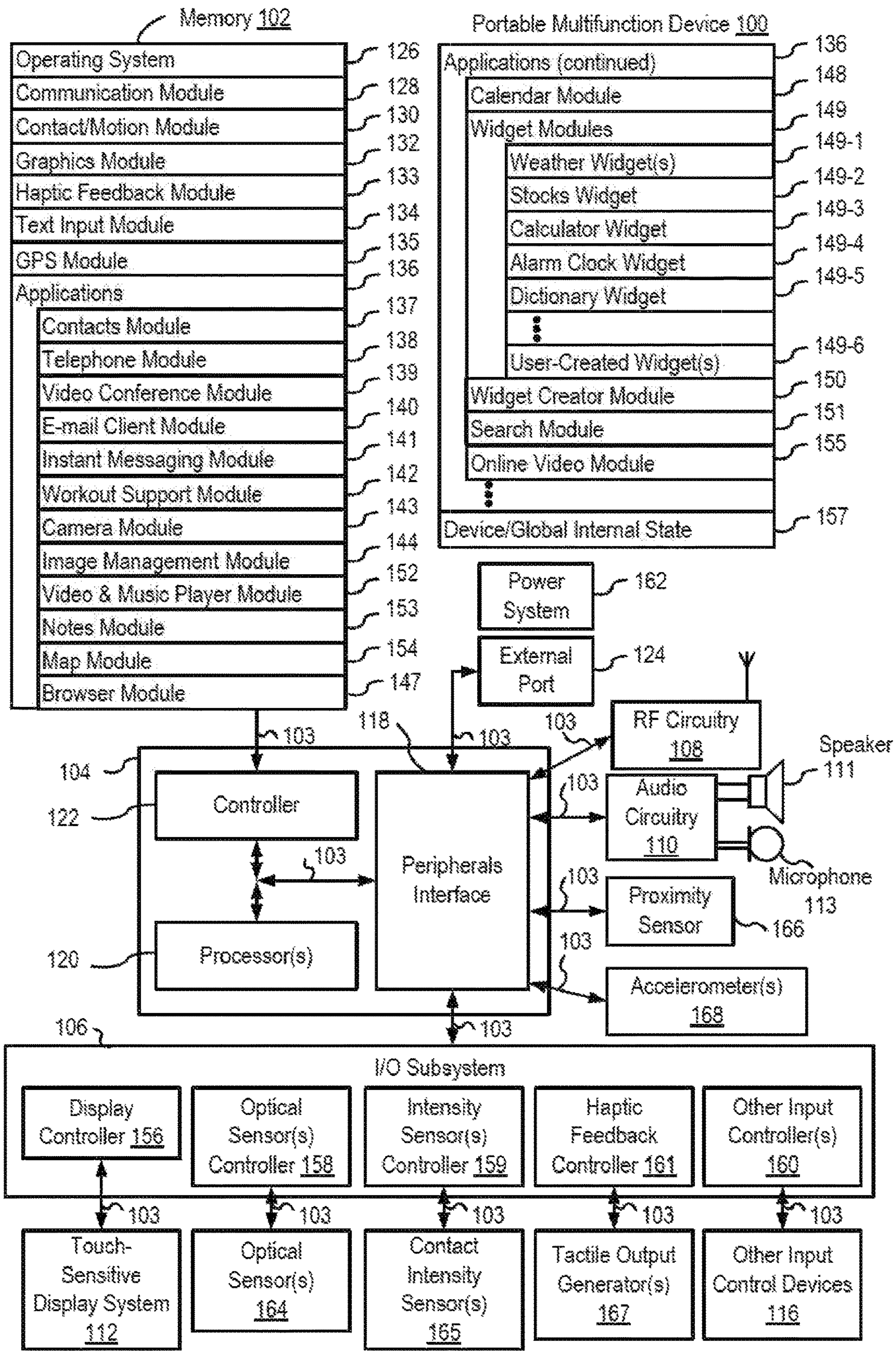
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

There is a need for electronic devices that share content with other electronic devices. Such techniques can reduce the cognitive burden on a user who uses such devices and/or wishes to control their use of such devices. Further, such techniques can reduce processor and battery power otherwise wasted on redundant user inputs.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term “tactile output” refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user’s sense of touch. For example, in situations where the device or the component of the device is in contact with a surface of a user that is sensitive to touch (e.g., a finger, palm, or other part of a user’s hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a “down click” or “up click” of a physical actuator button. In some cases, a user will feel a tactile sensation such as an “down click” or “up click” even when there is no movement of a physical actuator button associated with the touch-sensitive surface that is physically pressed (e.g., displaced) by the user’s movements. As another example, movement of the touch-sensitive surface is, optionally, interpreted or sensed by the user as “roughness” of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an “up click,” a “down click,” “roughness”), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions)

Figure 3:
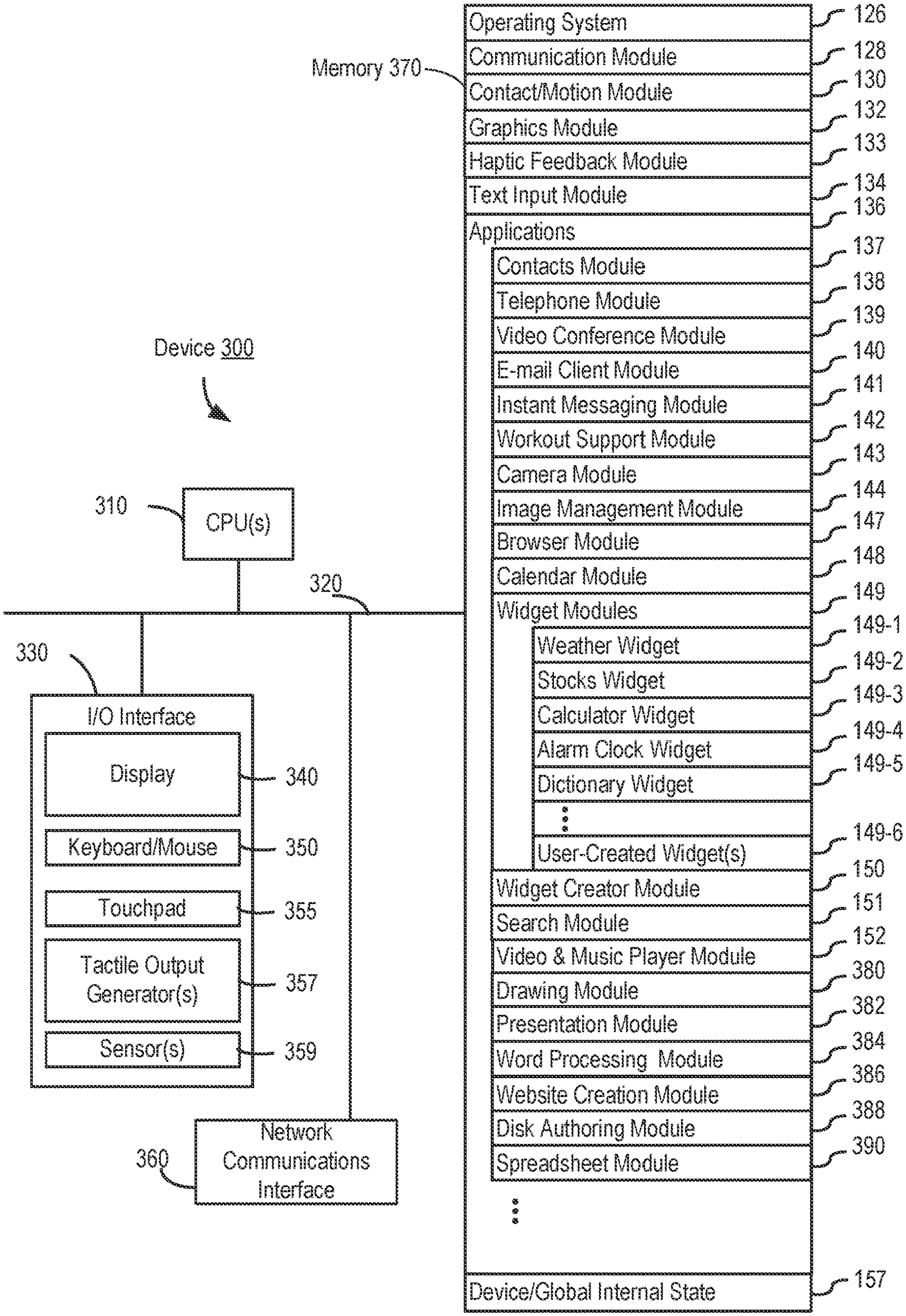
FIG. 3 is a block diagram of an exemplary multifunction device with a display and a touch-sensitive surface in accordance with some embodiments.

136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:

- Contacts module 137 (sometimes called an address book or contact list);
- Telephone module 138;
- Video conference module 139;
- E-mail client module 140;
- Instant messaging (IM) module 141;
- Workout support module 142;
- Camera module 143 for still and/or video images;
- Image management module 144;
- Video player module;
- Music player module;
- Browser module 147;

- Calendar module 148;
- Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- Widget creator module 150 for making user-created widgets 149-6;
- Search module 151;
- Video and music player module 152, which merges video player module and music player module;
- Notes module 153;
- Map module 154; and/or
- Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
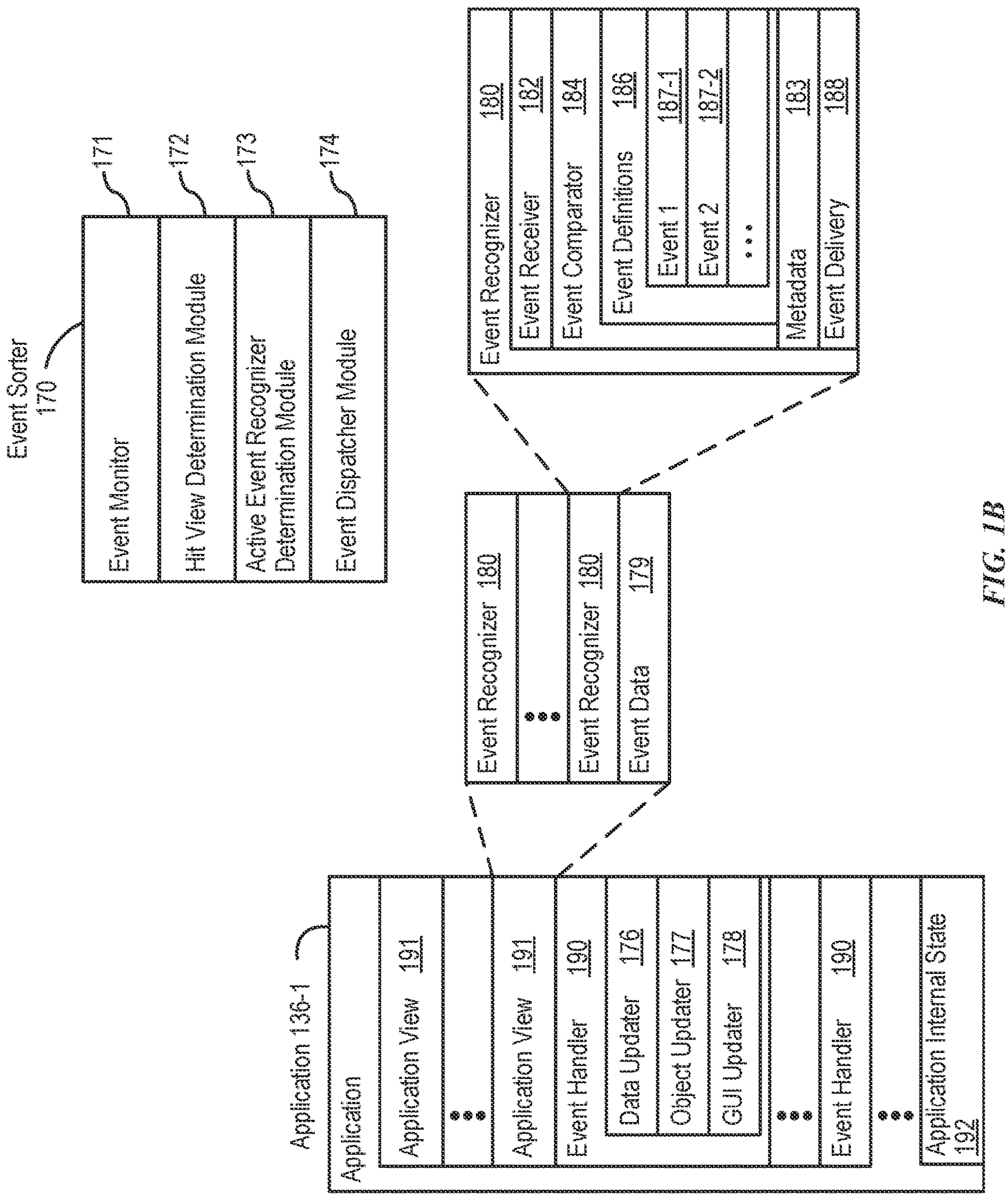
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
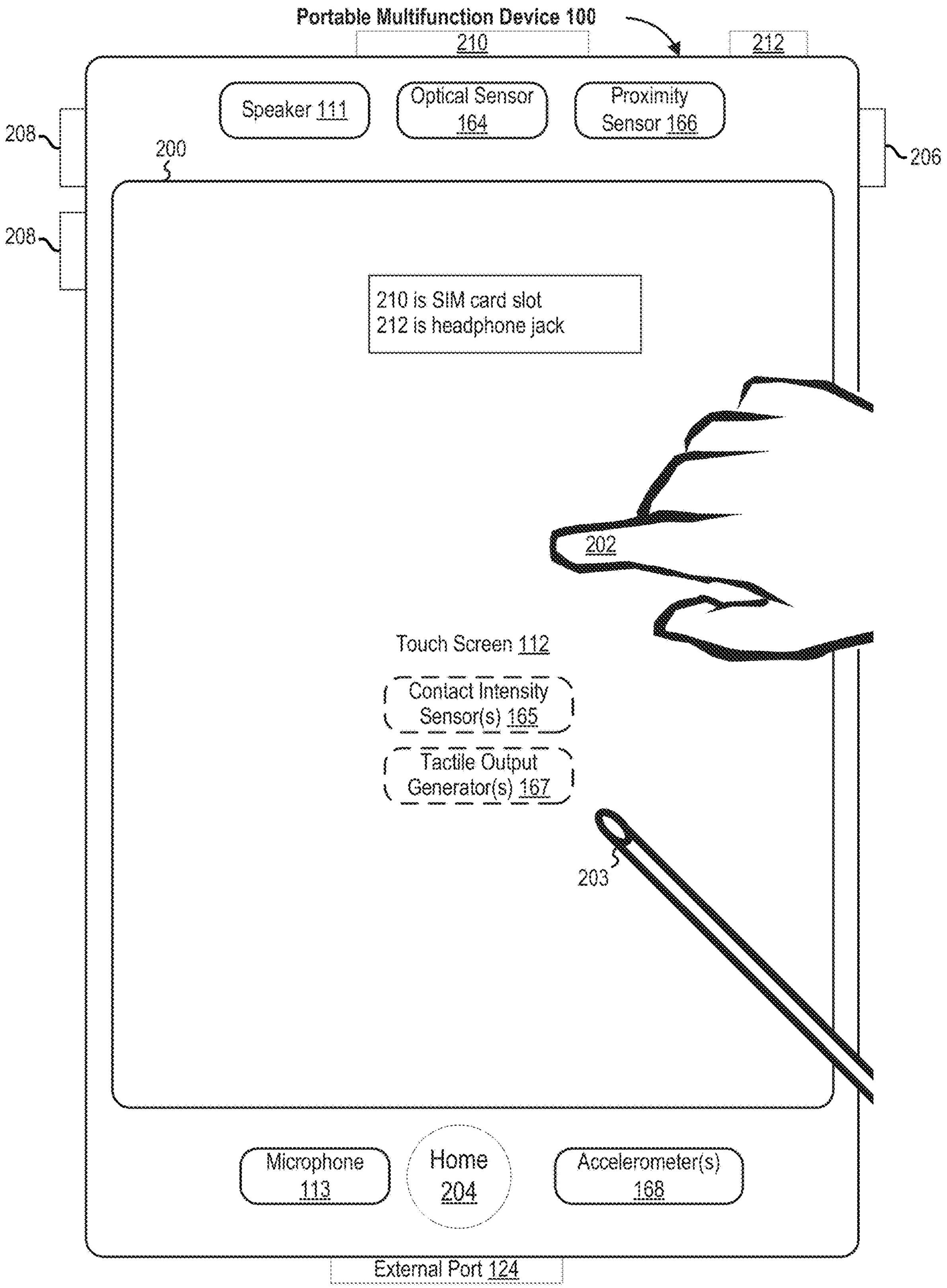
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
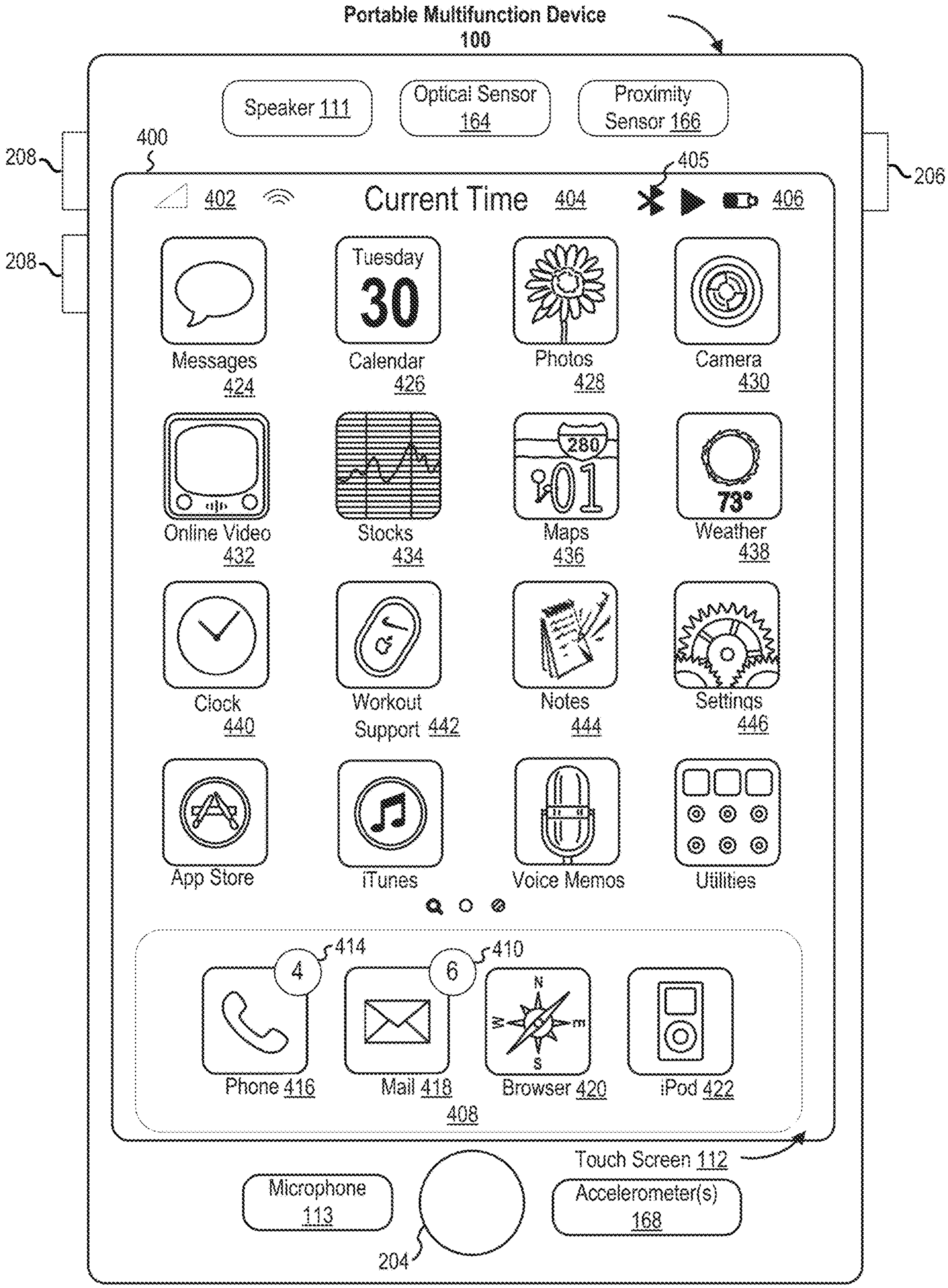
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

- Signal strength indicator(s) 402 for wireless communication(s), such as cellular and Wi-Fi signals;
- Time 404;
- Bluetooth indicator 405;
- Battery status indicator 406;
- Tray 408 with icons for frequently used applications, such as:
  - Icon 416 for telephone module 138, labeled "Phone," which optionally includes an indicator 414 of the number of missed calls or voicemail messages;
  - Icon 418 for e-mail client module 140, labeled "Mail," which optionally includes an indicator 410 of the number of unread e-mails;
  - Icon 420 for browser module 147, labeled "Browser;" and
  - Icon 422 for video and music player module 152, also referred to as iPod (trademark of Apple Inc.) module 152, labeled "iPod;" and
- Icons for other applications, such as:
  - Icon 424 for IM module 141, labeled "Messages;"
  - Icon 426 for calendar module 148, labeled "Calendar;"
  - Icon 428 for image management module 144, labeled "Photos;"
  - Icon 430 for camera module 143, labeled "Camera;"
  - Icon 432 for online video module 155, labeled "Online Video;"
  - Icon 434 for stocks widget 149-2, labeled "Stocks;"
  - Icon 436 for map module 154, labeled "Maps;"
  - Icon 438 for weather widget 149-1, labeled "Weather;"
  - Icon 440 for alarm clock widget 149-4, labeled "Clock;"
  - Icon 442 for workout support module 142, labeled "Workout Support;"
  - Icon 444 for notes module 153, labeled "Notes;" and
  - Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
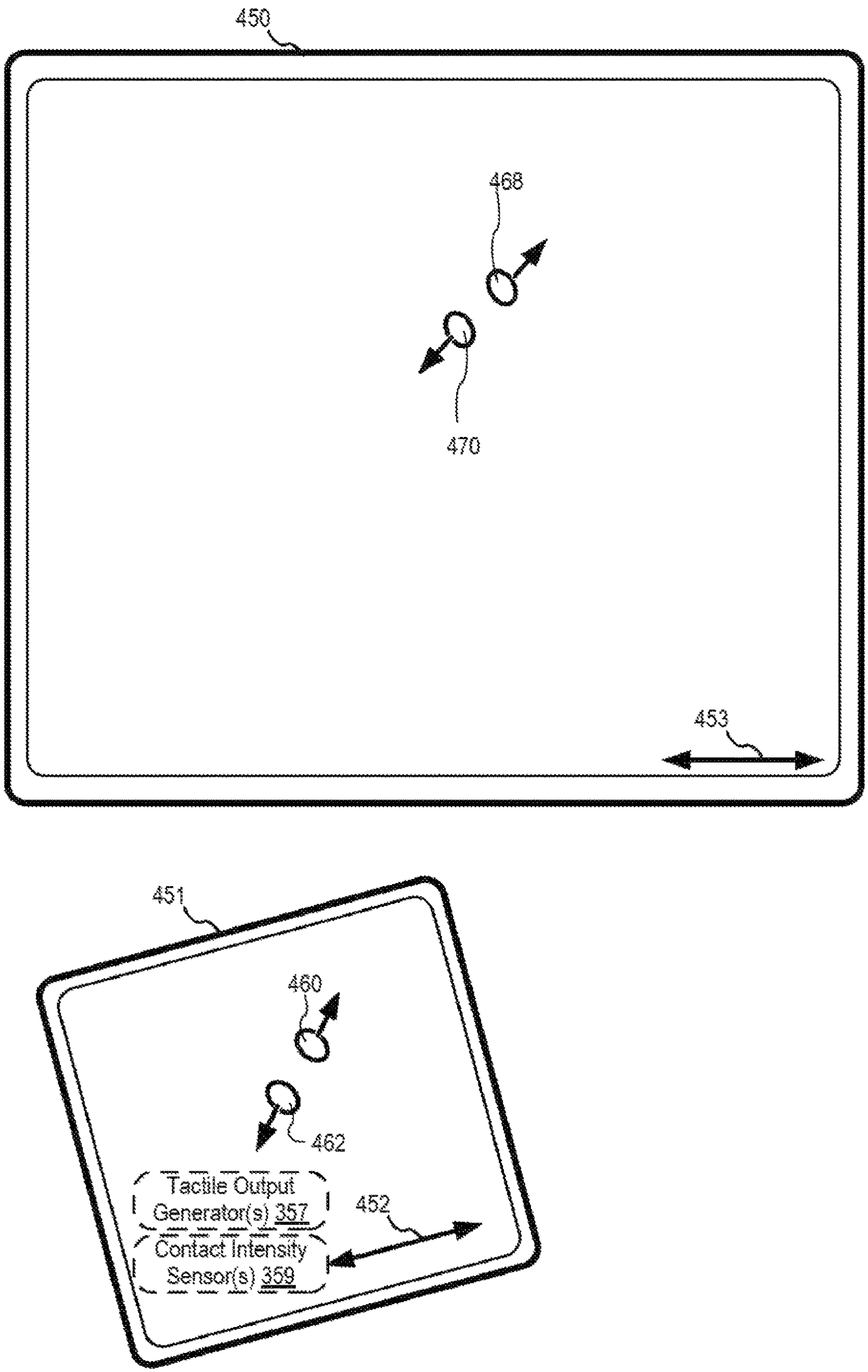
FIG. 4B illustrates an exemplary user interface for a multifunction device with a touch-sensitive surface that is separate from the display in accordance with some embodiments.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
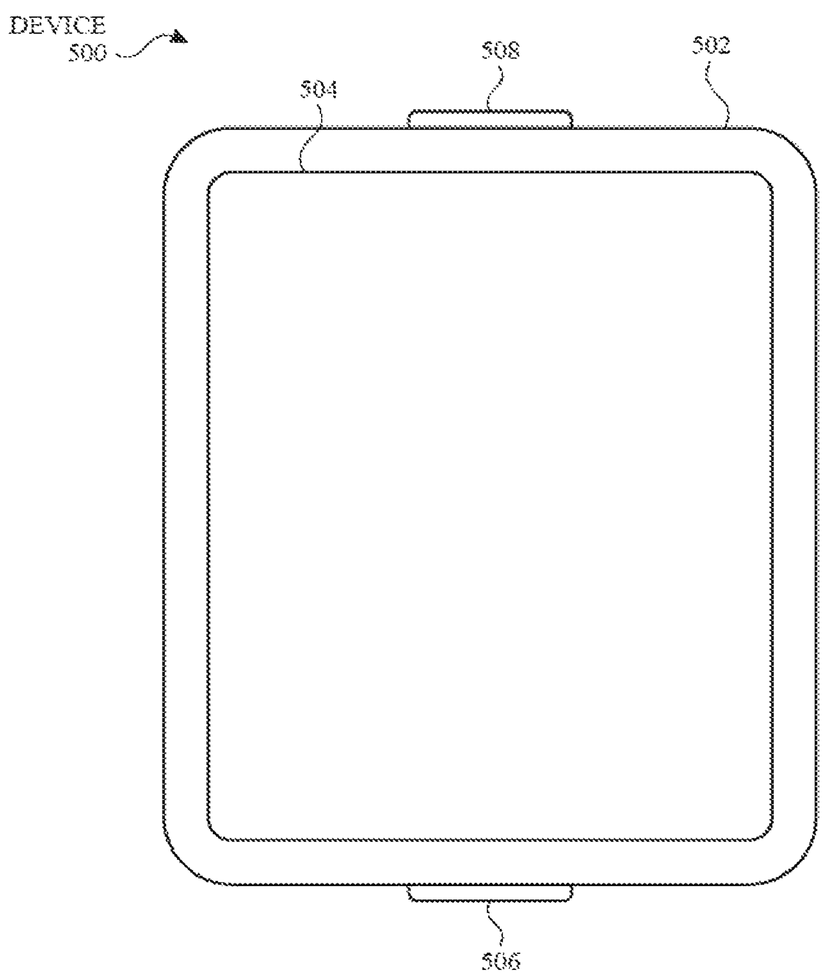
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
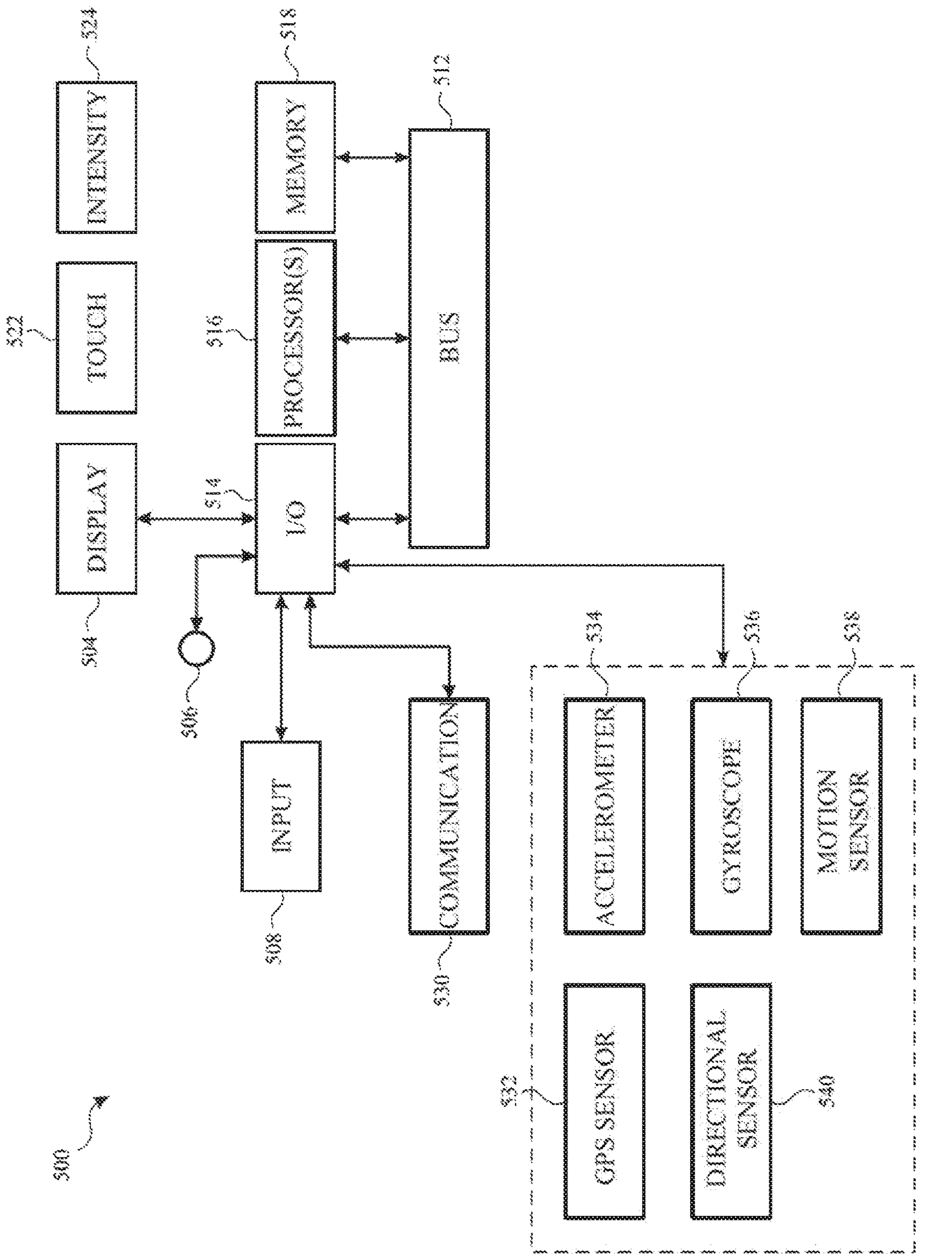
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700, 701, 900 and 1100 (FIGS. 7, 9 and 11). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Figure 5C:
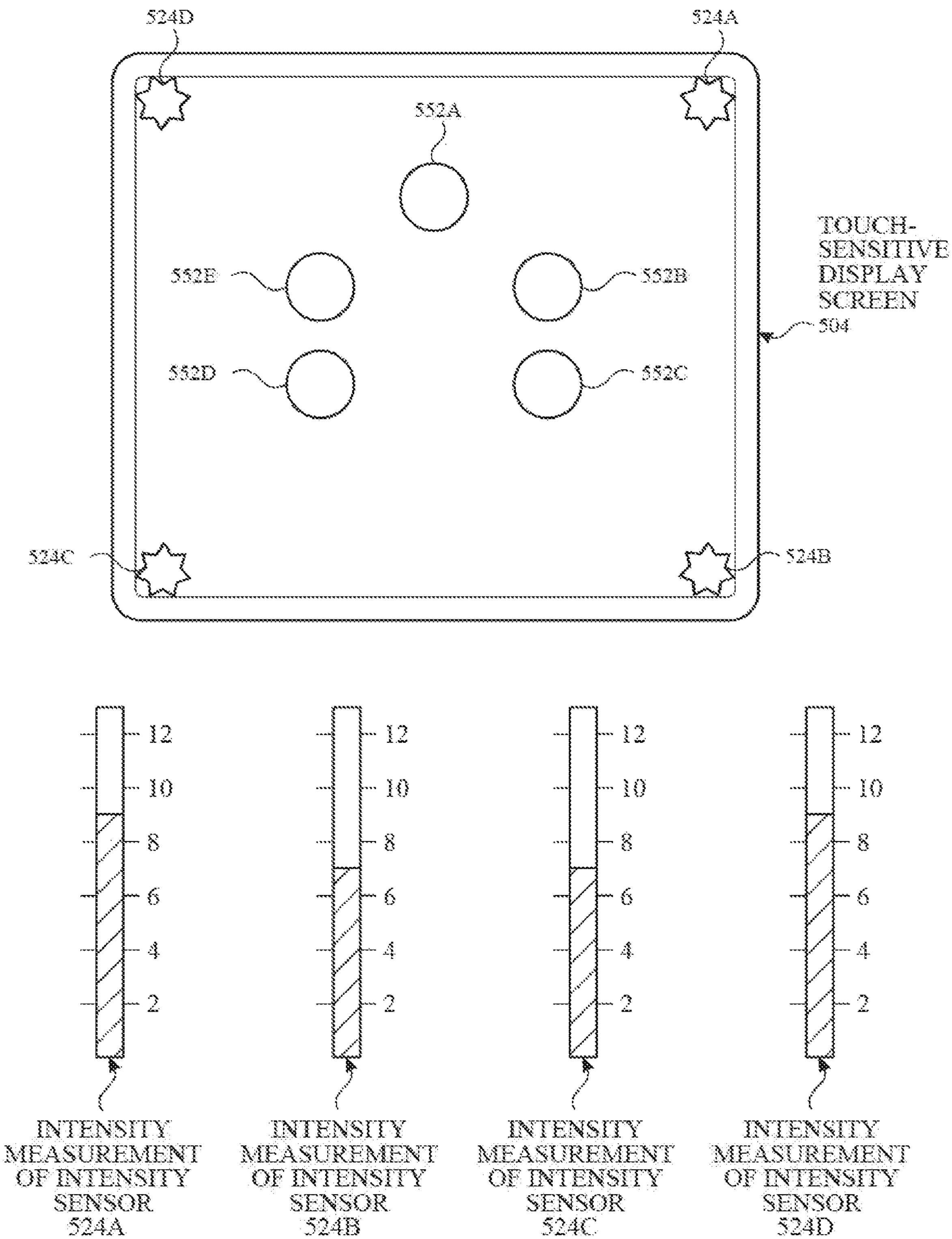
FIGS. 5C-5D illustrate exemplary components of a personal electronic device having a touch-sensitive display and intensity sensors in accordance with some embodiments.
Figure 5D:
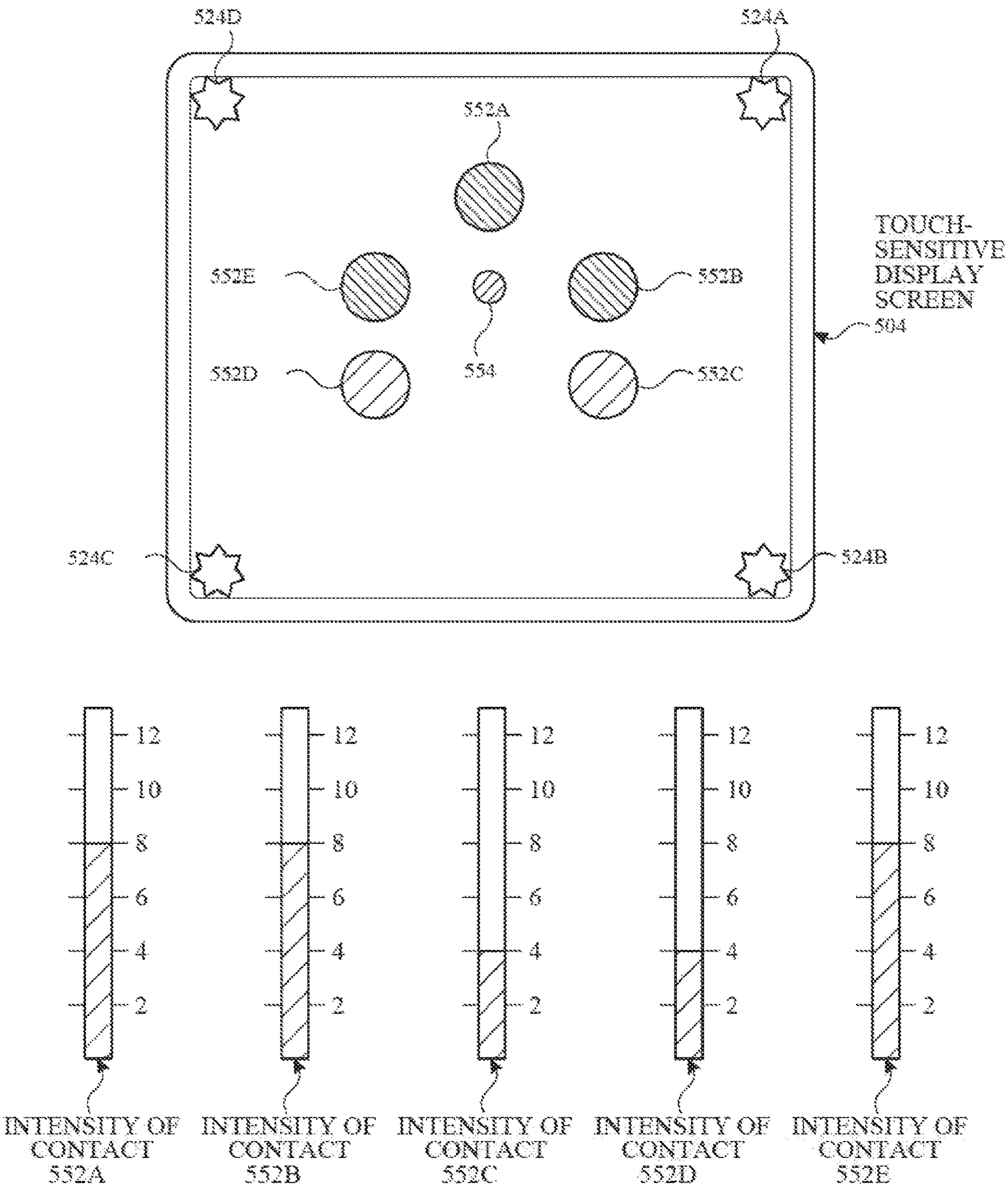

FIG. 5C illustrates detecting a plurality of contacts 552A-552E on touch-sensitive display screen 504 with a plurality of intensity sensors 524A-524D. FIG. 5C additionally includes intensity diagrams that show the current intensity measurements of the intensity sensors 524A-524D relative to units of intensity. In this example, the intensity measurements of intensity sensors 524A and 524D are each 9 units of intensity, and the intensity measurements of intensity sensors 524B and 524C are each 7 units of intensity. In some implementations, an aggregate intensity is the sum of the intensity measurements of the plurality of intensity sensors 524A-524D, which in this example is 32 intensity units. In some embodiments, each contact is assigned a respective intensity that is a portion of the aggregate intensity. FIG. 5D illustrates assigning the aggregate intensity to contacts 552A-552E based on their distance from the center of force 554. In this example, each of contacts 552A, 552B, and 552E are assigned an intensity of contact of 8 intensity units of the aggregate intensity, and each of contacts 552C and 552D are assigned an intensity of contact of 4 intensity units of the aggregate intensity. More generally, in some implementations, each contact j is assigned a respective intensity Ij that is a portion of the aggregate intensity, A, in accordance with a predefined mathematical function, $Ij=A\cdot(Dj/\Sigma Di)$, where Dj is the distance of the respective contact j to the center of force, and ΣDi is the sum of the distances of all the respective contacts (e.g., i=1 to last) to the center of force. The operations described with reference to FIGS. 5C-5D can be performed using an electronic device similar or identical to device 100, 300, or 500. In some embodiments, a characteristic intensity of a contact is based on one or more intensities of the contact. In some embodiments, the intensity sensors are used to determine a single characteristic intensity (e.g., a single characteristic intensity of a single contact). It should be noted that the intensity diagrams are not part of a displayed user interface, but are included in FIGS. 5C-5D to aid the reader.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

Figure 5E:
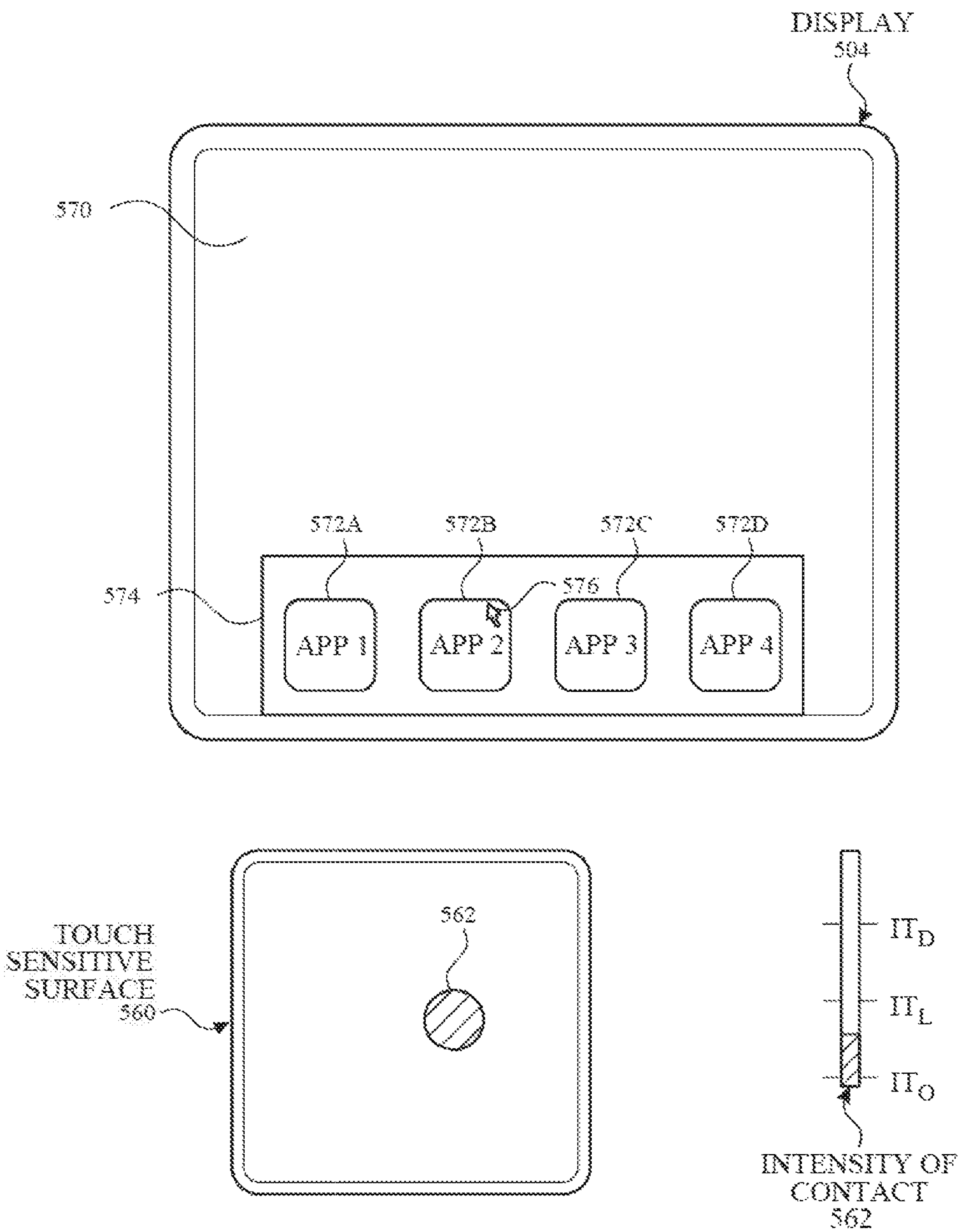
FIGS. 5E-5H illustrate exemplary components and user interfaces of a personal electronic device in accordance with some embodiments.
Figure 5F:
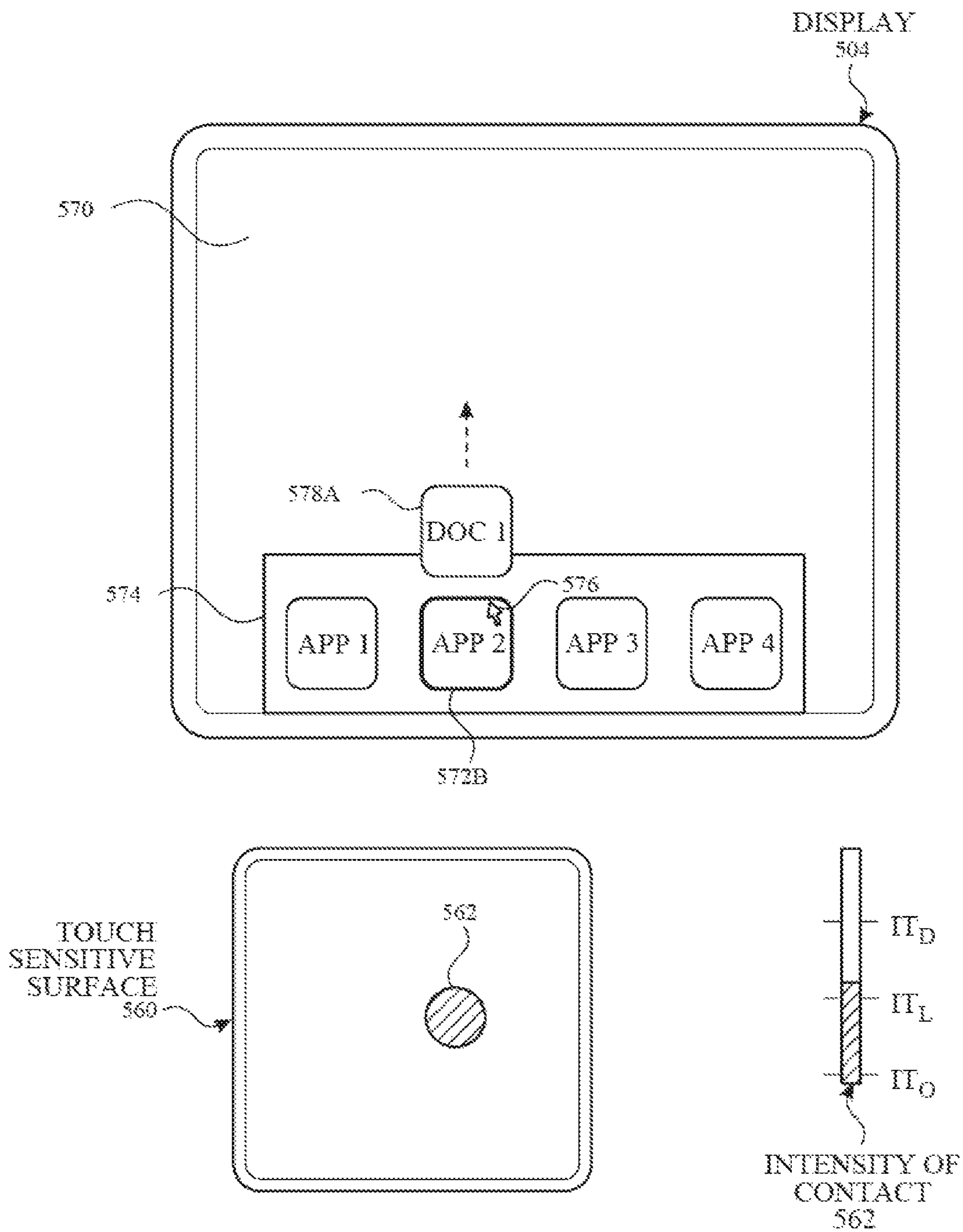
Figure 5G:
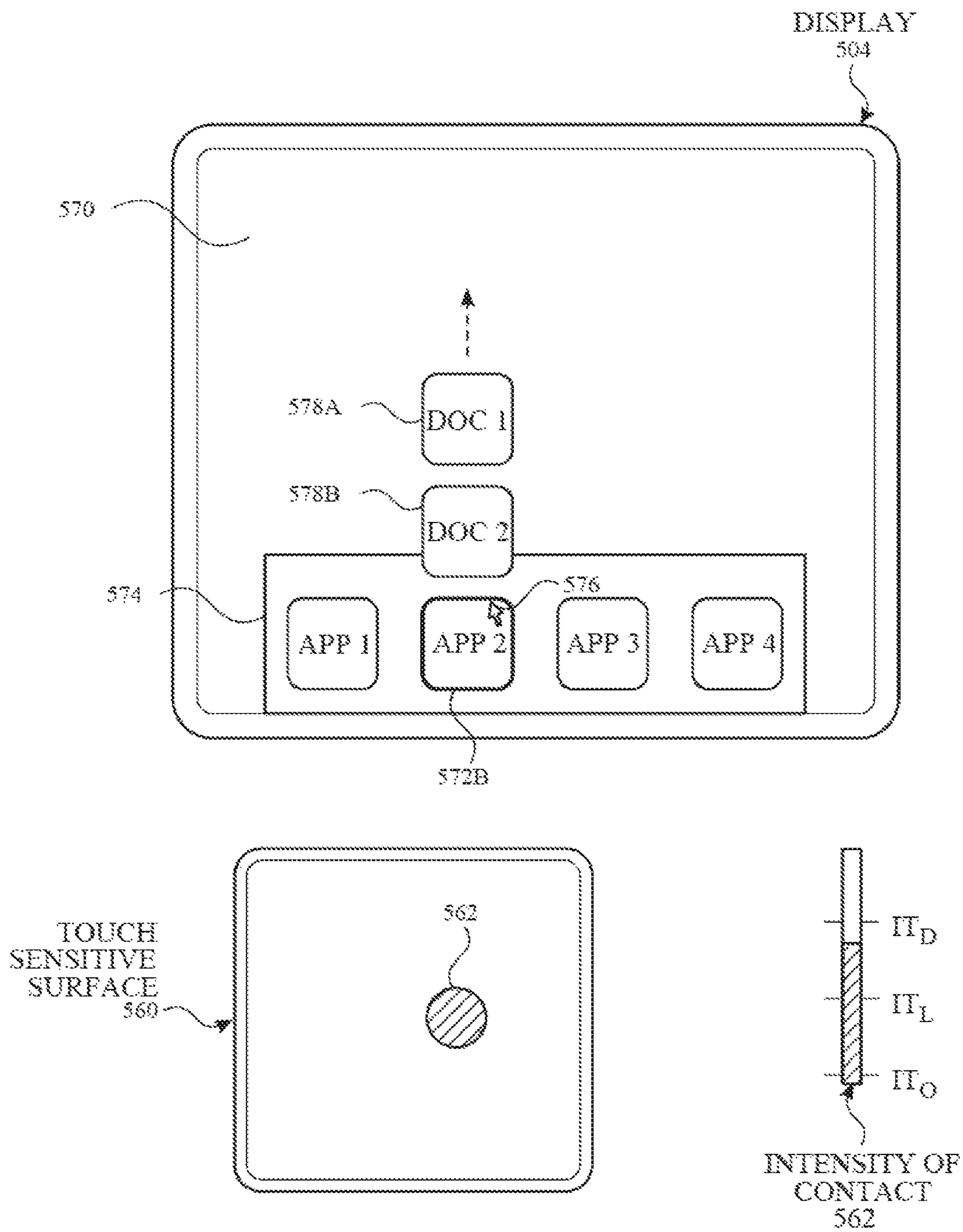
Figure 5H:
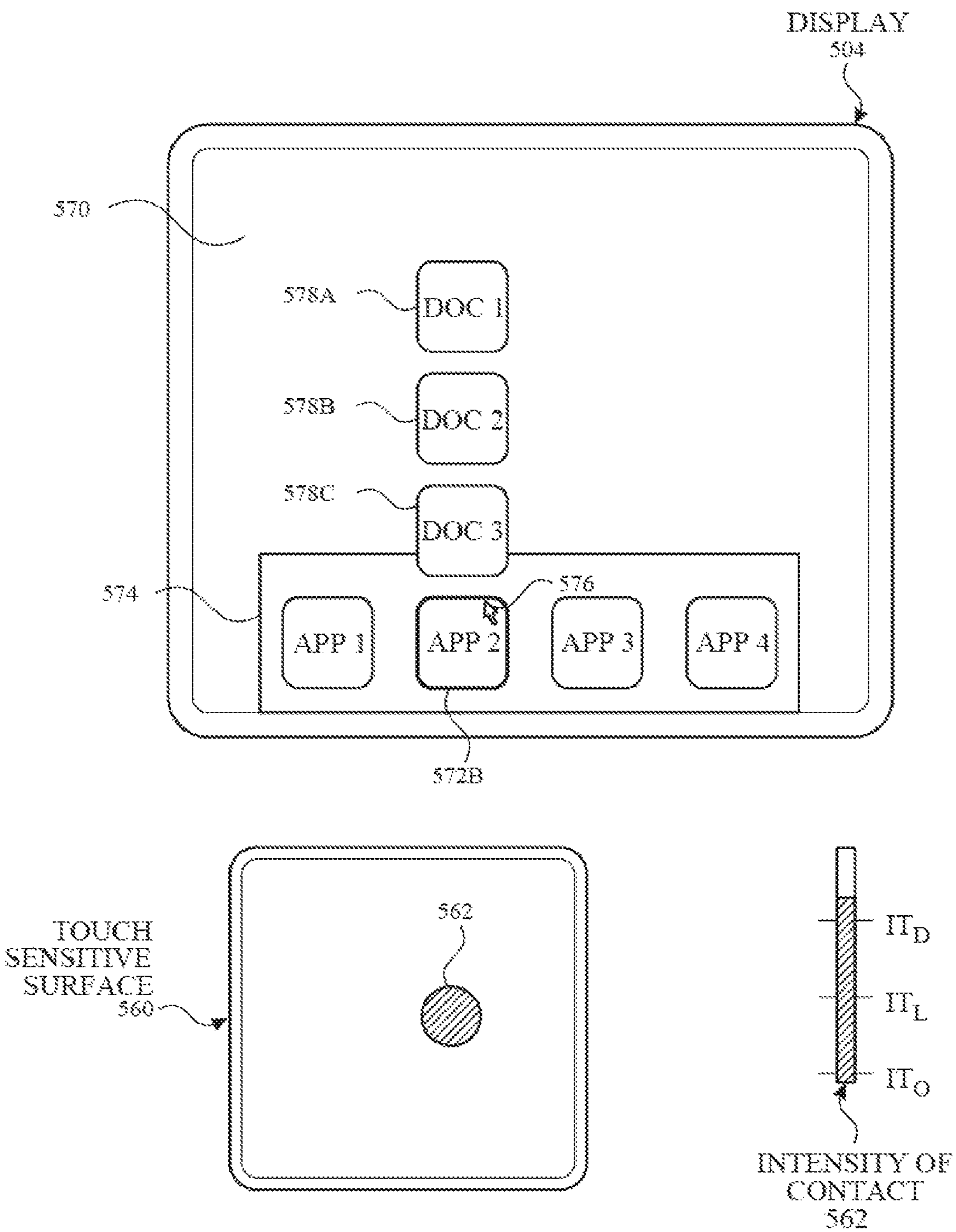
Figure 51:
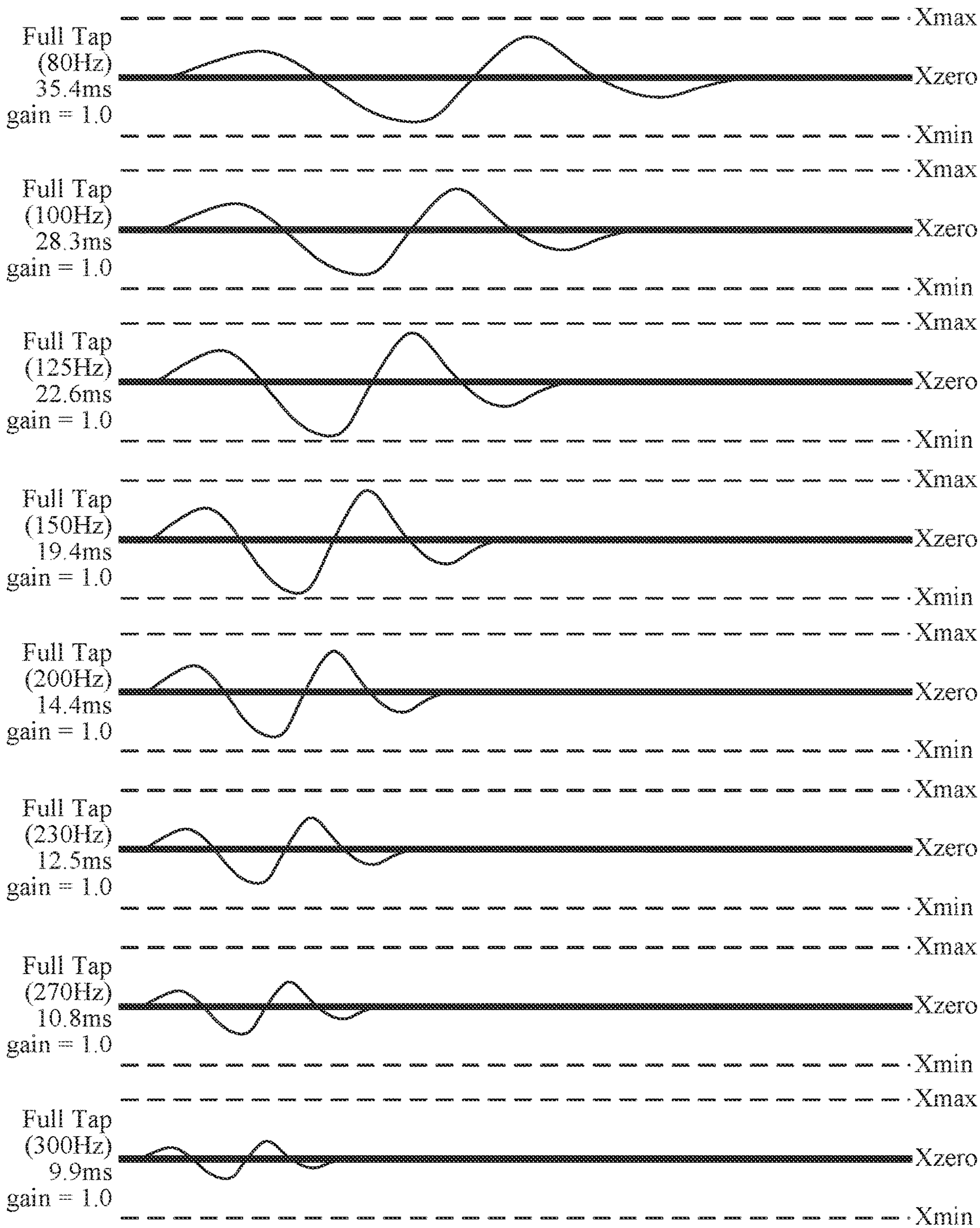

FIGS. 5E-5H illustrate detection of a gesture that includes a press input that corresponds to an increase in intensity of a contact 562 from an intensity below a light press intensity threshold (e.g., "ITL") in FIG. 5E, to an intensity above a deep press intensity threshold (e.g., "ITD") in FIG. 5H. The gesture performed with contact 562 is detected on touch-sensitive surface 560 while cursor 576 is displayed over application icon 572B corresponding to App 2, on a displayed user interface 570 that includes application icons 572A-572D displayed in predefined region 574. In some embodiments, the gesture is detected on touch-sensitive display 504. The intensity sensors detect the intensity of contacts on touch-sensitive surface 560. The device determines that the intensity of contact 562 peaked above the deep press intensity threshold (e.g., "ITD"). Contact 562 is maintained on touch-sensitive surface 560. In response to the detection of the gesture, and in accordance with contact 562 having an intensity that goes above the deep press intensity threshold (e.g., "ITD") during the gesture, reduced-scale representations 578A-578C (e.g., thumbnails) of recently opened documents for App 2 are displayed, as shown in FIGS. 5F-5H. In some embodiments, the intensity, which is compared to the one or more intensity thresholds, is the characteristic intensity of a contact. It should be noted that the intensity diagram for contact 562 is not part of a displayed user interface, but is included in FIGS. 5E-5H to aid the reader.

In some embodiments, the display of representations 578A-578C includes an animation. For example, representation 578A is initially displayed in proximity of application icon 572B, as shown in FIG. 5F. As the animation proceeds, representation 578A moves upward and representation 578B is displayed in proximity of application icon 572B, as shown in FIG. 5G. Then, representations 578A moves upward, 578B moves upward toward representation 578A, and representation 578C is displayed in proximity of application icon 572B, as shown in FIG. 5H. Representations 578A-578C form an array above icon 572B. In some embodiments, the animation progresses in accordance with an intensity of contact 562, as shown in FIGS. 5F-5G, where the representations 578A-578C appear and move upwards as the intensity of contact 562 increases toward the deep press intensity threshold (e.g., "ITD"). In some embodiments, the intensity, on which the progress of the animation is based, is the characteristic intensity of the contact. The operations described with reference to FIGS. 5E-5H can be performed using an electronic device similar or identical to device 100, 300, or 500.

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

In some embodiments, electronic device 500 includes one or more tactile output generators, where the one or more tactile output generators generate different types of tactile output sequences, as described below in Table 1. In some embodiments, a particular type of tactile output sequence generated by the one or more tactile output generators of the device corresponds to a particular tactile output pattern. For example, a tactile output pattern specifies characteristics of a tactile output, such as the amplitude of the tactile output, the shape of a movement waveform of the tactile output, the frequency of the tactile output, and/or the duration of the tactile output. When tactile outputs with different tactile output patterns are generated by a device (e.g., via one or more tactile output generators that move a moveable mass to generate tactile outputs), the tactile outputs may invoke different haptic sensations in a user holding or touching the device. While the sensation of the user is based on the user's perception of the tactile output, most users will be able to identify changes in waveform, frequency, and amplitude of tactile outputs generated by the device.

Figure 5J:
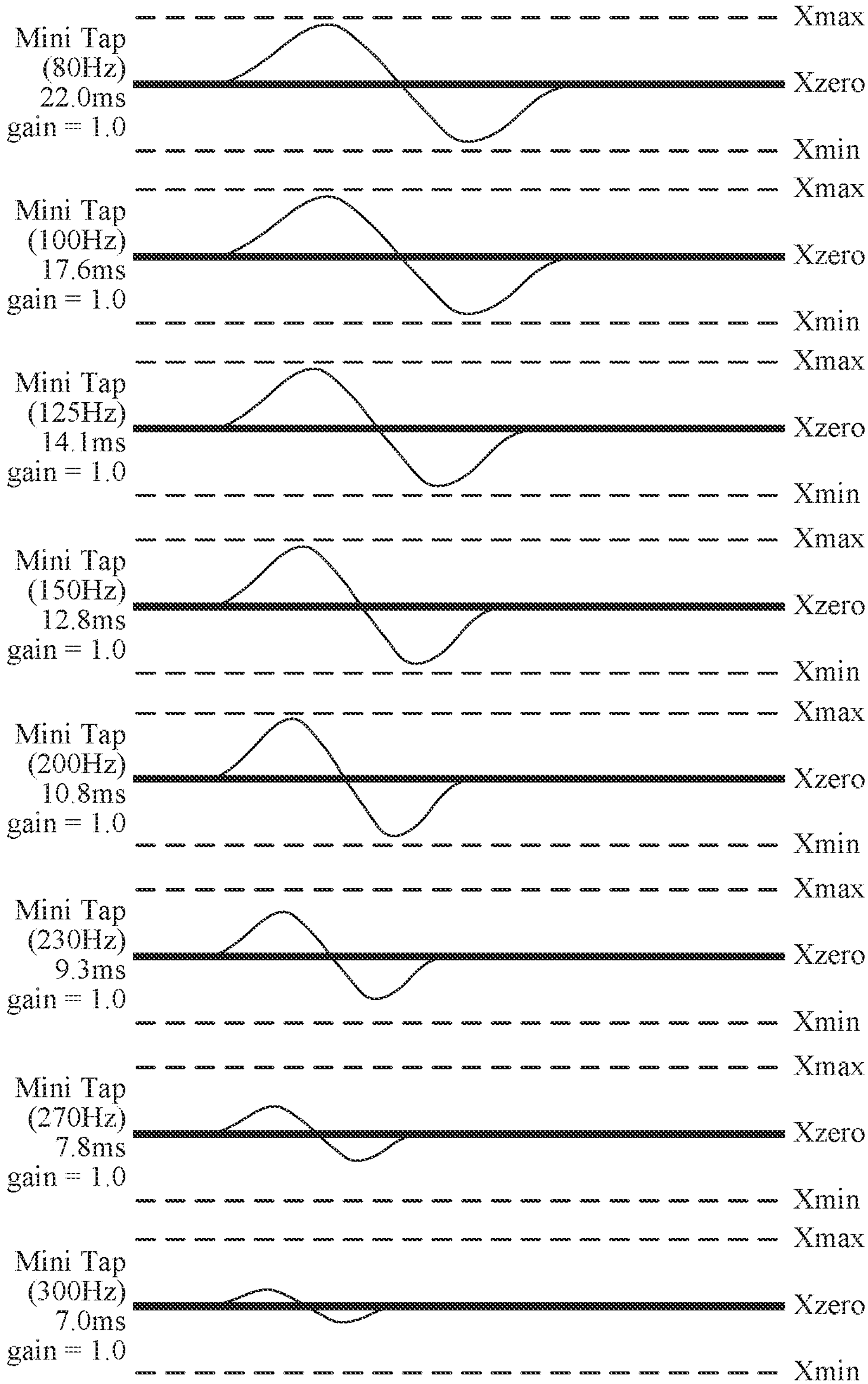
Figure 5K:
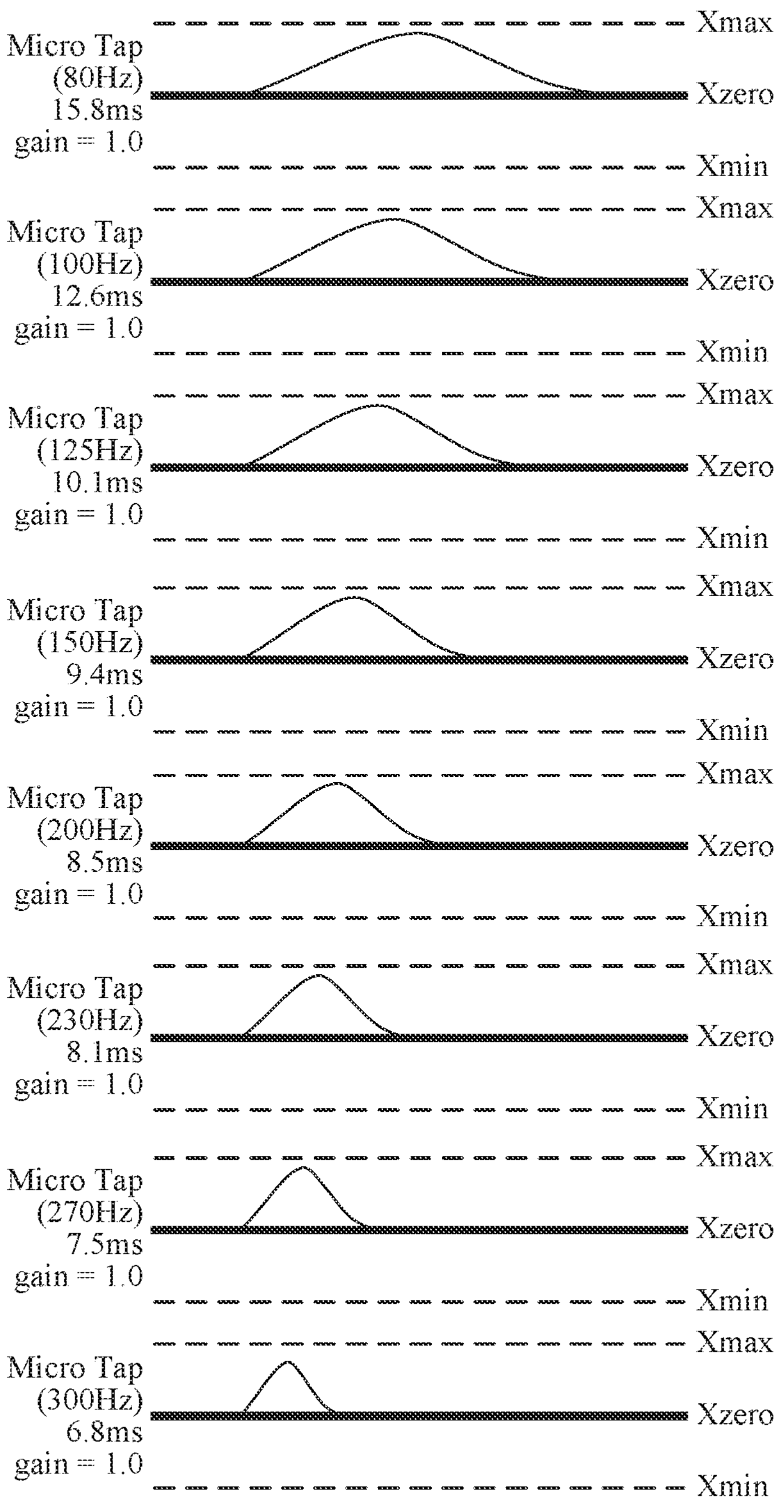
Figure 5L:
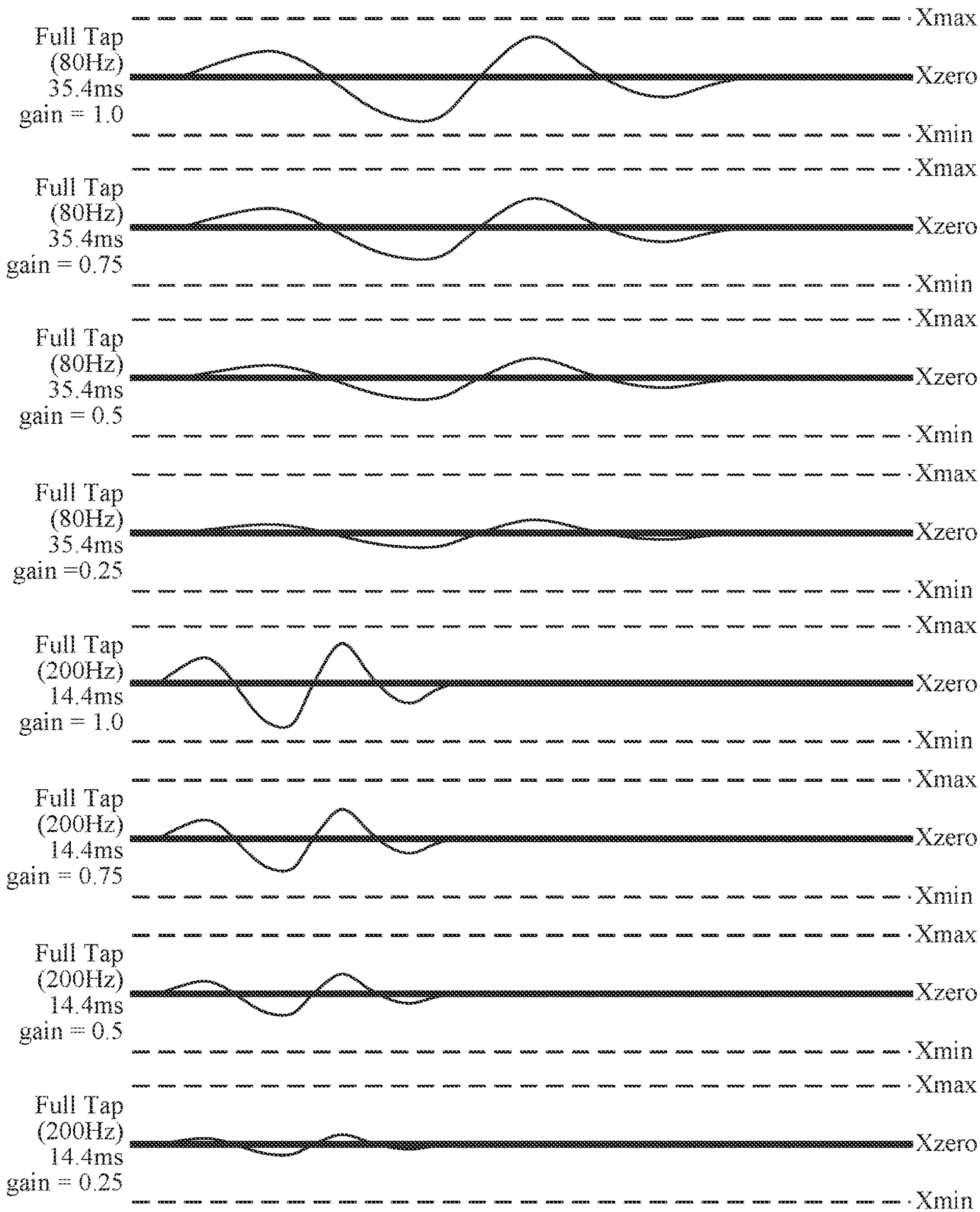
Figure 5M:
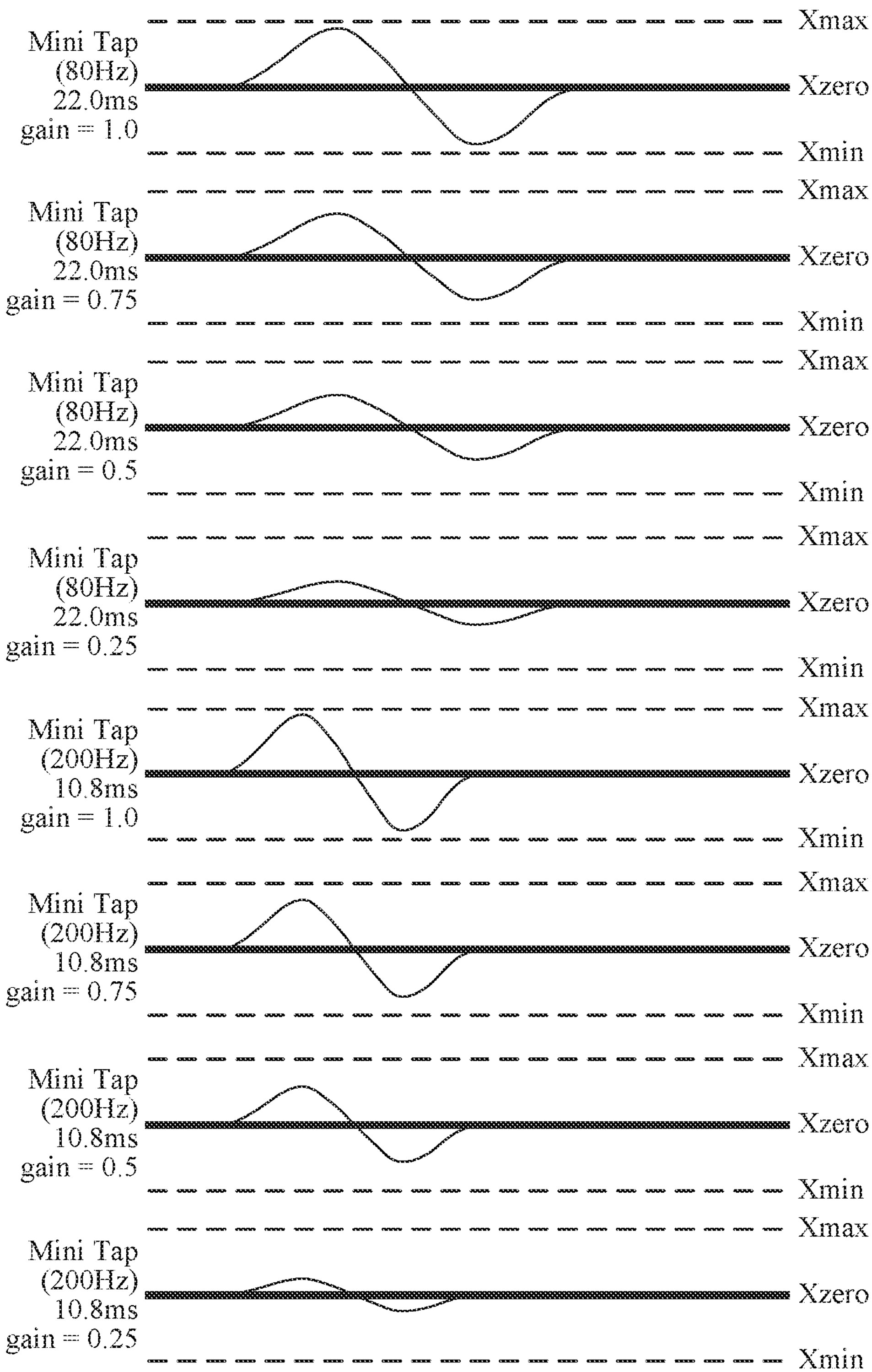
Figure 5N:
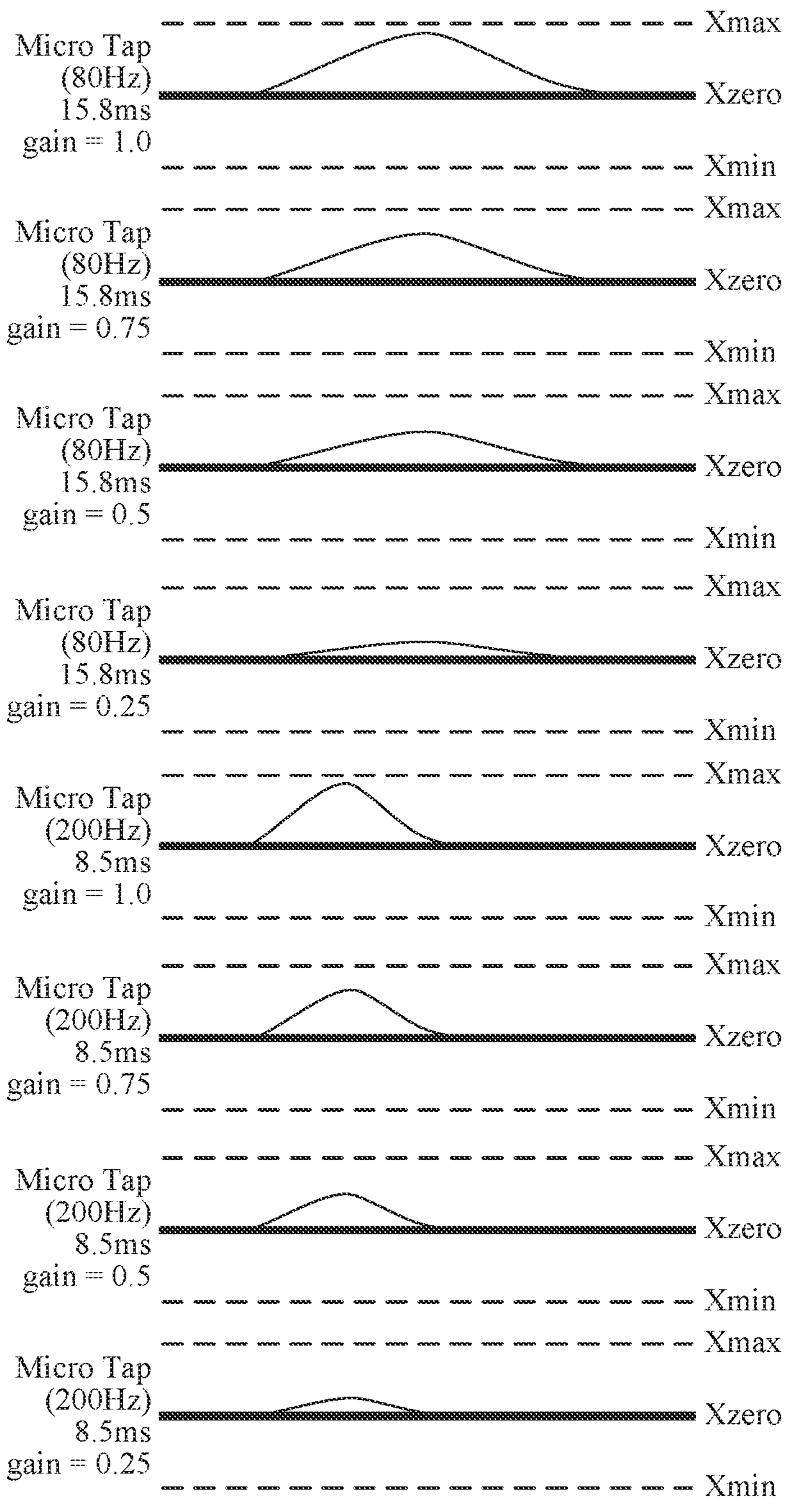

More specifically, FIGS. 5I-5K provide a set of sample tactile output patterns that may be used, either individually or in combination, either as is or through one or more transformations (e.g., modulation, amplification, truncation, etc.), to create suitable haptic feedback in various scenarios and for various purposes, such as those mentioned above and those described with respect to the user interfaces and methods discussed herein. This example of a palette of tactile outputs shows how a set of three waveforms and eight frequencies can be used to produce an array of tactile output patterns. In addition to the tactile output patterns shown in these figures, each of these tactile output patterns is optionally adjusted in amplitude by changing a gain value for the tactile output pattern, as shown, for example for FullTap 80 Hz, FullTap 200 Hz, MiniTap 80 Hz, MiniTap 200 Hz, MicroTap 80 Hz, and MicroTap 200 Hz in FIGS. 5L-5N, which are each shown with variants having a gain of 1.0, 0.75, 0.5, and 0.25. As shown in FIGS. 5L-5N, changing the gain of a tactile output pattern changes the amplitude of the pattern without changing the frequency of the pattern or changing the shape of the waveform. In some embodiments, changing the frequency of a tactile output pattern also results in a lower amplitude as some tactile output generators are limited by how much force can be applied to the moveable mass and thus higher frequency movements of the mass are constrained to lower amplitudes to ensure that the acceleration needed to create the waveform does not require force outside of an operational force range of the tactile output generator (e.g., the peak amplitudes of the FullTap at 230 Hz, 270 Hz, and 300 Hz are lower than the amplitudes of the FullTap at 80 Hz, 100 Hz, 125 Nz, and 200 Hz).

FIGS. 5I-5N show tactile output patterns that have a particular waveform. The waveform of a tactile output pattern represents the pattern of physical displacements relative to a neutral position (e.g., Xzero) versus time that a moveable mass goes through to generate a tactile output with that tactile output pattern. For example, a first set of tactile output patterns shown in FIG. 5I (e.g., tactile output patterns of a "FullTap") each have a waveform that includes an oscillation with two complete cycles (e.g., an oscillation that starts and ends in a neutral position and crosses the neutral position three times). A second set of tactile output patterns shown in FIG. 5J (e.g., tactile output patterns of a "MiniTap") each have a waveform that includes an oscillation that includes one complete cycle (e.g., an oscillation that starts and ends in a neutral position and crosses the neutral position one time). A third set of tactile output patterns shown in FIG. 5K (e.g., tactile output patterns of a "MicroTap") each have a waveform that includes an oscillation that include one half of a complete cycle (e.g., an oscillation that starts and ends in a neutral position and does not cross the neutral position). The waveform of a tactile output pattern also includes a start buffer and an end buffer that represent the gradual speeding up and slowing down of the moveable mass at the start and at the end of the tactile output. The example waveforms shown in FIGS. 5I-5N include Xmin and Xmax values which represent the maximum and minimum extent of movement of the moveable mass. For larger electronic devices with larger moveable masses, there may be larger or smaller minimum and maximum extents of movement of the mass. The examples shown in FIGS. 5I-5N describe movement of a mass in one dimension, however similar principles would also apply to movement of a moveable mass in two or three dimensions.

As shown in FIGS. 5I-5K, each tactile output pattern also has a corresponding characteristic frequency that affects the "pitch" of a haptic sensation that is felt by a user from a tactile output with that characteristic frequency. For a continuous tactile output, the characteristic frequency represents the number of cycles that are completed within a given period of time (e.g., cycles per second) by the moveable mass of the tactile output generator. For a discrete tactile output, a discrete output signal (e.g., with 0.5, 1, or 2 cycles) is generated, and the characteristic frequency value specifies how fast the moveable mass needs to move to generate a tactile output with that characteristic frequency. As shown in FIGS. 5I-5N, for each type of tactile output (e.g., as defined by a respective waveform, such as FullTap, MiniTap, or MicroTap), a higher frequency value corresponds to faster movement(s) by the moveable mass, and hence, in general, a shorter time to complete the tactile output (e.g., including the time to complete the required number of cycle(s) for the discrete tactile output, plus a start and an end buffer time). For example, a FullTap with a characteristic frequency of 80 Hz takes longer to complete than FullTap with a characteristic frequency of 100 Hz (e.g., 35.4 ms vs. 28.3 ms in FIG. 5I). In addition, for a given frequency, a tactile output with more cycles in its waveform at a respective frequency takes longer to complete than a tactile output with fewer cycles its waveform at the same respective frequency. For example, a FullTap at 150 Hz takes longer to complete than a MiniTap at 150 Hz (e.g., 19.4 ms vs. 12.8 ms), and a MiniTap at 150 Hz takes longer to complete than a MicroTap at 150 Hz (e.g., 12.8 ms vs. 9.4 ms). However, for tactile output patterns with different frequencies this rule may not apply (e.g., tactile outputs with more cycles but a higher frequency may take a shorter amount of time to complete than tactile outputs with fewer cycles but a lower frequency, and vice versa). For example, at 300 Hz, a FullTap takes as long as a MiniTap (e.g., 9.9 ms).

As shown in FIGS. 5I-5K, a tactile output pattern also has a characteristic amplitude that affects the amount of energy that is contained in a tactile signal, or a "strength" of a haptic sensation that may be felt by a user through a tactile output with that characteristic amplitude. In some embodiments, the characteristic amplitude of a tactile output pattern refers to an absolute or normalized value that represents the maximum displacement of the moveable mass from a neutral position when generating the tactile output. In some embodiments, the characteristic amplitude of a tactile output pattern is adjustable, e.g., by a fixed or dynamically determined gain factor (e.g., a value between 0 and 1), in accordance with various conditions (e.g., customized based on user interface contexts and behaviors) and/or preconfigured metrics (e.g., input-based metrics, and/or user-interface-based metrics). In some embodiments, an input-based metric (e.g., an intensity-change metric or an input-speed metric) measures a characteristic of an input (e.g., a rate of change of a characteristic intensity of a contact in a press input or a rate of movement of the contact across a touch-sensitive surface) during the input that triggers generation of a tactile output. In some embodiments, a user-interface-based metric (e.g., a speed-across-boundary metric) measures a characteristic of a user interface element (e.g., a speed of movement of the element across a hidden or visible boundary in a user interface) during the user interface change that triggers generation of the tactile output. In some embodiments, the characteristic amplitude of a tactile output pattern may be modulated by an "envelope" and the peaks of adjacent cycles may have different amplitudes, where one of the waveforms shown above is further modified by multiplication by an envelope parameter that changes over time (e.g., from 0 to 1) to gradually adjust amplitude of portions of the tactile output over time as the tactile output is being generated.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:

- an active application, which is currently displayed on a display screen of the device that the application is being used on;
- a background application (or background processes), which is not currently displayed, but one or more processes for the application are being processed by one or more processors; and
- a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Attention is now directed towards embodiments of user interfaces ("UI") and associated processes that are implemented on an electronic device, such as portable multifunction device 100, device 300, or device 500.

User Interfaces and Associated Processes

Selectable Options for Sharing Content with a Second Electronic Device Towards which a First Electronic Device is Oriented Users interact with electronic devices in many different manners, including sharing content with nearby electronic devices. The embodiments described below provide ways in which an electronic device displays an option that, when selected, causes the electronic device to share content with another electronic device towards which the electronic device is oriented (e.g., based on the orientation of the electronic device). Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

Figure 6A:
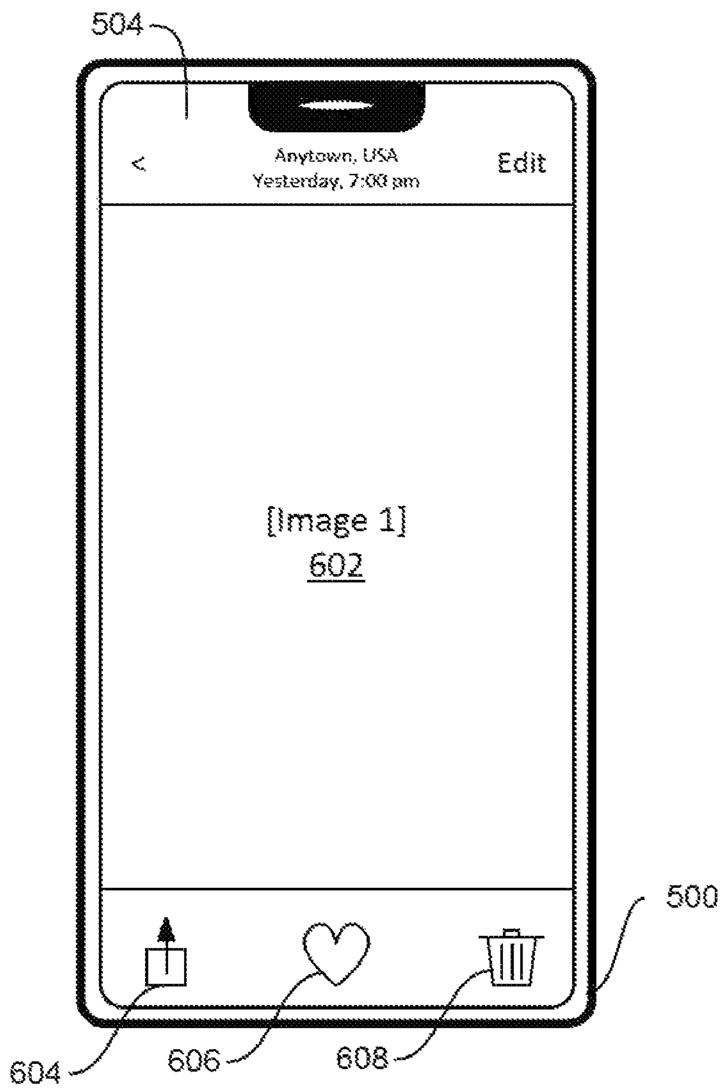
FIGS. 6A-6S illustrate exemplary ways in which a first electronic device presents an option that is selectable to share content with a second electronic device towards which the first electronic device is oriented in accordance with some embodiments of the disclosure.
Figure 6B:
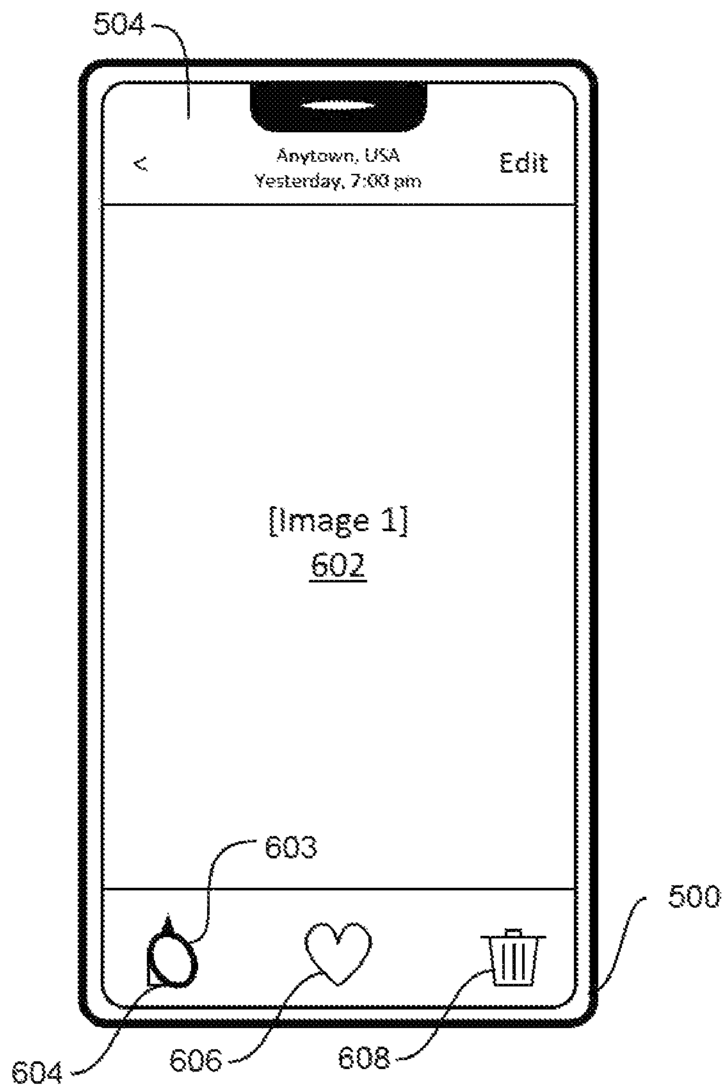
FIGS. 6T-6KK illustrate exemplary ways in which a first electronic presents an indication to change the orientation of the electronic device when the orientation of the electronic device is outside of a range of orientations in which circuitry that identifies another electronic device with which to share content is able to function with desired reliability in accordance with some embodiments of the disclosure.
Figure 6C:
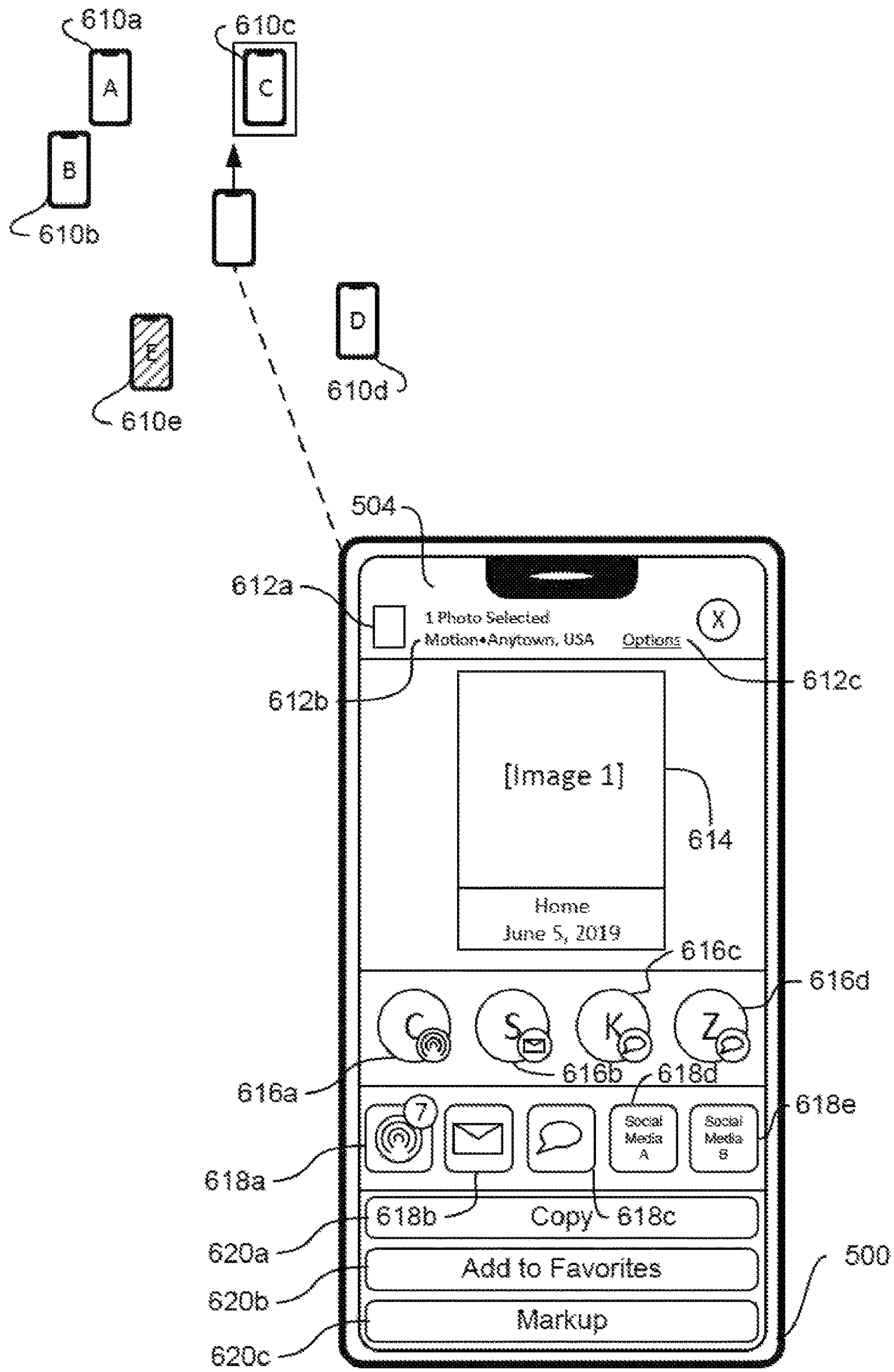
Figure 6D:
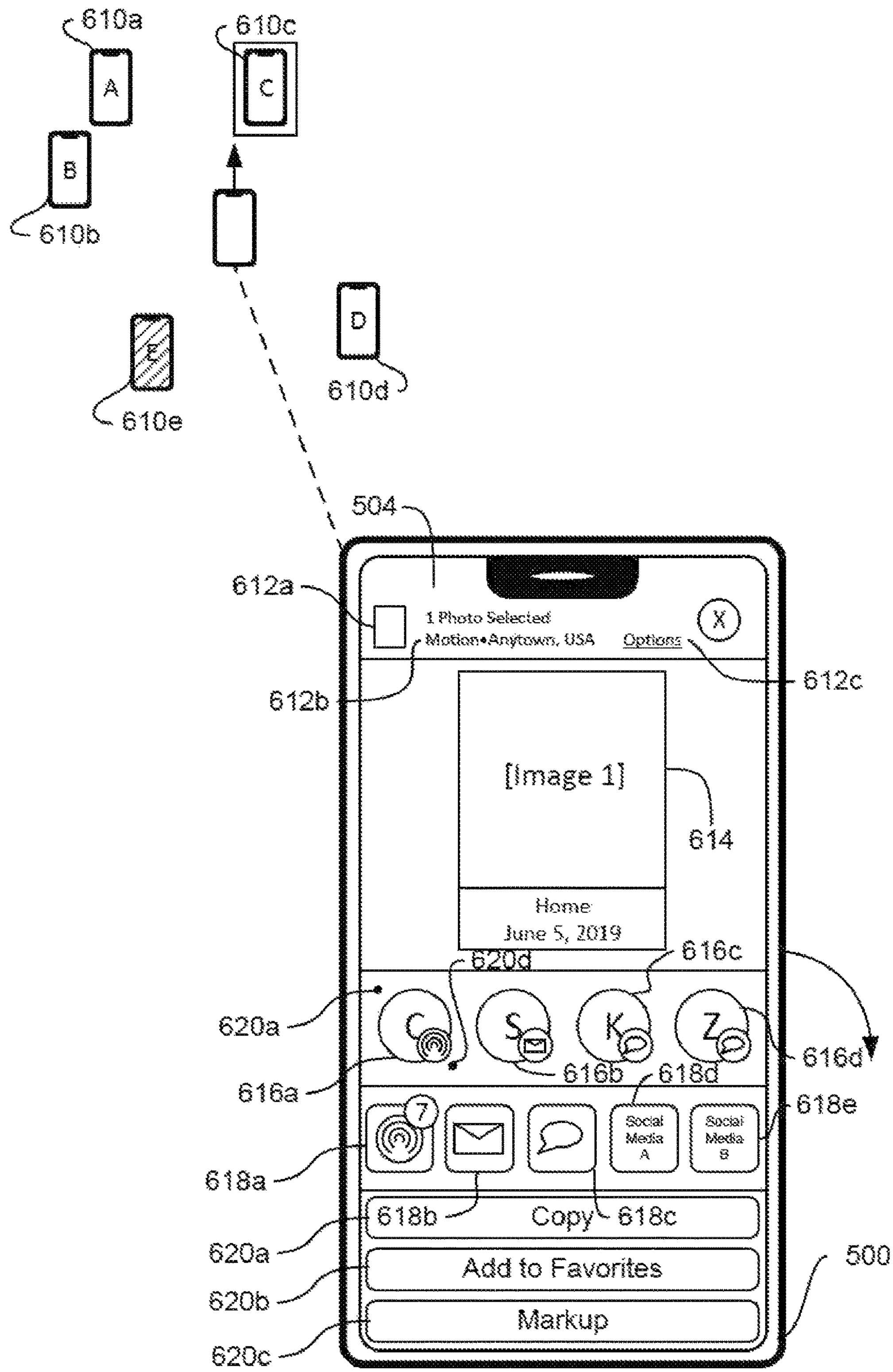
Figure 6E:
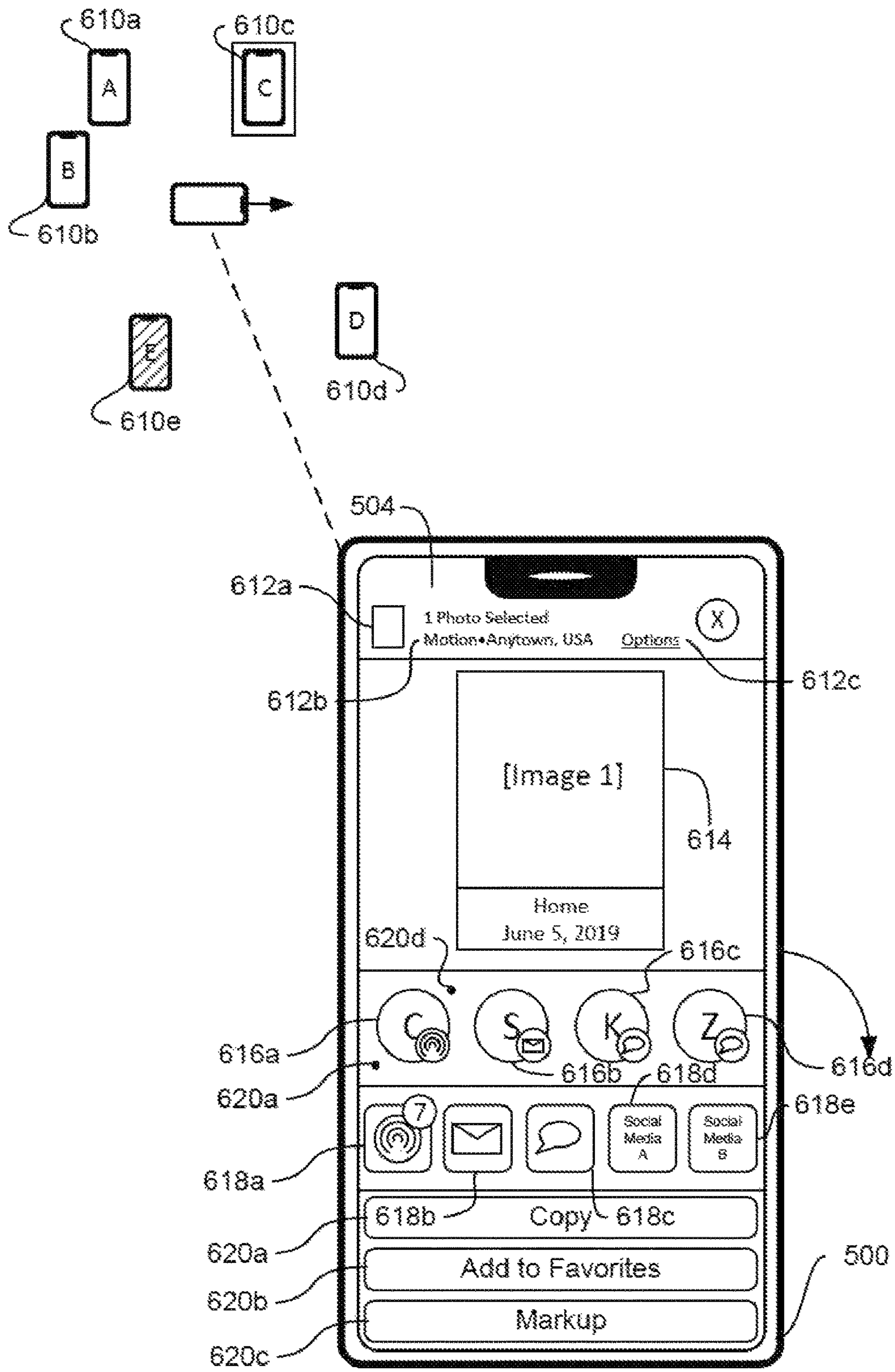
Figure 6F:
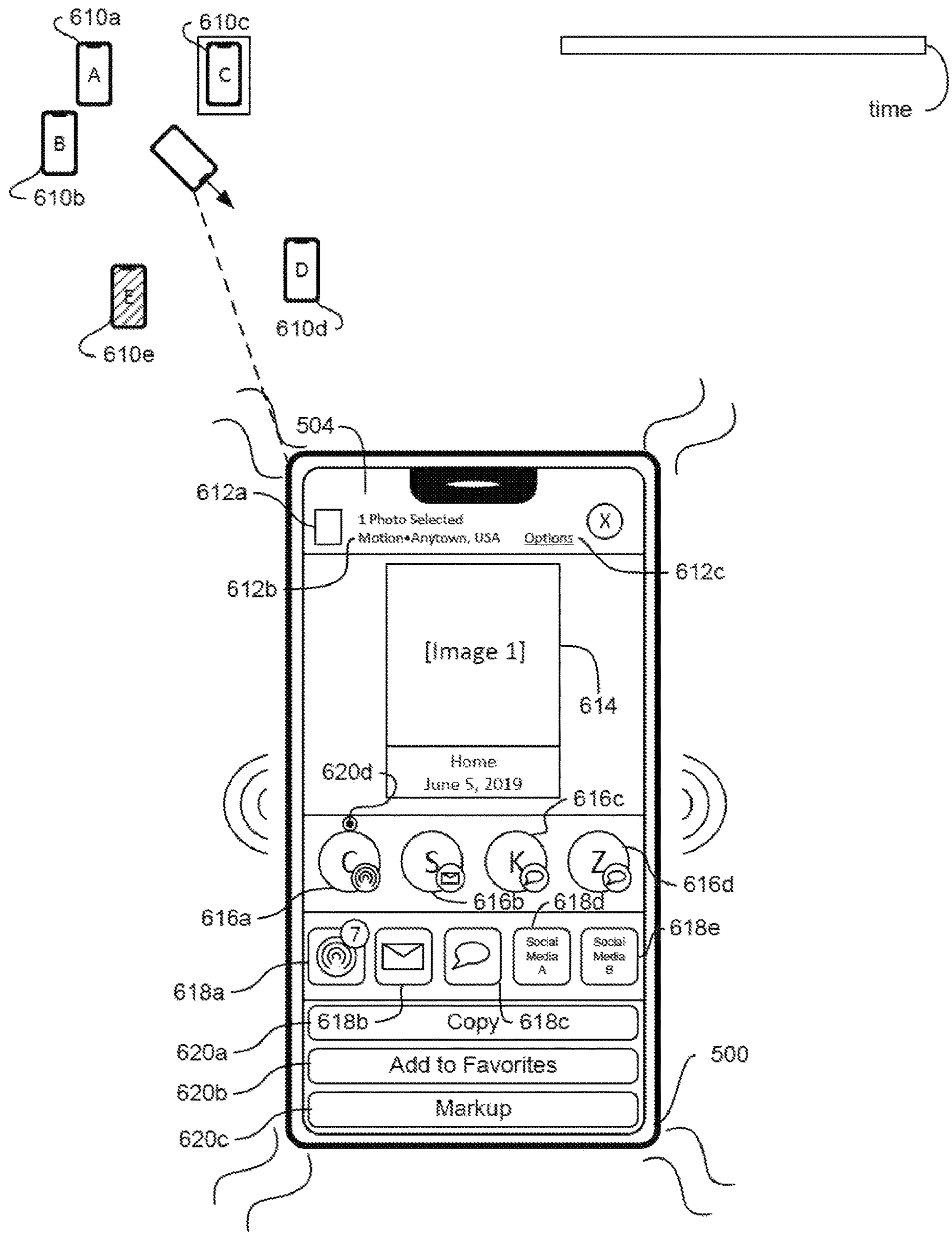
Figure 6G:
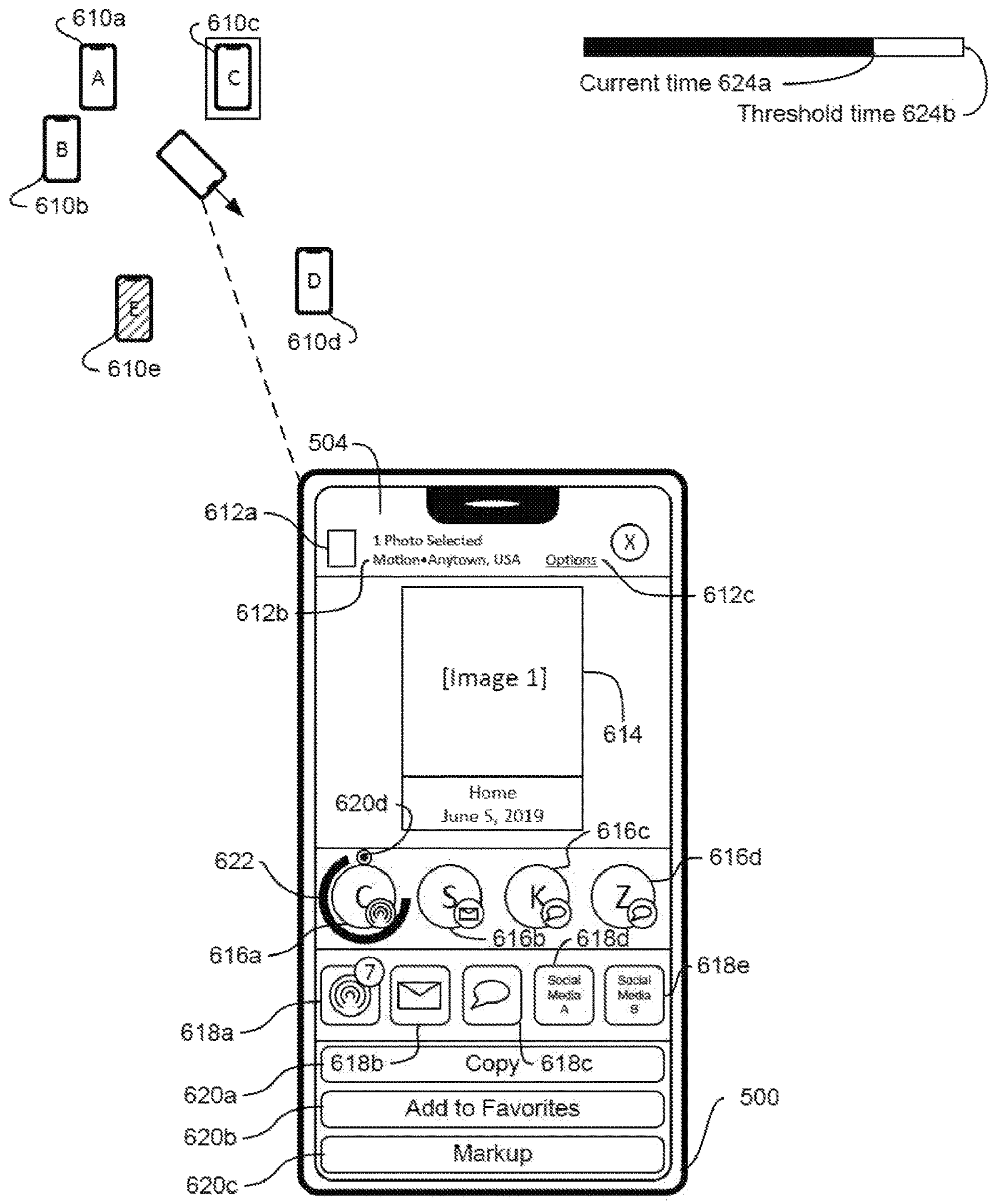
Figure 6H:
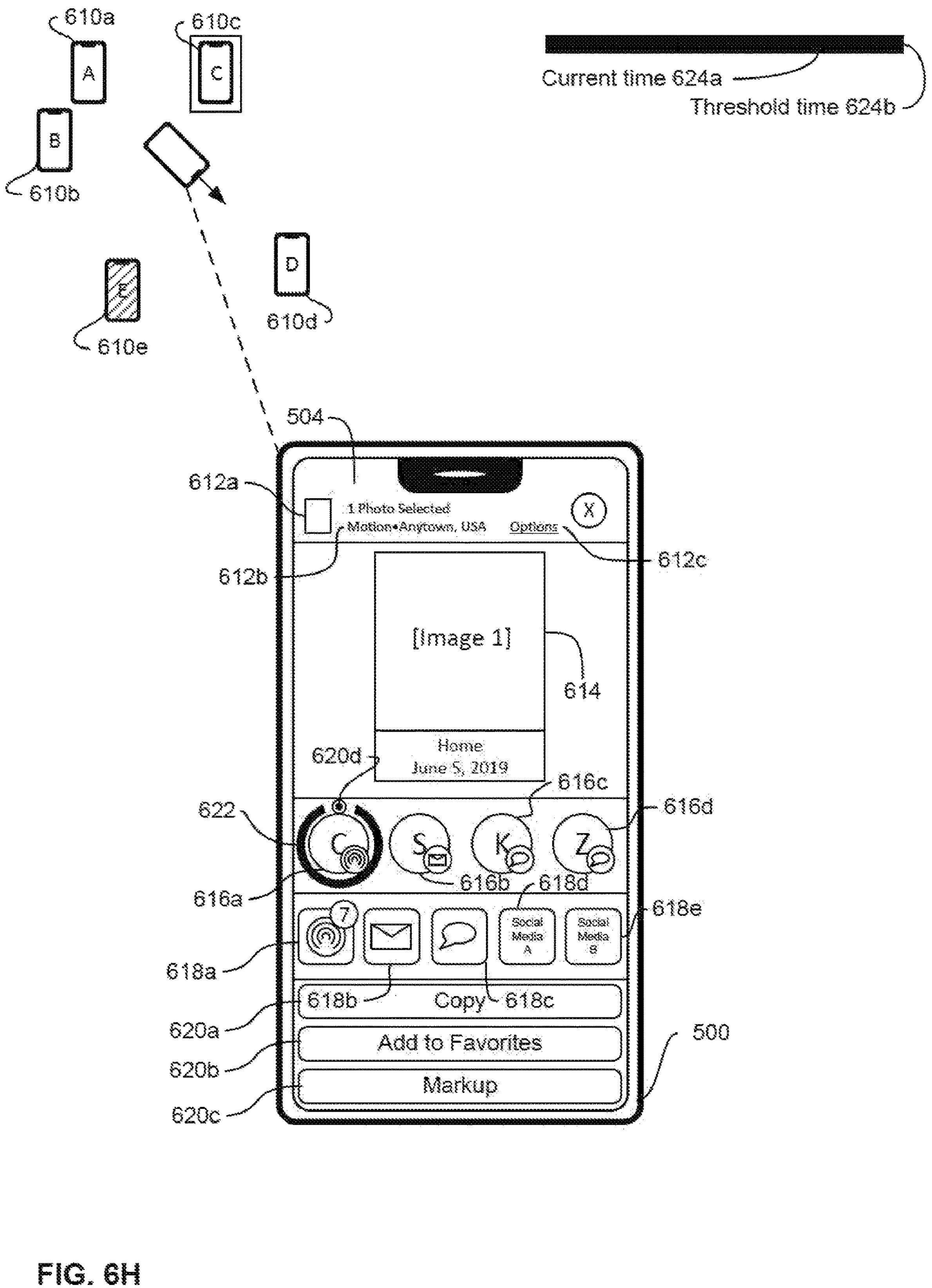
Figure 6I:
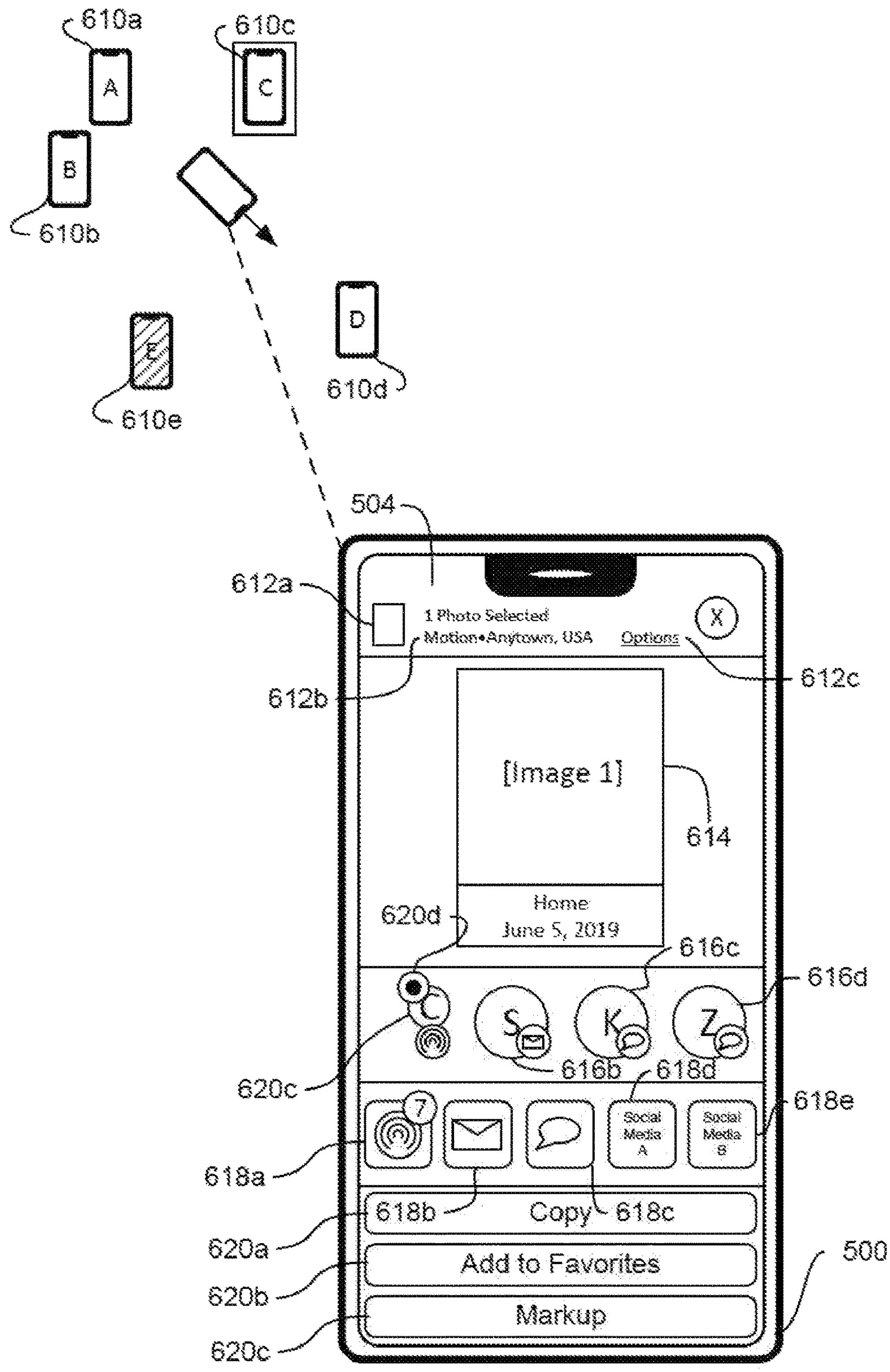
Figure 6J:
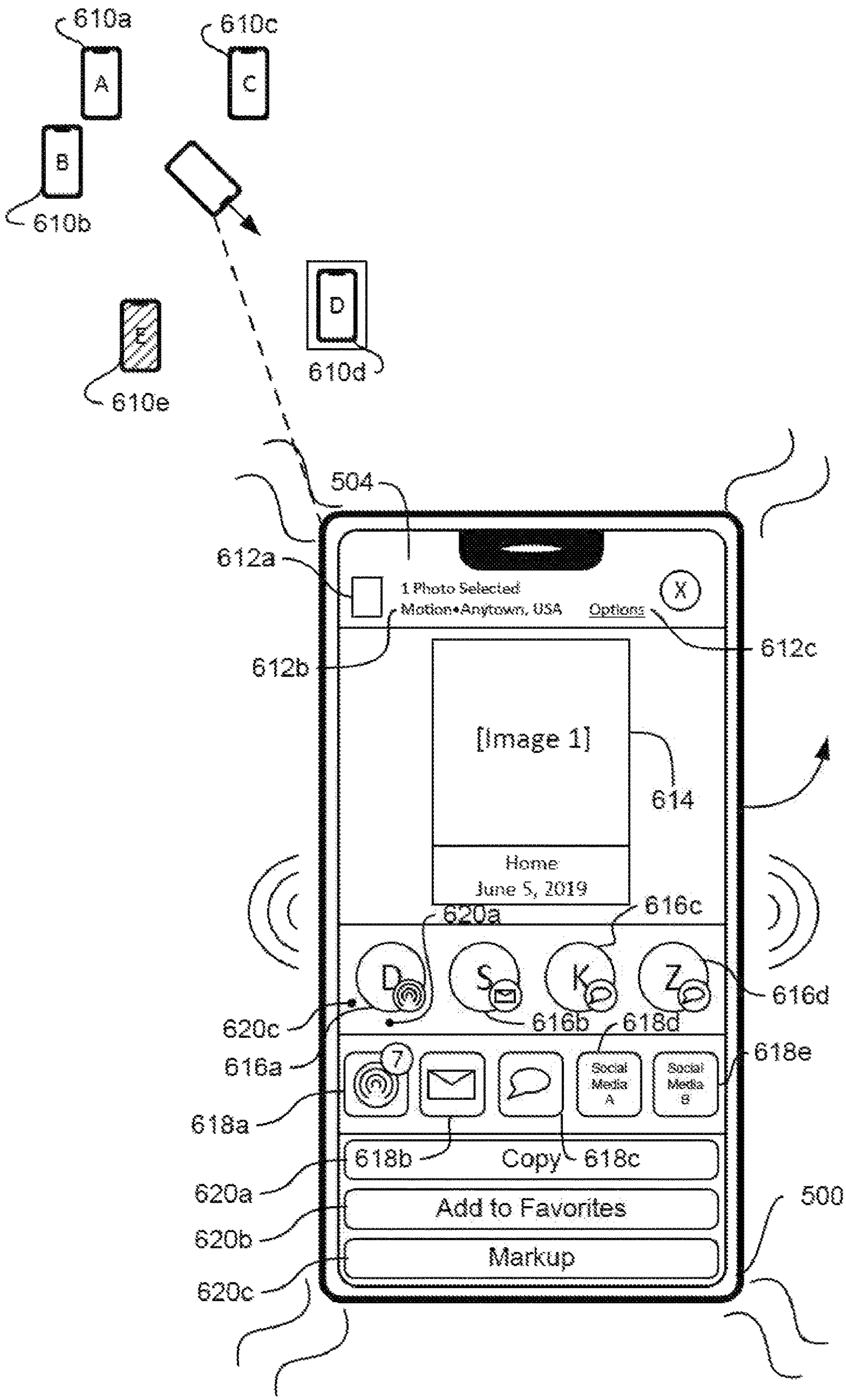
Figure 6K:
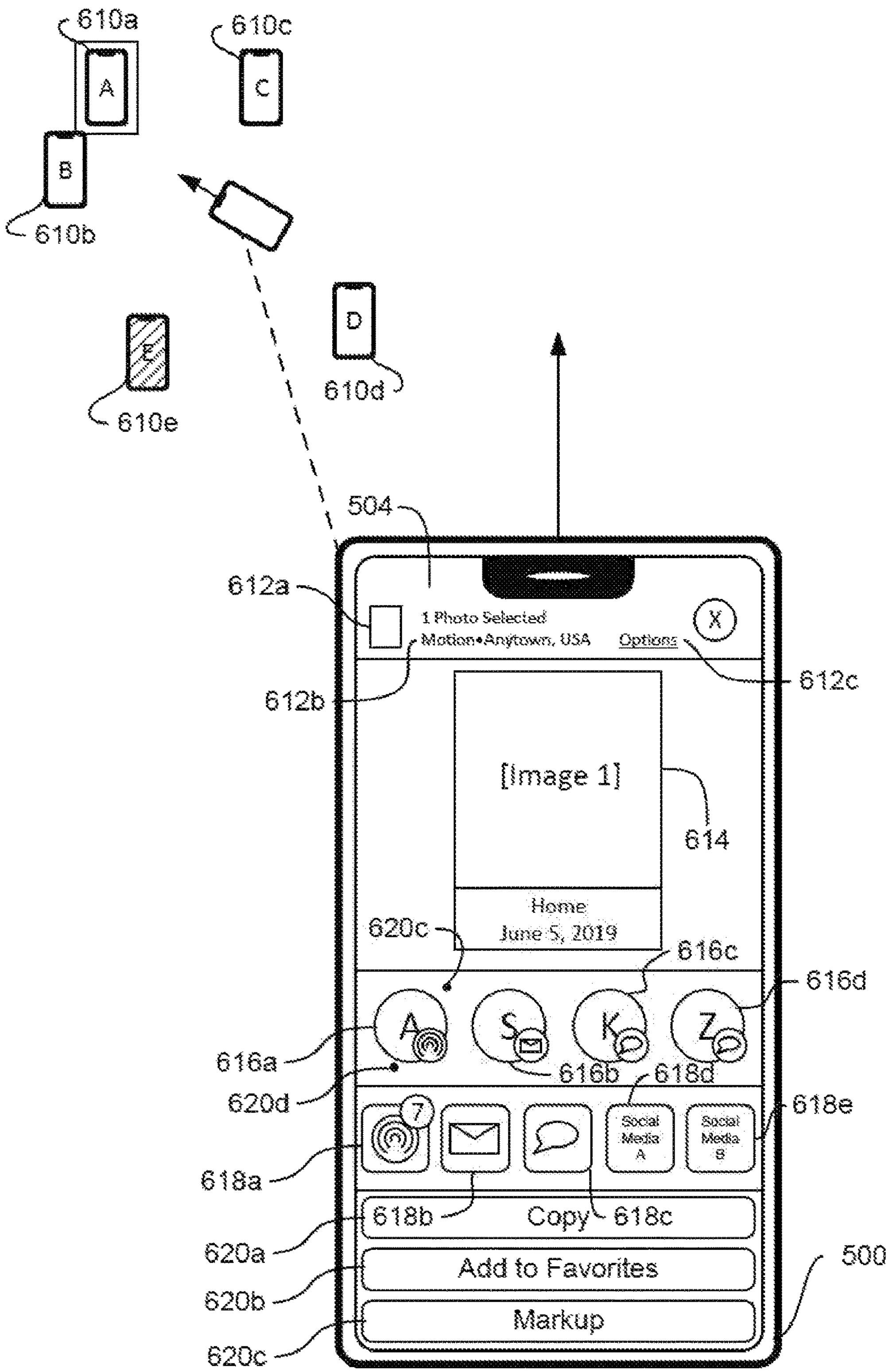
Figure 6L:
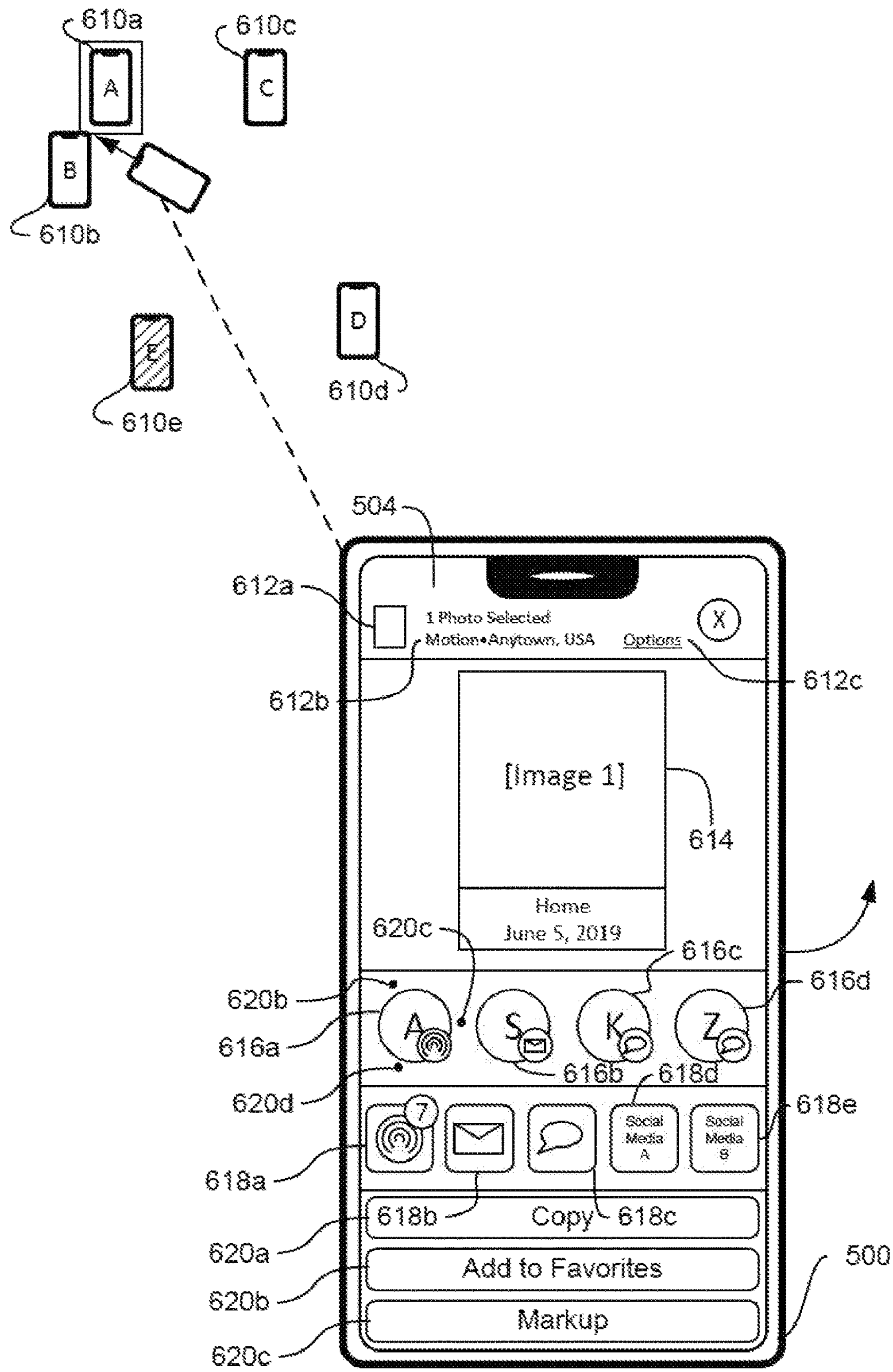
Figure 6M:
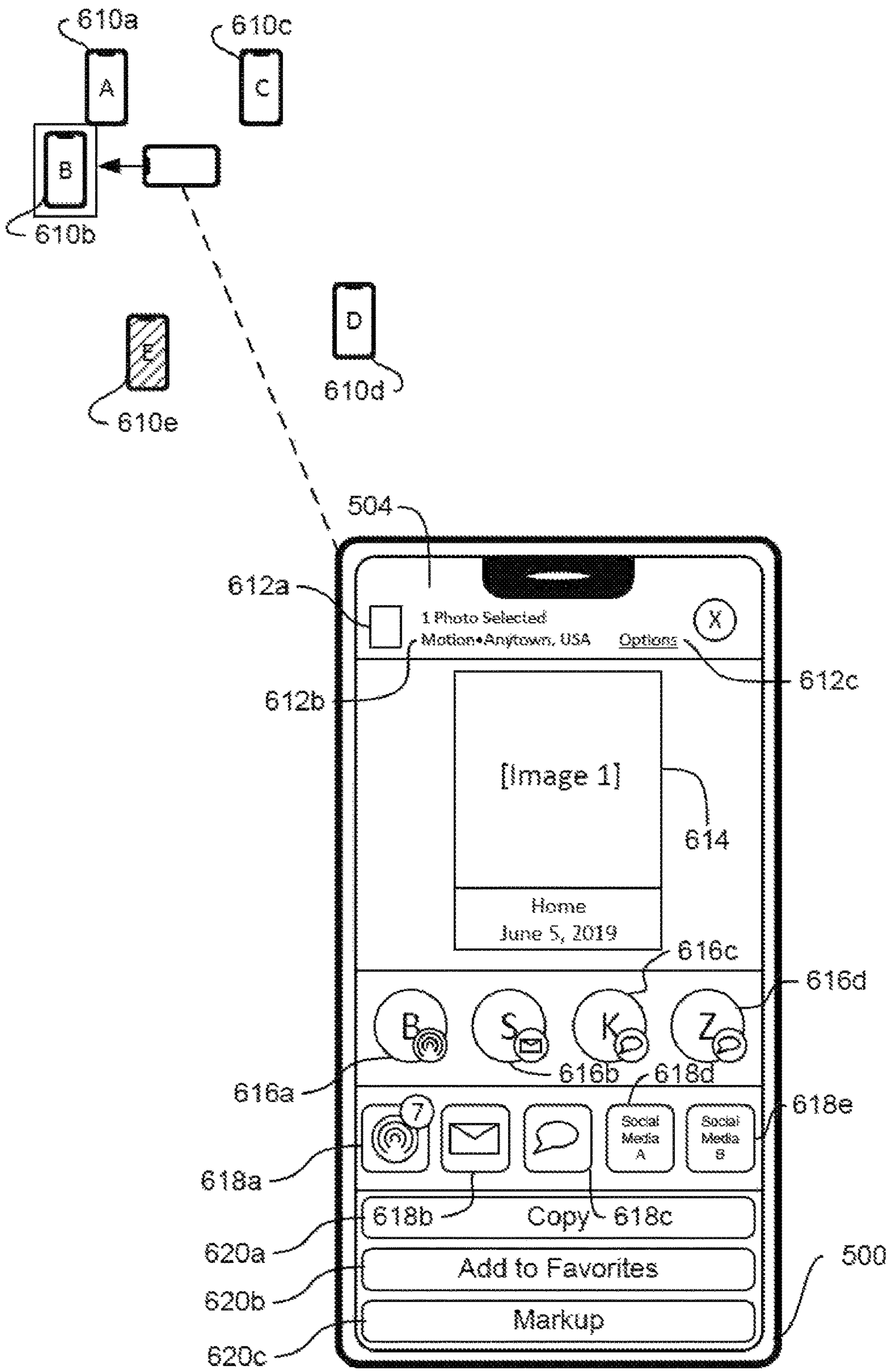
Figure 6N:
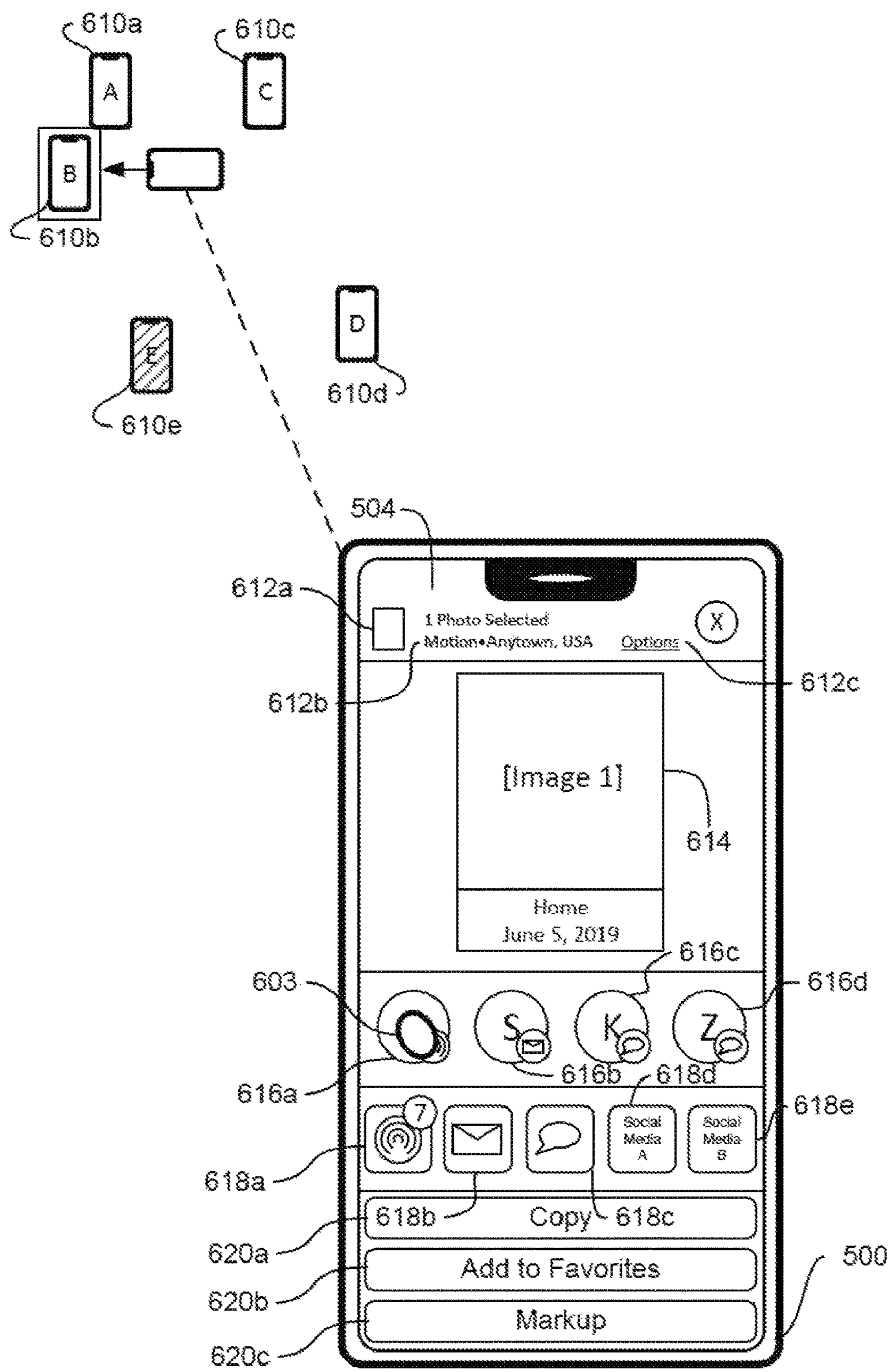
Figure 6O:
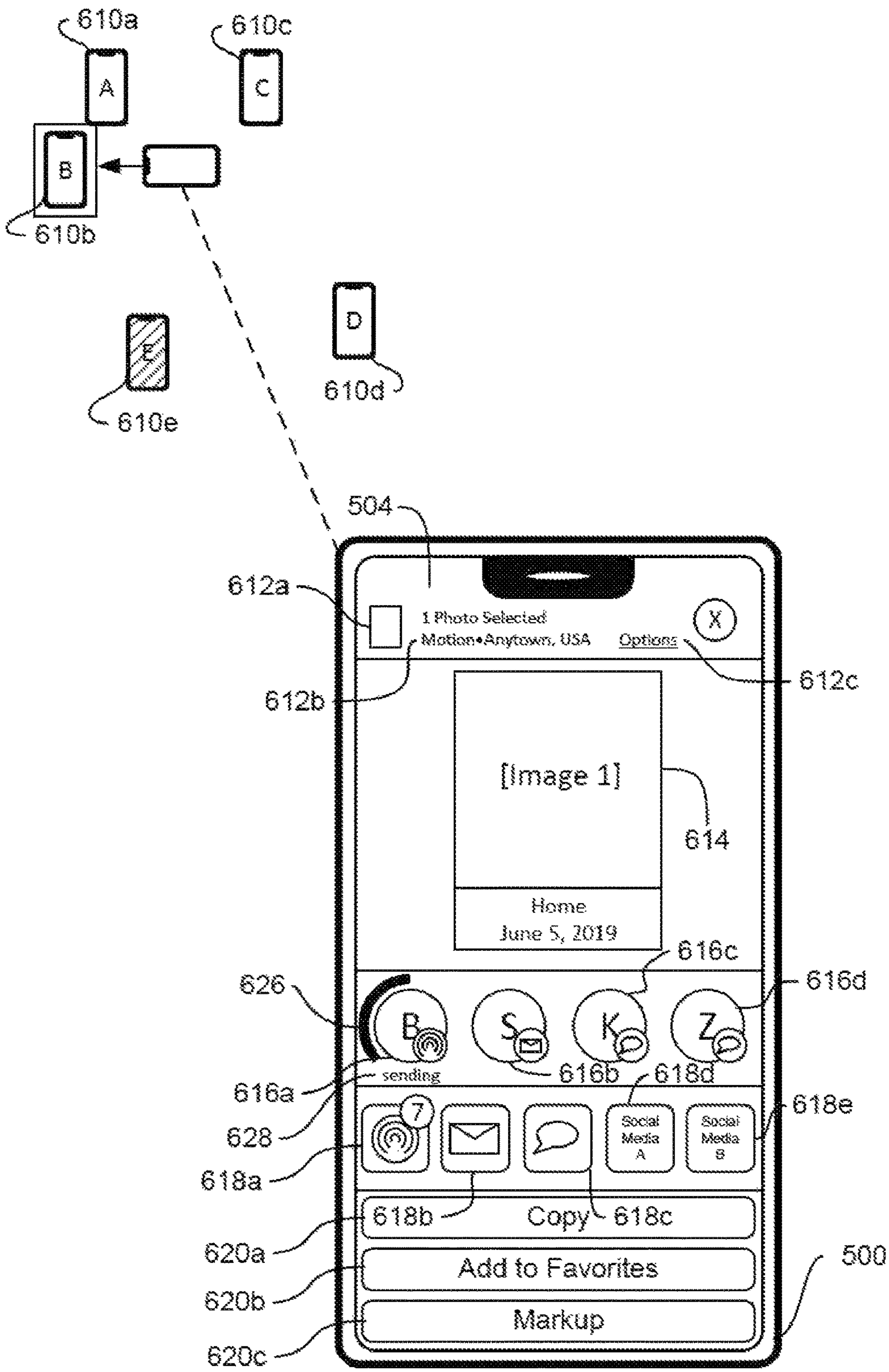
Figure 6P:
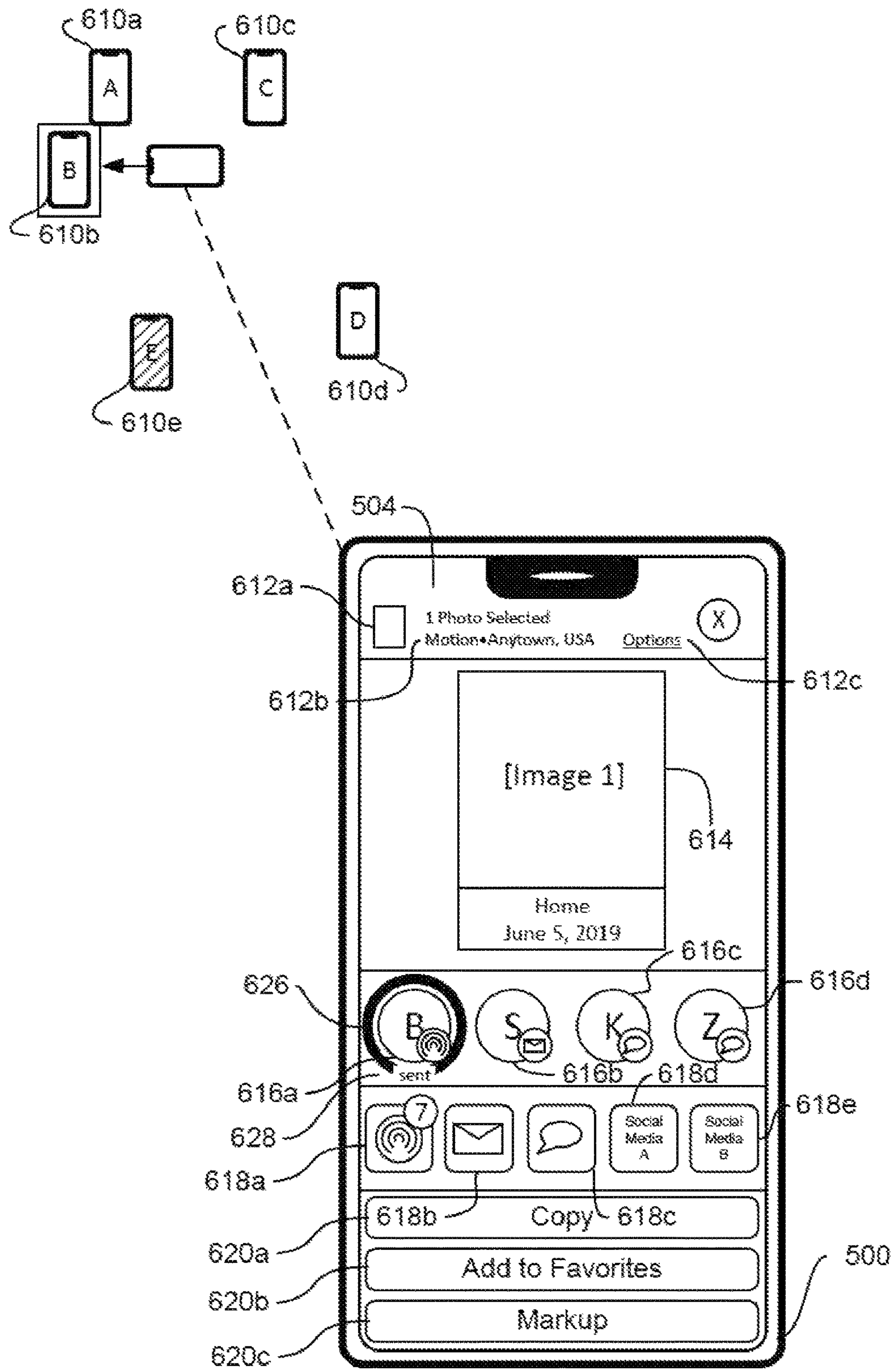
Figure 6Q:
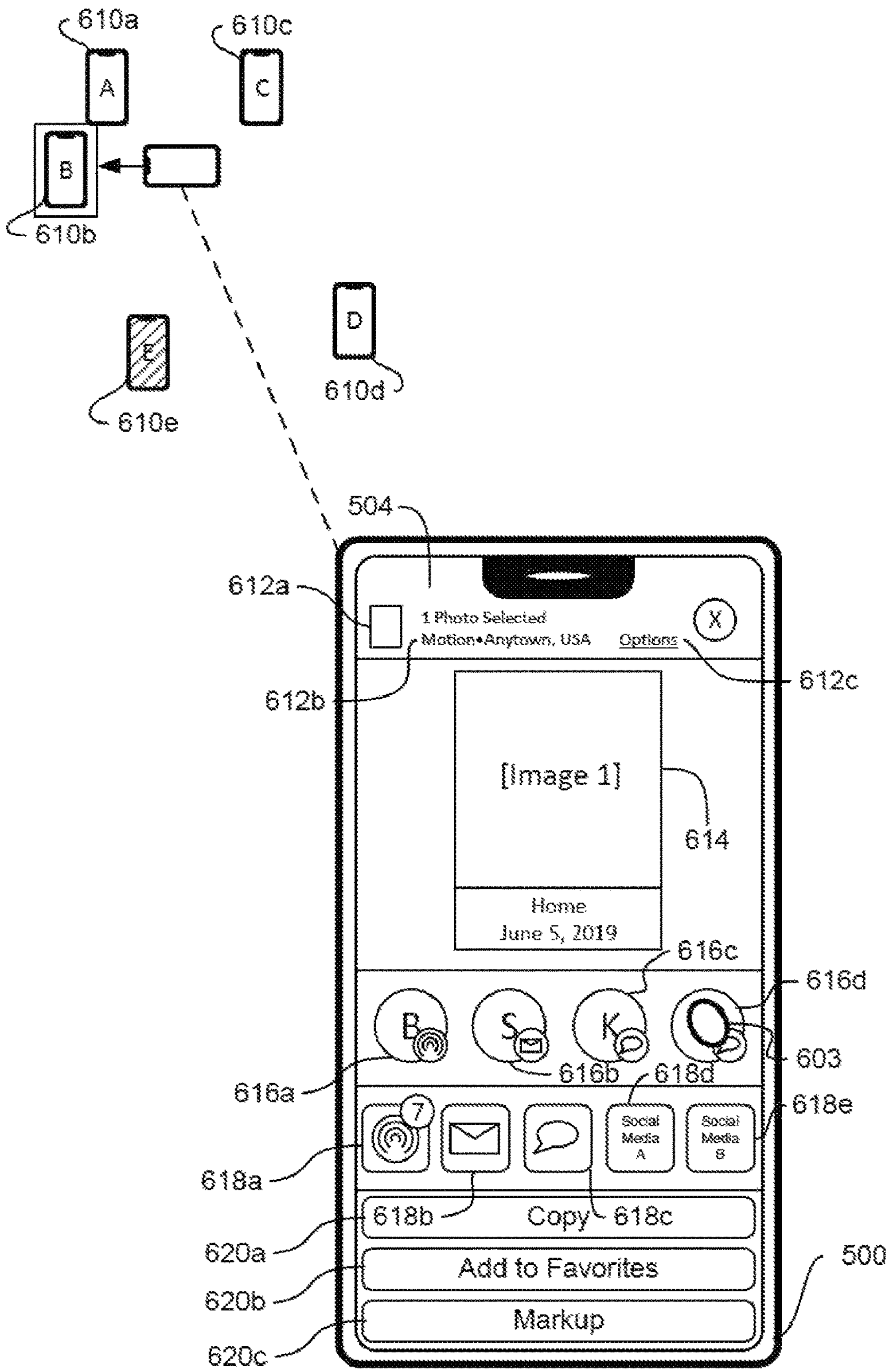
Figure 6R:
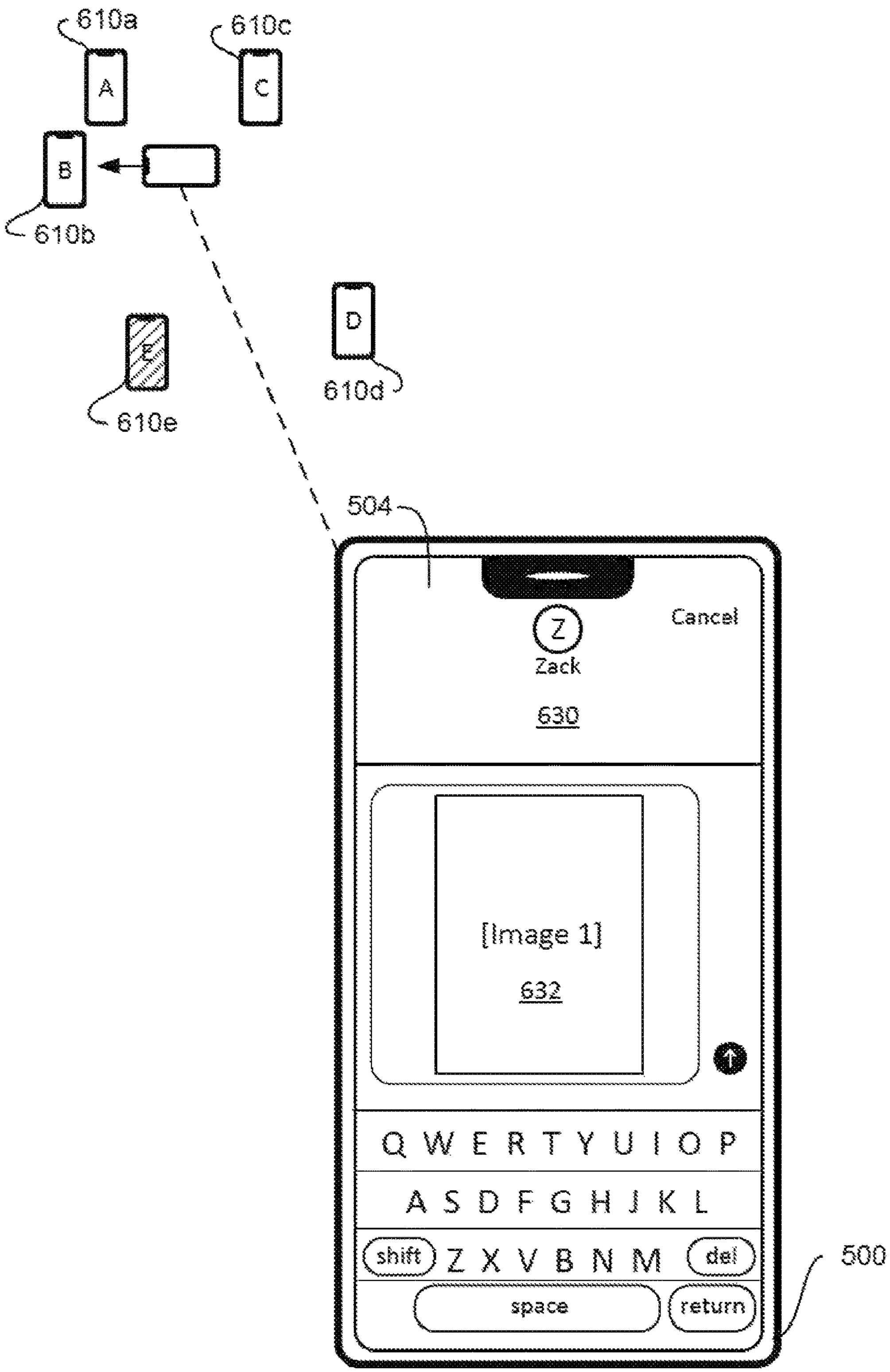
Figure 6S:
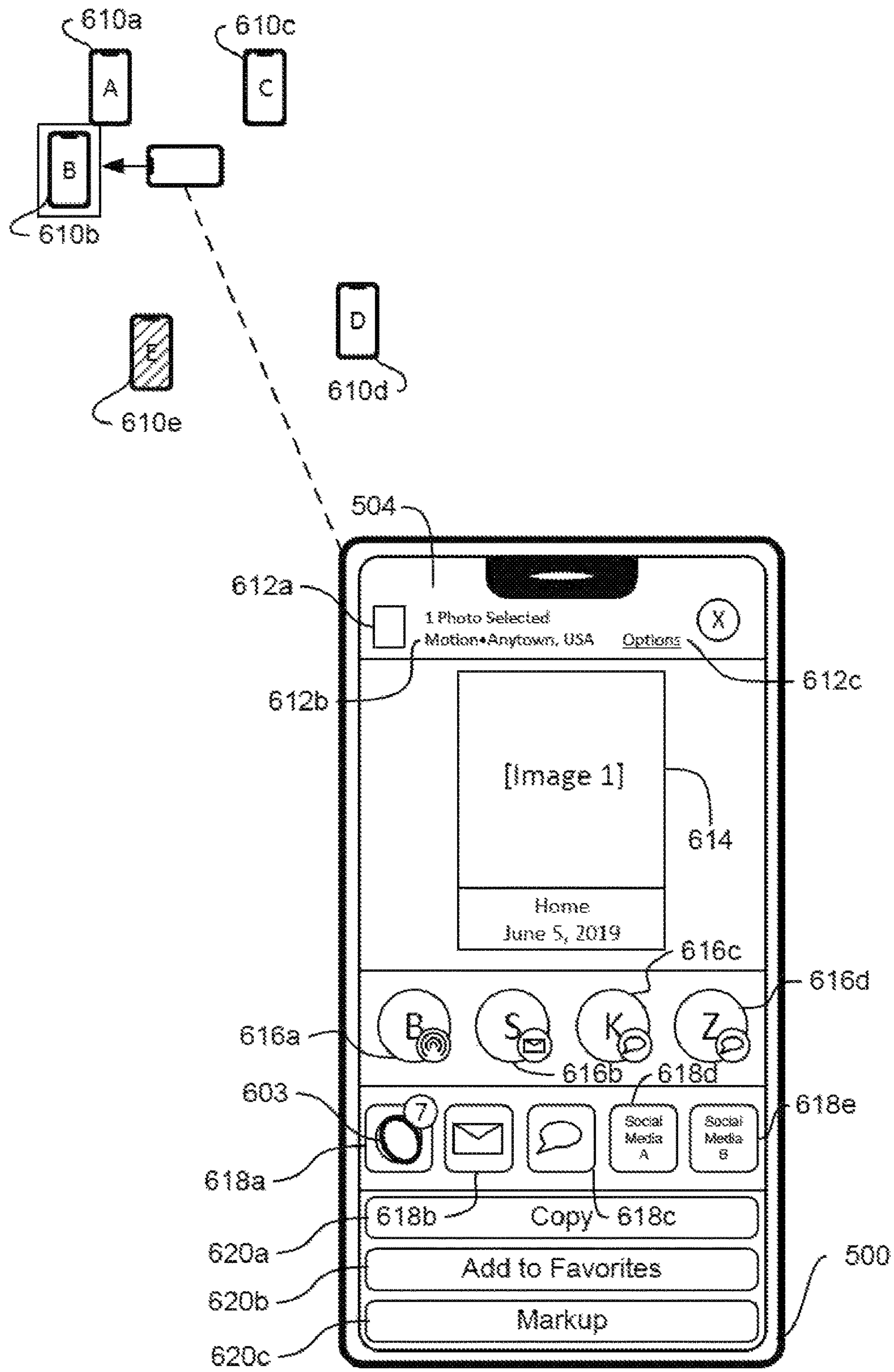
Figure 6T:
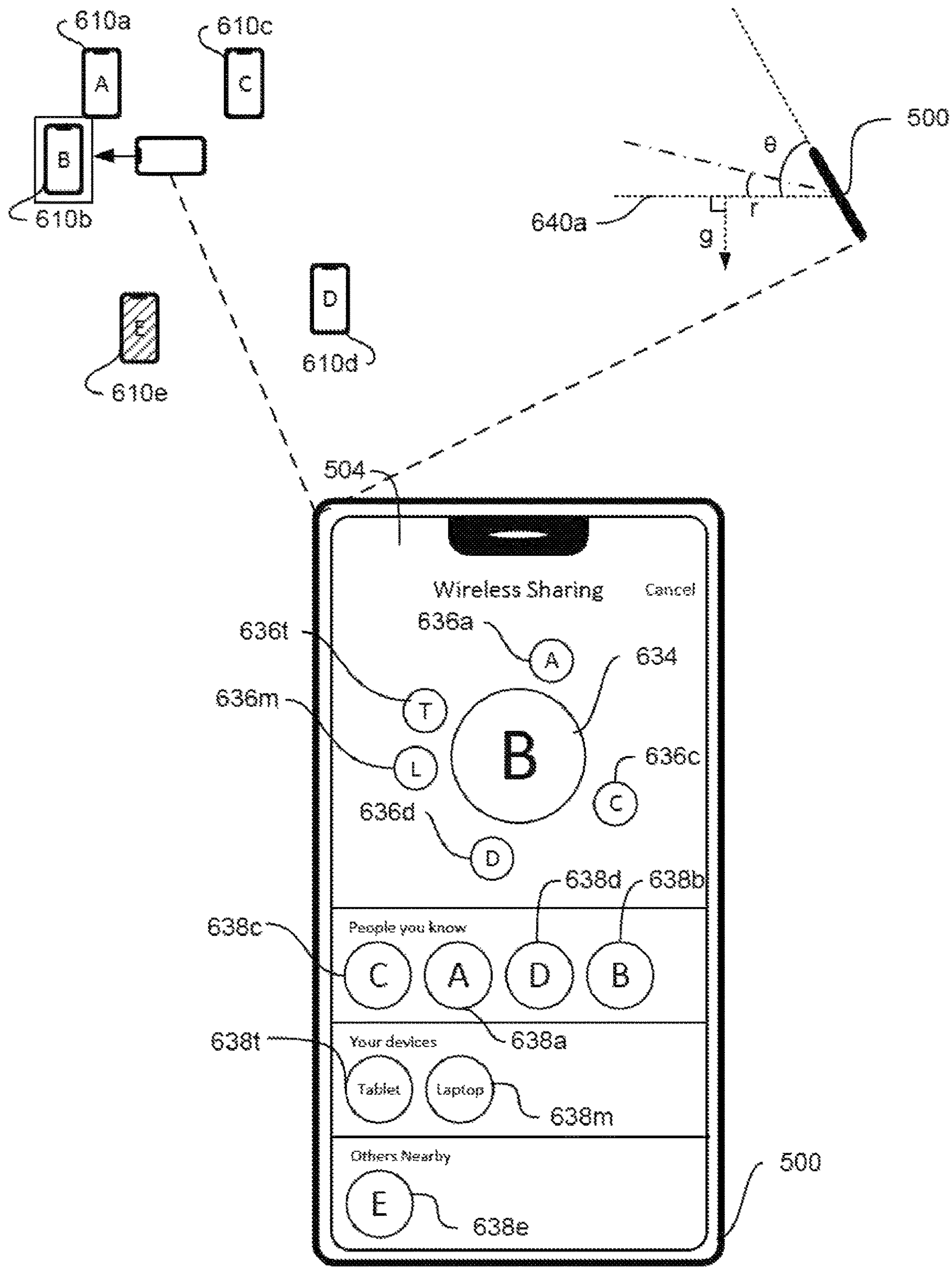

FIGS. 6A-6T illustrate exemplary ways in which a first electronic device 500 presents an option that is selectable to share content with a second electronic device towards which the first electronic device is oriented in accordance with some embodiments of the disclosure. The embodiments in these figures are used to illustrate the processes described below, including the processes described with reference to FIGS. 7A-7J.

FIGS. 6A-6B illustrate a photos application user interface. The user interface includes an image 602 stored on the electronic device 500, a selectable option 604 for presenting a content sharing user interface, a selectable option 606 to save the image 602 as a favorite image, and a selectable option 608 to delete the image. As shown in FIG. 6B, the user selects (e.g., with contact 603) the option 604 to present a content sharing user interface. In response to the user's selection, the electronic device 500 presents a sharing user interface illustrated in FIG. 6C.

FIGS. 6C-6Q illustrate a sharing user interface including a sharing option **616*a* that is updated as the orientation of the electronic device 500 relative to a plurality of other electronic devices 610*a*-610*e* changes. As shown in FIG. 6C, the sharing user interface includes a header that includes a representation 612_a_ of the image 602 to be shared, an indication 612_b_ of the metadata of the image 602, and a selectable option 612_c_ that, when selected, causes the electronic device 500 to present a settings user interface according to one or more steps of method 1100 described below. The sharing user interface includes a larger representation 614 of the image to be shared, a plurality of options 616_a-d_ for sharing the image with another user, a plurality of options 618_a-e_ for sharing the image with another electronic device, and a plurality of selectable options 620**_a-c_ for performing respective actions with respect to the image.

Each option 616_a_-616_d_ for sharing the content with another user or electronic device includes an indication of the other user or electronic device and an indication of a manner of sharing the image. Specifically, option 616_a_ is selectable to share the content with another electronic device (e.g., corresponding to device C) using a wireless network sharing protocol. Option 616_b_ is selectable to share the image with another user (e.g., user S) using e-mail. Options 616_c-d_ are selectable to share the image with a respective other user (e.g., users K or Z) via data-based messaging and/or text message. As will be described in more detail below, the sharing option 616_a_ is selectable to share the image with another electronic device that is selected based on the electronic device's 500 orientation with respect to other nearby electronic devices 610_a-e_. As shown in FIG. 6C, the sharing option 616_a_ includes an image that represents the other electronic device 610_c_, such as an image included in a contact card stored on the electronic device 500 that includes contact information for one or more user accounts (e.g., phone number, e-mail address) associated with a user of the other electronic device 610_c_.

Each option 618_a-e_ is selectable to initiate a process to share the image using a respective way of sharing the image. Option 618_a_ is selectable to initiate a process to share the image using the wireless network sharing protocol, as will be described in more detail below with reference to FIGS. 6S-6T. Option 618_b_ is selectable to initiate a process to share the image using e-mail. Option 618_c_ is selectable to initiate a process to share the image using enhanced data-based messaging or text message. Option 618_d_ is selectable to initiate a process to share the image using a first social media application. Option 618_e_ is selectable to initiate a process to share the image using a second social media application.

Options 620_a-c_ are selectable to perform non-sharing actions with respect to the image. Option 620_a_ is selectable to copy the image. Option 620_b_ is selectable to add the image to a list of favorite images. Option 620_c_ is selectable to mark up the image.

As shown in FIG. 6C, the electronic device 500 is oriented towards another electronic device 610_c_. Because the electronic device 500 is oriented towards the other electronic device 610_c_, the electronic device 500 configures the wireless sharing protocol option 616_a_ to be selectable to share the image with the other electronic device 610_c_ (e.g., instead of device 610_d_, for example).

In FIG. 6D, the electronic device 500 begins to change its orientation relative to the other electronic devices 610_a-e_. In response to detecting movement of the electronic device 500, the electronic device 500 presents indications 620_a_ and 620_d_ of electronic devices 610_a_ and 610_d_, respectively, around the wireless network protocol sharing option 616_a_. The positions of indications 620_a_ and 620_d_ relative to the option 616_a_ are based on the positions of the electronic devices 610_a_ and 610_d_ relative to the electronic device 500. For example, indication 620_a_ is in the upper left corner of sharing option 616_a_ because electronic device 601_a_ is in the upper left corner of electronic device 500 and indication 620_d_ is in the lower right corner of sharing option 616_a_ because electronic device 610_d_ is in the lower right corner of electronic device 500.

The electronic device 500 does not present an indication of electronic device 610_e_ because the electronic device 500 and electronic device 610_e_ are not configured to share data using the wireless network sharing protocol (e.g., the electronic device 500 does not include a contact card associated with electronic device 610_e_, the electronic device 610_e_ is not discoverable for content sharing, the electronic device 610_e_ is not connected to a wireless network, etc.).

The electronic device 500 does not display an indication of electronic device 610_b_ because electronic device 610_b_ and electronic device 610_a_ are too close to each other for the electronic device's 500 orientation to be uniquely oriented towards one of the two electronic devices 610_a_ and 610_b_ at the current distance between the electronic device 500 and electronic devices 610_a_ and 610_b_. The electronic device 500 optionally displays an indication 620_a_ of the electronic device 610_a_ instead of the electronic device 610_b_ based on frequency and/or recency with which electronic device 500 shares content with electronic device 610_a_ verses with electronic device 610_b_.

Generally speaking, if the electronic device 500 is pointing at another electronic device within a predetermined range of angles (e.g., 20 degrees, 30 degrees, etc.), the sharing option 616_a_ is selectable to share the content with the other electronic device towards which the electronic device 500 is pointing. If the electronic device 500 is not pointing at another electronic device when the sharing user interface is opened, the electronic device 500 optionally selects another electronic device based on frequency and recency of sharing with the other electronic devices 610 nearby. If the electronic device is not pointing at another electronic device and none of the electronic device has not shared content frequently and/or recently enough (e.g., compared to one or more predetermined thresholds) with nearby electronic devices, the electronic device 500 optionally forgoes displaying the sharing option 616_a_.

FIG. 6E illustrates the position of electronic device 500 while moving. As shown in FIG. 6E, the positions of the indications 620_a_ and 620_d_ around the option 616_a_ are updated to reflect the positions of electronic devices 610_a_ and 610_d_ relative to the electronic device 500. The electronic device 500 continues to move to the position in FIG. 6F.

FIGS. 6F-6J illustrate how the electronic device 500 updates the wireless network sharing protocol option 616_a_ in response to detecting that the orientation of the electronic device 500 is facing towards another electronic device. In FIG. 6F, the electronic device 500 is oriented towards another electronic device 610_d_. In response to detecting the orientation of the electronic device 500 relative to the other electronic device 610_d_, the electronic device 500 generates a tactile output (e.g., such as one of the tactile outputs described above with reference to FIGS. 5I-5N) and an audio output to indicate that the electronic device 500 is oriented towards another electronic device 610_d_ with which sharing via the wireless network sharing protocol is possible. Additionally, the indication 620_d_ of the other electronic device 610_d_ begins to grow in size. As will be described in more detail below with reference to FIGS. 6G-6J, if the electronic device 500 remains oriented towards the other electronic device 610_d_ for a threshold amount of time 624_b_, the electronic device 500 will update the wireless network sharing protocol option 616*a* to be selectable to share the image with the other electronic device 610*d*.

In FIG. 6G, the electronic device 500 continues to be oriented towards the other electronic device 610*d* for a period of time 624*a*. As the current time 624*a* approaches the threshold time 624*b*, the electronic device 500 presents an indication 622 of the progress of the process to update the wireless network protocol sharing option 616*a*.

In FIG. 6H, the amount of time 624*a* that the electronic device 500 remains oriented towards the other electronic device 610*d* reaches the threshold amount of time 624*b*. The electronic device 500 updates the indication 622 of the progress of updating the sharing option 616*a* to indicate that the threshold time 624*b* has been reached by completing a circle around the sharing option 616*a*. In some embodiments, the electronic device 500 gradually animates the indication 622 completing a circle around the sharing option 616*a* as the current time 624*a* approaches the threshold time 624*b*.

As shown in FIG. 6I, after the threshold time 624*b* is reached, the electronic device 500 presents an animation of the indication 620*d* of electronic device 610*d* replacing the indication 620*c* of electronic device 610*c* as the selectable option updates from being selectable to share the image with electronic device 610*c* to being selectable to share the image with electronic device 610*d*.

As shown in FIG. 6J, the electronic device 500 generates a tactile output (e.g., one of the tactile outputs described above with reference to FIG. 5I-5N) and an audio output indicating that the sharing option 616*a* has been updated. Sharing option 616*a* is updated to include an indication (e.g., the letter "D") representing the other electronic device 610*d*. Once the sharing option 616*a* has been updated, in response to detecting selection of sharing option 616*a*, the electronic device 500 optionally initiates a process to share the image with the other electronic device 610*d* (e.g., rather than device 610*c*) using the wireless network sharing protocol. In addition to updating the sharing option 616*a*, the electronic device 500 presents an indication 620*c* of electronic device 610*c* around the sharing option 616*a* at a position indicative of the orientation of electronic device 610*c* relative to electronic device 500. Although sharing option 616*a* is updated in response to the change in the orientation of the electronic device 500, the remaining selectable options 616*b*-616*d*, 618*a*-618*e*, and 620*a*-620*c* remain unchanged (e.g., remain selectable to initiate respective sharing processes that do not change as a function of the orientation of device 500).

In FIG. 6K, the sharing option 616*a* is configured to, when selected, initiate a process to share the image with electronic device 610*a*. It should be understood that the electronic device 500 updated the sharing option 616*a* in a manner similar to the manner illustrated in FIGS. 6F-6J. For the sake of brevity, these details are not repeated here. In FIG. 6K, the electronic device 500 begins to move towards electronic devices 610*a* and 610*b* to the position illustrated in FIG. 6L.

In response to the electronic device 500 moving to the position illustrated in FIG. 6L, the electronic device 500 presents an indication 620*b* of electronic device 610*b* around selectable option 616*a*. This is because, at the distance from electronic devices 610*a* and 610*b* illustrated in FIG. 6L, the electronic device 500 is able to distinguish between being oriented towards electronic device 610*a* and being oriented towards electronic device 610*b* (e.g., the angles between devices 610*a* and 610*b* with respect to device 500 are greater than a threshold angle, rather than below the threshold angle, which they optionally were before device 500 moved in FIG. 6L). As shown in FIG. 6L, the electronic device 500 starts rotating towards electronic device 610*b*.

As shown in FIG. 6M, the electronic device 500 has moved to face electronic device 610*b*. In response to the orientation of electronic device 500 towards electronic device 610*b*, the electronic device 500 updates the sharing option 616*a* to be selectable to share the photo with electronic device 610*b* in a manner similar to the manner illustrated in FIGS. 6F-6J.

In FIG. 6N, the user selects (e.g., with contact 603) the sharing option 616*a*. In response to the user's selection, the electronic device 500 initiates a process to share the image with the electronic device 610*b* using the wireless network sharing protocol.

FIGS. 6O-6P illustrate the electronic device 500 presenting an indication 626 of the progress of sharing the photo with the electronic device 610*b* using the wireless network sharing protocol. In FIG. 6O, the electronic device 500 presents a ring 626 around the sharing option 616*a* that is partially complete to indicate the progress of the sharing process and text 628 indicating that the photo is currently being sent to the other electronic device 610*b*. As the sharing process continues, the arrangement 626 animates to become a complete circle around the sharing option 616*a*.

In FIG. 6P, the electronic device 500 presents a complete ring 626 around the sharing option 616*a* and text 628 to indicate that the photo has been sent to the other electronic device 610*b* via the wireless network sharing protocol.

FIGS. 6Q-6R illustrate the electronic device 500 sharing the image with another electronic device via data-based messaging or text message. In FIG. 6Q, the user selects (e.g., with contact 603) the option 616*d* to share the image with another electronic device via enhanced data-based messaging or text message. In FIG. 6R, in response to the user's selection, the electronic device 500 presents a messaging user interface 630 with a message pre-populated with the image 632 and the recipient (e.g., user Z). The user of the electronic device 500 is able to send the message to the other user with the messaging user interface.

As shown in FIG. 6S, the option 618*a* includes a badge that indicates the number of electronic devices with which the electronic device 500 is able to share the photo using the wireless network sharing protocol. In FIG. 6S, the user selects (e.g., with contact 603) the option 618*a* to present the wireless network sharing protocol user interface. In response to the user's selection, the electronic device 500 presents the wireless network sharing protocol user interface illustrated in FIG. 6T.

As shown in FIG. 6T, the user interface includes a sharing option 634 similar to sharing option 616*a* illustrated in FIG. 6S that is surrounded by indications 636*a*, 636*c*, 636*d*, 636*m*, and 636*t* of other electronic devices similar to the indications 620 illustrated in FIG. 6L. Sharing option 634 is an enlarged version of sharing option 616*a* and indications 636*a*, 636*c*, and 636*d* are images corresponding to devices 610*a*, 610*c*, and 610*d*. Thus, the positions of indications 636 reflect the positions of the other electronic devices 610 with respect to the electronic device 500 and move to different positions as the orientation or position of electronic device 500 or electronic devices 610 change. The option 634 and indications 636 are presented at a larger size than the option 616*a* and indication 620.

The wireless network sharing protocol user interface further includes a plurality of selectable options 638 that, when selected, causes the electronic device 500 to share the image with a respective other electronic device using the wireless network sharing protocol. The positions of options 638 within the user interface do not change as the orientation of electronic device 500 changes.

The user interface sorts the selectable options 638 into categories, such as electronic devices belonging to users that the user of the electronic device 500 knows (e.g., users for which the electronic device 500 includes a contact card), devices associated with a user account that is the same as the user account of the electronic device 500, and other devices nearby that are not associated with users the user of the electronic device 500 knows or associated with the user of the electronic device 500. More specifically, options 638*c*, 638*a*, 638*d*, and 638*b* are selectable to share the content with electronic devices associated with users the user of the electronic device 500 knows; options 638*t* and 638*m* are associated with electronic devices associated with the user of electronic device 500; and an option 638*e* to share the content with another electronic device 610*e* near the electronic device 500. As shown in FIG. 6T, there are seven electronic devices with which the electronic device 500 is able to share the photo using the wireless network sharing protocol, which is indicated with the badge overlaid on option 618*a* illustrated in FIG. 6S.

In some embodiments, the sensor(s) (e.g., circuitry) of the electronic device 500 that determines the other electronic device 610 towards which the electronic device 500 is pointing functions with a desirable level of reliability while the orientation of the electronic device 500 is in a predetermined range of orientations, and does not perform with the desirable level of reliability when the orientation of the electronic device 500 is outside of the predetermined range of orientations. The predetermined range of orientations is optionally a range of angles between the electronic device 500 and a reference plane. In some embodiments, the reference plane is perpendicular to gravity. In some embodiments, the reference plane is a plane between the electronic device 500 and another electronic device 610 with which the electronic device 500 is configured to wirelessly share content in response to detecting selection of a selectable sharing option, such as option 634 shown in FIG. 6T or option 616*a* illustrated in FIG. 6S. Thus, in some embodiments, the electronic device 500 provides visual feedback to the user to encourage the user to position the electronic device 500 within the desired predetermined range of orientations during content sharing operations. In FIGS. 6T-6KK, the surface of device 500 that is facing the reference plane is optionally the back surface of the device (e.g., the surface of device opposite the surface on which touch screen 504 is disposed), and the surface of device 500 that is facing away from the reference plane is optionally the front surface of the device (e.g., the surface of device on which touch screen 504 is disposed).

Returning to FIG. 6T, while the electronic device 500 is at an angle θ relative to a reference plane 640*a* (where θ is within the desired predetermined range of orientations), the selectable sharing option 634 is displayed at a flat visual orientation. As shown in FIG. 6T, the reference plane 640*a* is perpendicular to gravity g. When the angle θ between the electronic device 500 and the reference plane 640*a* is greater than reference angle r, the circuitry that determines which electronic device 610 the electronic device 500 is pointing towards is optionally able to perform with the desired reliability. As shown in FIG. 6T, when the angle θ between electronic device 500 and the reference plane 640*a* is greater than the reference angle r, the sharing option 634 is displayed with a flat visual appearance. Displaying the sharing option 634 with the flat visual orientation optionally includes displaying the sharing option 634 with a circular shape. The image representing the other electronic device 610*b* (e.g., the letter "B") within sharing option 634 is displayed in an undistorted manner.

As shown in FIGS. 6U-6Y, in some embodiments, while the angle θ between the electronic device 500 and the reference plane 640*a* is less than the reference angle r, the sharing option 634 does not update when the electronic device 500 rotates to point towards a different electronic device 610.

Figure 6U:
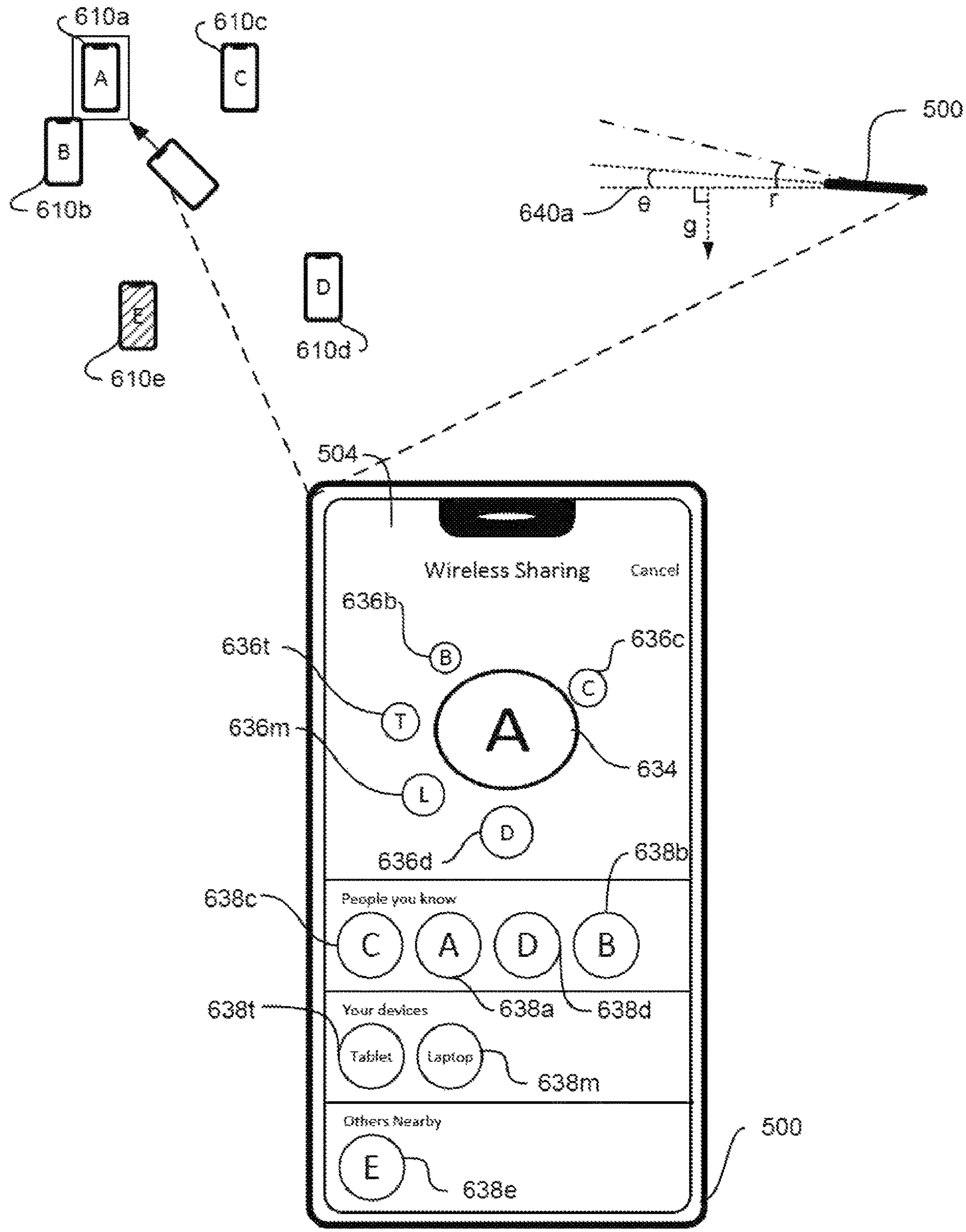

For example, as shown in FIG. 6U, after the electronic device 500 first changes positions to point towards another electronic device 610*a* and then to be oriented at an angle θ that is less than the reference angle r, the sharing option 634 updates (e.g., the angle θ was greater than the reference angle r when device 500 was rotated to point towards device 610*a*). Because the electronic device 500 rotated to be pointed towards electronic device 610*a*, the sharing option 634 includes an image A representing the electronic device 610*a*. After rotating towards device 610*a*, because the angle θ between the electronic device 500 and the reference plane 640*a* is less than the reference angle r, the sharing option 634 is displayed with a tilted appearance. Displaying the sharing option 634 with the tilted appearance includes displaying the sharing option 634 with an oval shape; distorting the image representing electronic device 610*a*, such as by stretching the image horizontally and shortening the image vertically; and/or resizing the indications 636*b*, 636*c*, 636*d*, 636*m*, and 636*t* of the other electronic devices to make the representations towards the top of sharing option 634 (e.g., indications 636*b* and 636*c*) smaller and to make the representations towards the bottom of sharing option 634 (e.g., indications 636*d* and 636*m*) larger (e.g., as if indications 636 are orbiting sharing option 634 out of the plane of the display 504). These modifications to sharing option 634 give the option a tilted appearance. Displaying the option with the tilted appearance indicates to the user that the angle between the electronic device 500 and the reference plane 640*a* needs to be adjusted to restore the desired reliability to the circuitry that determines the other electronic device 610 towards which the electronic device 500 is pointing.

Figure 6V:
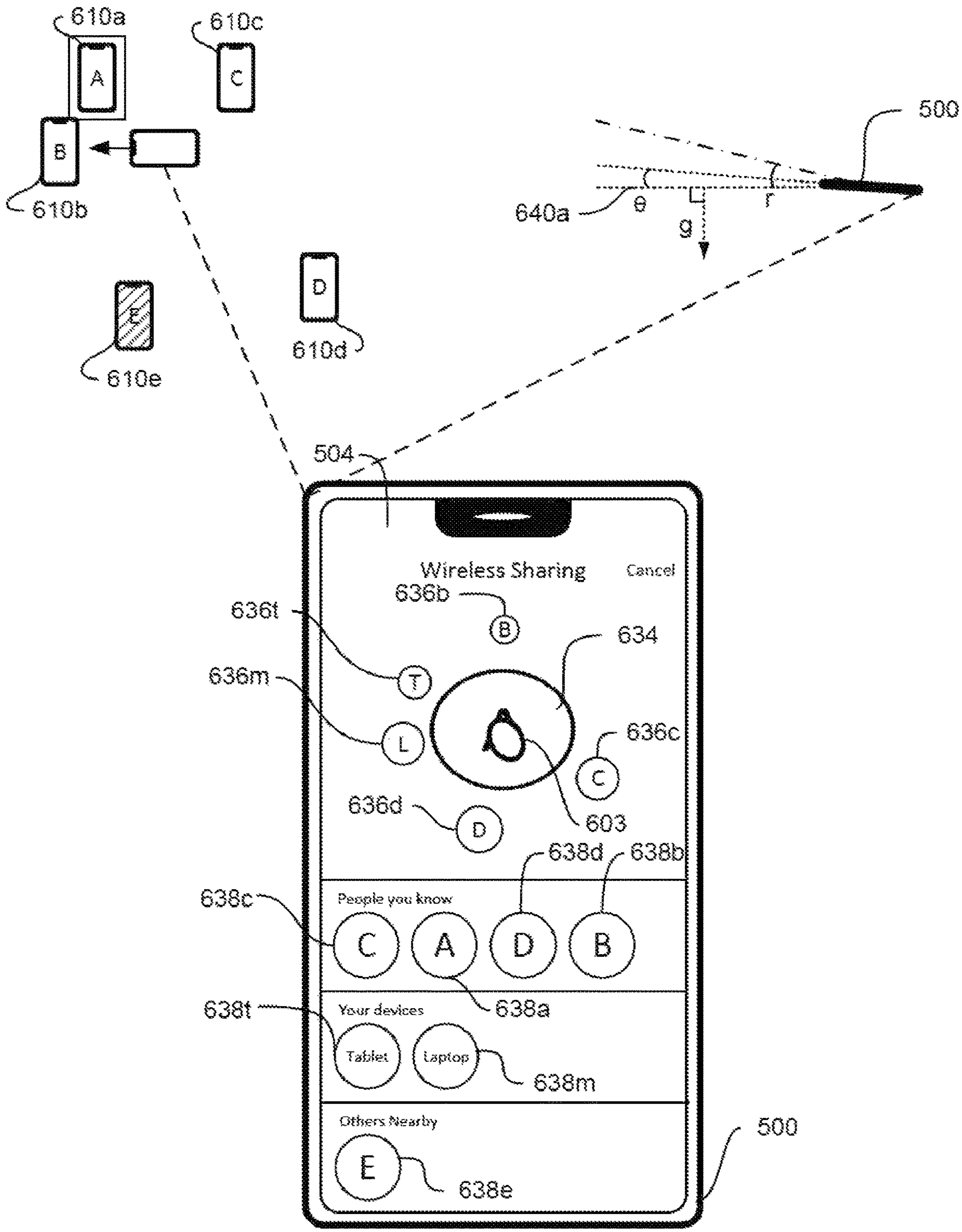

As shown in FIG. 6V, while the angle θ between the electronic device 500 and the reference plane 640*a* is less than the reference angle r, the electronic device 500 rotates to point towards electronic device 610*b*. Because the angle θ is less than the reference angle r, the sharing option 634 does not update to include an image representing electronic device 610*b*, even though the electronic device 500 is pointed towards electronic device 610*b*. Rather, sharing option 634 continues to correspond to electronic device 610*a*, which is the last electronic device 610 towards which electronic device 500 was pointing while the angle θ between the electronic device 500 and the reference plane 640*a* was greater than the reference angle r. Although selectable sharing option 634 does not update in response to the electronic device 500 changing orientation to point at electronic device 610*b*, the locations of representations 636 of the other electronic devices available for sharing move in accordance with the movement of the electronic device 500 relative to the other electronic devices available for sharing. In FIG. 6V, the user selects (e.g., with contact 603) the sharing option 634.

Figure 6W:
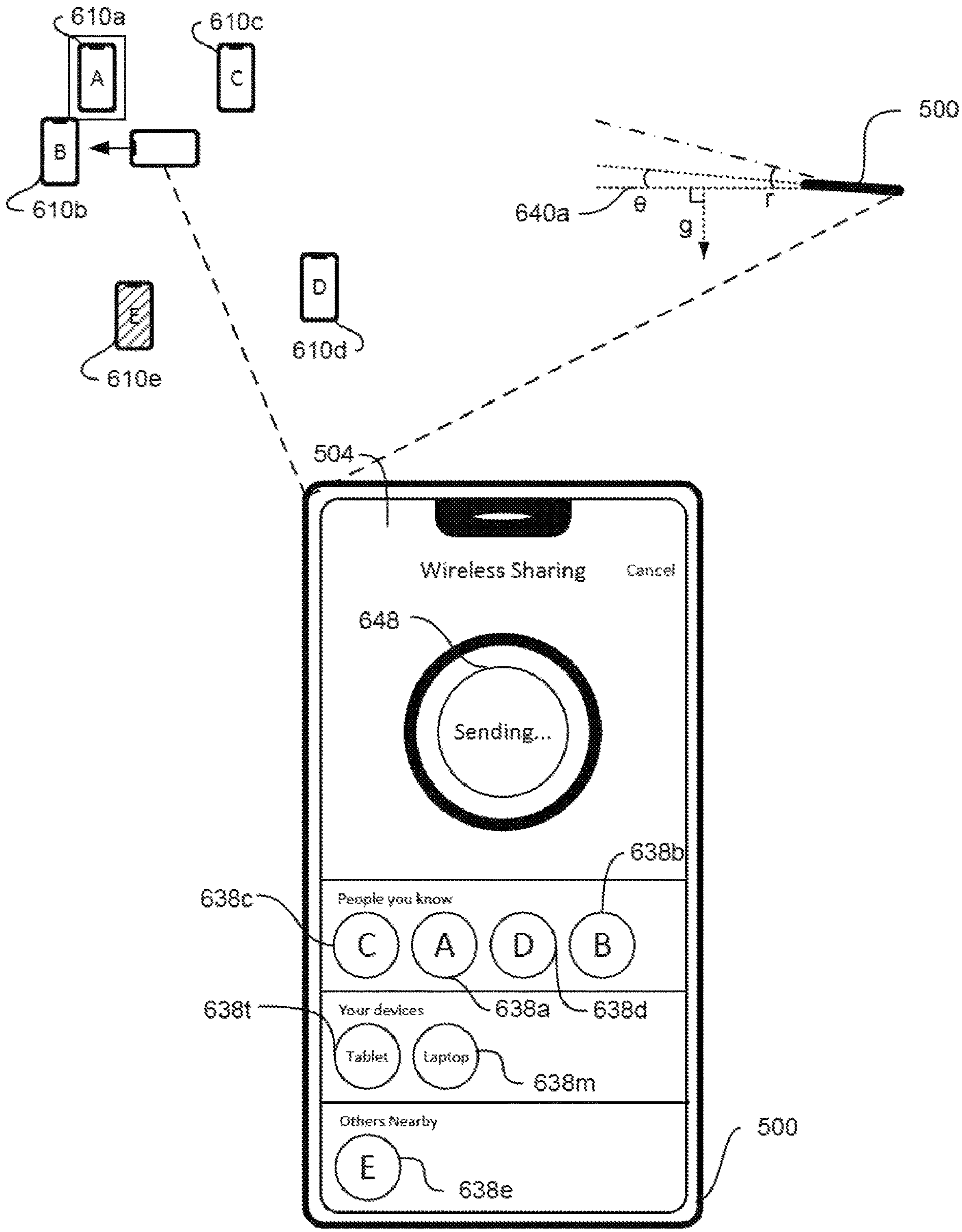

As shown in FIG. 6W, in response to detecting selection of the sharing option 634 illustrated in FIG. 6V, the electronic device 500 initiates a process to share content with electronic device 610*a*. The sharing process is initiated while the angle θ between the electronic device 500 and the reference plane 640*a* is less than the reference angle r. Because the sharing option 634 did not update in response to the electronic device 500 pointing towards electronic device 610*b*, the content is shared with electronic device 610*a*. While sharing the content with electronic device 610*a*, the electronic device 500 displays an indication 648 that sharing is in progress.

Figure 6X:
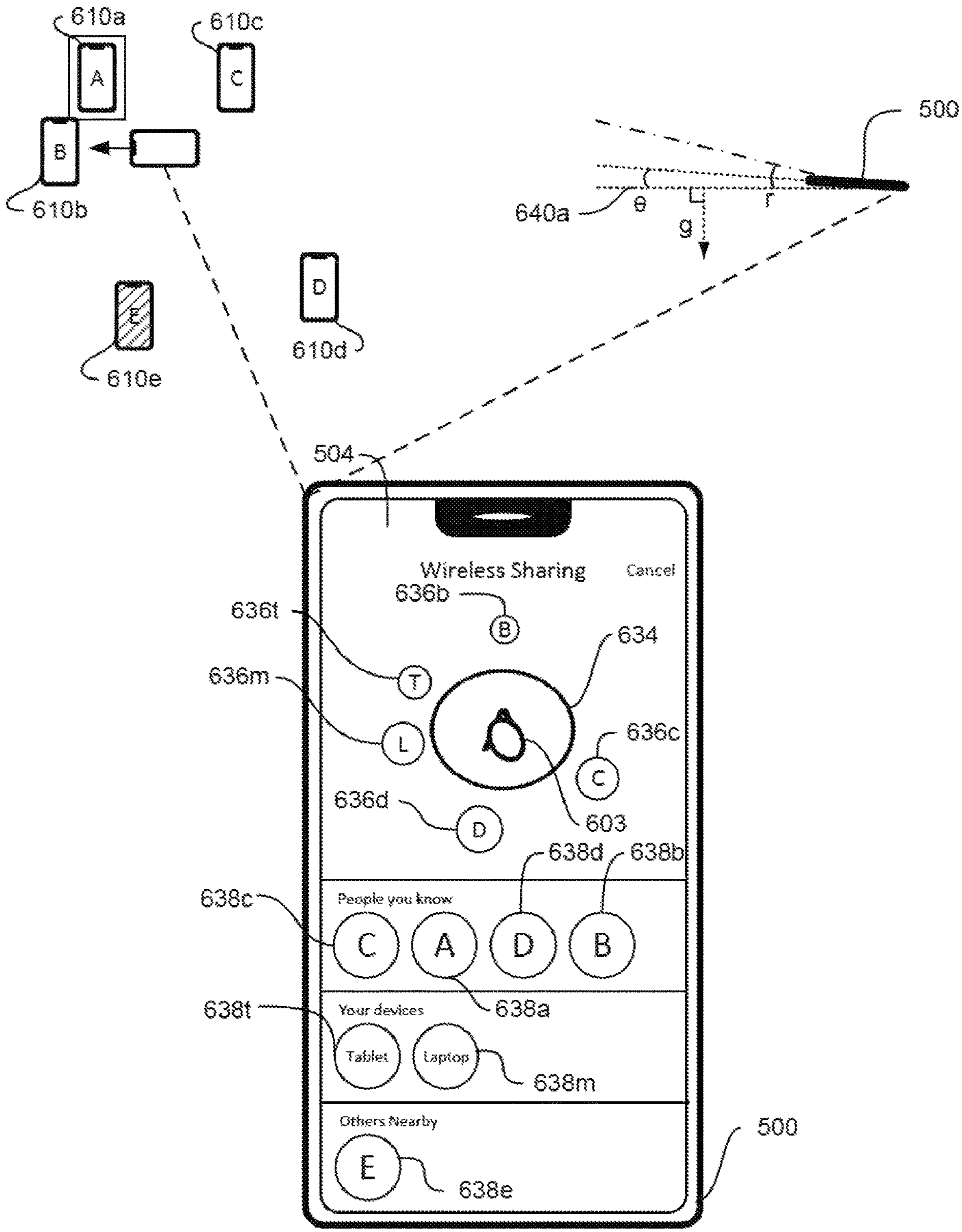
Figure 6Y:
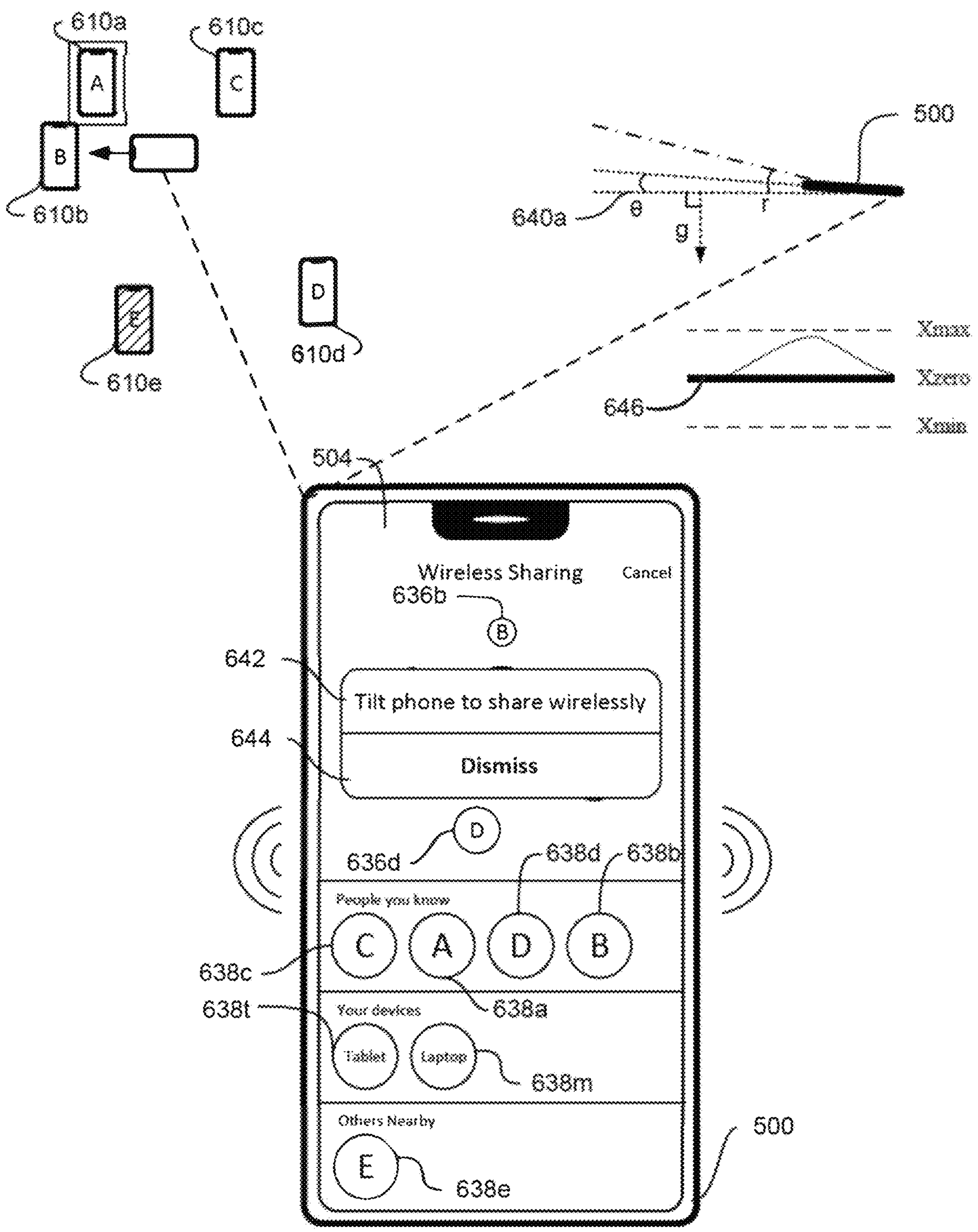

In some embodiments, however, the electronic device 500 does not initiate a process to share the content if selection of option 634 is detected while the angle θ between electronic device 500 and the reference plane 640*a* is less than the reference angle r, as shown in FIGS. 6X-6Y. FIG. 6X is similar to FIG. 6V in that the angle θ between the electronic device 500 and the reference plane 640*a* is less than the reference angle r, the electronic device 500 is pointing towards electronic device 610*b*, and the selectable sharing option 634 includes an indication of electronic device 610*a*. The selectable sharing option 634 includes an indication of electronic device 610*a* because the last time electronic device 500 was at an angle θ greater than reference angle r, electronic device 500 was pointing towards electronic device 610*a*.

As shown in FIG. 6X, the user selects (e.g., with contact 603) the selectable sharing option 634. In response to the user's selection, the electronic device 500 forgoes sharing the content and generates a tactile output 646 (e.g., such as one of the tactile outputs described above with reference to FIGS. 5I-5N) and visual indication 642, as shown in FIG. 6Y. The visual indication 642 instructs the user to tilt the electronic device 500 (e.g., to an angle that is greater than r) and a selectable option 644 that, when selected, causes the electronic device 500 to dismiss the indication.

Figure 6Z:
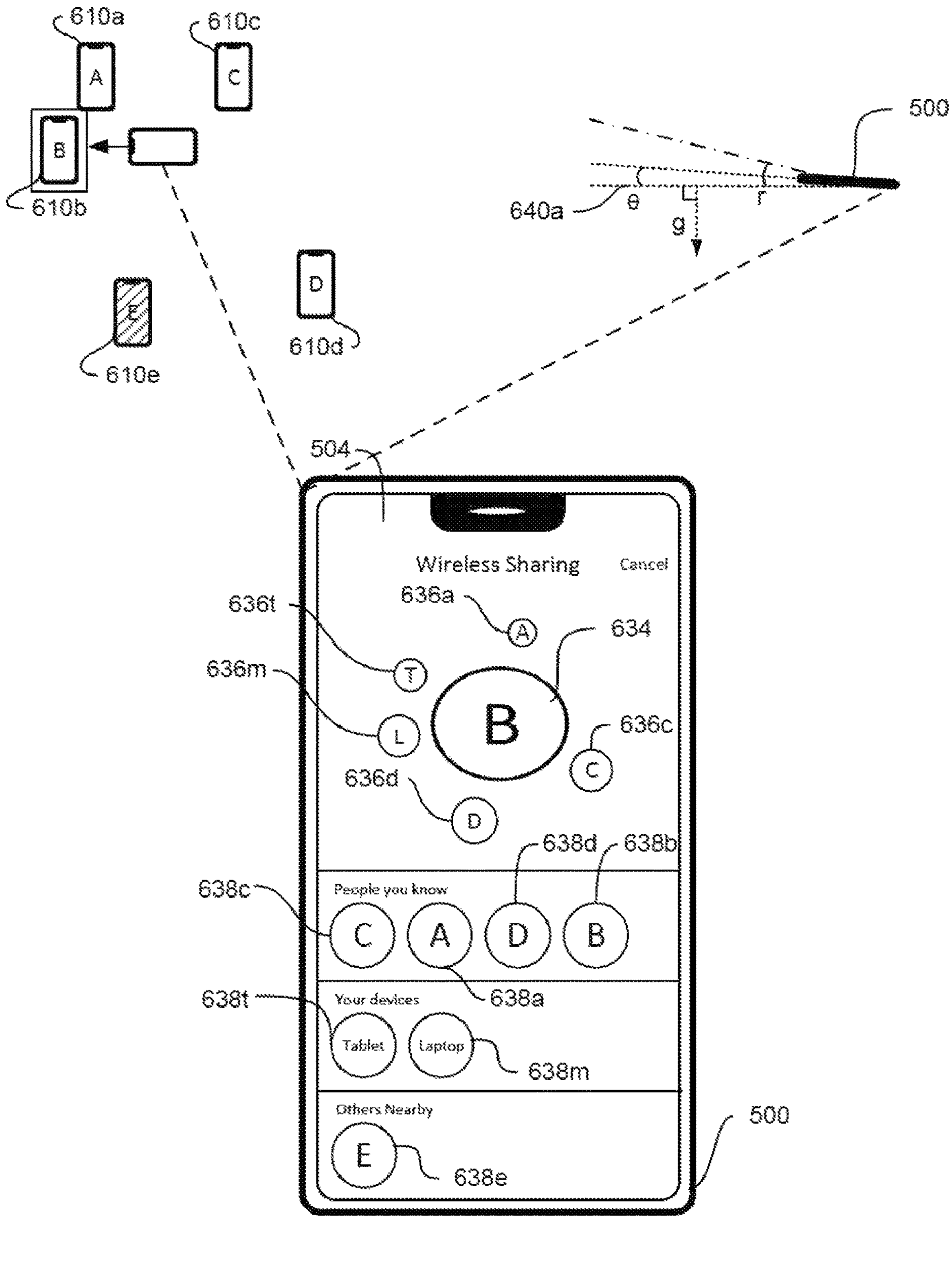
Figure 6A:
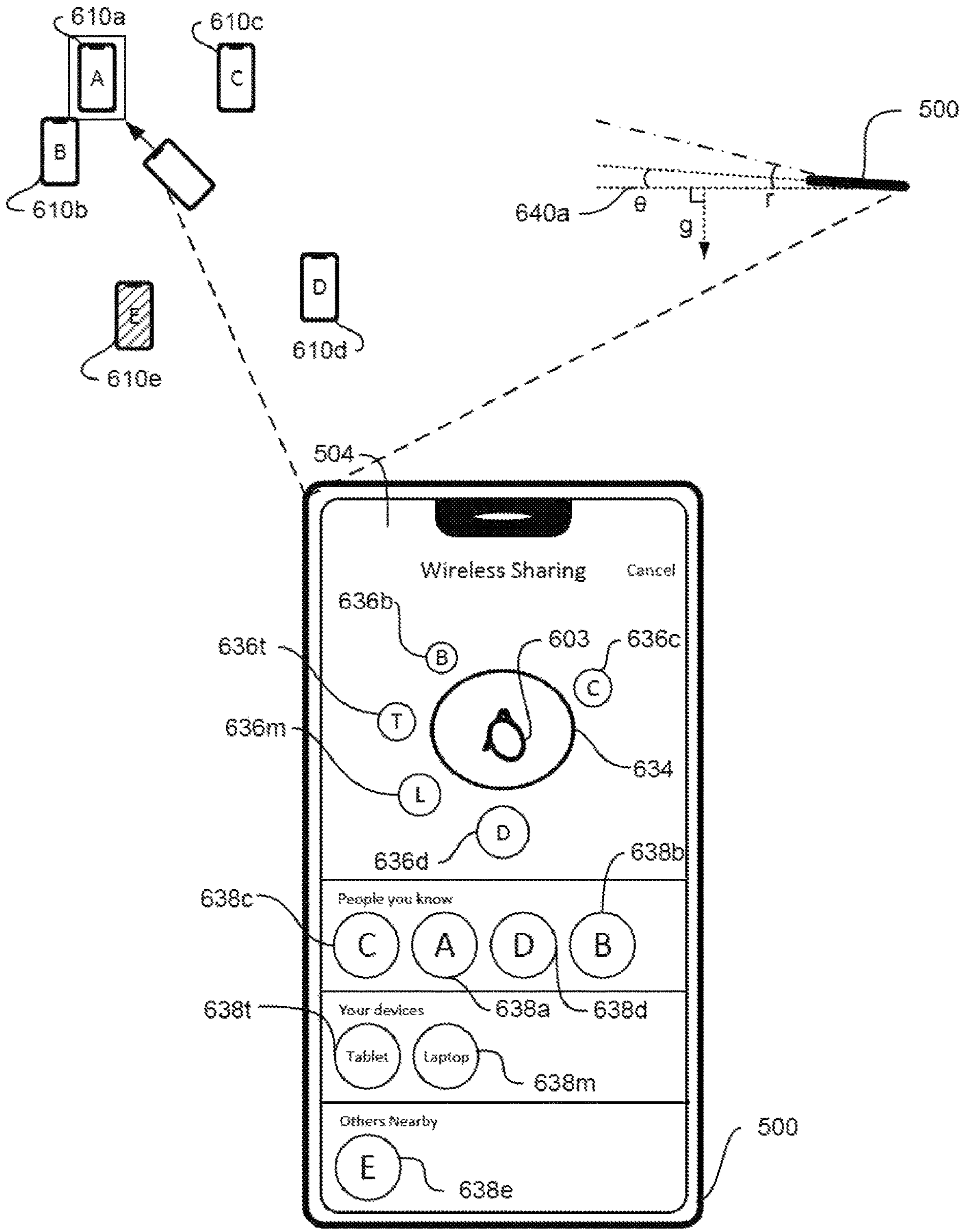
Figure 6B:
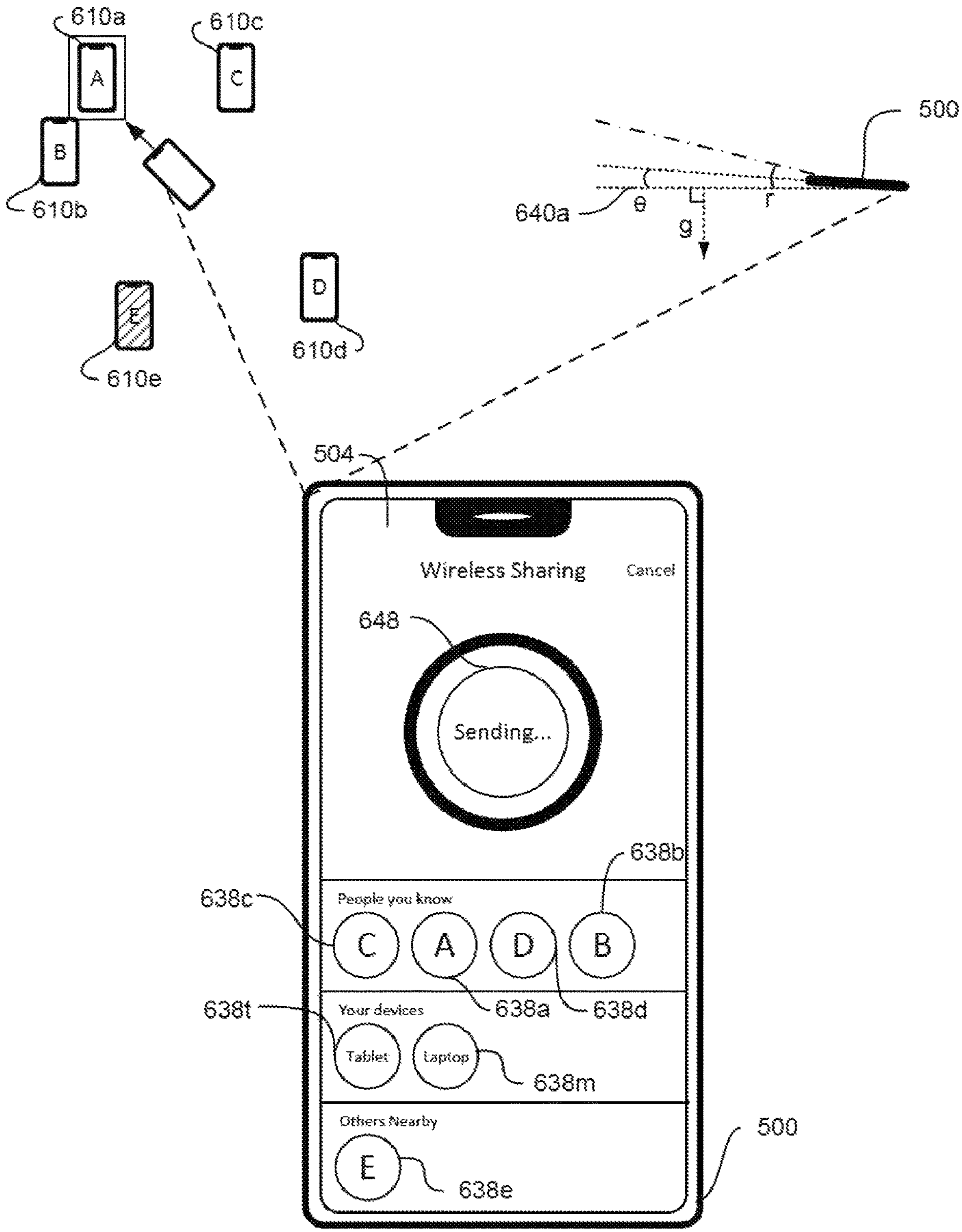
Figure 6C:
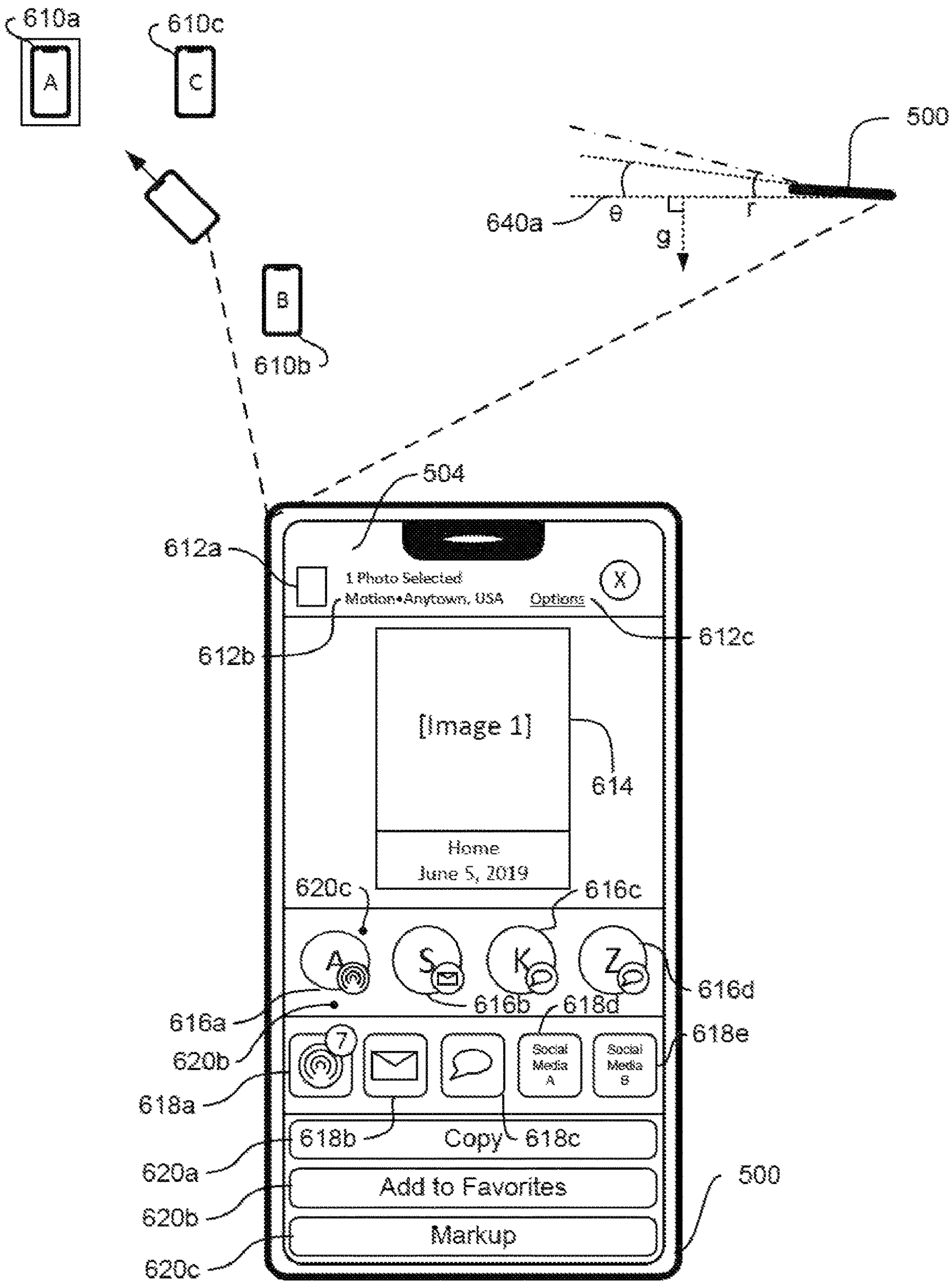
Figure 6D:
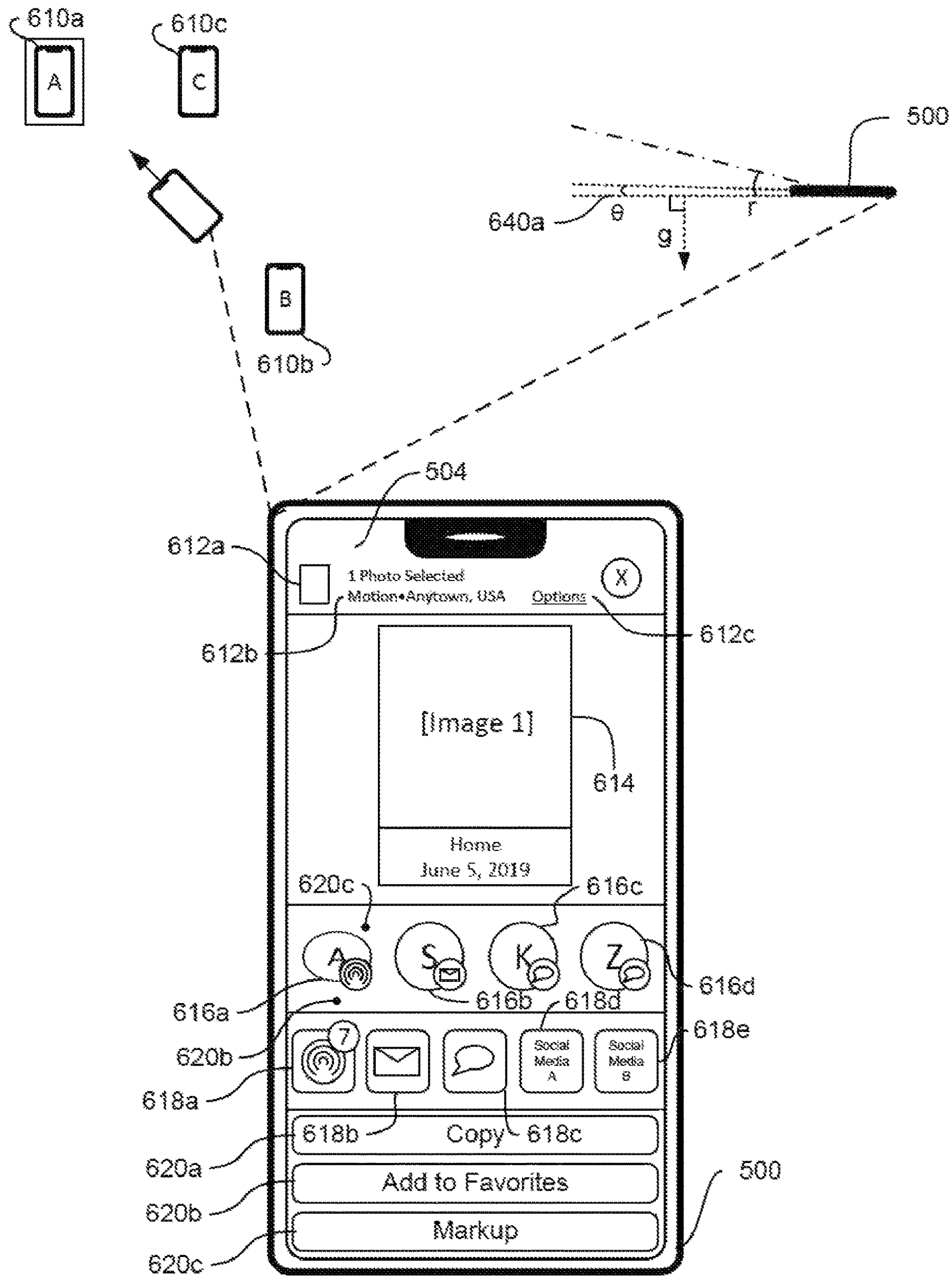
Figure 6E:
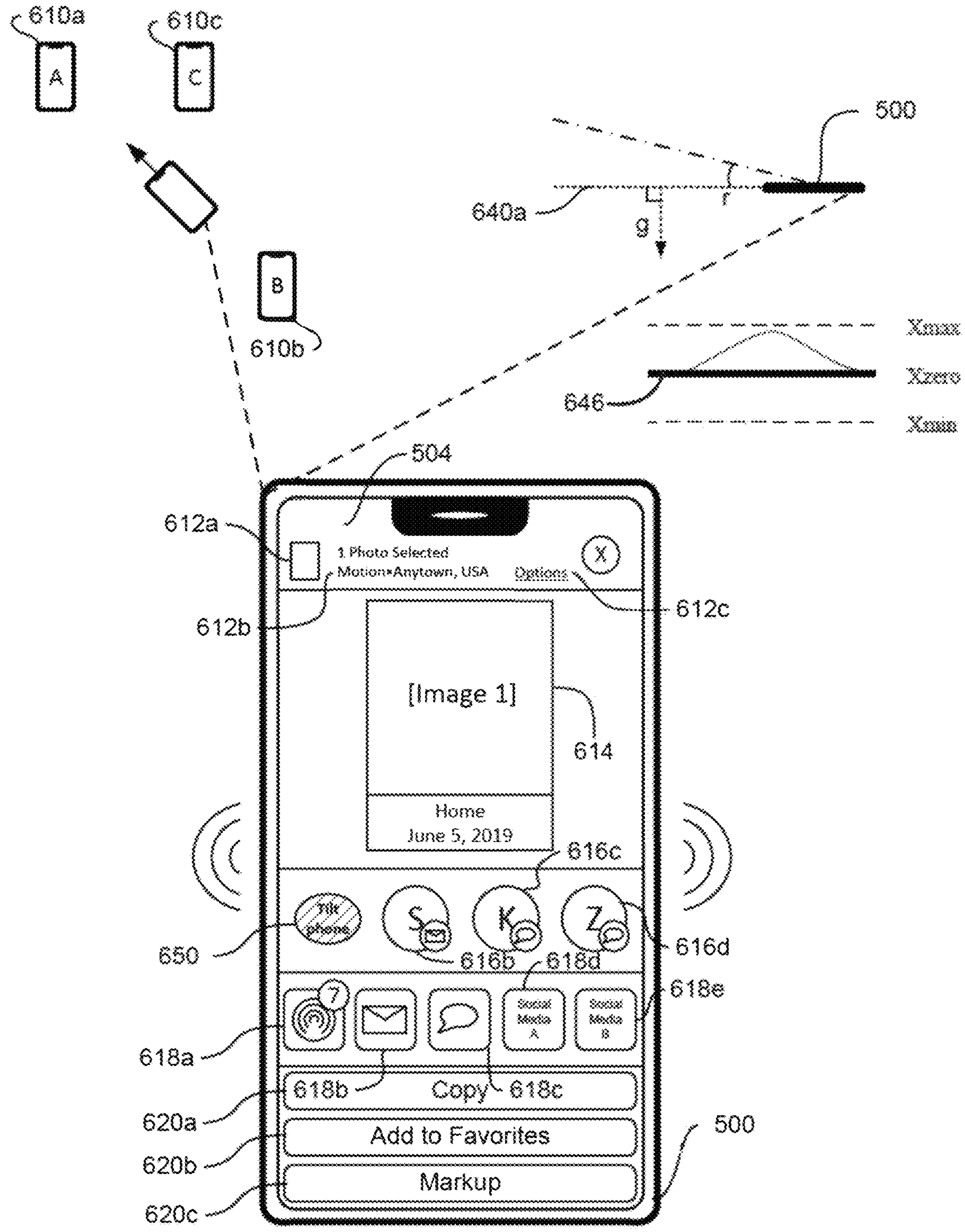
Figure 6F:
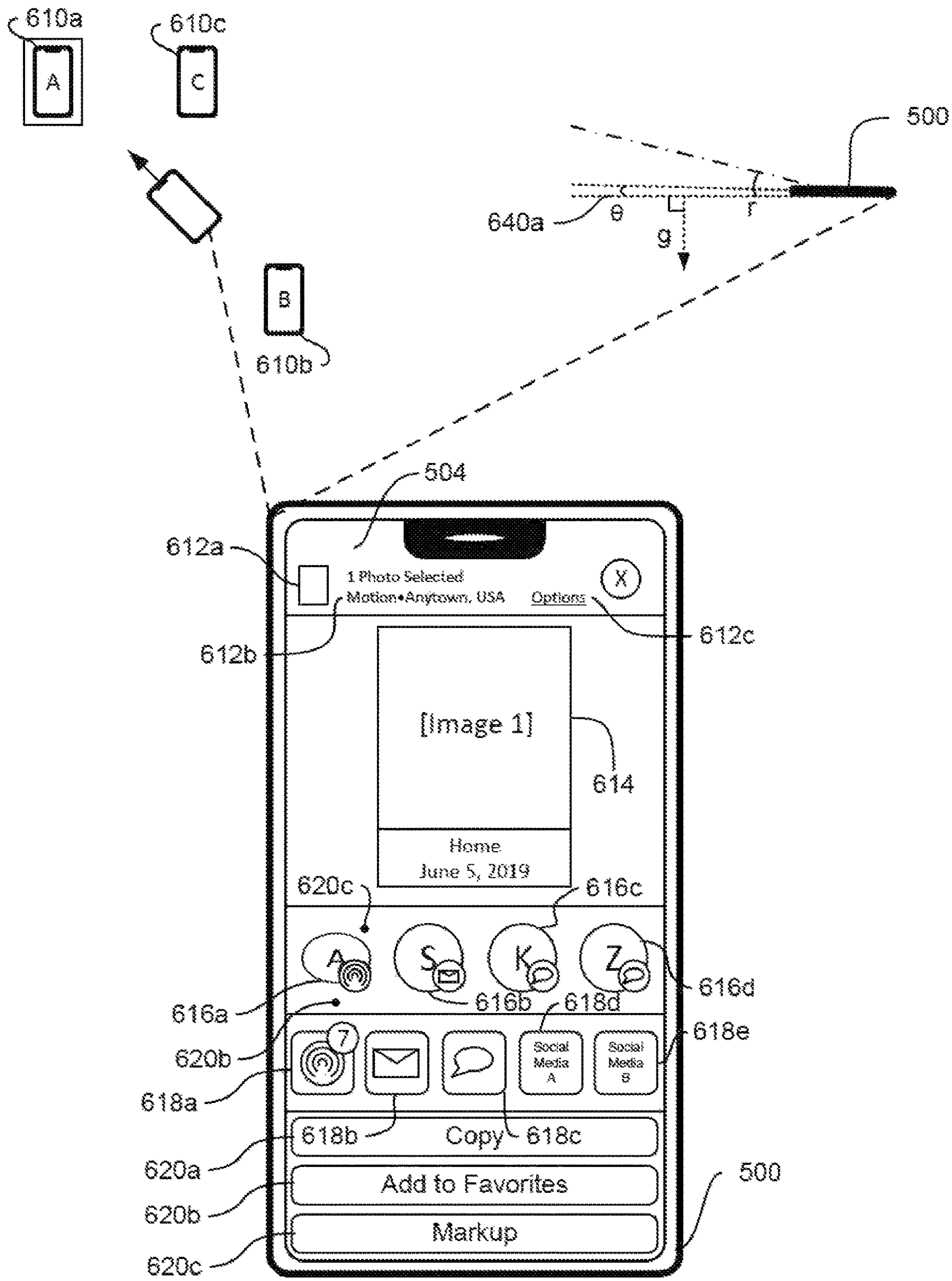
Figure 6G:
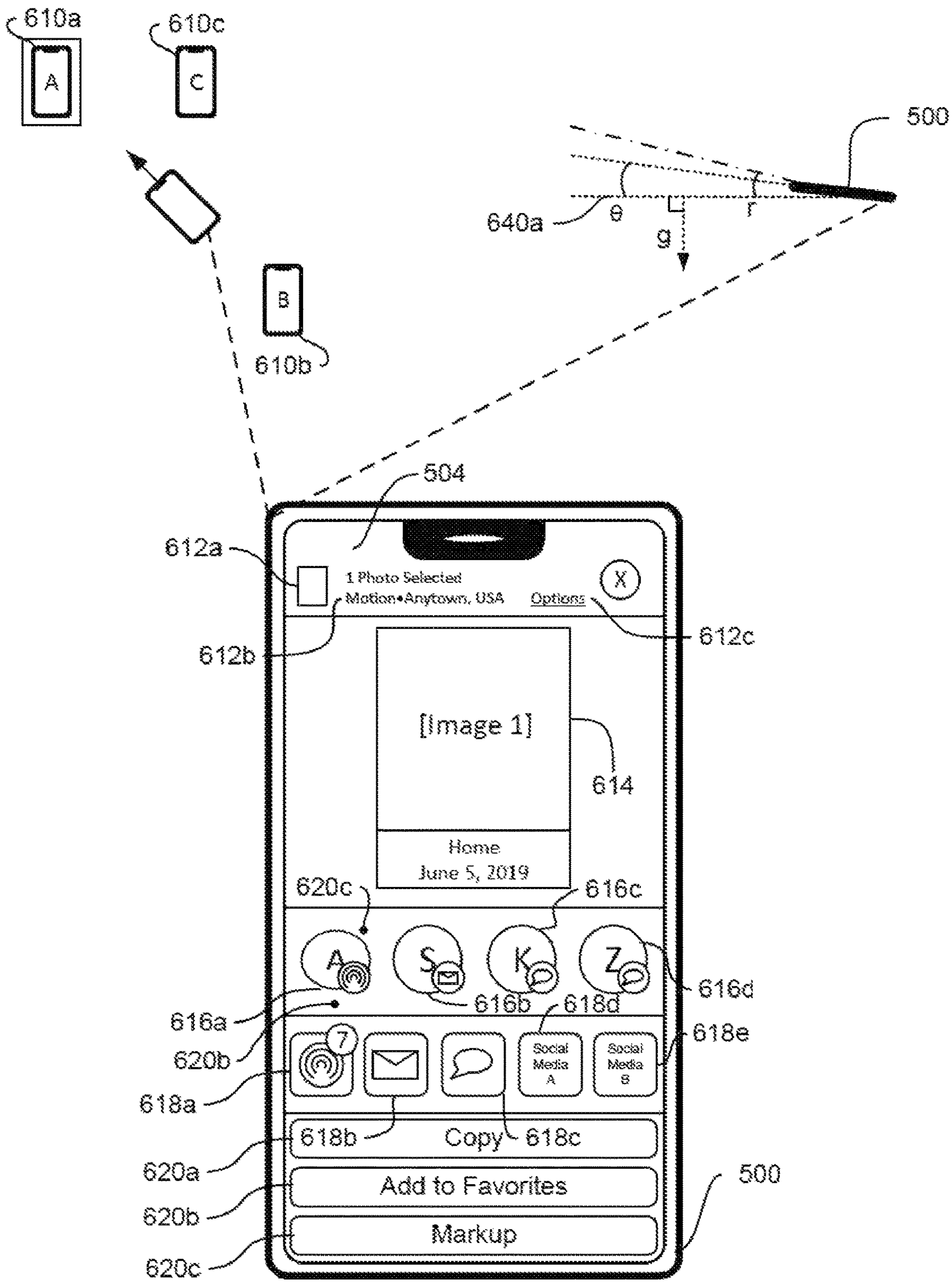
Figure 6H:
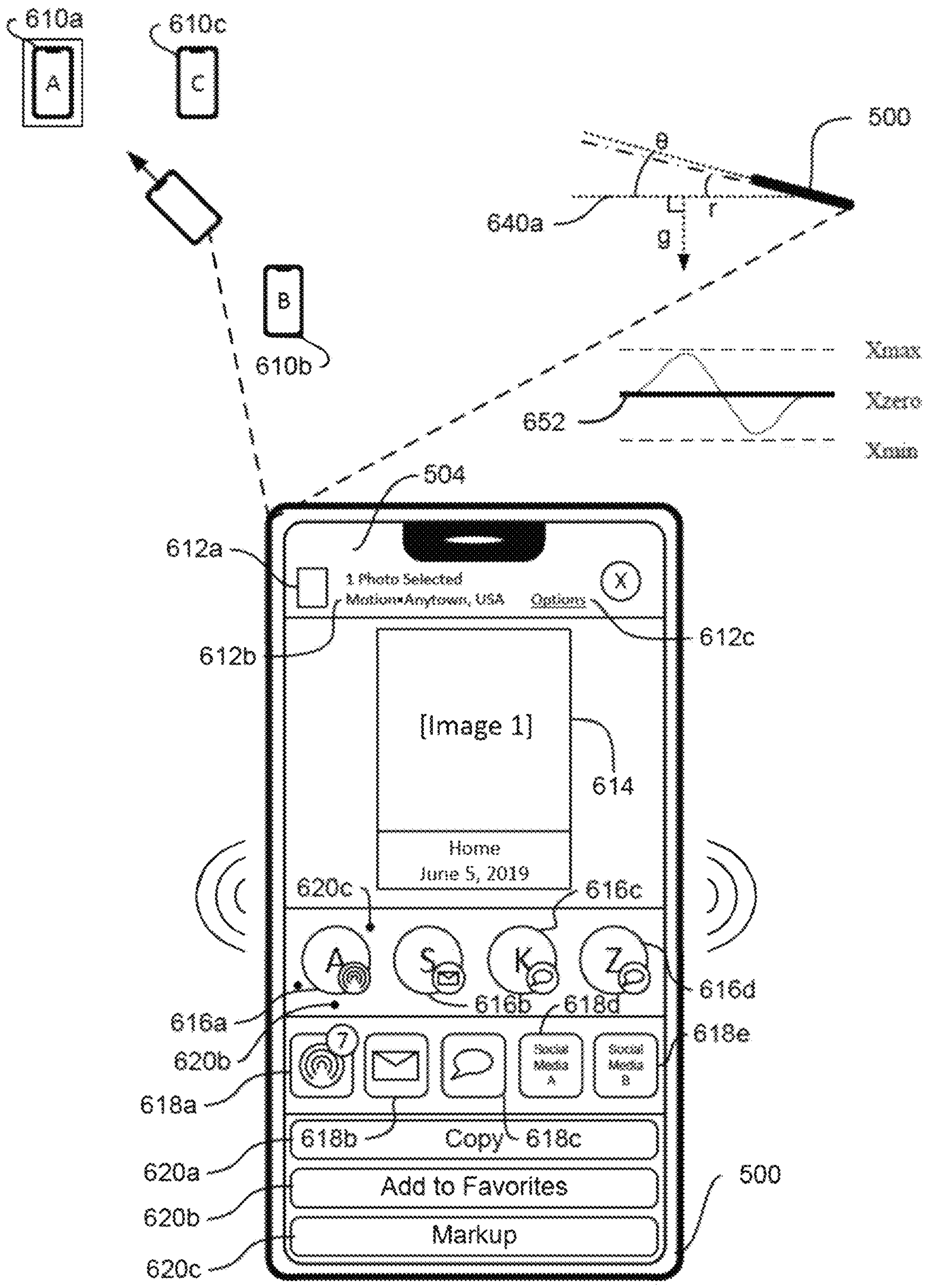
Figure 6I:
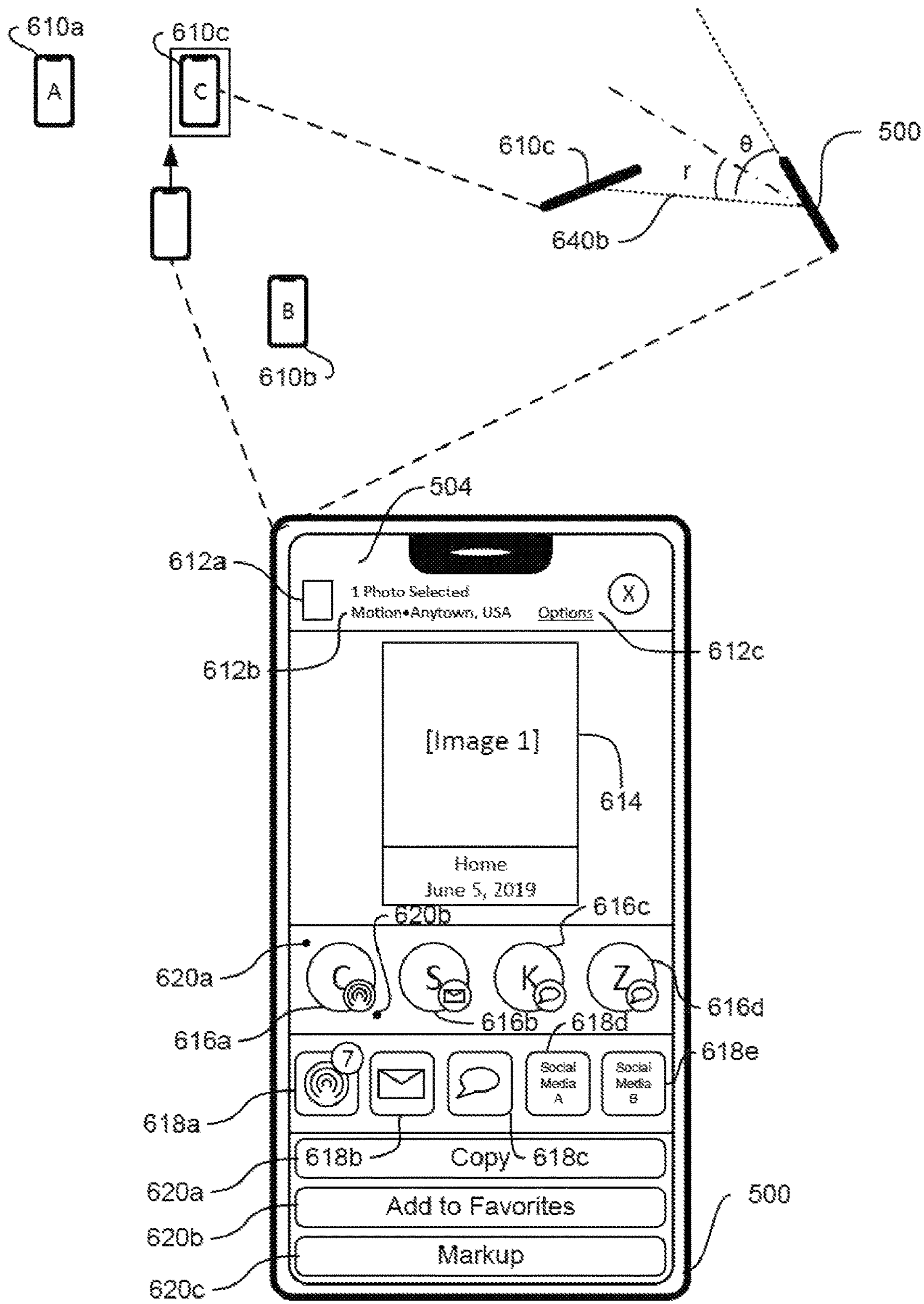
Figure 6J:
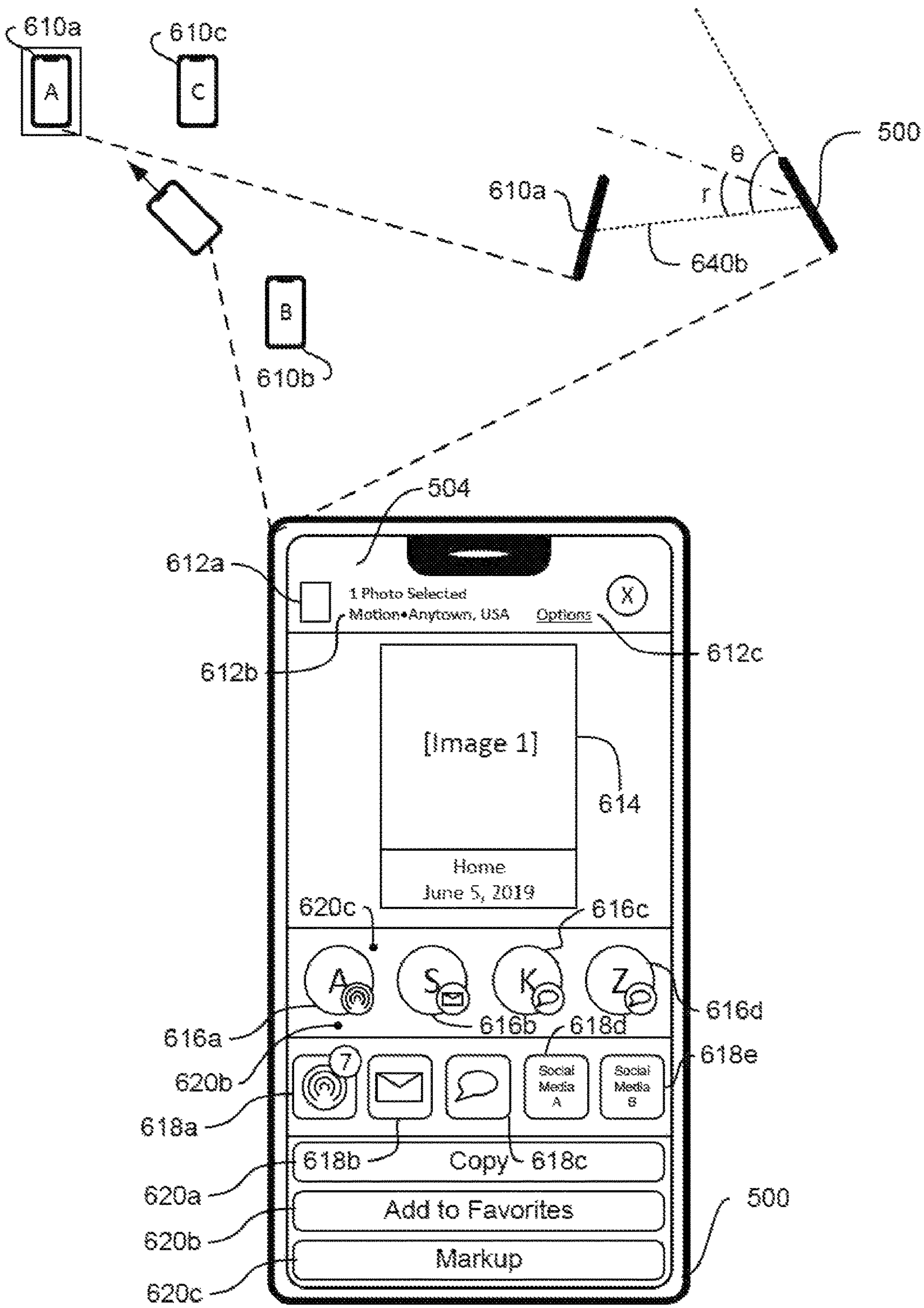
Figure 6K:
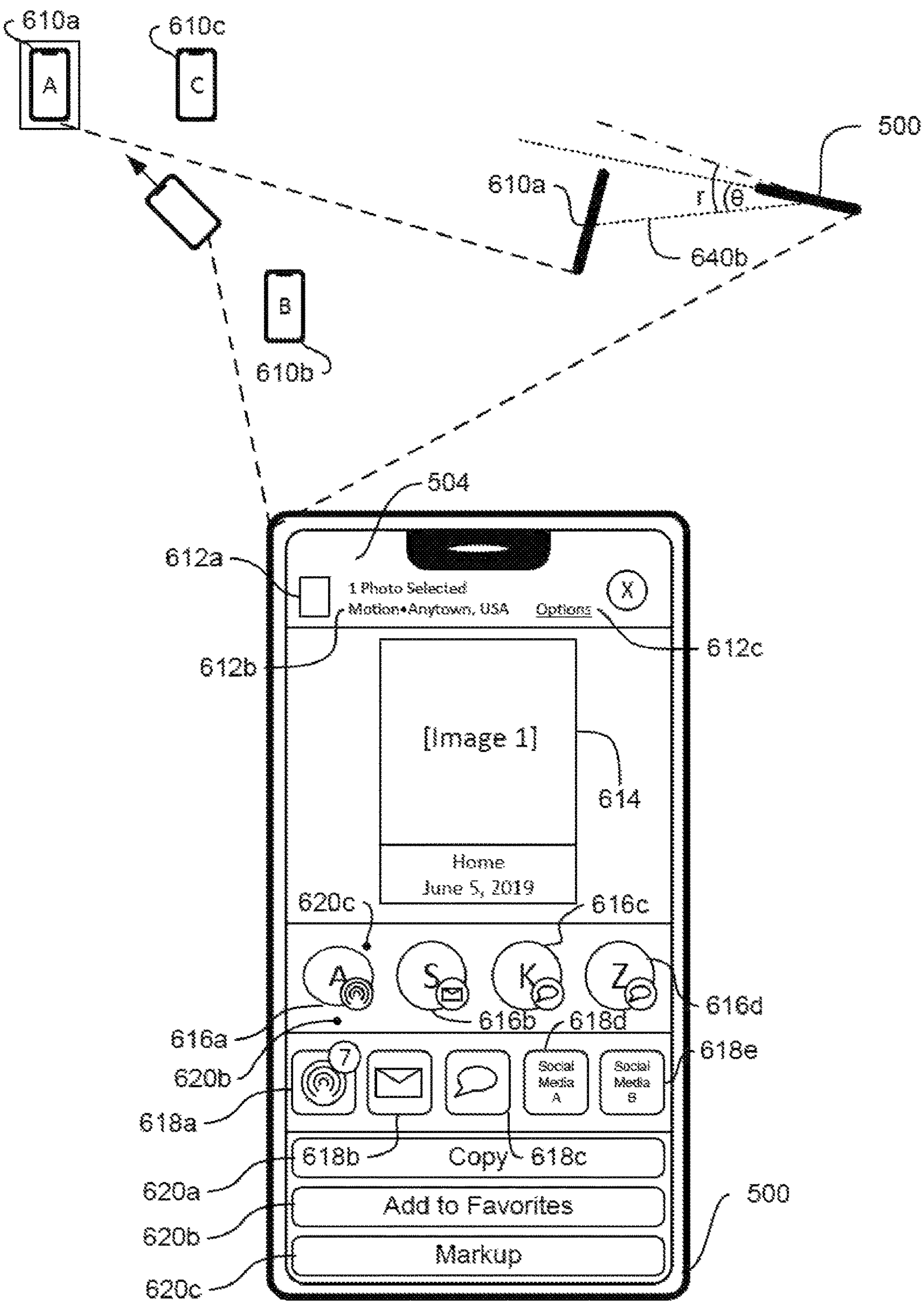
Figure 7A:
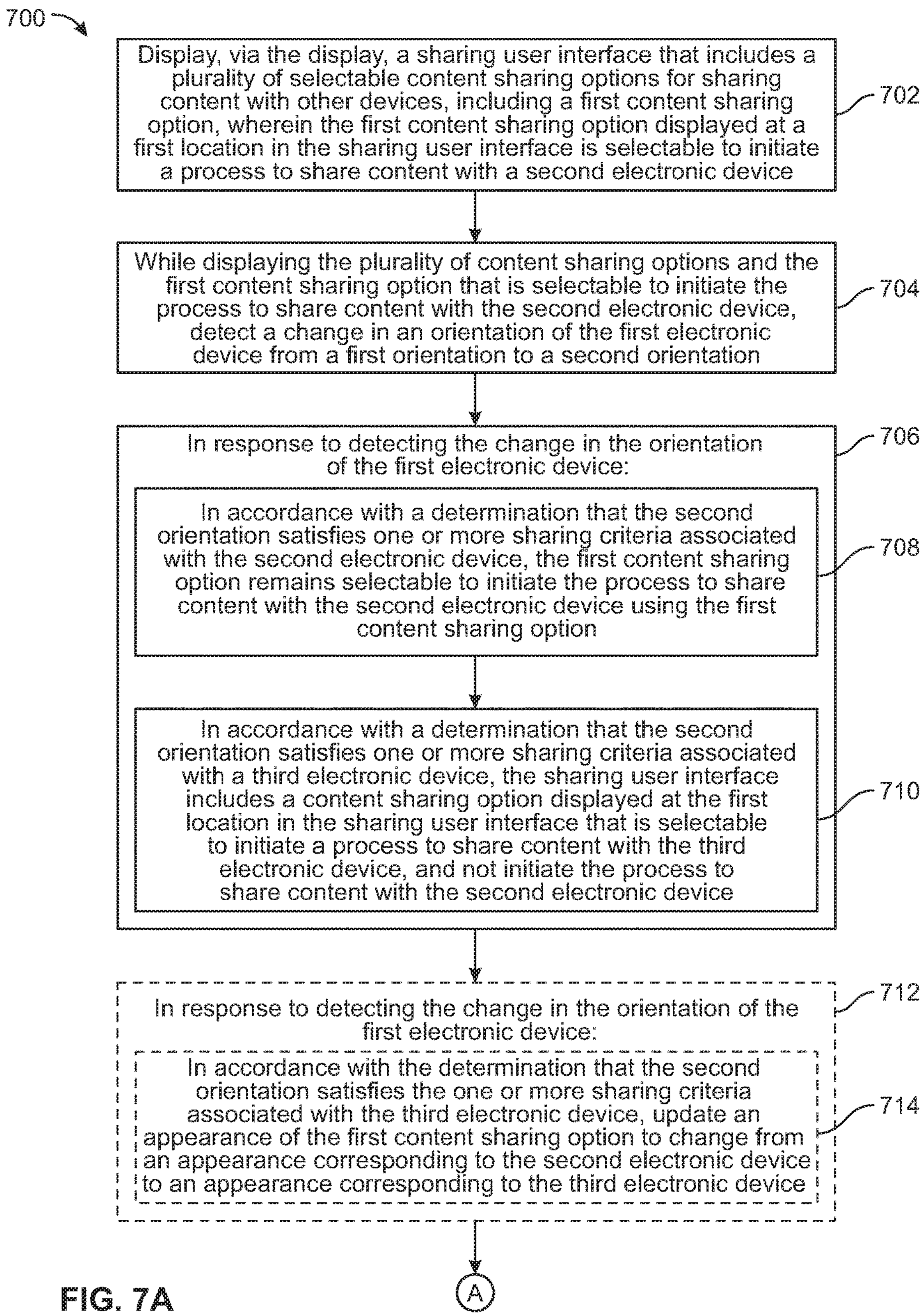
FIGS. 7A-7J are flow diagrams illustrating a method of presenting an option that is selectable to share content with a second electronic device selected which the first electronic device is oriented in accordance with some embodiments of the disclosure.
Figure 7B:
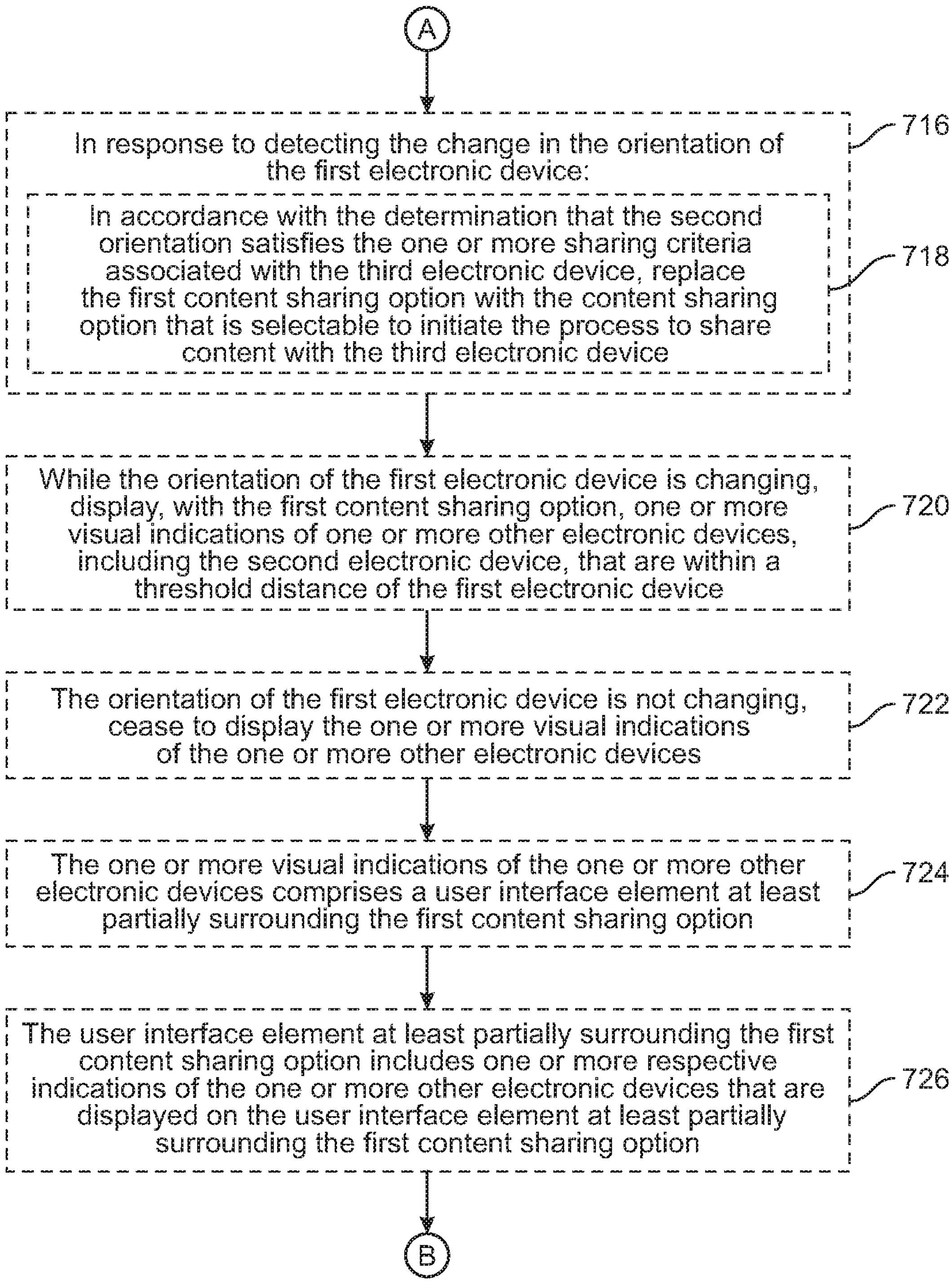
Figure 7C:
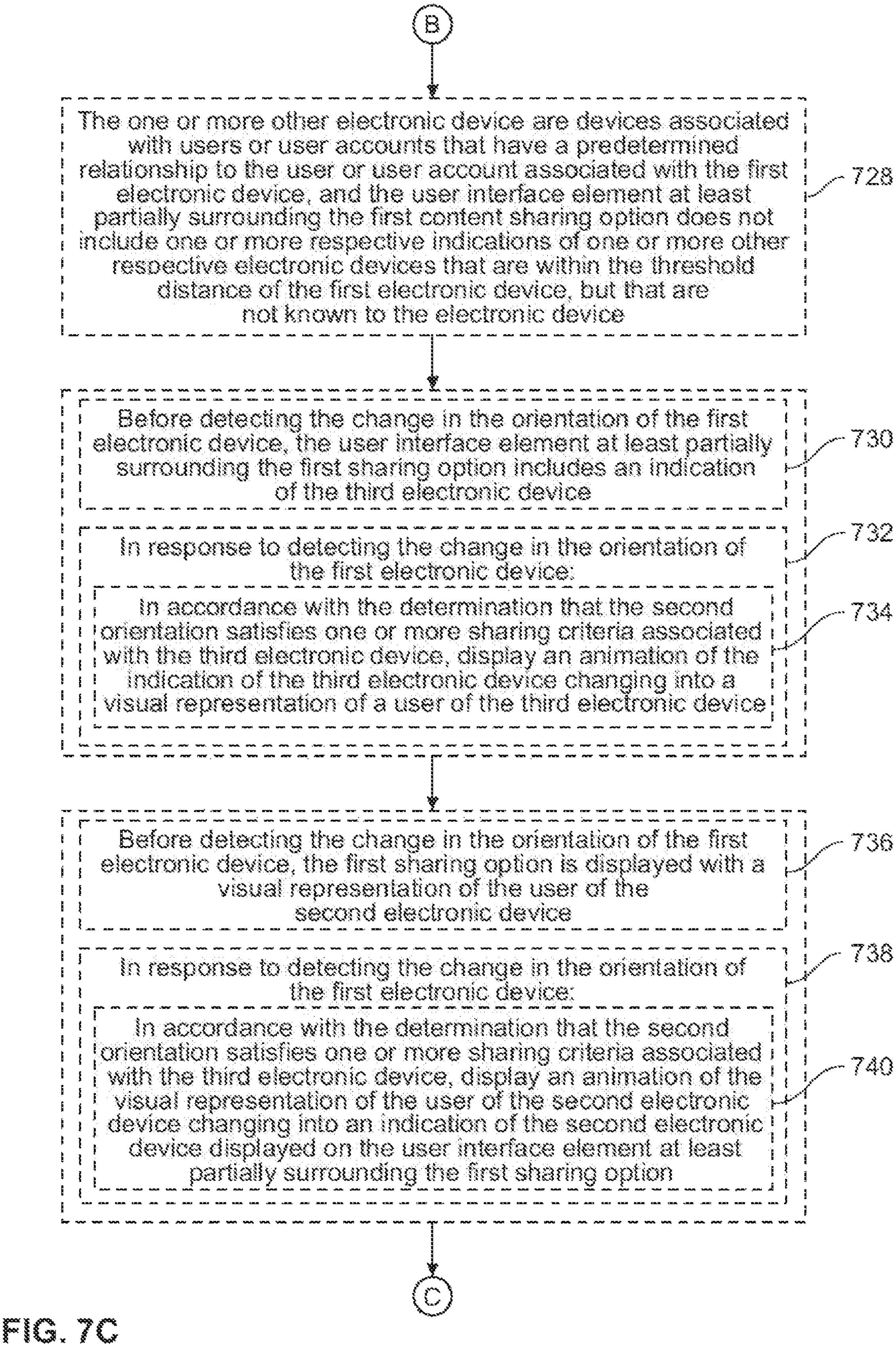
Figure 7D:
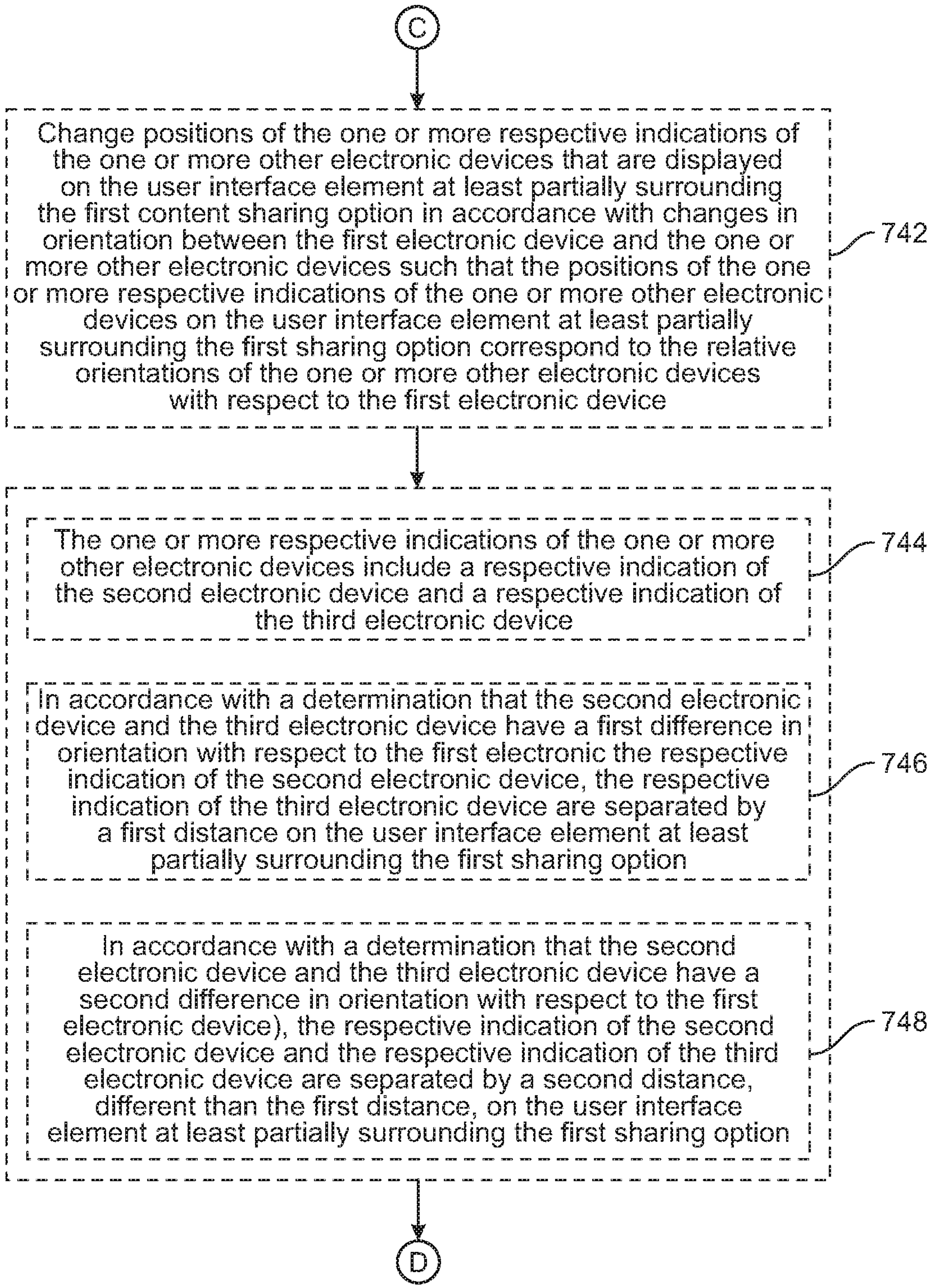
Figure 7E:
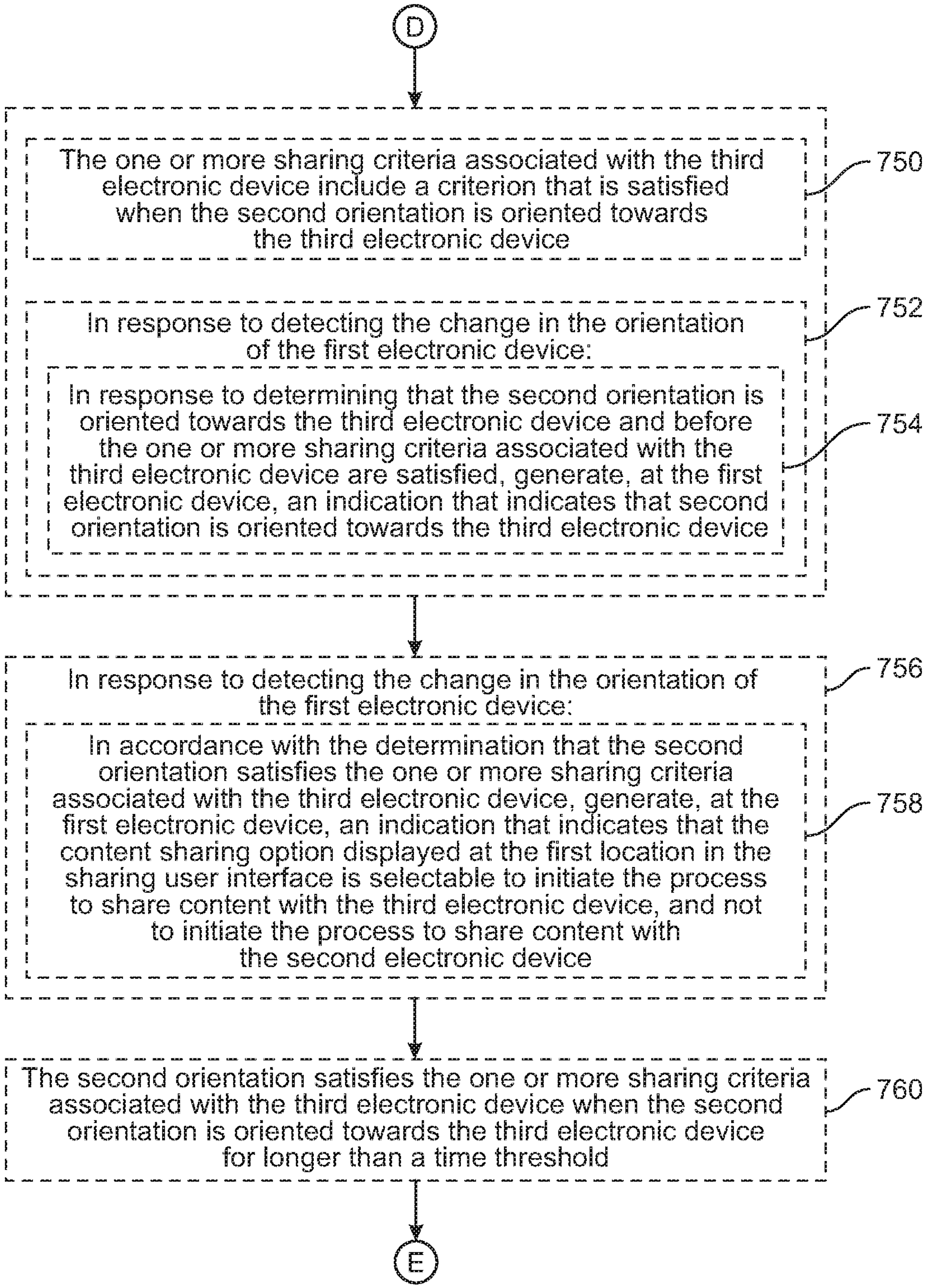
Figure 7F:
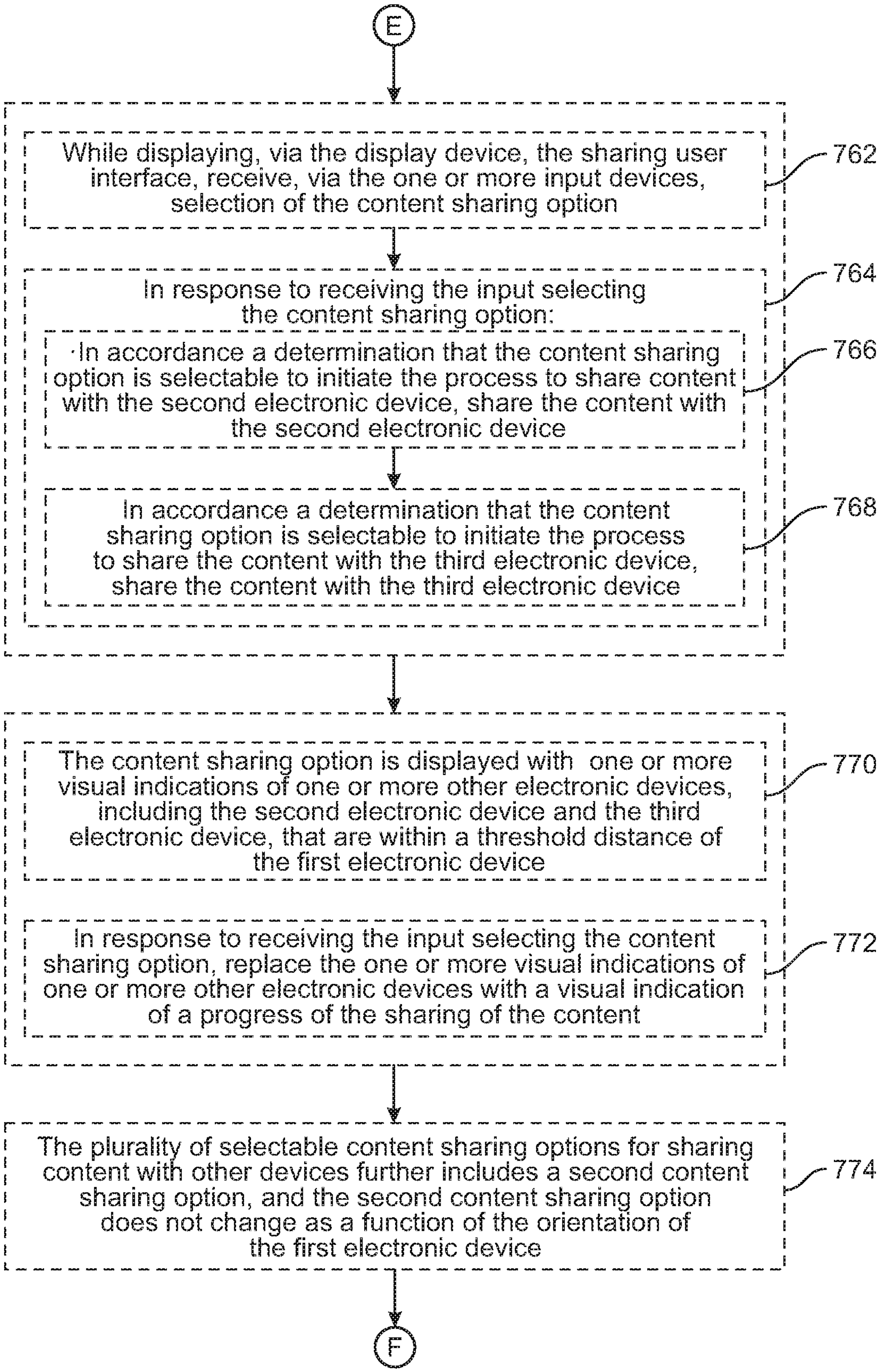
Figure 7G:
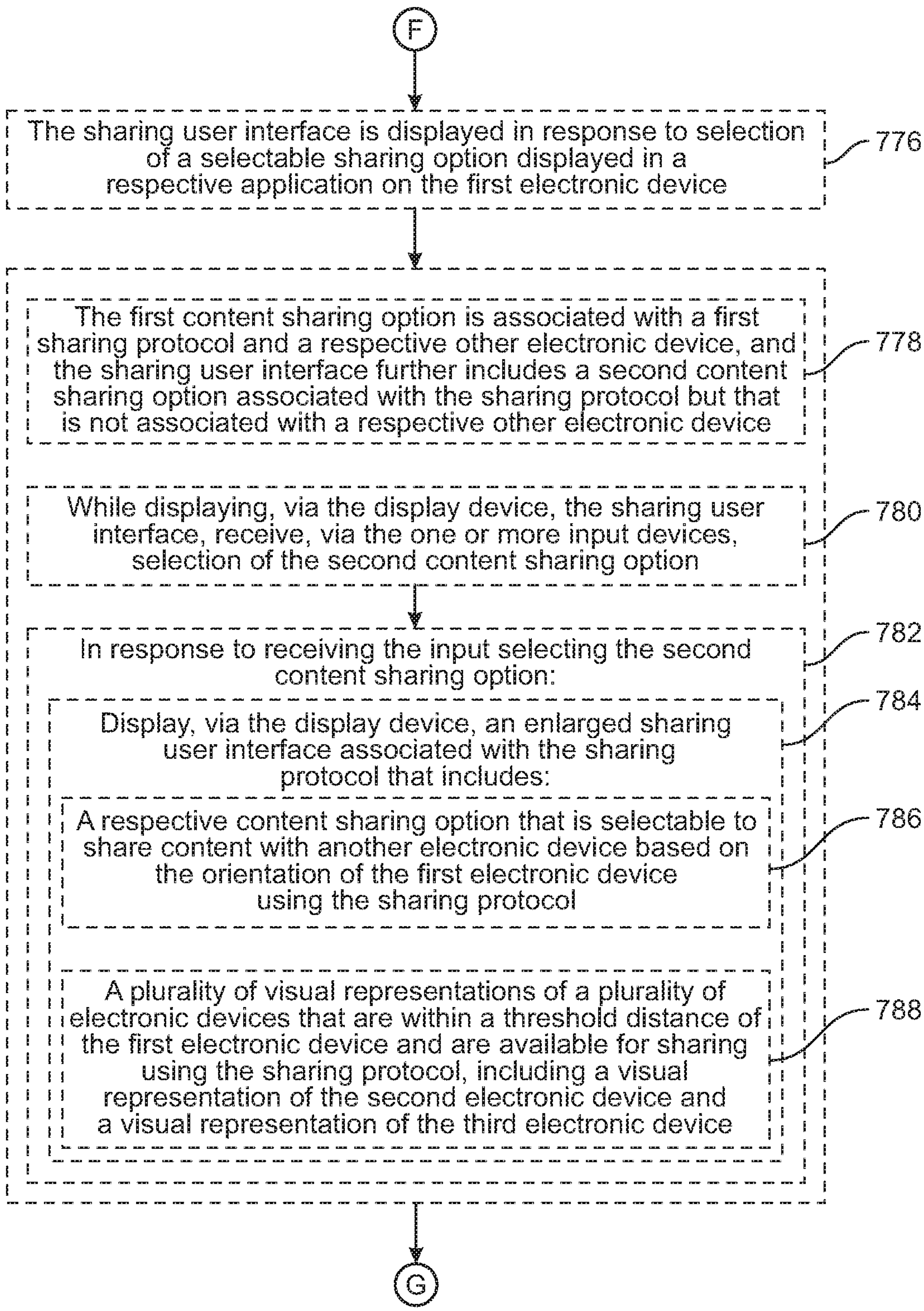
Figure 7H:
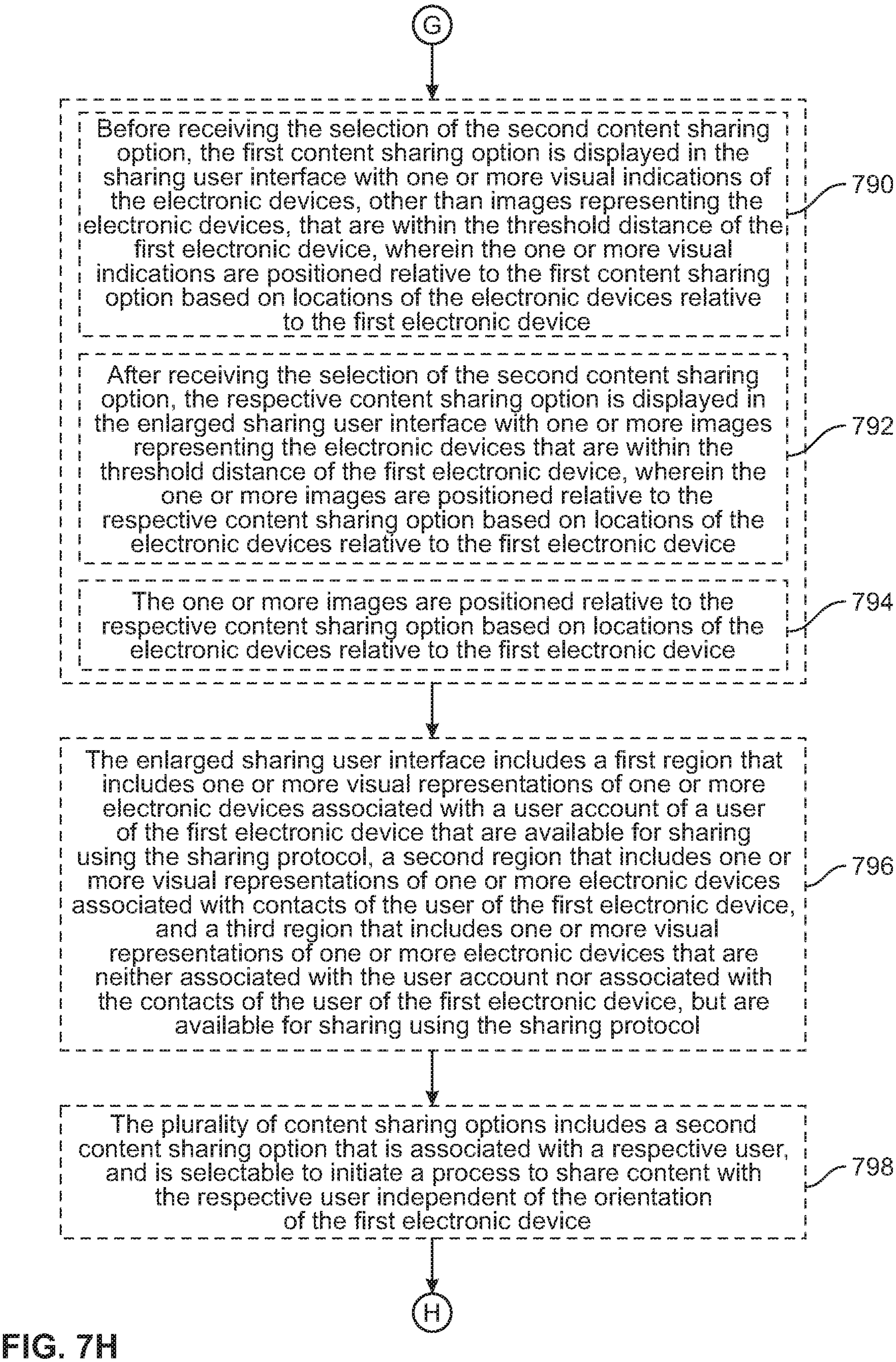
Figure 7I:
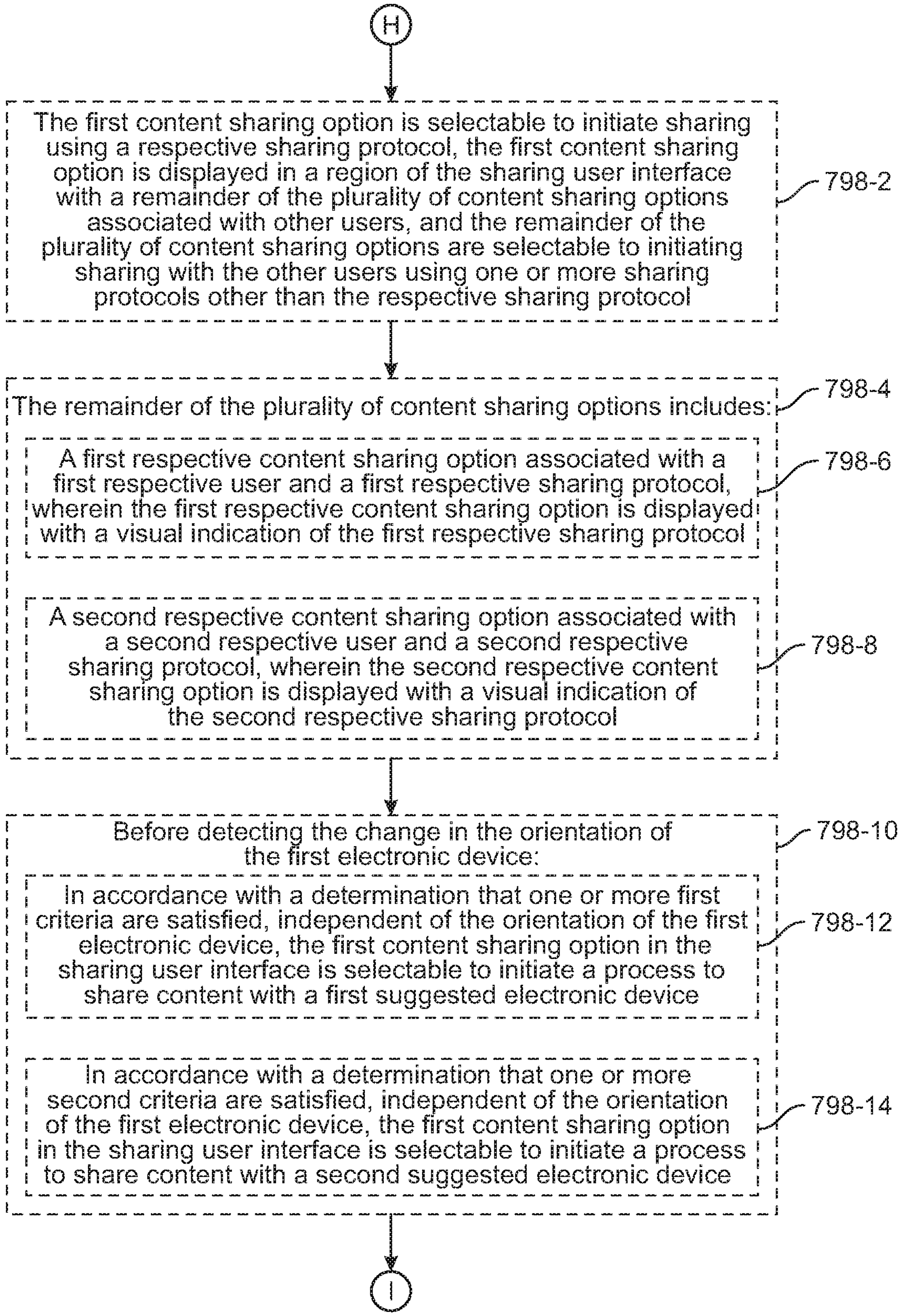
Figure 7J:
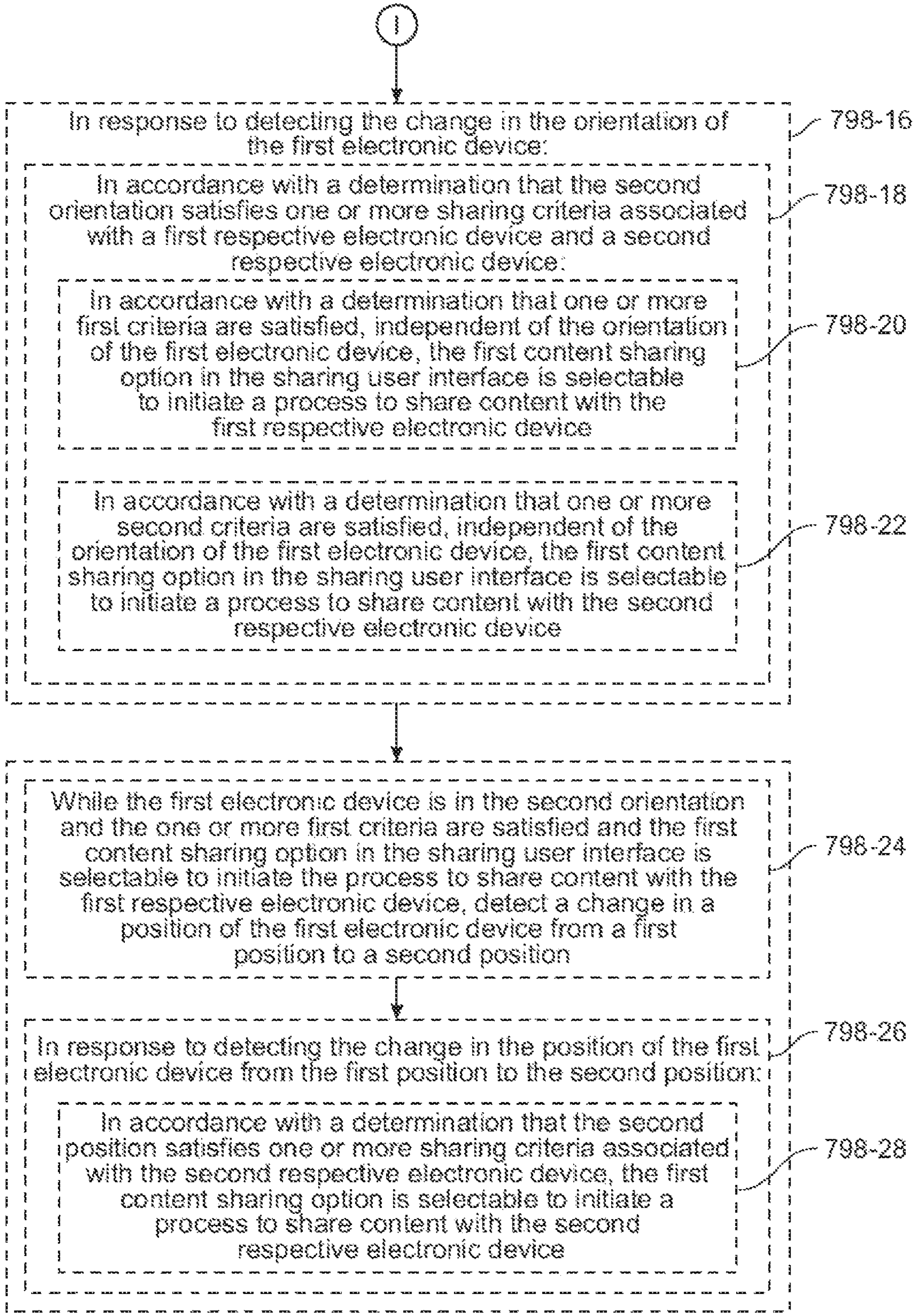
Figure 7K:
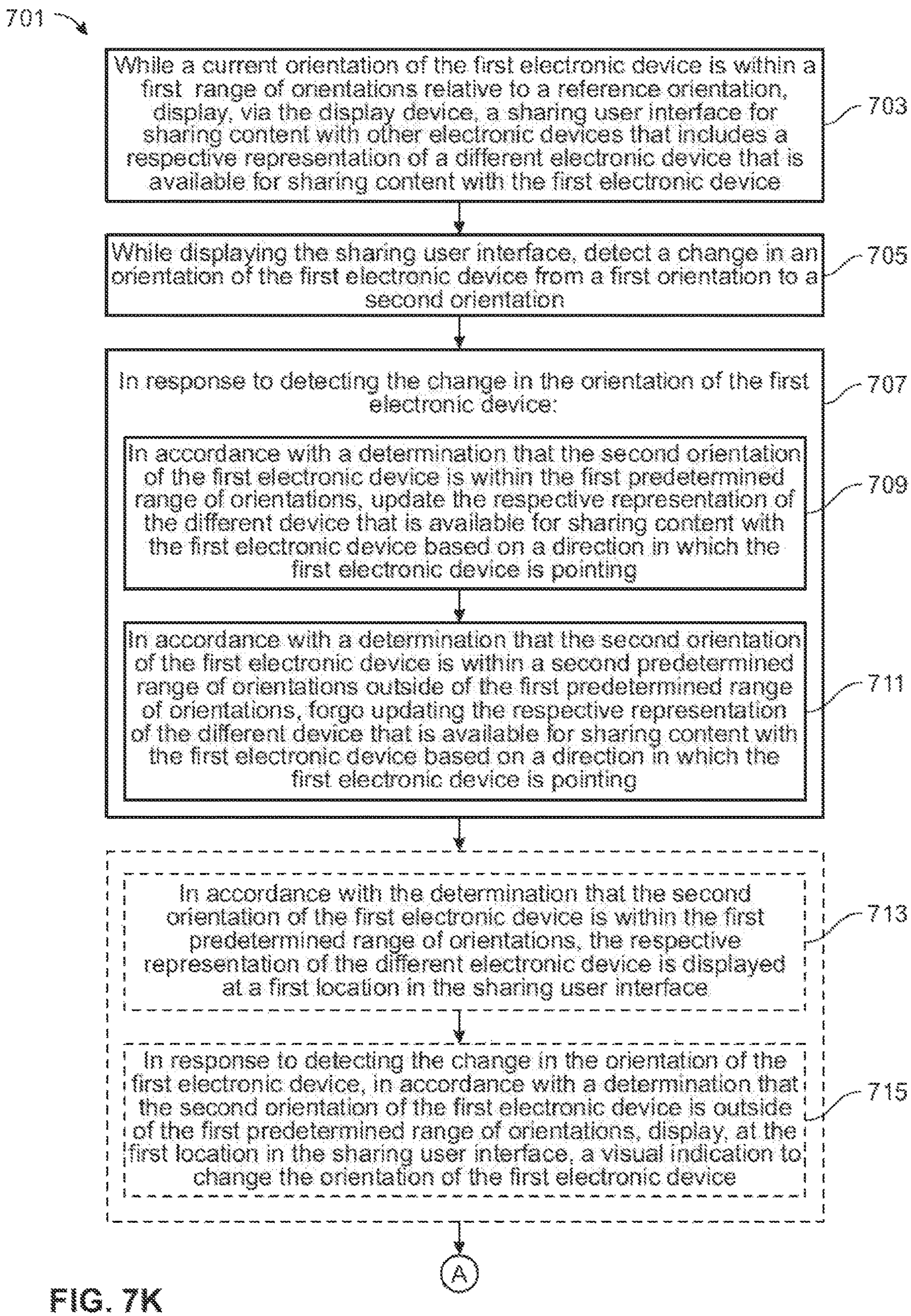
Figure 7M:
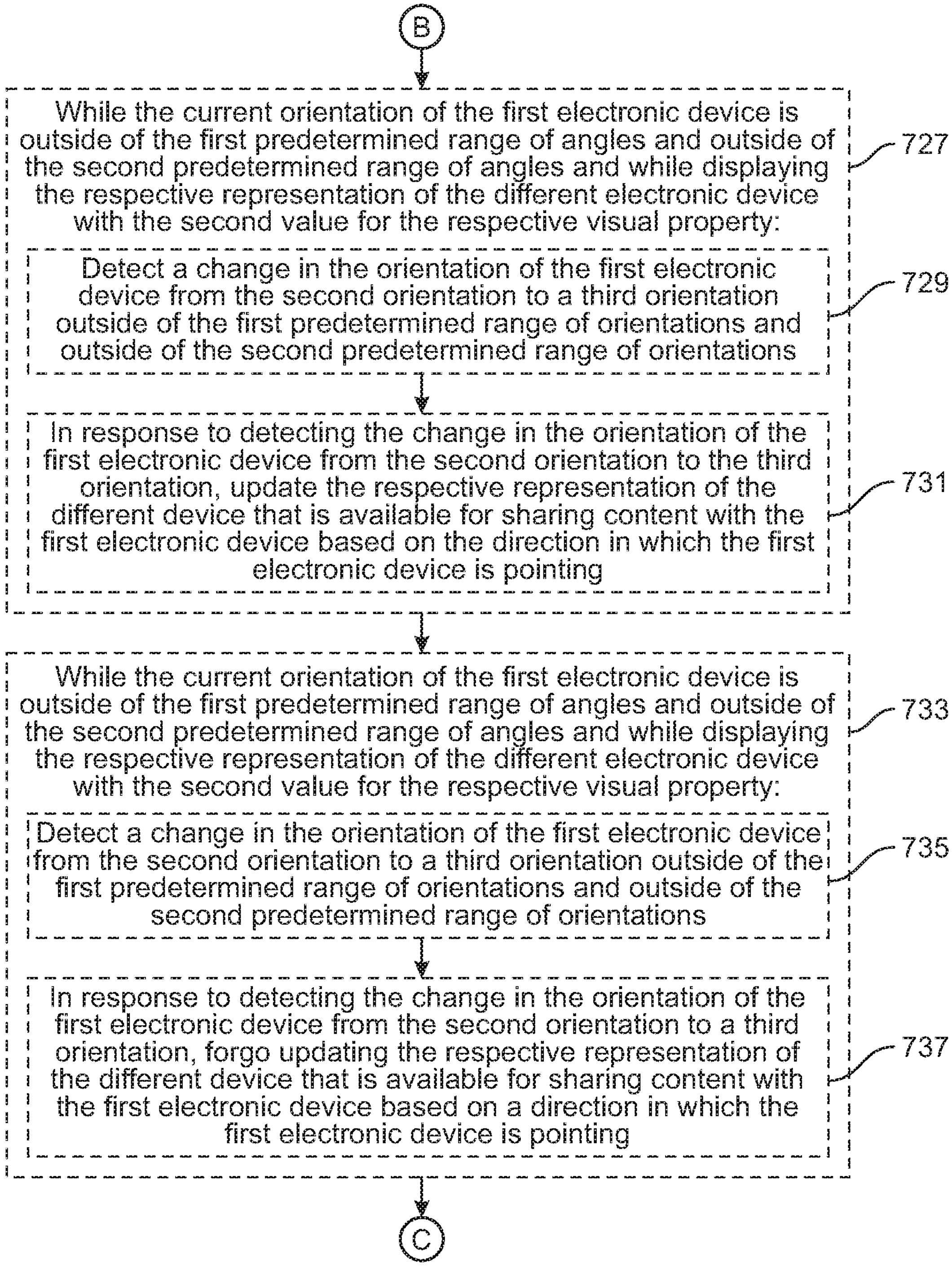
Figure 7N:
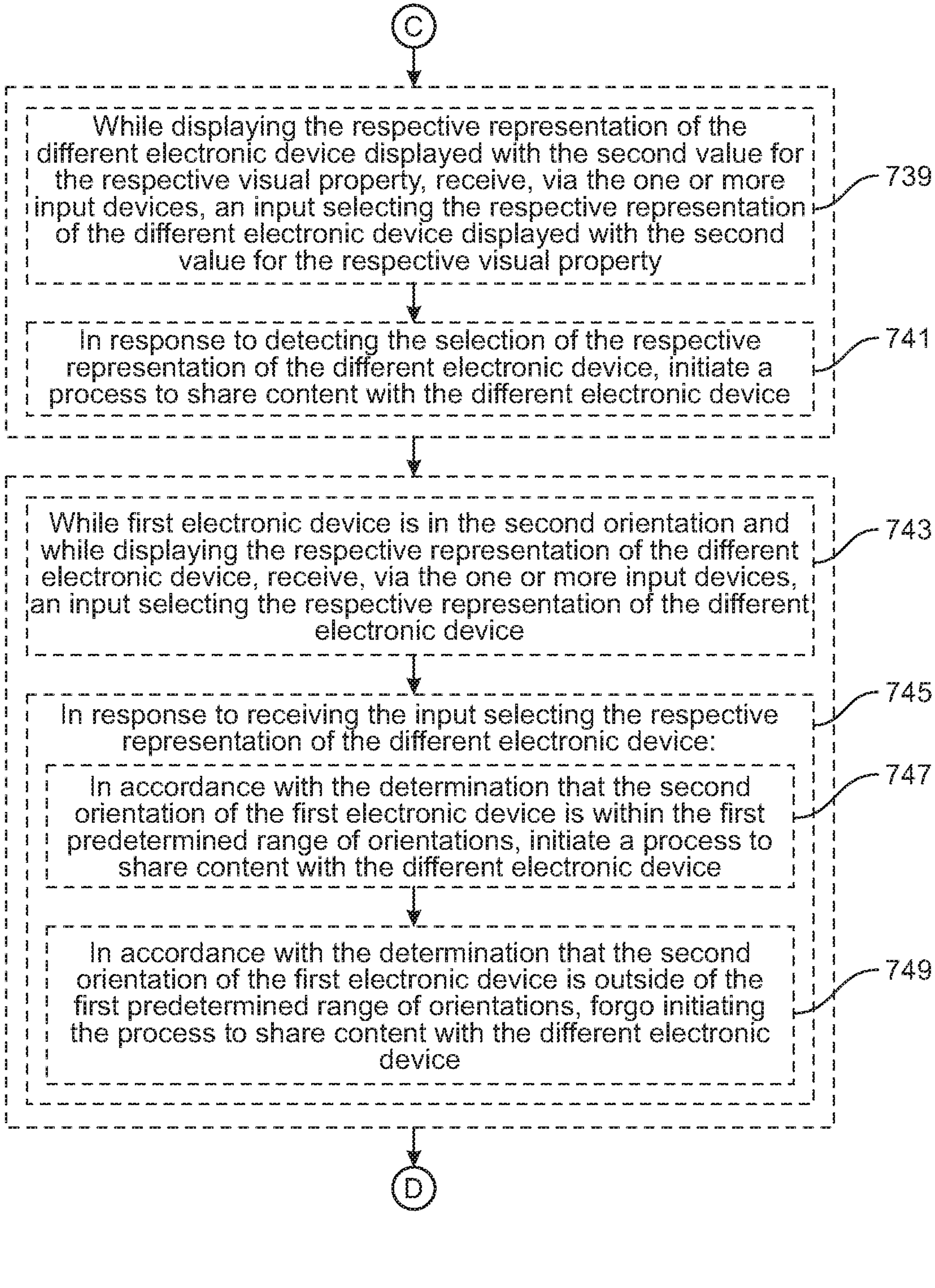
Figure 7O:
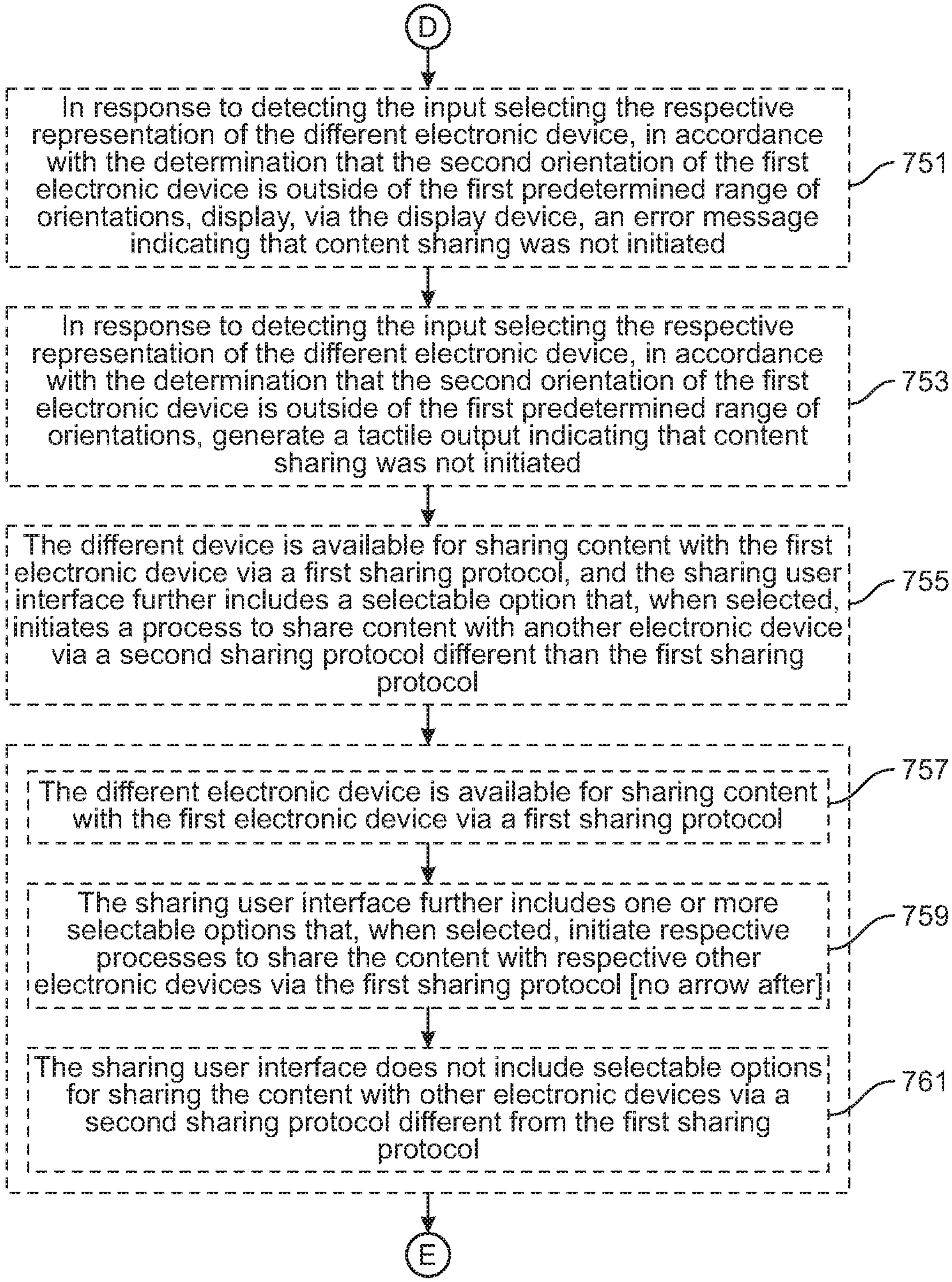
Figure 7P:
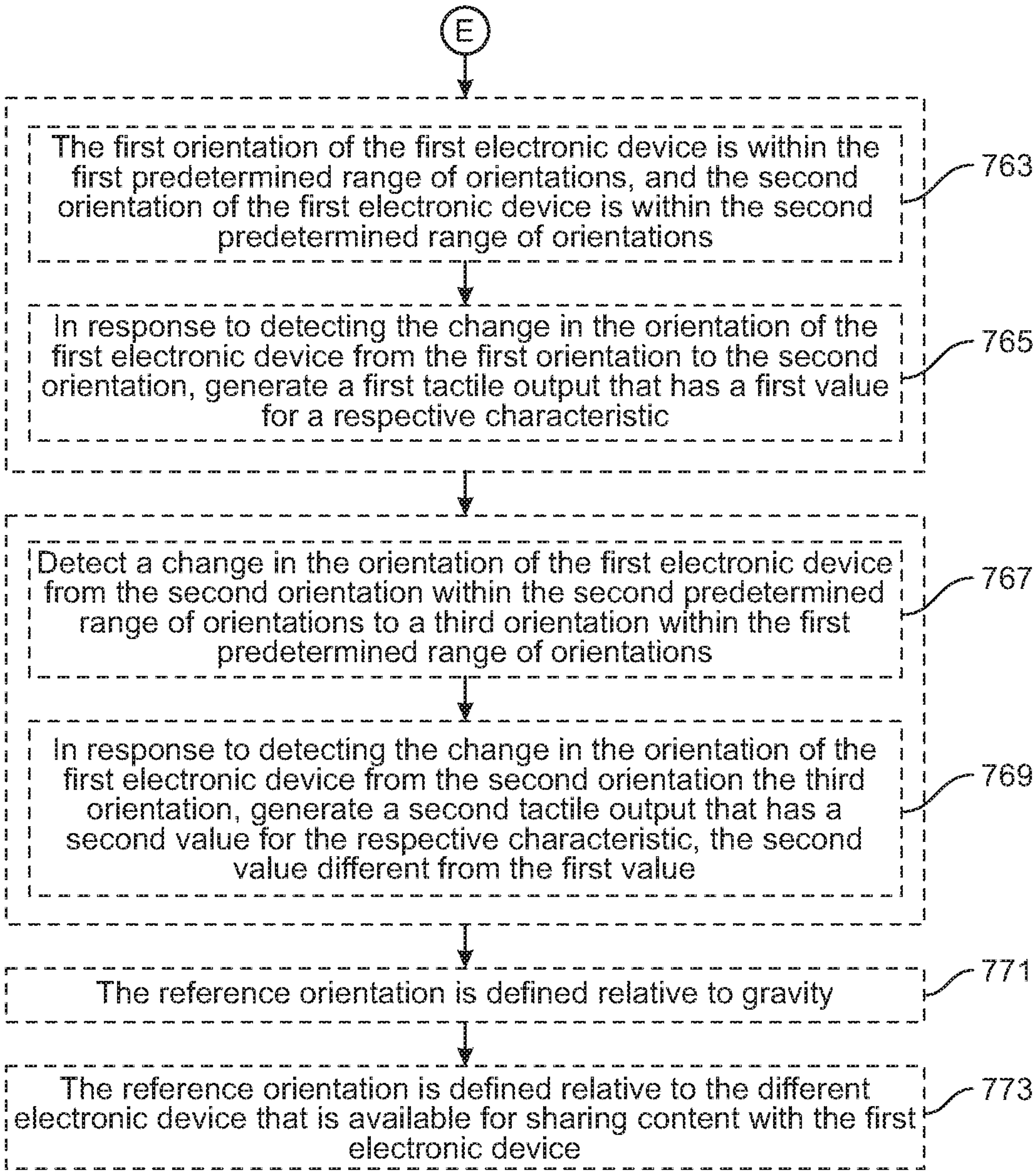

In some embodiments, the selectable sharing option 634 updates to indicate the electronic device 610 towards which electronic device 500 is pointing even when the angle θ between electronic device 500 and the reference plane 640*a* is less than reference angle r, as shown in FIGS. 6Z-6BB. In FIG. 6Z, the electronic device 500 is pointing towards electronic device 610*b* and is at an angle θ that is less than the reference angle r relative to reference plane 640*a*. Because the electronic device 500 is pointing towards electronic device 610*b*, the selectable sharing option 634 includes an indication of electronic device 610*b*.

In FIG. 6AA, the electronic device 500 rotates to point towards electronic device 610*a* while remaining at an angle θ relative to the reference plane 640*a* that is less than the reference angle r. In response to detecting that the electronic device 500 is pointing towards electronic device 610*a*, the electronic device 500 updates the selectable sharing option 634 to include an indication of electronic device 610*a*. The electronic device 500 also updates the display of the representations 636 of the other electronic devices available for sharing in accordance with the movement of electronic device 500 relative to the other electronic devices available for sharing. As shown in FIG. 6AA, the user selects (e.g., with contact 603) the selectable sharing option 634.

As shown in FIG. 6BB, in response to the user's selection in FIG. 6AA, the electronic device 500 initiates a process to share the content with electronic device 610*a*. While sharing the content with electronic device 610*a*, the electronic device 500 displays an indication 648 that sharing is in progress.

FIGS. 6CC-6KK illustrate ways in which the electronic device 500 displays a selectable sharing option 616*a* with a tilted appearance in response to detecting that an angle θ between the electronic device and a reference plane 640*a* or 640*b* is less than a reference angle r while displaying a sharing user interface. The sharing user interface includes a plurality of selectable options 616 and 618 for sharing content using a variety of sharing protocols. The sharing user interface illustrated in FIGS. 6CC-6KK is similar to the sharing user interface described above with reference to FIGS. 6A-6S.

FIGS. 6CC-6DD illustrate ways in which the electronic device 500 increases the visual tilt of sharing option 616*a* as the angle θ between the electronic device 500 and reference plane 640*a* decreases (and gets further away from the magnitude of reference angle r). The relationship of the visual tilt of sharing option 616*a* and the angle θ between the electronic device 500 and reference plane 640*a* optionally applies similarly to sharing option 634 shown in FIGS. 6T-6BB. Further, the various outcomes of rotating device 500 and/or selecting sharing option 634 shown in FIGS. 6T-6BB optionally apply similar to sharing option 616*a* in FIGS. 6CC-6KK.

FIG. 6CC illustrates the sharing user interface while the angle θ between the electronic device 500 and the reference plane 640*a* is less than reference angle r. While the electronic device 500 is pointed towards electronic device 610*a*, the sharing option 616*a* includes an indication of electronic device 610*a*. Because θ is less than r, the sharing option 616*a* is displayed with a visual tilt effect. While displaying the selectable sharing option 616*a* with the visual tilt effect, the electronic device 500 continues to update the locations of indications 620 of other electronic devices available for sharing in accordance with changes in the orientation of the electronic device 500 relative to the other electronic devices 610.

As shown in FIG. 6DD, as the angle θ between the electronic device 500 and reference plane 640*a* decreases (while remaining less than r), the visual tilt of sharing option 616*a* increases (e.g., as if the top of sharing option 616*a* continues to move further down into the plane of touch screen 504, and as if the bottom of sharing option 616*a* continues to move further out of the plane of touch screen 504). For instance, the height of sharing option 616*a* illustrated in FIG. 6DD is shorter than the height of sharing option 616*a* illustrated in FIG. 6CC because θ is smaller in FIG. 6DD than the magnitude of θ in FIG. 6CC.

FIG. 6EE illustrates the sharing user interface when the electronic device 500 is parallel to the reference plane 640*a* (or more generally less than an angle α relative to reference plane 640*a*, including potentially negative relative to reference plane 640*a*). In response to detecting that the electronic device 500 is parallel to the reference plane 640*a*, the electronic device 500 ceases displaying the sharing option 616*a* and displays an indication 650 instructing the user to tilt the electronic device 500 and presents a tactile output 646 (e.g., such as one of the tactile outputs described above with reference to FIGS. 5I-5N). Indication 650 is displayed at the same location in the user interface at which sharing option 616*a* had been displayed.

As shown in FIGS. 6FF-6GG, as the user tilts the electronic device 500 from being parallel to the reference plane 640*a* to an angle θ that is greater than reference angle r, the electronic device 500 presents the sharing option 616*a* with a visual tilt that decreases as θ increases while θ is still less than r, and then presents the sharing option 616*a* with no visual tilt once θ is equal to and/or greater than r (e.g., and remains with no visual tilt as θ increases while θ is greater than r).

In FIG. 6FF, the electronic device 500 displays the selectable sharing option 616*a* with a visually tilted appearance in response to detecting that the electronic device 500 is no longer parallel to the reference plane 640*a*, and that the angle θ between the electronic device 500 and the reference plane 640*a* is less than reference angle r. The sharing option 616*a* is displayed in the same location in the user interface at which indication 650 had been displayed.

As shown in FIG. 6GG, as the angle θ between the electronic device 500 and the reference plane 640*a* increases while remaining less than the reference angle r, the electronic device 500 displays the sharing option with a visual tilt that appears less tilted than the visual tilt with which the selectable sharing option 616*a* had been displayed when θ was smaller (e.g., while the orientation of device 500 is less than reference angle r relative to reference plane 640*a*, as the orientation of device 500 gets further away from the reference plane 640*a*, sharing option 616*a* is displayed with less and less of a visually tilted appearance, and as the orientation of device gets closer to the reference plane 640*a*, sharing option 616*a* is displayed with more and more of a visually tilted appearance). For instance, θ is smaller in FIG. 6FF than in FIG. 6GG and the visual tilt with which the selectable sharing option 616*a* is displayed is greater in FIG. 6FF than in FIG. 6GG. Thus, in some embodiments, the amount of change in the tilt of sharing option 616*a* changes by an amount that is proportional to the amount of change of the orientation of the device 500, and also the direction of change of the tilt of sharing option 616*a* changes as the direction of change of the orientation of the device 500 changes.

In FIG. 6HH, the electronic device 500 returns to an angle θ that is greater than the reference angle r after being parallel to the reference plane 640*a* (e.g., as shown in FIG. 6EE). In response to detecting that the electronic device 500 returned to an angle θ that is greater than the reference angle r after being parallel to the reference plane 640*a*, the electronic device 500 generates a tactile output 652 (e.g., such as one of the tactile outputs described above with reference to FIGS. 5I-5N). Tactile output 652 displayed in FIG. 6HH and generated in response to detecting that the electronic device 500 has returned to an angle θ greater than the reference angle r has one or more characteristics that are different from one or more characteristics of tactile output 656 generated in response to detecting that the electronic device 500 is parallel to the reference plane 640*a* described above with reference to FIG. 6EE. For example, tactile output 656 is optionally an “error” tactile output, such as three tactile pulses that indicate to the user that an error has occurred (e.g., the “error” tactile output is also generated at the electronic device 500 in response to detecting other errors) and tactile output 652 is a “notification” tactile output, such as a single pulse that indicates a notification event to the user (e.g., the “notification” tactile output is also generated at the electronic device 500 in response to detecting a non-error event at the electronic device, such as a notification).

As shown in FIG. 6HH, in response to detecting that the angle θ between the electronic device 500 and the reference plane 640*a* is greater than the reference angle r, the selectable sharing option 616*a* is displayed with a flat visual appearance. Displaying the selectable sharing option 616*a* with the flat visual appearance includes displaying the option 616*a* with a circular shape.

FIGS. 6II-6KK illustrate ways the electronic device 500 modifies the appearance of a selectable sharing option 616*a* based on the orientation of the electronic device 500 relative to a reference plane 640*b* that is defined relative to another electronic device 610 with which the electronic device 500 is able to share content. The various sharing, visual tilt, etc. characteristics described with reference to FIGS. 6T-6HH optionally analogously apply to FIGS. 6II-6KK.

In FIG. 6II, the electronic device 500 is at an angle θ relative to reference plane 640*b* that is greater than reference angle r. The reference plane 640*b* is a plane between the electronic device 500 and electronic device 610*c* with which the electronic device 500 will share content in response to detecting selection of the selectable sharing option 616*a*. Electronic device 610*c* is optionally selected for sharing because the electronic device 500 is pointing towards electronic device 610*c*.

In FIG. 6JJ, the electronic device 500 rotates to be pointing towards electronic device 610*a*. In response to detecting the change in the orientation of the electronic device 500 from pointing towards electronic device 610*c* to pointing towards electronic device 610*a*, the electronic device 500 updates the selectable sharing option 616*a* to include an indication of electronic device 610*a*. Additionally, the reference plane 640*b* is now relative to electronic device 610*a* instead of being defined relative to electronic device 610*c*. In FIG. 6JJ, the angle θ between electronic device 500 and the reference plane 640*b* is greater than reference angle r, so the selectable sharing option 616*a* is displayed with a visually flat (e.g., non-tilted) appearance.

In FIG. 6KK, the electronic device 500 changes orientation such that the angle θ between the electronic device 500 and the reference plane 640*b* is less than reference angle r. In response to detecting that the angle θ is less than the reference angle r, the electronic device 500 displays the sharing option 616*a* with a visually tilted appearance, such as described previously with reference to FIGS. 6T-6HH.

FIGS. 7A-7J are flow diagrams illustrating a method of presenting an option that is selectable to share content with a second electronic device selected which the first electronic device is oriented in accordance with some embodiments of the disclosure. The method 700 is optionally performed at an electronic device such as device 100, device 300, device 500 as described above with reference to FIGS. 1A-1B, 2-3, 4A-4B and 5A-5H. Some operations in method 700 are, optionally combined and/or order of some operations is, optionally, changed.

In some embodiments, such as in FIG. 6C, a first electronic device 500 in communication with a display device 504 and one or more input devices (e.g., a mobile device (e.g., a tablet, a smartphone, a media player, or a wearable device) including a touch screen or a computer including one or more of a keyboard, mouse, trackpad, and display/touch screen) displays (702), via the display, a sharing user interface that includes a plurality of selectable content sharing options 616*a-d* and 618*a-e* for sharing content with other devices, including a first content sharing option 618*a*, wherein the first content sharing option displayed at a first location in the sharing user interface is selectable to initiate a process to share content with a second electronic device 610*c*. Optionally the plurality of representations of content sharing options are presented in a sharing user interface element that is presented in response to detecting a user input for initiating a process to share the content with another electronic device. The sharing user interface element optionally includes selectable options related to sharing the content from an application in which the user input for initiating the process to share the content was received. In some embodiments, in response to detecting selection of one of the representations, the electronic device initiates a process to share the content using the sharing method represented by the selected sharing option. The sharing options optionally include text message, enhanced data-based message, e-mail, social media, hyperlink, and a short-range wireless sharing protocol (e.g., sharing that operates over Wi-Fi or Bluetooth, etc.). The first option is optionally the wireless network sharing protocol option.

In some embodiments, such as in FIG. 6F, while displaying the plurality of content sharing options 616*a-d* and 618*a-e* and the first content sharing option 616*a* that is selectable to initiate the process to share content with the second electronic device 610*c*, the electronic device 500 detects (704) a change in an orientation of the first electronic device 500 from a first orientation to a second orientation (e.g., rotational or translational movement of the electronic device). For example, the top edge of the electronic device initially points in a first direction and moves to point in a second direction.

In some embodiments, such as in FIG. 6E, in response to detecting the change in the orientation of the first electronic device 500 (706), in accordance with a determination that the second orientation satisfies one or more sharing criteria associated with the second electronic device 610*c*, the first content sharing option 616*a* remains selectable to initiate the process to share content with the second electronic device 610*c* using the first content sharing option (708). In some embodiments, the one or more sharing criteria include criteria that are satisfied when the first electronic device and second electronic device are in communication with one another (e.g., via the wireless network sharing protocol), the orientation of the first electronic device corresponds to the second electronic device, and/or the first electronic device determines that the user of the first electronic device is likely to select the second electronic device as the sharing destination based on previous sharing behavior with the second electronic device. For example, the top edge of the first electronic device points towards the second electronic device (e.g., within a range of angles, such as 10 degrees or 20 degrees, of the direction of the second electronic device) or the first electronic device frequently shares content of the same type as the content to be shared with the second electronic device.).

In some embodiments, such as in FIG. 6J, in response to detecting the change in the orientation of the first electronic device 500 (706), in accordance with a determination that the second orientation satisfies one or more sharing criteria associated with a third electronic device 610*d*, the sharing user interface includes a content sharing option 616*a* displayed at the first location in the sharing user interface that is selectable to initiate a process to share content with the third electronic device, 610*d* and not initiate the process to share content with the second electronic device 610*c* (710). Optionally, the orientation of the first electronic device changes from a top edge of the first electronic device being oriented towards the second electronic device to the top edge of the first electronic device being oriented towards the third electronic device (e.g., within a range of angles, such as 10 degrees or 20 degrees, of the direction of the third electronic device). In such a scenario, the sharing option displayed at the first location in the sharing user interface optionally becomes selectable to initiate sharing with the third electronic device rather than the second electronic device (e.g., because the first electronic device is no longer pointing towards the second electronic device).

The above-described manner of selecting between the second and third electronic devices as the recipient of the shared content based on the final orientation of the electronic device allows the first electronic device to change which electronic device will receive a shared item of content based on the orientation of the first electronic device which simplifies the interaction between the user and the electronic device and enhances the operability of the electronic device and makes the user-device interface more efficient (e.g., by changing which electronic device will receive the shared content based on orientation rather than requiring the user to navigate a visual user interface to select the electronic device to receive the content), which additionally reduces power usage and improves battery life of the electronic device by enabling the user to use the electronic device more quickly and efficiently.

In some embodiments, such as in FIG. 6J, in response to detecting the change in the orientation of the first electronic device 500 (712), in accordance with the determination that the second orientation satisfies the one or more sharing criteria associated with the third electronic device 610*d* (e.g., selecting the first content sharing option will cause the first electronic device to share content with the third electronic device because the first electronic device is oriented towards the third electronic device for longer than a time threshold), the electronic device 500 updates (714) an appearance of the first content sharing option 616*a* to change from an appearance corresponding to the second electronic device 610*c* to an appearance corresponding to the third electronic device 610*d*. In some embodiments, while the first content sharing option is associated with the second electronic device, the first content sharing option includes an image associated with the second electronic device and when the first content sharing option becomes associated with the third electronic device, the first content sharing option is updated to include an image associated with the third electronic device instead of the image associated with the second electronic device. For example, the image associated with a respective electronic device is an image included in a contact card stored on the first electronic device that also includes information for contacting the respective electronic device and/or a user account associated with the respective electronic device (e.g., phone number, e-mail address, social media account, etc.).

The above-described manner of updating the appearance of the first content sharing option to correspond to the electronic device associated with the first sharing option allows the first electronic device to indicate to the user which electronic device content will be shared with in response to selection of the first sharing option which simplifies the interaction between the user and the electronic device and enhances the operability of the electronic device and makes the user-device interface more efficient (e.g., by reducing the number of inputs needed to determine which electronic device is associated with the first sharing option), which additionally reduces power usage and improves battery life of the electronic device by enabling the user to use the electronic device more quickly and efficiently.

In some embodiments, such as in FIG. 6J in response to detecting the change in the orientation of the first electronic device 500 (716), in accordance with the determination that the second orientation satisfies the one or more sharing criteria associated with the third electronic device 610*d*, the electronic device 500 replaces (718) the first content sharing option 616*a* with the content sharing option 616*a* that is selectable to initiate the process to share content with the third electronic device 610*d* (e.g., the electronic device ceases displaying the first content sharing option associated with the second electronic device and displays the content sharing option that is selectable to initiate the process to share content with the third electronic device at the first location in the user interface).

The above-described manner of replacing the first content sharing option with the content sharing option that is selectable to initiate the process to share content with the third electronic device allows the first electronic device to conserve display area for other content, such as other sharing options, which simplifies the interaction between the user and the electronic device and enhances the operability of the electronic device and makes the user-device interface more efficient (e.g., by enabling the user to continue to view the other content (e.g., other sharing options) without having to scroll or pan the user interface), which additionally reduces power usage and improves battery life of the electronic device by enabling the user to use the electronic device more quickly and efficiently.

In some embodiments, such as in FIG. 6D, while the orientation of the first electronic device 500 is changing, the first electronic device 500 displays (720), with the first content sharing option 616*a* (e.g., within the first content sharing option, adjacent to the first content sharing option, surrounding the first content sharing option, etc.), one or more visual indications 620*a*, 620*c*, and 620*d* of one or more other electronic devices 610*a* and 610*d*, including the second electronic device 610*c* (e.g., within the first option 616*a*), that are within a threshold distance (e.g., 6 feet, 10 feet, 20 feet, or a distance defined by the range of a wireless communication protocol between the first electronic device and the other devices) of the first electronic device 500. In some embodiments, the visual indications of the one or more other electronic devices are presented at locations relative to the first sharing option that reflect the locations of the one or more other electronic devices relative to the first electronic device. For example, the first sharing option is an icon and the visual indications of the other electronic devices are dots located around the first sharing option at orientations corresponding to the orientations of each respective other electronic device relative to a reference orientation on the first electronic device. For example, if the third electronic device is to the right of the direction that the top edge of the first electronic device is oriented towards, the first electronic device presents a dot to the right of the first sharing option that represents the third electronic device.

The above-described manner of presenting visual indications of the one or more other electronic devices allows the first electronic device to indicate to the user the locations of the electronic devices the first electronic device is able to detect to share content with which simplifies the interaction between the user and the electronic device and enhances the operability of the electronic device and makes the user-device interface more efficient (e.g., by reducing the amount of time it takes the user to position the first electronic device to cause the first sharing option to be updated to be selectable to share content with a desired other electronic device), which additionally reduces power usage and improves battery life of the electronic device by enabling the user to use the electronic device more quickly and efficiently.

In some embodiments, such as in FIG. 6C, while the orientation of the first electronic device 500 is not changing (e.g., the first electronic device is not moving), the first electronic device 500 ceases (722) to display the one or more visual indications 620 of the one or more other electronic devices 610. Optionally, in response to detecting a change in orientation of the first electronic device, the first electronic device presents the one or more visual indications of the one or more other electronic devices.

The above-described manner of ceasing to display the one or more visual indications of the one or more other electronic devices when the orientation of the first electronic device is not changing allows the first electronic device to forgo determining where to display the one or more indications when the electronic device's orientation is not changing which reduces power usage and improves battery life of the electronic device by reducing the number of operations the electronic device needs to perform.

In some embodiments, such as in FIG. 6D, the one or more visual indications 620*a*, 620*c*, and 620*d* of the one or more other electronic devices 610*a* and 610*d* comprises a user interface element at least partially surrounding the first content sharing option 616*a* (724). In some embodiments, the one or more visual indications of the one or more other electronic devices are located in a ring around the first content sharing option. For example, the first content sharing option is a circular icon and the one or more visual indications of the one or more other electronic devices are dots positioned around the icon at positions on a ring corresponding to the location of each respective other electronic device relative to the first electronic device.

The above-described manner of presenting the one or more visual indications of the one or more other electronic devices in a ring surrounding the first content sharing options allows the first electronic device to present the visual indications at locations around the first content sharing option that correspond to the positions of the other electronic devices relative to the first electronic device which simplifies the interaction between the user and the electronic device and enhances the operability of the electronic device and makes the user-device interface more efficient (e.g., by enabling the user to more quickly identify how to move the first electronic device to orient the first electronic device towards a respective other electronic device), which additionally reduces power usage and improves battery life of the electronic device by enabling the user to use the electronic device more quickly and efficiently.

In some embodiments, such as in FIG. 6D, the user interface element at least partially surrounding the first content sharing option 616*a* includes one or more respective indications 620*a* and 620*d* of the one or more other electronic devices 610*a* and 610*d* that are displayed on the user interface element at least partially surrounding the first content sharing option 616*a* (726). Optionally, the electronic device presents a ring surrounding the first content sharing option that includes a dot or other visual indication at the respective locations of the one or more other electronic devices relative to the first electronic device. In some embodiments, the position of the dots indicates the angle of the one or more other devices relative to a central axis of the first electronic device but do not indicate the distance between each of the one or more electronic devices from the first electronic device.

The above-described manner of presenting the one or more visual indications of the one or more other electronic devices in an arrangement surrounding the first content sharing options allows the first electronic device to present the visual indications at locations around the first content sharing option that correspond to the positions of the other electronic devices relative to the first electronic device which simplifies the interaction between the user and the electronic device and enhances the operability of the electronic device and makes the user-device interface more efficient (e.g., by enabling the user to more quickly identify how to move the first electronic device to orient the first electronic device towards a respective other electronic device), which additionally reduces power usage and improves battery life of the electronic device by enabling the user to use the electronic device more quickly and efficiently.

In some embodiments, such as in FIG. 6D, the one or more other electronic devices 610*a* and 610*d* are devices associated with users or user accounts that have a predetermined relationship to the user or user account associated with the first electronic device 500 (e.g., the first electronic device has the other electronic device or a user account associated with the other electronic device stored as a contact, the first electronic device has the other electronic device stored in a list of electronic devices with which sharing is possible, the first electronic device has shared content with the other electronic device previously, etc.), and the user interface element at least partially surrounding the first content sharing option 616*a* does not include one or more respective indications of one or more other respective electronic devices 610*e* that are within the threshold distance of the first electronic device 500, but that are not known to the electronic device (728). In some embodiments, electronic devices that are not known to the first electronic device optionally include electronic devices that the first electronic device does not have stored as a contact (and does not have a user account associated with the other electronic device stored as a contact), electronic devices that the first electronic device does not have stored in a list of electronic devices with which sharing is possible, and/or electronic devices that the first electronic device has not shared content with previously. For example, the second electronic device and third electronic devices are known to the first electronic device and a fourth electronic device within the threshold distance of the first electronic device is not known to the first electronic device, so the first electronic device presents indications of the second and third electronic devices without presenting an indication of the fourth electronic device.

The above-described manner of only presenting indications of other electronic devices that are known to the first electronic device allows the first electronic device to enable the user to more quickly configure the first selectable option to share content with one of the other electronic devices selected by the user which simplifies the interaction between the user and the electronic device and enhances the operability of the electronic device and makes the user-device interface more efficient (e.g., by making it easier for the user to locate an electronic device they are likely to want to share with, as it is more likely the user wishes to share content with a known electronic device than an unknown electronic device), which additionally reduces power usage and improves battery life of the electronic device by enabling the user to use the electronic device more quickly and efficiently.

In some embodiments, such as in FIG. 6E, before detecting the change in the orientation of the first electronic device 500, the user interface element at least partially surrounding the first sharing option 616*a* includes an indication 620*d* of the third electronic device (730). Optionally, one of the dots around the first sharing option represents the third electronic device and is positioned at a position within the arrangement around the first sharing option that corresponds to the relative position of the third electronic device relative to the first electronic device.

In some embodiments, such as in FIG. 6I, in response to detecting the change in the orientation of the first electronic device 500 (732), in accordance with the determination that the second orientation satisfies one or more sharing criteria associated with the third electronic device 610*d* (e.g. the second orientation is the first electronic device positioned such that the first electronic device is facing the third electronic device (e.g., a top edge of the first electronic device is the closest edge of the first electronic device to the third electronic device)), the first electronic device 500 displays (734) an animation of the indication 620*d* of the third electronic device 610*d* changing into a visual representation of a user of the third electronic device 610*d*. In some embodiments, the dot in the arrangement around the first sharing option that represents the third electronic device expands in size to an image associated with the third electronic device (e.g., an image of a contact card stored on the first electronic device that includes contact information for one or more user accounts (e.g., phone number, email address, etc.) associated with the third electronic device and/or the third electronic device itself (e.g., information needed to share content with the third electronic device using the wireless network sharing protocol)). In some embodiments, the image that represents the third electronic device moves to the first location in the user interface and becomes the first sharing option. The first sharing option optionally becomes selectable to initiate a process to share content with the third electronic device using the wireless network sharing protocol. In some embodiments, the animation of the indication of the third electronic device changing into the visual representation of the user of the third electronic device is displayed after the orientation of the first electronic device remains in the second orientation for a predetermined amount of time (e.g., 1 second, 2 seconds, 5 seconds).

The above-described manner of displaying an animation of the indication of the third electronic device changing into a visual representation of the user of the third electronic device allows the first electronic device to indicate to the user which electronic device the first electronic device will share the content with in response to detecting selection of the first sharing option which simplifies the interaction between the user and the electronic device and enhances the operability of the electronic device and makes the user-device interface more efficient (e.g., by reducing the chance of user error of sharing the content with the wrong electronic device in response to detecting selection of the first sharing option), which additionally reduces power usage and improves battery life of the electronic device by enabling the user to use the electronic device more quickly and efficiently, such as by reducing the user inputs needed to correct an error.

In some embodiments, such as in FIG. 6E, before detecting the change in the orientation of the first electronic device, 500 the first sharing option 616*a* is displayed with a visual representation of the user of the second electronic device 610*c* (736). Optionally, an image included in a contact card stored on the first electronic device that includes contact information for one or more user accounts (e.g., phone number, email address) associated with the second electronic device and the information for sharing content with the second electronic device itself (e.g., via the wireless network sharing protocol). In some embodiments, the visual representation of the user of the second electronic device is displayed within the first sharing option.

In some embodiments, such as in FIG. 6I, in response to detecting the change in the orientation of the first electronic device 500 (738), in accordance with the determination that the second orientation satisfies one or more sharing criteria associated with the third electronic device 610*c* (e.g., including a criterion that is satisfied when the first electronic device remains in the second orientation for an amount of time that exceeds a predetermined threshold (e.g., 1 second, 2 seconds, 5 seconds, etc.)), the first electronic device 500 displays (740) an animation of the visual representation of the user of the second electronic device 610*c* changing into an indication 620*c* of the second electronic device 610*c* displayed on the user interface element at least partially surrounding the first sharing option 616*a*. Optionally, the indication of the second electronic device shrinks in size from the size of the indication to a dot in the arrangement around the first sharing option. The indication of the second electronic device displayed on the arrangement is optionally positioned on the arrangement at a position that corresponds to the position of the third electronic device relative to the first electronic device. In some embodiments, if the first electronic device does not change orientation, the first sharing option remains selectable to initiate a process to share the content with the second electronic device and continues to be presented with the image that represents the user of the second electronic device.

The above-described manner of displaying the animation of the visual representation of the user of the second electronic device changing into an indication of the second electronic device displayed on the arrangement allows the first electronic device to indicate to the user that the first sharing option is no longer selectable to initiate a process to share content with the second electronic device which simplifies the interaction between the user and the electronic device and enhances the operability of the electronic device and makes the user-device interface more efficient (e.g., by reducing user error of sharing content with the wrong electronic device in response to detecting selection of the first sharing option) which additionally reduces power usage and improves battery life of the electronic device by enabling the user to use the electronic device more quickly and efficiently.

In some embodiments, such as in FIGS. 6D-6E, the first electronic device 500 changes (742) positions of the one or more respective indications 620*a* and 620*d* of the one or more other electronic devices 610*a* and 610*d* that are displayed on the user interface element at least partially surrounding the first content sharing option 616*a* in accordance with changes in orientation between the first electronic device 500 and the one or more other electronic devices 610*a* and 610*d* such that the positions of the one or more respective indications 620*a* and 620*d* of the one or more other electronic devices 610*a* and 610*d* on the user interface element at least partially surrounding the first sharing option 616*a* correspond to the relative orientations of the one or more other electronic devices 610*a* and 610*d* with respect to the first electronic device 500. Optionally, the one or more respective indications of the one or more other electronic devices are displayed at respective positions within the arrangement that correspond to the respective location of each respective other electronic device relative to the first electronic device. For example, while a third electronic device is positioned to the left of the first electronic device, the first electronic device displays an indication of the third electronic device on the left side of the first sharing option. When the third electronic device changes position to be behind the first electronic device, the indication of the third electronic device is optionally moved to be positioned within the arrangement at the bottom edge of the first sharing option. Similarly, in some embodiments, when the first electronic device changes position, the representations of the one or more other electronic devices are moved to new positions in the arrangement around the first option that correspond to the updated positions of the other electronic devices relative to the first electronic device.

The above-described manner of moving one or more indications of one or more other electronic devices within the arrangement around the first sharing option in response to detecting a change in the position of one or more other electronic devices relative to the first electronic device allows the first electronic device to consistently present the indications of the other electronic devices at positions within the arrangement around the first sharing option that correspond to the positions of the other electronic devices relative to the first electronic device which simplifies the interaction between the user and the electronic device and enhances the operability of the electronic device and makes the user-device interface more efficient (e.g., by enabling the user to identify which representation corresponds to which other electronic device by seeing where the other electronic devices are located relative to the first electronic device), which additionally reduces power usage and improves battery life of the electronic device by enabling the user to use the electronic device more quickly and efficiently.

In some embodiments, such as in FIG. 6E, the one or more respective indications 620 of the one or more other electronic devices 610 include a respective indication of the second electronic device 610*c* and a respective indication of the third electronic device 610*d* (744). Optionally, the respective indication of the second electronic device is displayed at a location within the arrangement around the first sharing option that corresponds to the location of the second electronic device relative to the first electronic device and the respective indication of the third electronic device is displayed at a location within the arrangement around the first sharing option that corresponds to the location of the third electronic device relative to the first electronic device.

Figure 10A:
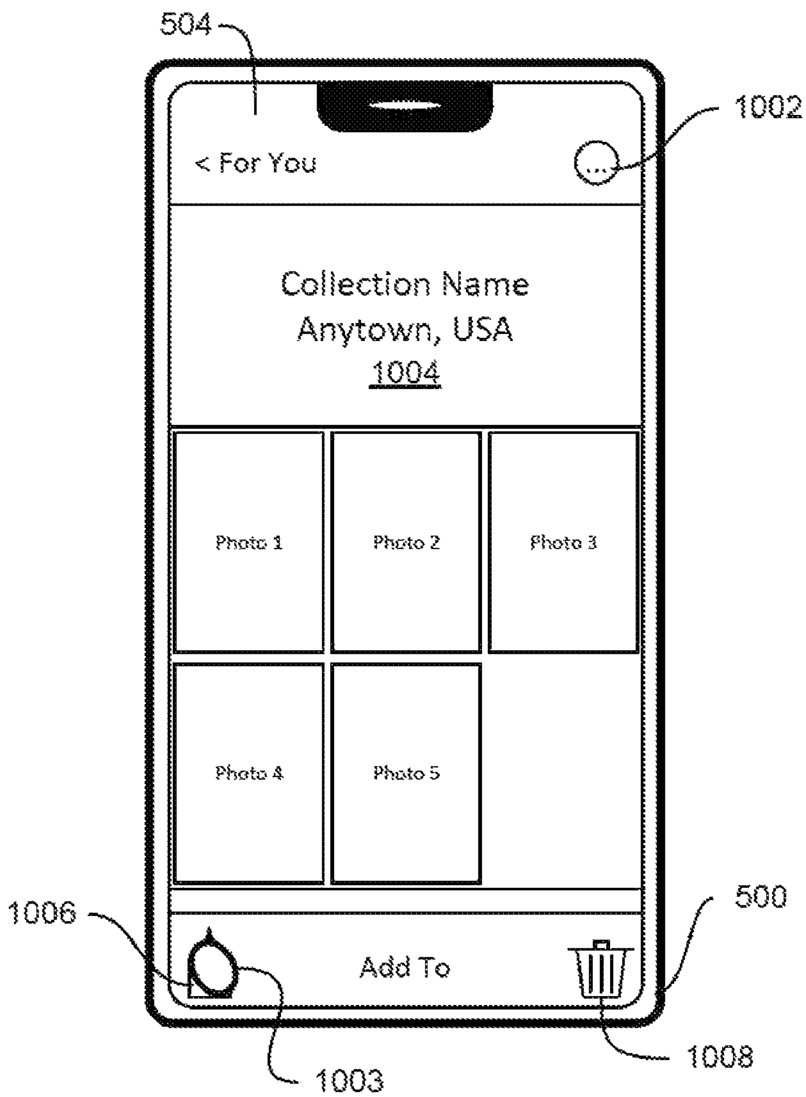
FIGS. 10A-10BB illustrate exemplary ways in which an electronic device presents one or more options for changing one or more settings associated with an item of content before sharing the content in accordance with some embodiments of the disclosure.
Figure 10B:
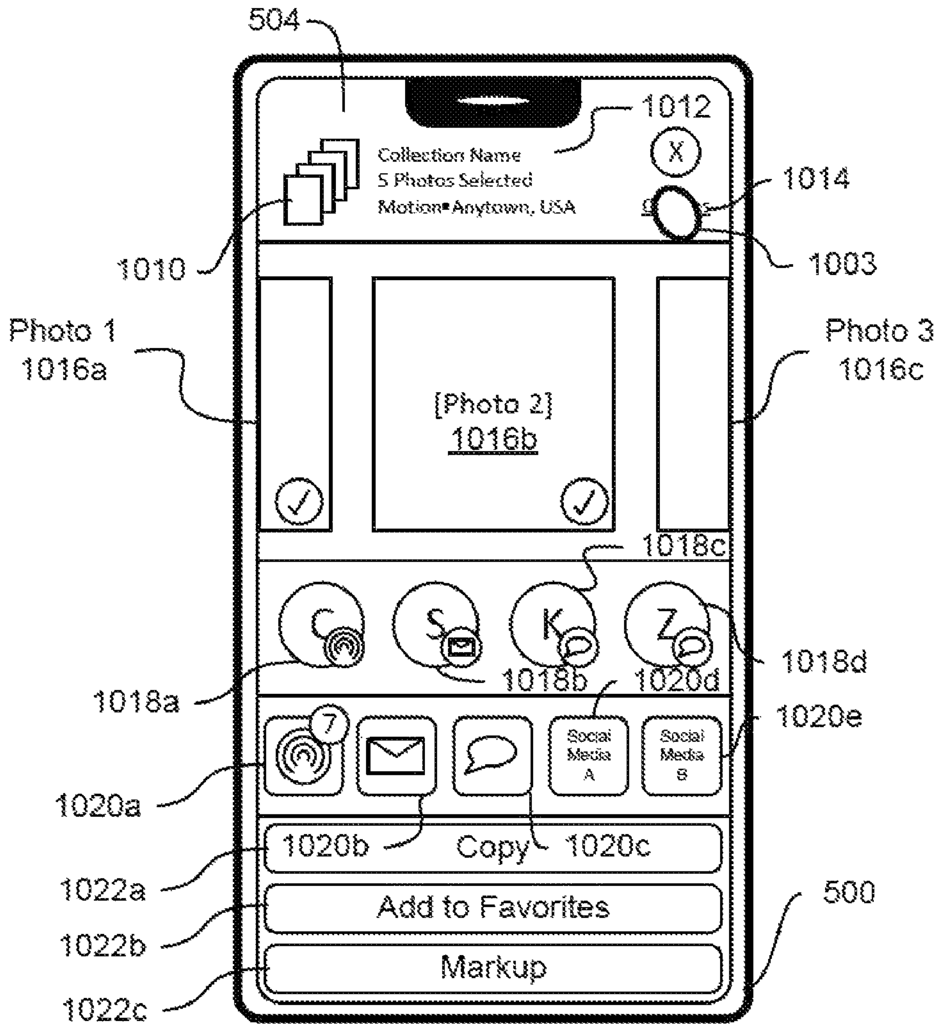
Figure 10C:
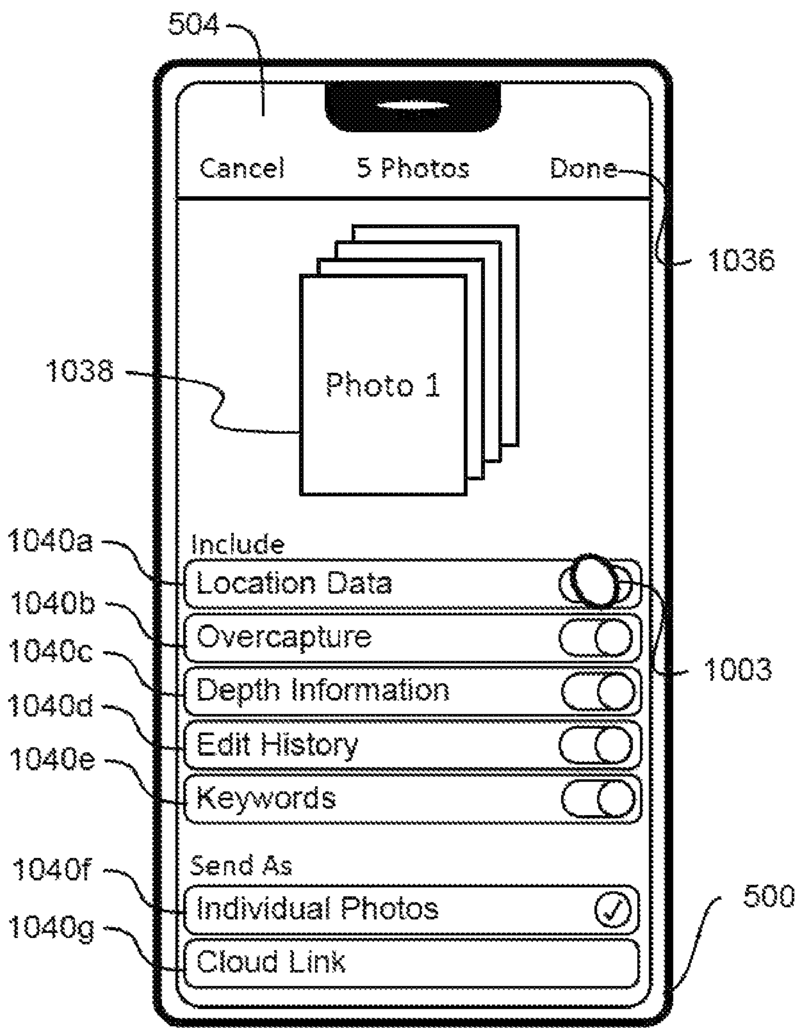
Figure 10D:
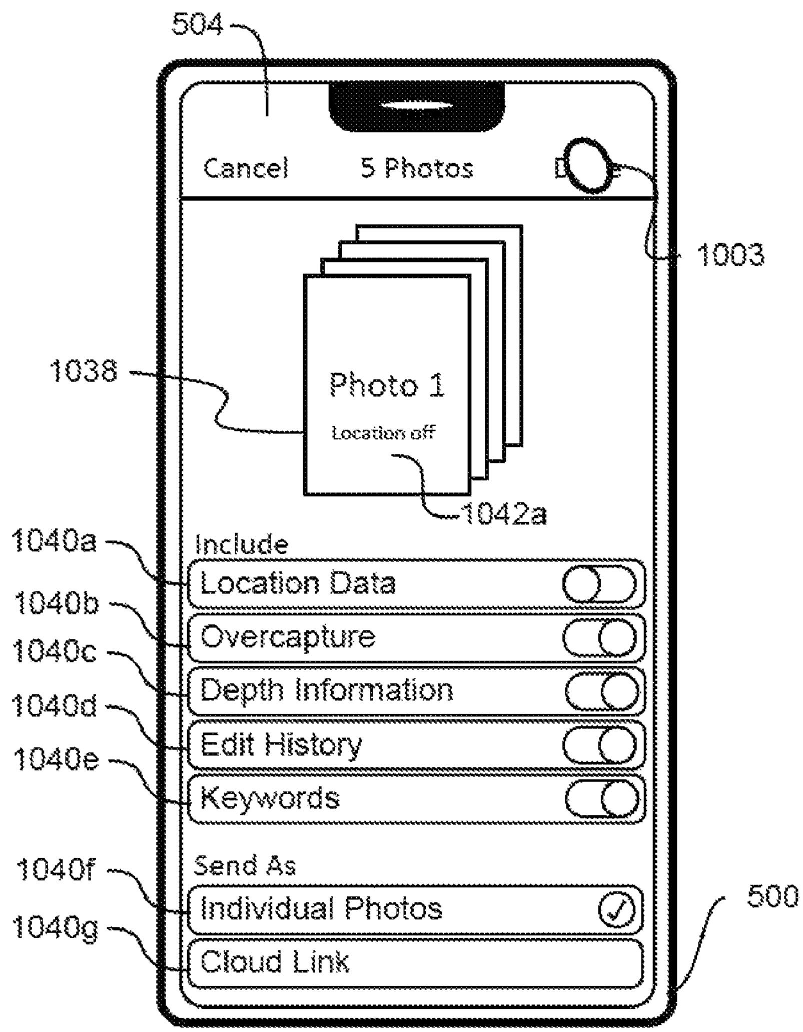
Figure 10E:
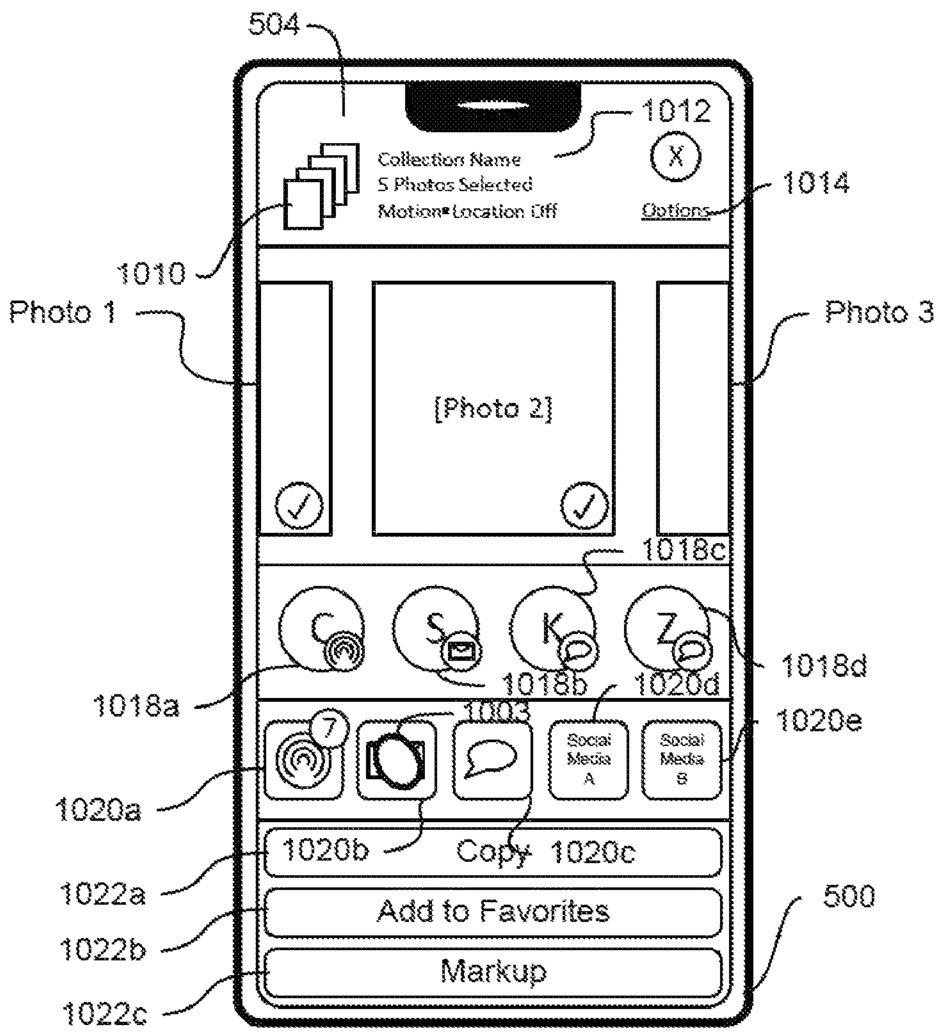

In some embodiments, such as in FIG. 10E, in accordance with a determination that the second electronic device 610*c* and the third electronic device 610*d* have a first difference in orientation with respect to the first electronic device 500 (e.g., the second electronic device and the third electronic device are separated from each other by a first angle relative to the first electronic device), the respective indication of the second electronic device 620*d* and the respective indication of the third electronic device 620*c* are separated by a first distance on the user interface element at least partially surrounding the first sharing option 616*a* (746). Optionally, the indications of the second and third electronic devices are separated from each other by the first angle relative to the first sharing option. For example, the second electronic device is to the right of the first electronic device and the third electronic device is behind the first electronic device, making the second and third electronic devices separated by an angle of about 90 degrees relative to the first electronic device. In this example, the indication of the second electronic device is displayed to the right of the first sharing option and the indication of the third electronic device is displayed beneath the first sharing option, making the second and third indications separated by an angle of about 90 degrees relative to the first sharing option.

Figure 10F:
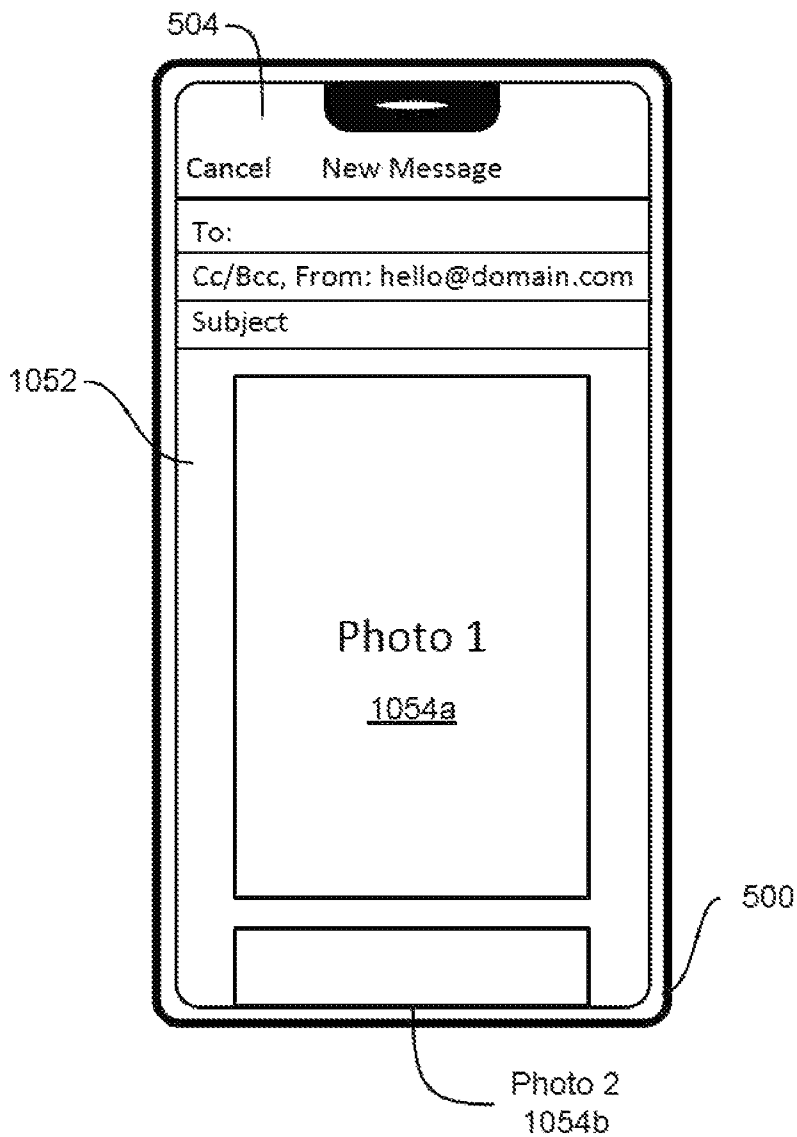
Figure 10G:
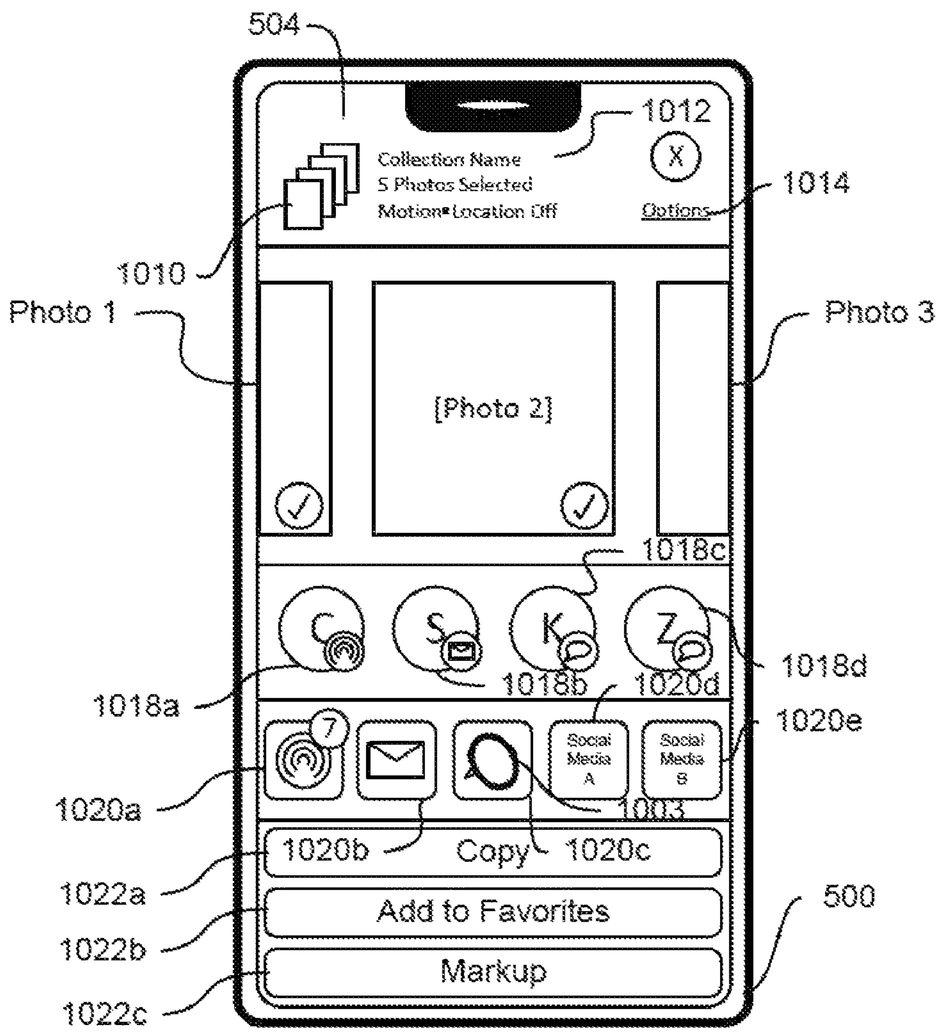
Figure 10H:
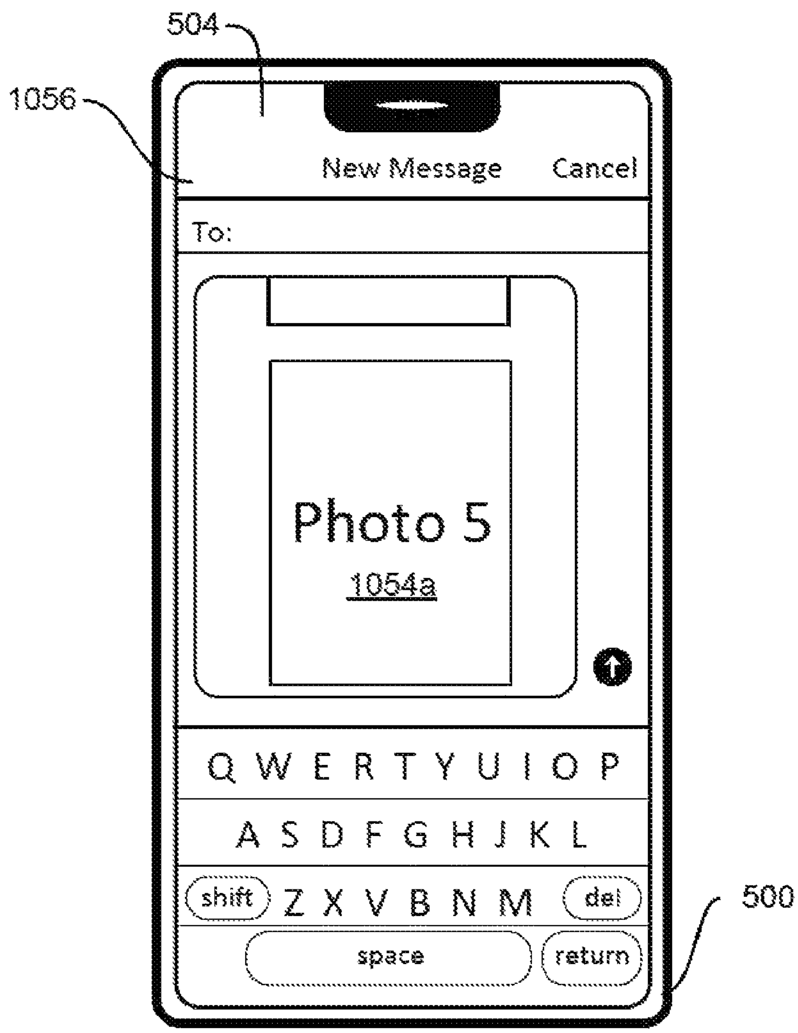
Figure 10I:
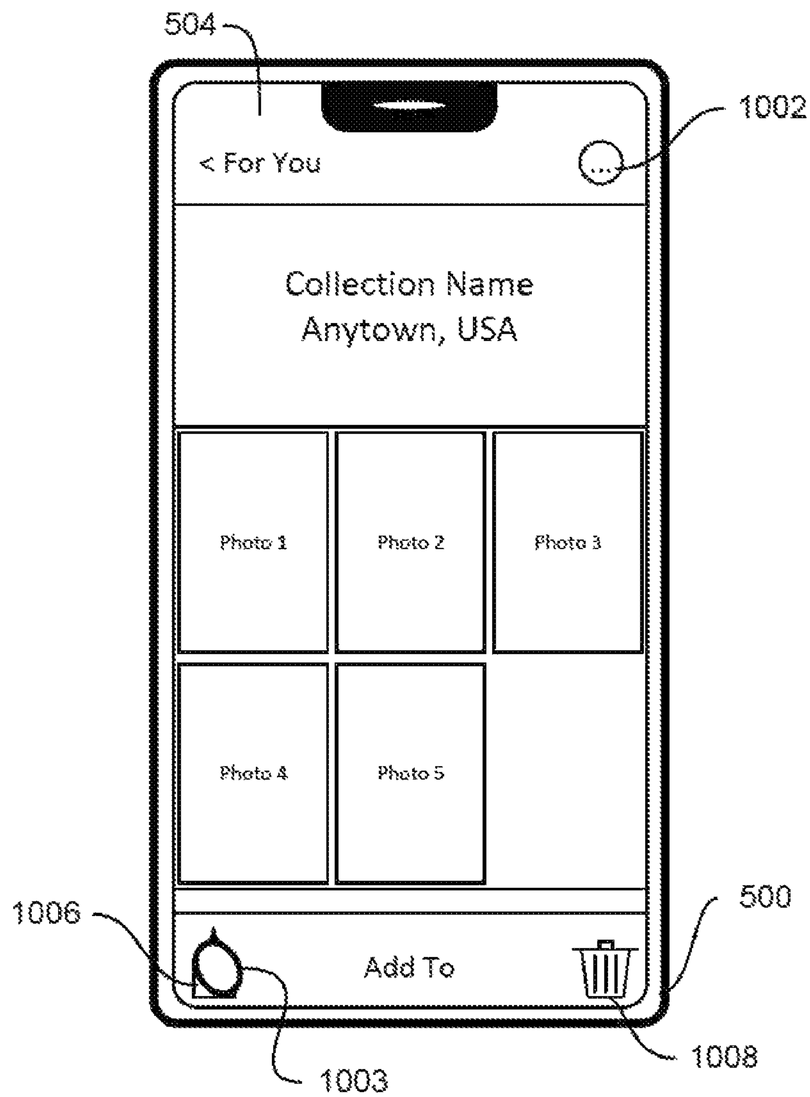
Figure 10J:
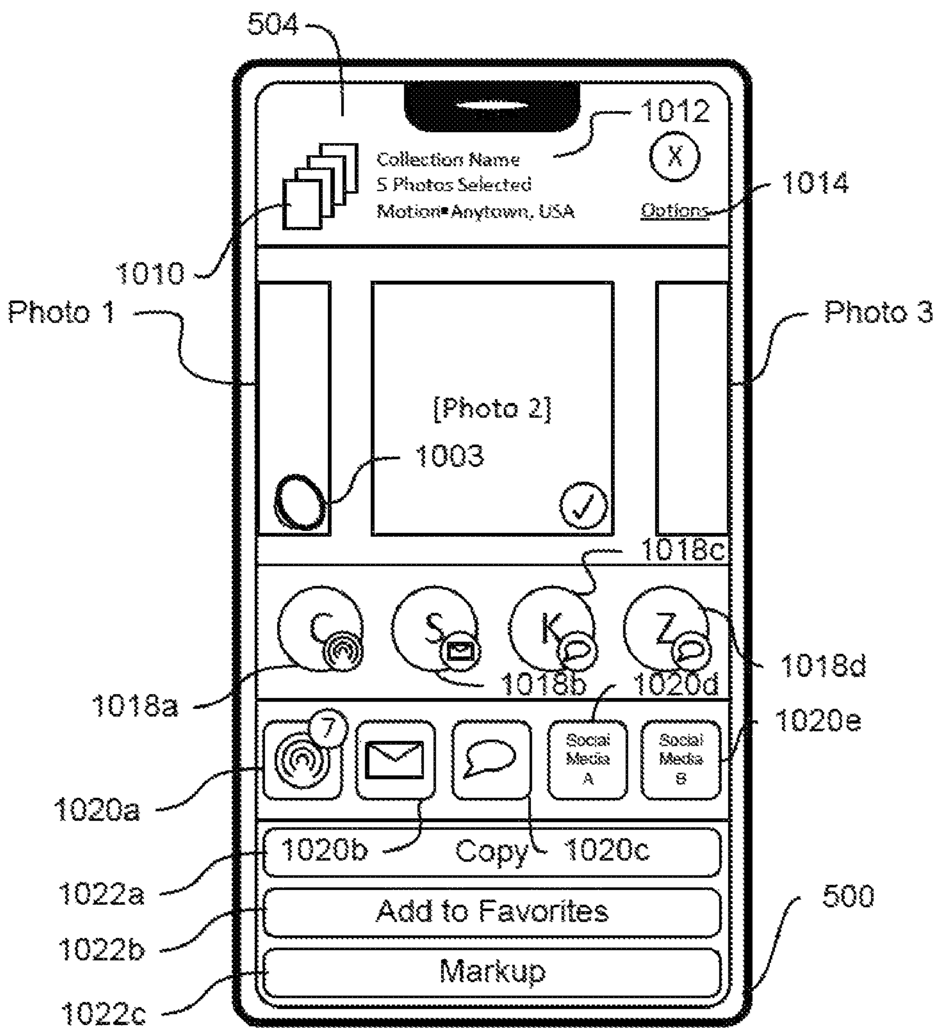

In some embodiments, such as in FIG. 10J, in accordance with a determination that the second electronic device 610*c* and the third electronic device 610*a* have a second difference in orientation with respect to the first electronic device 500 (e.g., the second electronic device and the third electronic device are separated from each other by a second angle relative to the first electronic device), the respective indication 620*c* of the second electronic device 610*c* and the respective indication 620*a* of the third electronic device 610*a* are separated by a second distance, different than the first distance, on the user interface element at least partially surrounding the first sharing option 616*a* (748). Optionally, the indications of the second and third electronic devices are separated from each other by the second angle relative to the first sharing option. For example, the second electronic device is to the right of the first electronic device and the third electronic device is to the left of the first electronic device, making the second and third electronic devices separated by an angle of about 180 degrees relative to the first electronic device. In this example, the indication of the second electronic device is displayed to the right of the first sharing option and the indication of the third electronic device is displayed to the left of the first sharing option, making the second and third indications separated by an angle of about 180 degrees relative to the first sharing option.

The above-described manner of presenting the indications of the second and third electronic devices separated by a distance that corresponds to the distance between the second and third electronic devices allows the first electronic device to present indications of the second and third electronic devices at positions that correspond to the positions of the second and third electronic devices which simplifies the interaction between the user and the electronic device and enhances the operability of the electronic device and makes the user-device interface more efficient (e.g., by making it easier for the user to identify which electronic device is represented by which indication), which additionally reduces power usage and improves battery life of the electronic device by enabling the user to use the electronic device more quickly and efficiently and reduces user error of sharing the content with the wrong electronic device in response to detecting selection of the first sharing option.

In some embodiments, such as in FIG. 6J, the one or more sharing criteria associated with the third electronic device 610*d* include a criterion that is satisfied when the second orientation is oriented towards the third electronic device 610*d* (750). Optionally, the top edge of the first electronic device or some other predetermined part of the first electronic device points in the direction of the third electronic device within a threshold range of angles (e.g., +/−10 degrees, 20 degrees, etc.) of the third electronic device.

In some embodiments, such as in FIG. 6J, in response to detecting the change in the orientation of the first electronic device 500 (752), in response to determining that the second orientation is oriented towards the third electronic device 610*d* and before the one or more sharing criteria associated with the third electronic device 610*d* are satisfied, the first electronic device 500 generates (754), at the first electronic device 500, an indication that indicates that second orientation is oriented towards the third electronic device. Optionally, a representation of the third electronic device is presented with a visual characteristic that is different from a visual characteristic of the representation of the third electronic device prior to the first electronic device detecting that the second orientation is oriented towards the third electronic device (e.g., the dot representing the third electronic device changes from being a small black dot to being a large blue dot). The indication is optionally an audio or tactile output. For example, the first electronic device presents a plurality of dots that represent a plurality of electronic devices within the threshold distance of the first electronic device and when the first electronic device detects the second orientation that is oriented towards the third electronic device, the dot representing the third electronic device changes color and/or changes size and/or the first electronic device generates an audio or tactile output indicating the second orientation, corresponding to the third electronic device, has been reached.

The above-described manner of presenting an indication that the second orientation is oriented towards the third electronic device allows the first electronic device to notify the user that the first sharing option is about to change from being selectable to share content with the second electronic device to being selectable to share content with the third electronic device which simplifies the interaction between the user and the electronic device and enhances the operability of the electronic device and makes the user-device interface more efficient (e.g., by enabling the user to move the first electronic device to prevent the first sharing option from changing instead of having to reposition the first electronic device towards the second electronic device to reconfigure the first sharing option to be selectable to share content with the second electronic device, and reducing errors of sharing with the third device if not intended), which additionally reduces power usage and improves battery life of the electronic device by enabling the user to use the electronic device more quickly and efficiently.

In some embodiments, such as in FIG. 6J, in response to detecting the change in the orientation of the first electronic device 500 (756), in accordance with the determination that the second orientation satisfies the one or more sharing criteria associated with the third electronic device 610*d* (e.g., a top edge of the first electronic device or another predetermined location of the first electronic device is pointing towards the third electronic device within a threshold range of angles (e.g., +/−10 or 20 degrees)), the first electronic device 500 generates (758), at the first electronic device 500, an indication (e.g., an audio or tactile output) that indicates that the content sharing option 616*a* displayed at the first location in the sharing user interface is selectable to initiate the process to share content with the third electronic device 610*d*, and not to initiate the process to share content with the second electronic device 610*c*. Optionally, the electronic device generates the indication in response to updating the first sharing option to be selectable to share content with the third electronic device instead of the second electronic device. In some embodiments, the electronic device updates the first sharing option in response to detecting that the first electronic device has been in the second orientation for a predetermined amount of time (e.g., 2 seconds, 3 seconds, 5 seconds, etc.). For example, the first electronic device generates an indication when the first electronic device initially reaches the second orientation and generates another indication when the first electronic device has been in the second orientation for the predetermined amount of time, causing the first sharing option to be updated.

The above-described manner of generating the indication in response to updating the first sharing option allows the first electronic device to notify the user that the first sharing option has been updated to be selectable to share content with the third electronic device instead of the second electronic device which simplifies the interaction between the user and the electronic device and enhances the operability of the electronic device and makes the user-device interface more efficient (e.g., by preventing a user error of sharing content with the third electronic device when the user intended to share the content with the second electronic device), which additionally reduces power usage and improves battery life of the electronic device by enabling the user to use the electronic device more quickly and efficiently.

In some embodiments, such as in FIG. 6H, the second orientation satisfies the one or more sharing criteria associated with the third electronic device 610*d* when the second orientation is oriented towards (e.g., when the third electronic device is within a predefined range of angles of a predetermined axis of the electronic device) the third electronic device 610*d* for longer than a time threshold 624*d* (e.g., 2 seconds, 3 seconds, 5 seconds) (760). For example, if the first electronic device is in the second orientation for less than the time threshold before moving to a different orientation that is not associated with the third electronic device, the first selectable option remains selectable to initiate a process to share content with the second electronic device.

The above-described manner of updating the first sharing option in response to detecting that the first electronic device is in the second orientation for a threshold amount of time allows the first electronic device to forgo updating the first sharing option if the first electronic device is in the second orientation for less than the threshold amount of time which simplifies the interaction between the user and the electronic device and enhances the operability of the electronic device and makes the user-device interface more efficient (e.g., by reducing a user error of accidentally changing the first sharing option to be selectable to share content with the third electronic device instead of the second electronic device), which additionally reduces power usage and improves battery life of the electronic device by enabling the user to use the electronic device more quickly and efficiently.

In some embodiments, such as in FIG. 6N, while displaying, via the display device 504, the sharing user interface, the first electronic device 500 receives (762), via the one or more input devices, selection of the content sharing option 616*a* (e.g., the first content sharing option).

In some embodiments, such as in FIG. 6O, in response to receiving the input selecting the content sharing option 616*a* (764), in accordance a determination that the content sharing option 616*a* is selectable to initiate the process to share content with the second electronic device 610*b*, the first electronic device 500 shares (766) the content with the second electronic device 610*b*. Optionally, the first electronic device initiates a process to share the content with the second electronic device via the wireless network sharing protocol while maintaining display of the sharing user interface, without displaying another user interface.

In some embodiments, in response to receiving the input selecting the content sharing option (764), in accordance a determination that the content sharing option is selectable to initiate the process to share the content with the third electronic device, the first electronic device 500 shares (768) the content with the third electronic device. For example, if the electronic device 500 were to detect selection of option 616*a* while displaying the user interface illustrated in FIG. 6J, the first electronic device 500 would initiate a process to share the content with electronic device 610*d*. Optionally, the first electronic device initiates a process to share the content with the third electronic device via the wireless network sharing protocol. For example, selection of the first content sharing option causes the first electronic device to initiate a process to share content with another electronic device that is currently associated with the first sharing option. In some embodiments, selection of a means of sharing other than the first sharing option in the sharing user interface initiates a process to share content with another electronic device using a different sharing means (e.g., text message or email rather than via a wireless network sharing protocol), which optionally causes the first electronic device to cease display of the sharing user interface and instead display another user interface associated with the other sharing means (e.g., a text messaging user interface, an email user interface, etc.).

The above-described manner of sharing the content with the second or third electronic device depending on with which electronic device the selected sharing option is associated allows the first electronic device to provide selectable options for sharing the content with each of the second electronic device and the third electronic device which simplifies the interaction between the user and the electronic device and enhances the operability of the electronic device and makes the user-device interface more efficient (e.g., by reducing user error of sharing the content with the wrong other device by providing options for sharing with each other electronic device within the threshold distance), which additionally reduces power usage and improves battery life of the electronic device by enabling the user to use the electronic device more quickly and efficiently.

In some embodiments, such as in FIG. 6L the content sharing option 616*a* is displayed with (e.g., within the first content sharing option, adjacent to the first content sharing option, surrounding the first content sharing option, etc.) one or more visual indications 620*b*, 620*c*, and 620*d* of one or more other electronic devices 610*b*, 610*c*, and 610*d*, including the second electronic device and the third electronic device, that are within a threshold distance (e.g., 6 feet, 10 feet, 20 feet, or a distance defined by the range of a wireless communication protocol between the first electronic device and the other devices) of the first electronic device 500 (770). Optionally, the content sharing option is presented with a ring of dots that indicate each of the other electronic devices surrounding the content sharing option.

In some embodiments, such as in FIG. 6O, in response to receiving the input selecting the content sharing option 616*a*, the first electronic device 500 replaces (772) the one or more visual indications 620*b*, 620*c*, and 620*d* of one or more other electronic devices 610*b*, 610*c*, and 610*d* with a visual indication 626 of a progress of the sharing of the content. Optionally, the first electronic device ceases displaying the one or more visual indications of the other electronic devices (e.g., the arrangement of dots that each represent another electronic device) and presents the indication of the progress of the sharing of the content in the location of the user interface where the one or more visual indications of the other electronic devices was presented. For example, the electronic device presents a progress ring around the sharing option that is progressively filled in around the sharing option as more and more of the content is shared with the other electronic device.

The above-described manner of replacing the visual indications of the one or more other electronic devices with a visual indication of the progress of sharing the content allows the first electronic device to use one region of the user interface to display the indications of the other electronic devices while the user is selecting an electronic device with which to share the content and display the progress of sharing the content while the first electronic device is in the process of sharing the content which simplifies the interaction between the user and the electronic device and enhances the operability of the electronic device and makes the user-device interface more efficient (e.g., by conserving display area to enable the user to view the rest of the user interface with reduced scrolling or panning), which additionally reduces power usage and improves battery life of the electronic device by enabling the user to use the electronic device more quickly and efficiently.

In some embodiments, such as in FIG. 6M, the plurality of selectable content sharing options for sharing content with other devices further includes a second content sharing option 616*b*, and the second content sharing option 616*b* does not change as a function of the orientation of the first electronic device 500 (774). In some embodiments, the second content sharing option is one of an option to share content with a particular user account with a particular way of sharing (e.g., an application for sharing, such as text message, enhanced data-based message, e-mail, etc.) or an option to initiate a process to share the content using a particular way of sharing. For example, the sharing user interface includes the first sharing option and an option to share the content with a particular contact via text message, an option to share the content with a particular contact via e-mail, an option to initiate a process to share the content via e-mail, an option to initiate a process to share the content via text message, and an option to share the content with social media. In this example, the option to share the content with a particular contact via text message, the option to share the content with a particular contact via e-mail, the option to initiate a process to share the content via e-mail, the option to initiate a process to share the content via text message, and the option to share the content with social media do not change as the orientation of the electronic device changes.

The above-described manner of presenting the second sharing option that does not change as a function of the orientation of the first electronic device allows the first electronic device to continue to present the second sharing option even if the orientation of the first electronic device changes in a way that causes the first sharing option to change which simplifies the interaction between the user and the electronic device and enhances the operability of the electronic device and makes the user-device interface more efficient (e.g., by reducing the number of sharing options that need to be updated by the first electronic device), which additionally reduces power usage and improves battery life of the electronic device by enabling the user to use the electronic device more quickly and efficiently.

In some embodiments, the sharing user interface such as in FIG. 6C is displayed in response to selection (e.g., with contact 603) of a selectable sharing option 604 displayed in a respective application on the first electronic device 500 (776), such as in FIG. 6B. Optionally, the respective application is an application for viewing and/or editing the content. For example, a photos application includes a selectable option to share a photo that is currently being presented in the photos application, selection of which cause the first electronic device to display the sharing user interface for sharing the photo.

The above-described manner of presenting the sharing user interface in response to selection of a selectable sharing option allows the first electronic device to forgo powering up sharing circuitry of the first electronic device until the selection of the selectable sharing option is detected which reduces power usage and improves battery life of the electronic device by enabling the user to use the electronic device more quickly and efficiently.

In some embodiments, such as in FIG. 6C, the first content sharing option 616*a* is associated with a first sharing protocol and a respective other electronic device 610*c*, and the sharing user interface further includes a second content sharing option 618° associated with the sharing protocol but that is not associated with a respective other electronic device 610*c* (778). In some embodiments, the first and second sharing options are associated with the wireless network sharing protocol, where the first sharing option is associated with a particular other electronic device and is selectable to share content with the other electronic device, but the second sharing option is not associated with any particular other electronic device and is selectable not to share the content, but to display a further user interface associated with the wireless network sharing protocol from which the user is able to share the content with one or more other electronic devices/contacts.

In some embodiments, such as in FIG. 6S, while displaying, via the display device 504, the sharing user interface, the first electronic device 500 receives (780), via the one or more input devices, selection (e.g., with contact 603) of the second content sharing option 618*a*.

In some embodiments, such as in FIG. 6T, in response to receiving the input selecting the second content sharing option 618*a* (782), the electronic device 500 displays (784), via the display device 504, an enlarged sharing user interface associated with the sharing protocol (e.g., a wireless network sharing protocol user interface) that includes a respective content sharing option 634 that is selectable to share content with another electronic device 610*b* based on the orientation of the first electronic device 500 using the sharing protocol (e.g., a selectable option that, if selected, causes the first electronic device to share the content with a respective other electronic device that is selected based on the orientation of the first electronic device using the sharing protocol) (786). In some embodiments, the other electronic device that the option is initially associated with is selected based on criteria other than the orientation of the electronic device, such as how often the first electronic device shares content with the other electronic device, the type of content being shared, how recently the first electronic device shared content with the other electronic device, how many times the first electronic device shared content with the other electronic device, etc.

In some embodiments, in response to receiving the input selecting the second content sharing option 618*a* (782), the electronic device 500 displays (784), via the display device 504, an enlarged sharing user interface associated with the sharing protocol (e.g., a wireless network sharing protocol user interface) that includes a plurality of visual representations 636*a*, 636*c*, 636*d*, 636*t*, and 636*m* of a plurality of electronic devices that are within a threshold distance of the first electronic device 500 and are available for sharing using the sharing protocol, including a visual representation of the second electronic device and a visual representation of the third electronic device (788). Optionally, the visual representations are images (as opposed to dots) representing the other electronic devices (e.g., images associated with a contact card associated with the other electronic device) that are positioned around the respective content sharing option in accordance with the position of each other electronic device relative to the first electronic device. For example, if the second electronic device is to the left of the first electronic device and the third electronic device is to the right of the first electronic device, the user interface includes an image representing the second electronic device to the left of the respective sharing option and an image representing the third electronic device to the right of the respective sharing option. In some embodiments, the enlarged sharing user interface associated with the sharing protocol further includes a plurality of selectable options to share content with a respective other electronic device using the wireless network sharing protocol.

The above-described manner of presenting the enlarged sharing user interface associated with the sharing protocol allows the first electronic device to present the representations of the other electronic devices with more information and detail than would fit in the sharing user interface which simplifies the interaction between the user and the electronic device and enhances the operability of the electronic device and makes the user-device interface more efficient (e.g., by providing more information to the user about the other electronic devices to enable the user to quickly select a desired other electronic device with which to share content), which additionally reduces power usage and improves battery life of the electronic device by enabling the user to use the electronic device more quickly and efficiently.

In some embodiments, such as in FIG. 6L, before receiving the selection of the second content sharing option 618*a*, the first content sharing option 616*a* is displayed in the sharing user interface with one or more visual indications 620 of the electronic devices 610, other than images representing the electronic devices (e.g., one dot represents each other electronic device), that are within the threshold distance of the first electronic device 500, wherein the one or more visual indications 620 are positioned relative to the first content sharing option 616*a* based on locations of the electronic devices 610 relative to the first electronic device 500 (790). Optionally, the dots are positioned in a ring around the first content sharing option at angles representing the angular position of each other electronic device relative to the first electronic device).

In some embodiments, such as in FIG. 6T, after receiving the selection of the second content sharing option 618*a*, the respective content sharing option 634 is displayed in the enlarged sharing user interface with one or more images 636 representing the electronic devices 610 that are within the threshold distance of the first electronic device 500 (792). Optionally, the images are images associated with a contact card associated with each other electronic device.

In some embodiments, such as in FIG. 6T, the one or more images 636 are positioned relative to the respective content sharing option 634 based on locations of the electronic devices 610 relative to the first electronic device 500 (794). Optionally, the images are positioned in a ring around the respective content sharing option at angles representing the angular position of each other electronic device relative to the first electronic device. For example, prior to detecting selection of the second content sharing option, the electronic device presents indications of the other electronic devices as dots around the first selectable sharing option and, in response to detecting selection of the second sharing option, the electronic device presents indications of the other electronic devices as images around the respective sharing option. The respective sharing option and images are optionally presented at a larger size than the first sharing option and the dots.

The above-described manner of presenting the indications of the other electronic devices as images positioned around the respective sharing option at locations indicative of the position of each other electronic device relative to the first electronic device allows the first electronic device to present visual indications of each other electronic device with more information about each other electronic device (e.g., a recognizable photo instead of some other indication, such as a dot) which simplifies the interaction between the user and the electronic device and enhances the operability of the electronic device and makes the user-device interface more efficient (e.g., by enabling the user to more quickly identify which other electronic devices are represented by each indication), which additionally reduces power usage and improves battery life of the electronic device by enabling the user to use the electronic device more quickly and efficiently.

In some embodiments, such as in FIG. 6T, the enlarged sharing user interface includes (796) a first region that includes one or more visual representations 638*t* and 638*m* of one or more electronic devices associated with a user account of a user of the first electronic device 500 that are available for sharing using the sharing protocol, a second region that includes one or more visual representations 638*c*, 638*a*, 638*d*, and 638*b* of one or more electronic devices associated with contacts of the user of the first electronic device, and a third region that includes one or more visual representations 638*e* of one or more electronic devices that are neither associated with the user account nor associated with the contacts of the user of the first electronic device 500, but are available for sharing using the sharing protocol. In some embodiments, the user interface includes a section labeled "My Devices" that includes selectable options that, when selected, cause the first electronic device to share the content with a respective electronic device associated with the user account that is associated with the first electronic device that is within a threshold distance (e.g., a distance at which the sharing protocol is available) of the first electronic device. The electronic device in the "My Devices" section are optionally devices that have been configured with the user account of the user of the first electronic device. In some embodiments, the user interface includes a section labeled "Contacts" or "People I Know" that includes selectable options that, when selected, cause the first electronic device to share the content with a respective electronic device associated with a user account included in a contact card stored on the first electronic device that is within a threshold distance (e.g., a distance at which the sharing protocol is available) of the first electronic device, and are devices that are not configured with the user account of the first electronic device. In some embodiments, the user interface includes a section labeled "Others Nearby" that includes selectable options that, when selected, cause the first electronic device to share the content with a respective electronic device that is within a threshold distance (e.g., a distance at which the sharing protocol is available) of the first electronic device and not associated with a user account of the first electronic device or a user account included in a contact card stored on the first electronic device. The respective sharing option is optionally presented in a region of the user interface that is not the first, second or third region. In some embodiments, the selectable options presented in the first, second, and third regions do not change as the orientation of the first electronic device changes, which causes the respective content sharing option to change. In some embodiments, the electronic devices in the "People I Know" section were displayed as dots surrounding the first content sharing option in the sharing user interface, but the devices in the "My Devices" and "Others Nearby" sections were not displayed surrounding the first content sharing option in the sharing user interface.

The above-described manner of presenting selectable options for sharing content using the sharing protocol with electronic devices belonging to the user of the first electronic device, electronic devices belonging to contacts of the first electronic device, and with electronic devices that do not belong to the user of the first electronic device or to contacts of the first electronic device in different regions of the user interface allows the first electronic device to enable the user to find the desired electronic device with which to share the content more quickly which simplifies the interaction between the user and the electronic device and enhances the operability of the electronic device and makes the user-device interface more efficient (e.g., by reducing the amount of time it takes the user to locate and select a desired sharing option), which additionally reduces power usage and improves battery life of the electronic device by enabling the user to use the electronic device more quickly and efficiently.

In some embodiments, such as in FIG. 6Q, the plurality of content sharing options includes a second content sharing option 616*d* that is associated with a respective user, and is selectable to initiate a process to share content with the respective user independent of the orientation of the first electronic device 500 (798). Optionally, the second selectable sharing option continues to be presented and continues to be selectable to share the content with the respective user regardless of the orientation of the first electronic device. In some embodiments, the second sharing option is associated with one respective method of sharing the content. For example, the second sharing option is an option to share the content with the contact via one of e-mail, text message, enhanced data-based messaging, social media, etc.

The above-described manner of presenting the second sharing option for sharing content with the respective user that is independent of the orientation of the first electronic device allows the first electronic device to continue to present the second option even if the orientation of the first electronic device changes which simplifies the interaction between the user and the electronic device and enhances the operability of the electronic device and makes the user-device interface more efficient (e.g., by enabling the user to select the second option to share the content with the respective user even if the position of the first electronic device has changed without moving the first electronic device or entering another input to configure the second sharing option to be selectable to share with the respective user), which additionally reduces power usage and improves battery life of the electronic device by enabling the user to use the electronic device more quickly and efficiently.

In some embodiments, such as in FIG. 6Q, the first content sharing option 616*a* is selectable to initiate sharing using a respective sharing protocol (e.g., a short-range wireless sharing protocol), the first content sharing option 616*a* is displayed in a region of the sharing user interface with a remainder of the plurality of content sharing options 616*b-d* associated with other users (e.g., each of the plurality of content sharing options is associated with one other user and a method of sharing content), and the remainder of the plurality of content sharing options 616*b-d* are selectable to initiating sharing with the other users using one or more sharing protocols other than the respective sharing protocol (798-2). In some embodiments, the region of the sharing user interface includes the first sharing option and a plurality of sharing options that are selectable to share the content with a respective user using a respective way of sharing content, such as e-mail, text message, enhanced data-based message, social media, and the like. In some embodiments, sharing in response to selection of the first content sharing option occurs while the sharing user interface remains displayed, while sharing with the other sharing options in response to selection of the other content sharing options occurs outside of the sharing user interface and causes the first electronic device to cease displaying the sharing user interface.

The above-described manner of presenting the plurality of content sharing options that are each selectable to share content with another user with a sharing protocol other than the respective sharing protocol associated with the first sharing option allows the first electronic device to present a plurality of sharing options that do not change in response to the first electronic device detecting a change in the orientation of the first electronic device which simplifies the interaction between the user and the electronic device and enhances the operability of the electronic device and makes the user-device interface more efficient (e.g., by enabling the user to select the other options regardless of the position of the first electronic device), which additionally reduces power usage and improves battery life of the electronic device by enabling the user to use the electronic device more quickly and efficiently.

In some embodiments, such as in FIG. 6Q, the remainder of the plurality of content sharing options includes (798-4) a first respective content sharing option 616*b* associated with a first respective user and a first respective sharing protocol, wherein the first respective content sharing option is displayed with a visual indication of the first respective sharing protocol (798-6). Optionally, the first respective content sharing option is an icon including an image representing the first respective user (e.g., an image included in a contact card of the first respective user) with an icon representing the first respective sharing protocol overlaid on the image representing the first respective user.

In some embodiments, such as in FIG. 6Q, the remainder of the plurality of content sharing options includes (798-4) a second respective content sharing option 616*c* associated with a second respective user and a second respective sharing protocol, wherein the second respective content sharing option is displayed with a visual indication of the second respective sharing protocol (798-8). In some embodiments, the second respective content sharing option is an icon including an image representing the second respective user (e.g., an image included in a contact card of the second respective user) with an icon representing the second respective sharing protocol overlaid on the image representing the second respective user. The first and second respective sharing protocols are optionally each one of email, text message, enhanced data-based messaging, or social media. For example, the first respective content sharing option is selectable to initiate a process to share the content with the first user via text message and the second respective content sharing option is selectable to initiate a process to share the content with the second user via email.

The above-described manner of presenting respective sharing options that are associated with specific users and specific sharing protocols with the visual indications of the sharing protocols allows the first electronic device to enable the user to avoid erroneous selection of improper sharing protocols, which additionally reduces power usage and improves battery life of the electronic device by enabling the user to use the electronic device more quickly and efficiently.

In some embodiments, such as in FIG. 6C, before detecting the change in the orientation of the first electronic device 500 (798-10), in accordance with a determination that one or more first criteria are satisfied, independent of the orientation of the first electronic device 500, the first content sharing option 616*a* in the sharing user interface is selectable to initiate a process to share content with a first suggested electronic device 610*c* (798-12). Optionally, the first criteria are based on the number of times the first electronic device has shared content with the first suggested electronic device, how recently the first electronic device shared content with the first suggested electronic device, the type of content being shared, the current date and time, the current location, etc.

In some embodiments, such as in FIG. 6M, before detecting the change in the orientation of the first electronic device 500 (798-10), in accordance with a determination that one or more second criteria are satisfied, independent of the orientation of the first electronic device 500, the first content sharing option 616*a* in the sharing user interface is selectable to initiate a process to share content with a second suggested electronic device 610*b* (798-14). In some embodiments, the second criteria are based on the number of times the first electronic device has shared content with the second suggested electronic device, how recently the first electronic device shared content with the second suggested electronic device, the type of content being shared, the current date and time, the current location, etc. Thus, in some embodiments, before the first electronic device changes orientation after the sharing user interface has been displayed, the first sharing option is, by default, selectable to initiate a process to share the content with a suggested other electronic device based, not on the current orientation of the first electronic device, but rather other criteria associated with the electronic device suggested by default.

The above-described manner of selecting the respective suggested electronic device based on the first or second criteria allows the first electronic device to initially configure the first sharing option to be selectable to share the content with the suggested electronic device the user is most likely to want to share the content with which simplifies the interaction between the user and the electronic device and enhances the operability of the electronic device and makes the user-device interface more efficient (e.g., by reducing the number of inputs needed to share the content with a respective suggested electronic device that the first sharing option is initially configured to cause the first electronic device to share the content with), which additionally reduces power usage and improves battery life of the electronic device by enabling the user to use the electronic device more quickly and efficiently.

In some embodiments, such as in FIG. 6K, in response to detecting the change in the orientation of the first electronic device 500 (798-16), in accordance with a determination that the second orientation satisfies one or more sharing criteria associated with a first respective electronic device 610*a* and a second respective electronic device 610*b* (e.g., the first respective electronic device and the second respective electronic device are positioned near each other such that the orientation of the first electronic device corresponds to both of the first respective electronic device and the second respective electronic device) (798-18), in accordance with a determination that one or more first criteria are satisfied, independent of the orientation of the first electronic device 500, the first content sharing option 616*a* in the sharing user interface is selectable to initiate a process to share content with the first respective electronic device 610*a* (798-20). Optionally, the first criteria are based on the number of times the first electronic device has shared content with the first respective electronic device, how recently the first electronic device shared content with the first respective electronic device, the type of content being shared, the current date and time, the current location, etc. For example, if the first electronic device has shared content with the first respective electronic device more times than it has shared content with the second respective electronic device, the first sharing option will be selectable to share content with the first respective electronic device rather than the second respective electronic device.

In some embodiments, such as in FIG. 6K, in response to detecting the change in the orientation of the first electronic device 500 (798-16), in accordance with a determination that the second orientation satisfies one or more sharing criteria associated with a first respective electronic device 610*a* and a second respective electronic device 610*b* (e.g., the first respective electronic device and the second respective electronic device are positioned near each other such that the orientation of the first electronic device corresponds to both of the first respective electronic device and the second respective electronic device) (798-18), in accordance with a determination that one or more second criteria are satisfied, independent of the orientation of the first electronic device, the first content sharing option in the sharing user interface is selectable to initiate a process to share content with the second respective electronic device (798-22), such as if, in FIG. 6K, the first sharing option 616*a* was configured to share with electronic device 610*b* instead of electronic device 610*a*. Optionally, the second criteria are based on the number of times the first electronic device has shared content with the second respective electronic device, how recently the first electronic device shared content with the second respective electronic device, the type of content being shared, the current date and time, the current location, etc. The first and second criteria are optionally used to determine which of the first respective electronic device and the second respective electronic device the user most likely wishes to share the content with when the orientation of the first electronic device could correspond to either of the first respective electronic device or the second respective electronic device. For example, if the first electronic device has shared content with the second respective electronic device more times than it has shared content with the first respective electronic device, the first sharing option will be selectable to share content with the second respective electronic device rather than the first respective electronic device. In some embodiments, if the first content sharing option changes to be associated with a respective electronic device when the first electronic device is oriented within 20 degrees of the respective electronic device and there is another electronic device positioned within that range of angles, the first and second criteria are used to determine with which electronic device the first sharing option should be associated.

The above-described manner of selecting which of the first respective electronic device and the second respective electronic device using the first and second criteria allows the first electronic device to associate the first sharing option with the respective electronic device with which the user is most likely to want to share the content which simplifies the interaction between the user and the electronic device and enhances the operability of the electronic device and makes the user-device interface more efficient (e.g., by reducing the number of inputs needed to share the content with the electronic device with which the user is more likely to want to share the content), which additionally reduces power usage and improves battery life of the electronic device by enabling the user to use the electronic device more quickly and efficiently.

In some embodiments, such as in FIG. 6K, while the first electronic device 500 is in the second orientation and the one or more first criteria are satisfied and the first content sharing option 616*a* in the sharing user interface is selectable to initiate the process to share content with the first respective electronic device 610*a*, the first electronic device 500 detects (798-24) a change in a position of the first electronic device 500 from a first position illustrated in FIG. 6K to a second position illustrated in FIG. 6M (e.g., detecting movement of the electronic device to a different location and/or a different orientation).

In some embodiments, in response to detecting the change in the position of the first electronic device 500 from the first position in FIG. 6K to the second position in FIG. 6M (798-26), in accordance with a determination that the second position (e.g., current location and/or orientation of the first electronic device) satisfies one or more sharing criteria associated with the second respective electronic device 610*b* (e.g., the second position is associated with the second respective electronic device and not with the first respective electronic device), the first content sharing option 616*a* is selectable to initiate a process to share content with the second respective electronic device 610*b* (798-28). Optionally, the first electronic device moves closer to the first respective electronic device and the second respective electronic device so that the range of positions (e.g., orientations of the first electronic device within a predetermined range of angles, such as 10 or 20 degrees) that are associated with the first respective electronic device and the range of positions associated with the second respective electronic device do not overlap and the first electronic device is positioned in the range of positions associated with the second respective electronic device. In some embodiments, if the second position does not satisfy the criteria associated with the second respective electronic device, the first sharing option remains selectable to share the content with the first respective electronic device. In some embodiments, if the second position satisfies criteria associated with a third respective electronic device and not the first respective electronic device, the first sharing option is updated to be associated with the third respective electronic device.

The above-described manner of updating the first content sharing option to be selectable to initiate the process to share the content with the second respective electronic device in response to detecting the second position satisfies one or more sharing criteria associated with the second respective electronic device allows the first electronic device to provide a way for the user to select a device other than the one selected by the first electronic device based on non-orientation-based criteria for sharing with the first sharing option which simplifies the interaction between the user and the electronic device and enhances the operability of the electronic device and makes the user-device interface more efficient (e.g., by enabling the user to select the second respective electronic device by moving the first electronic device to the second position instead of having to navigate a user interface to select the second respective electronic device), which additionally reduces power usage and improves battery life of the electronic device by enabling the user to use the electronic device more quickly and efficiently.

It should be understood that the particular order in which the operations in FIGS. 7A-7J have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 701, 900 and 1100) are also applicable in an analogous manner to method 700 described above with respect to FIGS. 7A-7J. For example, the ways of updating the sharing option in accordance with the orientation of the electronic device relative to other electronic devices described above with reference to method 700 optionally have one or more of the characteristics of the ways of presenting an indication to change the orientation of the electronic device, presenting a sharing user interface within an action user interface of an application running on the electronic device, presenting options for modifying one or more settings for an item of content before sharing the item of content, etc., described herein with reference to other methods described herein (e.g., methods 701, 900 and 1100). For brevity, these details are not repeated here.

The operations in the information processing methods described above are, optionally, implemented by running one or more functional modules in an information processing apparatus such as general purpose processors (e.g., a as described with respect to FIGS. 1A-1B, 3, 5A-5H) or application specific chips. Further, the operations described above with reference to FIGS. 7A-7J are, optionally, implemented by components depicted in FIGS. 1A-1B. For example, displaying operations 702, 720, and 722 receiving operations 762 and 780, and generating operations 754 and 758 are, optionally, implemented by event sorter 170, event recognizer 180, and event handler 190. Event monitor 171 in event sorter 170 detects a contact on touch screen 504, and event dispatcher module 174 delivers the event information to application 136-1. A respective event recognizer 180 of application 136-1 compares the event information to respective event definitions 186, and determines whether a first contact at a first location on the touch screen corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

FIGS. 7K-7P are flow diagrams illustrating a method 701 of presenting an indication to change the orientation of the electronic device when the orientation of the electronic device is outside of a range of orientations in which circuitry that identifies another electronic device with which to share content is able to function with desired reliability in accordance with some embodiments of the disclosure. The method 701 is optionally performed at an electronic device such as device 100, device 300, device 500 as described above with reference to FIGS. 1A-1B, 2-3, 4A-4B and 5A-5H. Some operations in method 701 are, optionally combined and/or order of some operations is, optionally, changed.

In some embodiments, such as in FIG. 6T, a first electronic device 500 in communication with a display device and one or more input devices (e.g., a mobile device (e.g., a tablet, a smartphone, a media player, or a wearable device) including a touch screen or a computer including one or more of a keyboard, mouse, trackpad, and display/touch screen) displays (703), via the display device, a sharing user interface for sharing content with other electronic devices that includes a respective representation 634 of a different electronic device 610*b* that is available for sharing content with the first electronic device while a current orientation of the first electronic device is within a first (e.g., predefined) range of orientations relative to a reference orientation 640*a* (e.g., a reference plane such as the ground, or a plane intersected by the first electronic device and a respective electronic device with which the first electronic device is able to share content or a reference vector such as gravity or the gravitational attraction of a large object such as the earth). In some embodiments, the reference orientation is a plane that is perpendicular to gravity and the first electronic device includes an accelerometer or other sensor capable of sensing gravity that enables the first electronic device to determine its orientation with respect to the gravity. In some embodiments, the reference orientation is defined relative to the respective other electronic device with which the first electronic device is able to share content, such as a plane that intersects the first electronic device and the respective other electronic device or a plane defined in some other manner relative to the respective other electronic device. Optionally, the respective orientation of the first electronic device relative to the reference orientation is an angle between a predetermined axis of the electronic device and the reference plane. The sharing user interface optionally further functions to share content with user accounts (e.g., e-mail addresses, telephone numbers, social media accounts, etc.) other than a user account associated with the first electronic device. In some embodiments, the sharing user interface includes a plurality of selectable options that, when selected, cause the first electronic device to share the content in a respective manner. The representation of the different electronic device that is available for sharing content with the first electronic device is optionally a selectable option that, when selected, causes the first electronic device to share the content with the different electronic device. In some embodiments, the predetermined axis of the electronic device is an axis parallel to an edge of the electronic device, such as a vertical edge or a horizontal edge of the first electronic device. For example, the sharing user interface enables the user to share the content via e-mail, text message, enhanced data-based message, and social media, such as the sharing user interface described with reference to method 700. In some embodiments, the first electronic device includes one or more orientation sensors for determining its orientation (e.g., accelerometer, etc.).

In some embodiments, such as in FIGS. 6T-6U, while displaying the sharing user interface, the first electronic device 500 detects (705) a change in an orientation θ of the first electronic device from a first orientation to a second orientation. In some embodiments, changing the orientation of the first electronic device from the first orientation to the second orientation includes one or more of changing the orientation of the first electronic device relative to the reference orientation (e.g., tilting the electronic device vertically) and changing the orientation of the electronic device relative to an axis that is perpendicular to the reference orientation or parallel to gravity (e.g., rotating the electronic device horizontally). For example, the user rotates the first electronic device horizontally, such as to point a predetermined edge (e.g., the top edge) of the first electronic device at a respective other electronic device with which the user wishes to share content from the first electronic device. Such orientation-based determination of target sharing devices is described with reference to method 700.

In some embodiments, such as in FIG. 6II-6JJ, in response to detecting the change in the orientation of the first electronic device 500, (707) in accordance with a determination that the second orientation θ of the first electronic device is within the first predetermined range of orientations (e.g., a predetermined axis of the electronic device (e.g., a vertical axis) is 15-255 degrees relative to the reference plane), the first electronic device 500 updates (709) the respective representation 616*a* of the different device 610*a* that is available for sharing content with the first electronic device based on a direction in which the first electronic device is pointing. In some embodiments, the sharing target device is selected using an orientation sensor that determines a direction in which a predetermined surface of the electronic device is oriented towards. Optionally, the sensor determines a vector normal to the back surface of the first electronic device and determines which other electronic device towards which the vector points. For example, if the first electronic device is oriented at an angle in the range of 15-255 degrees relative to a reference plane perpendicular to gravity and the top edge of the first electronic device is facing a second electronic device, the second electronic device is selected as the sharing target device and if the top edge of the first electronic device is facing a third electronic device, the third electronic device is selected as the sharing target device. Optionally, in response to determining which electronic device is the sharing target device, the first electronic device displays an indication of the sharing target device, such as updating a selectable option for sharing the content to include a representation of a user account associated with the sharing target device. In some embodiments, the first electronic device includes circuitry (e.g., a sensor) that detects the orientation and/or position of the first electronic device relative to the other electronic devices within a threshold distance (e.g., 20 feet, 30 feet, 50 feet) of the first electronic device. Optionally, the first predetermined range of orientations is a range of orientations at which the sensor is able to function with a predetermined level of reliability. For example, if the sensor is able to function with the predetermined level of reliability when the first electronic device is positioned at an orientation in the range of 15-255 degrees relative to the reference plane perpendicular to gravity, the first predetermined range of orientations is 15-255 degrees relative to the reference plane perpendicular to gravity. In this example, the first electronic device updates the sharing target device based on which of the other electronic devices the first electronic device is pointing towards when the first electronic device is oriented 15-255 degrees relative to the reference plane perpendicular to gravity. Such updating of the sharing target based on which of the other electronic devices the first electronic device is pointing towards is described with reference to method 700.

In some embodiments, such as in FIG. 6U-6V, in response to detecting the change in the orientation θ of the first electronic device, (707) in accordance with a determination that the second orientation of the first electronic device is within a second predetermined range of orientations outside of the first predetermined range of orientations (e.g., the first electronic device is approximately parallel to (e.g., at an angle less than +/−1, 3, 5, 10, 15 degrees relative to) the reference plane), the first electronic device forgoes (711) updating the respective representation 634 of the different device 610*a* that is available for sharing content with the first electronic device based on a direction in which the first electronic device is pointing. In some embodiments, in response to detecting that the respective orientation of the first electronic device relative to the reference plane is outside of the first predetermined range of orientations, the first electronic device ceases displaying an indication of the sharing target device and displays an indication to change the orientation of the electronic device. For example, in response to detecting the orientation of the first electronic device changing from within the first predetermined range of orientations relative to the reference plane to outside of the first predetermined range of orientations, the first electronic device ceases displaying a selectable sharing option that includes an indication of the sharing target device and instead displays the indication to tilt the first electronic device at the location at which the selectable sharing option had been displayed. In some embodiments, the indication of the sharing target device or selectable sharing option ceases to be displayed when the first electronic device is in a first orientation outside of the first predetermined range of orientations (e.g., approximately parallel to the reference plane or at an orientation less than +/−1, 3, or 5 degrees relative to the reference plane). Optionally, the indication of the sharing target device or selectable sharing option continues to be displayed when the first electronic device is in a second orientation outside of the first predetermined range of orientations (e.g., less than 15 degrees but more than approximately parallel or +/−1, 3, or 5 degrees relative to the reference plane that is perpendicular to gravity). In some embodiments, as will be described in more detail below, when the first electronic device is in the second orientation outside of the first predetermined range of orientations, the indication of the sharing target device or selectable sharing option is displayed with a visual characteristic different from a visual characteristic of the indication or option while the first electronic device is oriented within the first predetermined range of orientations. For example, the indication of the sharing target device or selectable sharing option is displayed in a warped or tilted manner to give the appearance of being tilted (e.g., to encourage the user to tilt the first electronic device to an orientation within the first predetermined range of orientations).

The above-described manner of updating the representation of the different device based on a direction the first electronic device is pointing in response to determining that the orientation of the first electronic device is within a first predetermined range of orientations and forgoing updating the representation in response to determining that the orientation of the first electronic device is within a second range of orientations outside of the first predetermined range of orientations reduces errors in determining a sharing target when circuitry that determines the sharing target based on the orientation of the first electronic device operates more reliably in a subset of device orientations (e.g., within the first predetermined range of orientations), which simplifies the interaction between the user and the electronic device and enhances the operability of the electronic device and makes the user-device interface more efficient (e.g., by encouraging the user to position the first electronic device in a manner that will enable the first electronic device to determine a sharing target device reliably and, thus, predictably and efficiently), which additionally reduces power usage and improves battery life of the electronic device by enabling the user to use the electronic device more quickly and efficiently.

In some embodiments, such as in FIG. 6T, in accordance with the determination that the second orientation θ of the first electronic device 500 is within the first predetermined range of orientations (e.g., 15-255 degrees relative to a reference plane defined by gravity or the different electronic device with which the first electronic device is able to share content), the respective representation 634 of the different electronic device is displayed at a first location in the sharing user interface (713). In some embodiments, the respective representation of the different electronic device is a selectable option that, when selected, causes the first electronic device to share the content with the different electronic device, such as via a wireless sharing protocol. The respective representation is optionally concurrently displayed with a plurality of selectable options that, when selected, initiate a respective process to share content with another user account or electronic device via a different respective sharing protocol (e.g., e-mail, text message, social media, etc.).

In some embodiments, such as in FIG. 6U, in response to detecting the change in the orientation θ of the first electronic device 500, in accordance with a determination that the second orientation of the first electronic device is outside of the first predetermined range of orientations (e.g., within the second predetermined range of orientations or outside of the first and second predetermined ranges of orientations), the first electronic device 500 displays (715), at the first location in the sharing user interface, a visual indication 634 to change the orientation of the first electronic device (e.g., the visual indication to change the orientation of the first electronic device replaces the respective representation of the different electronic device or the respective representation of the different electronic device is modified to indicate to the user to tilt the first electronic device). In some embodiments, the visual indication to change the orientation of the first electronic device includes text, such as "tilt device" or "tilt phone." Optionally, the indication to tilt the first electronic device is the respective representation of the different electronic device displayed in a manner different from how the respective representation is displayed when the first electronic device is within the first range of orientations.

The above-described manner of changing the respective representation with an indication to change the orientation of the first electronic device in accordance with a determination that the orientation of the first electronic device is outside of the first predetermined range of orientations encourages the user to reposition the first electronic device in an orientation at which the circuitry for determining the device towards which the first electronic device is pointing is able to function reliably, which simplifies the interaction between the user and the electronic device and enhances the operability of the electronic device and makes the user-device interface more efficient (e.g., by instructing the user to reposition the first electronic device in order to accurately and efficiently use features that rely on the circuitry that determines the other electronic device towards which the first electronic device is pointing, such as updating the respective representation), which additionally reduces power usage and improves battery life of the electronic device by enabling the user to use the electronic device more quickly and efficiently.

In some embodiments, such as in FIG. 6T, in response to detecting the change in the orientation θ of the first electronic device 500 (717), in accordance with the determination that the second orientation of the first electronic device 500 is within the first predetermined range of orientations, the respective representation 634 of the different electronic device is displayed with a first value for a respective visual property (719) (e.g., a flat visual orientation). In some embodiments, the respective representation of the different electronic device includes an image representing the different electronic device, such as a user picture or avatar associated with a user account of the different electronic device. Optionally, when the respective representation of the different electronic device is displayed with the flat visual orientation, the representation has a first shape (e.g., a circle) and the image is not distorted.

In some embodiments, such as in FIG. 6U, in response to detecting the change in the orientation θ of the first electronic device 500 (717), in accordance with the determination that the second orientation of the first electronic device is outside of the first predetermined range of orientations, the indication 634 to change the orientation of the electronic device is the respective representation of the different electronic device displayed with a second value for the respective visual property (e.g., a tilted visual orientation), different than the first value for the respective visual property (721). In some embodiments, when the respective representation of the different electronic device is displayed with the tilted visual orientation, the representation has a second shape (e.g., an oval) and the image is distorted to create the appearance that the visual indication of the respective electronic device is tilted.

The above-described manner of displaying the respective representation with the tilted visual orientation in accordance with a determination that the orientation of the first electronic device is outside of the first predetermined range of orientations quickly and efficiently indicates that the device is in an orientation at which the circuitry for determining the direction in which the first electronic device is pointing is unable to function reliably, which simplifies the interaction between the user and the electronic device and enhances the operability of the electronic device and makes the user-device interface more efficient (e.g., by instructing the user to position the first electronic device correctly in order to accurately and efficiently use features that rely on the circuitry that determines the other electronic device towards which the first electronic device is pointing, such as updating the respective representation), which additionally reduces power usage and improves battery life of the electronic device by enabling the user to use the electronic device more quickly and efficiently.

In some embodiments, such as in FIGS. 6CC-6DD, a current value of the visual property of the respective representation of the different electronic device changes as the current orientation θ of the first electronic device 500, outside of the first predetermined range of orientations, changes (723). In some embodiments, the amount of change in the current value of the visual property changes by an amount that is proportional to the amount of change of the orientation of the first electronic device. For example, while the orientation of the electronic device remains outside of the first range of orientations, when the orientation changes slightly, the amount of visual tilt of the representation of the different electronic device changes slightly and when the orientation of the electronic device changes by a larger amount, the amount of visual tilt changes by a greater amount. The direction of the change of the current value of the respective visual property optionally changes as the direction of change of the orientation of the first electronic device changes. For example, while the first electronic device is at an orientation outside of the first range of orientations, when the orientation of the electronic device moves further away from the reference orientation, the amount of visual tilt of the representation of the other electronic device increases and when the orientation of the electronic device moves closer to the reference orientation, the amount of visual tilt of the representation of the other electronic device decreases. In some embodiments, as the orientation of the first electronic device changes to be further from the first range of orientations, the visual tilt of the respective representation increases. As another example, the first predetermined range of orientations includes orientations in which an angle between the first electronic device and a reference plane (e.g., a plane normal to gravity or a plane between the first electronic device and the different electronic device) is between 15 and 255 degrees. In this example, in response to detecting that the angle between the first electronic device and the reference plane is 13 degrees, the first electronic device displays the respective representation with a tilted appearance. For example, in response to detecting that the angle between the first electronic device and the reference plane decreases to 9 degrees, the first electronic device displays the respective representation with more of a tilted appearance that appears to be more tilted than the appearance when the first electronic device was at the angle of 13 degrees relative to the reference plane. Thus, in some embodiments, the further the orientation of the first electronic device is from a boundary of the first predetermined range of orientations, the more tilted the respective representation appears.

The above-described manner of changing the second visual orientation of the respective representation of the different electronic device as the orientation of the first electronic device outside of the first predetermined range of orientations changes quickly and efficiently communicates to the user the current orientation of the first electronic device relative to the range of orientations in which the sharing circuitry works most reliably, which simplifies the interaction between the user and the electronic device and enhances the operability of the electronic device and makes the user-device interface more efficient (e.g., by instructing the user to change the orientation of the first electronic device to improve the performance of the circuitry that determines the other electronic device towards which the first electronic device is pointing), which additionally reduces power usage and improves battery life of the electronic device by enabling the user to use the electronic device more quickly and efficiently, such as by efficiently instructing the user how to position the first electronic device to improve the performance of the circuitry that senses the direction in which the first electronic device is pointing.

In some embodiments, such as in FIGS. 6T-6U, displaying the respective representation 634 of the different electronic device 610*b* with the first value for the respective visual property and the respective representation 634 of the different electronic device 610*a* with the second value for the respective visual property includes displaying one or more representations 636 of other electronic devices 610 that are available for sharing content with the first electronic device, the plurality of representations 636 of other electronic devices displayed at locations around the respective representation that update as the current orientation of the first electronic device relative to the other electronic devices changes (725). Optionally, the respective representation of the different electronic device includes an image representing the different electronic device, such as a user profile picture or avatar associated with a user account of the different electronic device or a representation of a name or alias of a user account of the different electronic device. In some embodiments, the image representing the different electronic device is surrounded by representations of the other electronic devices. For example, the representations of the other electronic devices are dots or images associated with each respective other electronic device. In some embodiments, the position of each representation of a respective other electronic device relative to the image representing the different electronic device is optionally analogous to the position of the respective other electronic device relative to the first electronic device, such as described with reference to method 700. For example, if a first other electronic device is positioned in the direction of the right edge of the first electronic device, the representation of the first other electronic device is displayed to the right of the image representing the different electronic device and if a second other electronic device is positioned in the direction of the bottom edge of the first electronic device, the representation of the second other electronic device is displayed adjacent to the bottom edge of the image representing the different electronic device. In some embodiments, the representations of the other electronic devices are displayed around the image representing the different electronic device regardless of the visual orientation of the representation of the different electronic device. Optionally, when the orientation of the first electronic device is outside of the first predetermined range of orientations and the representation of the different electronic device is displayed with the tilted visual orientation, the representations of the other electronic devices are distorted, such as distorting the shape of the representations of the other electronic devices or displaying the representations that are above the image representing the different electronic device at a smaller size than the size of the representations that are below the image representing the different electronic device (e.g., indicating that the top part of the representation of the other electronic device has tilted into the display, and the bottom part of the representation of the other electronic device has tilted out from the display).

The above-described manner of displaying representations of other electronic devices at locations around the respective representation that update as the current orientation of the first electronic device relative to the other electronic devices changes while displaying the respective representation with the first or second visual orientation provides feedback to the user as the user repositions the first electronic device, such as to cause the first electronic device to update the device with which to share content based on the direction in which the first electronic device is pointing, which simplifies the interaction between the user and the electronic device and enhances the operability of the electronic device and makes the user-device interface more efficient (e.g., by providing the user with visual aids that enable the user to more quickly update the respective representation of the different electronic device to share content with the different electronic device), which additionally reduces power usage and improves battery life of the electronic device by enabling the user to use the electronic device more quickly and efficiently.

In some embodiments, such as in FIGS. 6Z-6AA, while the current orientation of the first electronic device 500 is outside of the first predetermined range of angles and outside of the second predetermined range of angles and while displaying the respective representation 634 of the different electronic device with the second value for the respective visual property (727), the first electronic device 500 detects (729) a change in the orientation of the first electronic device from the second orientation to a third orientation outside of the first predetermined range of orientations and outside of the second predetermined range of orientations (e.g., the angle between the first electronic device and the reference plane changes and/or the direction in which the first electronic device is pointing changes). In some embodiments, the first predetermined range of orientations includes orientations in which the angle between the first electronic device and the reference plane is in the range of 15 to 255 degrees and the second predetermined range of orientations includes orientations in which the angle between the first electronic device and the reference plane is approximately zero (e.g., +/−0.1, 0.5, or 1 degree). Thus, in some embodiments, when the angle between the first electronic device and the reference plane is less than 15 degrees but greater than the boundary of the second range of orientations, the orientation of the first electronic device is outside of both the first predetermined range of orientations and the second predetermined range of orientations.

In some embodiments, such as in FIGS. 6Z-6AA, while the current orientation θ of the first electronic device 500 is outside of the first predetermined range of angles and outside of the second predetermined range of angles and while displaying the respective representation 634 of the different electronic device 610 with the second value for the respective visual property (727), in response to detecting the change in the orientation of the first electronic device from the second orientation to the third orientation, the first electronic device 500 updates (731) the respective representation 634 of the different device 610 that is available for sharing content with the first electronic device based on the direction in which the first electronic device is pointing. In some embodiments, when the orientation of the first electronic device is outside of the first and second predetermined ranges of orientations, the first electronic device displays the representation of the different electronic device with a tilted visual orientation and updates the respective representation if the first electronic device moves from pointing at one different electronic device to another different electronic device. Optionally, in response to detecting that the orientation of the first electronic device is within the second predetermined range of orientations, the respective representation of the different electronic device does not update in accordance with the direction in which the first electronic device is pointing. In some embodiments, in response to detecting that the orientation of the first electronic device is in the second predetermined range of orientations, the first electronic device ceases displaying the respective representation of the different electronic device and displays an indication to tilt the first electronic device that does not include the respective representation of the different electronic device (e.g., an image or text that includes "tilt device, "tilt phone," etc.).

The above-described manner of updating the respective representation of the different device displayed with the second value for the respective visual characteristic based on the direction in which the first electronic device is pointing while the orientation of the first electronic device is outside of the first predetermined range of orientations and outside of the second predetermined range of orientations provides for continued operation of the direction-based sharing method described herein while instructing the user to change the orientation of the first electronic device, which simplifies the interaction between the user and the electronic device and enhances the operability of the electronic device and makes the user-device interface more efficient (e.g., by continuing to update the respective representation while encouraging the user to update the orientation of the first electronic device to an orientation that improves the performance of the circuitry that detects the direction in which the first electronic device is pointing), which additionally reduces power usage and improves battery life of the electronic device by enabling the user to use the electronic device more quickly and efficiently, such as by providing visual feedback of the orientation of the first electronic device to help the user more quickly orient the first electronic device towards a desired sharing target and encouraging the user to change the orientation of the first electronic device to an orientation that improves device performance.

In some embodiments, such as in FIGS. 6U-6V, while the current orientation θ of the first electronic device 500 is outside of the first predetermined range of angles and outside of the second predetermined range of angles and while displaying the respective representation 634 of the different electronic device with the second value for the respective visual property (733), the electronic device 500 detects (735) a change in the orientation of the first electronic device from the second orientation to a third orientation outside of the first predetermined range of orientations and outside of the second predetermined range of orientations (e.g., the angle between the first electronic device and the reference plane changes and/or the direction in which the first electronic device is pointing changes). In some embodiments, the first predetermined range of orientations includes orientations in which the angle between the first electronic device and the reference plane is in the range of 15 to 255 degrees and the second predetermined range of orientations includes orientations in which the angle between the first electronic device and the reference plane is approximately zero (e.g., +/−0.1, 0.5, or 1 degree). Thus, in some embodiments, when the angle between the first electronic device and the reference plane is less than 15 degrees but greater than the boundary of the second range of orientations, the orientation of the first electronic device is outside of both the first predetermined range of orientations and the second predetermined range of orientations.

In some embodiments, such as in FIGS. 6U-6V, while the current orientation θ of the first electronic device 500 is outside of the first predetermined range of angles and outside of the second predetermined range of angles and while displaying the respective representation 634 of the different electronic device 610*a* with the second value for the respective visual property (733), in response to detecting the change in the orientation of the first electronic device from the second orientation to a third orientation, the first electronic device 500 forgoes (737) updating the respective representation 634 of the different device 610*a* that is available for sharing content with the first electronic 500 device based on a direction in which the first electronic device is pointing. In some embodiments, when the orientation of the first electronic device is outside of the first and second predetermined ranges of orientations, the first electronic device displays the representation of the different electronic device with a second (e.g., tilted) visual orientation and does not update the respective representation when the first electronic device moves from pointing at one different electronic device to another different electronic device. In some embodiments, in response to detecting that the orientation of the first electronic device is in the second predetermined range of orientations, the first electronic device ceases displaying the respective representation of the different electronic device and displays an indication to tilt the first electronic device that does not include the respective representation of the different electronic device (e.g., an image or text that includes "tilt device, "tilt phone," etc.).

The above-described manner of forgoing updating the respective representation when the orientation of the first electronic device is outside of the first range of orientations prevents the first electronic device from erroneously updating the respective representation while in an orientation in which the circuitry that identifies the direction in which the first electronic device is pointing is functioning with reduced reliability, which simplifies the interaction between the user and the electronic device and enhances the operability of the electronic device and makes the user-device interface more efficient (e.g., by reducing errors and enabling the user to more quickly select the desired different electronic device for sharing), which additionally reduces power usage and improves battery life of the electronic device by enabling the user to use the electronic device more quickly and efficiently.

In some embodiments, such as in FIG. 6V, while displaying the respective representation 634 of the different electronic device 610*a* displayed with the second value for the respective visual property, the first electronic device 500 receives (739), via the one or more input devices, an input selecting (e.g., with contact 603) the respective representation 634 of the different electronic device 610*a* (e.g., a selectable sharing option that, when selected, causes the first electronic device to initiate a process for sharing content with the different electronic device according to method 700) displayed with the second value for the respective visual property.

In some embodiments, such as in FIG. 6W, in response to detecting the selection of the respective representation 634 of the different electronic device 610*a*, the first electronic device 500 initiates (741) a process to share content with the different electronic device. In some embodiments, the respective representation of the different electronic device is a selectable sharing option that, when selected, initiates a process to share content with the different electronic device. Optionally, when the orientation of the first electronic device is within the first predetermined range of orientations, in response to detecting selection of the representation of the different electronic device displayed with the first visual orientation, the first electronic device initiates a process to share content with the different electronic device, as described above with reference to method 700. In some embodiments, while the first electronic device displays the respective representation of the different electronic device with the second orientation, the respective orientation updates in accordance with a direction in which the first electronic device is pointing. For example, while the orientation of the first electronic device is outside of the first predetermined range of orientations and outside of the second predetermined range of orientations, the respective representation updates if the first electronic device is repositioned to point at another different electronic device and, in response to detecting selection of the updated respective representation, the first electronic device initiates the process to share the content with the other different electronic device. Optionally, the respective representation of the different electronic device with the second visual orientation does not update in accordance with a direction in which the first electronic device is pointing. For example, the respective representation updates in accordance with the direction in which the first electronic device is pointing while the orientation of the first electronic device is within the first predetermined range of orientations and stops updating if the orientation of the first electronic device changes to an orientation outside of the first predetermined range of orientations (e.g., within the second predetermined range of orientations). In this example, the first electronic device shares the content with the different electronic device identified most recently (e.g., when the device orientation was last within the first predetermined range of orientations) in response to detecting selection of the respective representation while the orientation of the first electronic device is outside of the first predetermined range of orientations.

The above-described manner of sharing content with the different device in response to detecting selection of the respective representation while the orientation of the first electronics device is outside of the first and second predetermined ranges of orientations reduces the amount of time it takes to share the content (e.g., by sharing the content without requiring the user reposition the first electronic device at an orientation in the first predetermined range of orientations), which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, while first electronic device 500 is in the second orientation and while displaying the respective representation of the different electronic device, the first electronic device 500 receives (734), via the one or more input devices, an input selecting the respective representation of the different electronic device.

In some embodiments, such as in FIG. 6N, in response to receiving the input selecting (e.g., with contact 603) the respective representation 616*a* of the different electronic device (745), in accordance with the determination that the second orientation of the first electronic device 500 is within the first predetermined range of orientations (e.g., such as in FIG. 6T), the first electronic device initiates (747) a process to share content with the different electronic device, as shown in FIG. 6O. In some embodiments, when the orientation of the first electronic device is within the first predetermined range of orientations, in response to detecting selection of the respective representation, the first electronic device initiates a process to share the content with the different electronic device as described with reference to method 700.

In some embodiments, such as in FIGS. 6X-6Y, in response to receiving the input selecting (e.g., with contact 603) the respective representation 634 of the different electronic device 610*a* (745), in accordance with the determination that the second orientation of the first electronic device 500 is outside of the first predetermined range of orientations, the first electronic device 500 forgoes (749) initiating the process to share content with the different electronic device. In some embodiments, when the orientation of the electronic device is outside of the first predetermined range of orientations (e.g., inside the second predetermined range of orientations), the first electronic device displays the respective representation without updating the respective representation in accordance with a direction in which the first electronic device is pointing and does not share the content in response to detecting selection of the respective representation. In some embodiments, when the orientation of the first electronic device is outside of the first predetermined range of orientations and outside of the second predetermined range of orientations, the first electronic device updates the respective representation of the different electronic device in accordance with a direction in which the first electronic device is pointing but does not initiate a process to share the content in response to detecting selection of the respective representation.

The above-described manner of sharing the content in response to detecting selection of the respective representation while the orientation of the first electronic device is within the first predetermined range of orientations and forgoing sharing the content in response to detecting selection of the respective representation while the orientation of the first electronic device is outside of the first predetermined range of orientations avoids erroneously sharing the content with the wrong different electronic device (e.g., by forgoing sharing when the orientation of the first electronics device is outside of the first predetermined range of angles), which simplifies the interaction between the user and the electronic device and enhances the operability of the electronic device and makes the user-device interface more efficient (e.g., by avoiding having to attempt to share the content multiple times due to errors), which additionally reduces power usage and improves battery life of the electronic device by enabling the user to use the electronic device more quickly and efficiently.

In some embodiments, such as in FIGS. 6X-6Y, in response to detecting the input selecting (e.g., with contact 603) the respective representation 634 of the different electronic device 610*a*, in accordance with the determination that the second orientation θ of the first electronic device 500 is outside of the first predetermined range of orientations, the first electronic device displays (751), via the display device, a visual indication 642 indicating that content sharing was not initiated. In some embodiments, the error message is overlaid on the sharing user interface. Optionally, the error message indicates to the user that the content was not shared because the orientation of the electronic device is outside of the first predetermined range of orientations, such as by including text instructing the user to tilt the first electronic device. In some embodiments, the error message includes a selectable option that, when selected, causes the first electronic device to cease displaying the error message. In some embodiments, the error message is displayed overlaid on the respective representation and/or replaces the respective representation. The first electronic device optionally plays a sound and/or generates a tactile output concurrently with displaying the error message.

The above-described manner of displaying the error message in response to detecting selection of the respective representation while the orientation of the first electronic device is outside the first predetermined range of orientations informs the user that and/or why selecting the respective representation did not cause the first electronic device to share the content so that the user knows to reposition the first electronic device and select the respective representation again to successfully share the content, which simplifies the interaction between the user and the electronic device and enhances the operability of the electronic device and makes the user-device interface more efficient (e.g., by providing the user with instructions for sharing the content instead of requiring the user use trial-and-error to share the content), which additionally reduces power usage and improves battery life of the electronic device by enabling the user to use the electronic device more quickly and efficiently.

In some embodiments, such as in FIGS. 6X-6Y, in response to detecting the input selecting (e.g., with contact 603) the respective representation 634 of the different electronic device 610*a*, in accordance with the determination that the second orientation θ of the first electronic device is outside of the first predetermined range of orientations, the first electronic device 500 generates (753) a tactile output 646 indicating that content sharing was not initiated. In some embodiments, the tactile output is a tactile output generated by the first electronic device in other contexts to indicate an error. For example, the tactile output optionally includes a pattern of three tactile pulses, and is optionally the same tactile output the electronic device generates in response to other errors experienced by the electronic device, such as a tactile output generated in response to the electronic device failing to biometrically authenticate (e.g., facial, fingerprint, etc.) a user during a process to unlock the electronic device or during a process to make a purchase using the electronic device. The electronic device optionally displays an error message and/or plays a sound concurrently with generating the tactile output.

The above-described manner of generating the tactile output in response to detecting selection of the respective representation while the orientation of the first electronic device is outside the first predetermined range of orientations quickly and easily informs the user that selecting the respective representation did not cause the first electronic device to share the content due to an error at the first electronic device, which simplifies the interaction between the user and the electronic device and enhances the operability of the electronic device and makes the user-device interface more efficient (e.g., by helping the user identify why the content was not shared), which additionally reduces power usage and improves battery life of the electronic device by enabling the user to use the electronic device more quickly and efficiently.

In some embodiments, such as in FIG. 6HH, the different device 610*a* is available for sharing content with the first electronic device 500 via a first sharing protocol (e.g., a short-range wireless sharing protocol that shares content from one electronic device to another electronic device), and the sharing user interface further includes a selectable option 616*b* that, when selected, initiates a process to share content with another electronic device via a second sharing protocol different than the first sharing protocol (e.g., text message, e-mail, social media, etc.) (757). In some embodiments, the respective representation is presented in a sharing user interface that includes selectable options for sharing content in a variety of ways, such as described with reference to methods 700 or 900.

The above-described manner of displaying the respective representation concurrently with a selectable option for sharing the content using another sharing protocol additionally provides the user with alternate ways of sharing the content that do not depend on the orientation of the first electronic device, which simplifies the interaction between the user and the electronic device and enhances the operability of the electronic device and makes the user-device interface more efficient (e.g., by enabling the user to share the content in a different manner, from the same user interface, if the user is unable to position the first electronic device in the first range of orientations), which additionally reduces power usage and improves battery life of the electronic device by enabling the user to use the electronic device more quickly and efficiently.

In some embodiments, such as in FIG. 6U, the different electronic device 610*a* is available for sharing content with the first electronic device 500 via a first sharing protocol (e.g., a short-range wireless sharing protocol that shares content from one electronic device to another electronic device) (757).

In some embodiments, such as in FIG. 6U, the sharing user interface further includes one or more selectable options 638*c* that, when selected, initiate respective processes to share the content with respective other electronic devices via the first sharing protocol (759). In addition to displaying the respective representation, the first electronic device optionally concurrently displays selectable options that do not update based on where the first electronic device is pointing, each selectable option associated with a respective other electronic device. In some embodiments, the selectable options are organized into categories, such as options for sharing with electronic devices associated with contacts of the first electronic device, options for sharing with electronic devices associated with the same user account as the user account associated with the first electronic device, and options for sharing with other electronic devices not associated with known user accounts, as described with reference to method 700.

In some embodiments, such as in FIG. 6U, the sharing user interface does not include selectable options for sharing the content with other electronic devices via a second sharing protocol different from the first sharing protocol (761). In some embodiments, the sharing user interface is dedicated to sharing via the first sharing protocol and does not include selectable options for sharing with any other sharing protocols.

The above-described manner of displaying the respective representation in a user interface that includes selectable options for sharing the content with other electronic devices using the first sharing protocol allows the user to share the content with the first sharing protocol by selecting an option that does not update based on where the first electronic device is pointing, which simplifies the interaction between the user and the electronic device and enhances the operability of the electronic device and makes the user-device interface more efficient (e.g., by enabling the user to share the content with the first sharing protocol without repositioning the first electronic device in the first range of orientations pointed towards the other electronic device with which the user wishes to share content), which additionally reduces power usage and improves battery life of the electronic device by enabling the user to use the electronic device more quickly and efficiently.

In some embodiments, such as in FIG. 6HH the first orientation of the first electronic device 500 is within the first predetermined range of orientations, and the second orientation of the first electronic device is within the second predetermined range of orientations (763), such as in FIG. 6EE (e.g., the orientation of the first electronic device changes from being within the first predetermined range of orientations to being within the second predetermined range of orientations).

In some embodiments, such as in FIG. 6EE, in response to detecting the change in the orientation of the first electronic device 500 from the first orientation to the second orientation, the first electronic device generates (765) a first tactile output 646 that has a first value for a respective characteristic. The respective characteristic is optionally one of intensity, duration, pattern, or frequency of the tactile output. In some embodiments, the first tactile output is a tactile output generated by the first electronic device in other contexts to indicate to the user an error has been made. For example, the first tactile output is a series of three pulses.

The above-described manner of generating the first tactile output in response to detecting the orientation of the first electronic device change from being within the first predetermined range of orientations to being in the second predetermined range of orientations quickly and efficiently informs the user that the circuitry that determines where the first electronic device is pointing is unable to function reliably at the second orientation, which simplifies the interaction between the user and the electronic device and enhances the operability of the electronic device and makes the user-device interface more efficient (e.g., by providing feedback to the user when the orientation of the first electronic device changes so the user knows to change the orientation if the user wishes to share content using the respective representation), which additionally reduces power usage and improves battery life of the electronic device by enabling the user to use the electronic device more quickly and efficiently.

In some embodiments, such as in FIGS. 6GG-6HH the first electronic device 500 detects (767) a change in the orientation θ of the first electronic device from the second orientation within the second predetermined range of orientations, such as in FIG. 6GG, to a third orientation within the first predetermined range of orientations, such as in FIG. 6HH (e.g., the orientation of the first electronic device changes from being within the first predetermined range of orientations to being within the second predetermined range of orientations).

In some embodiments, such as in FIG. 6HH, in response to detecting the change in the orientation θ of the first electronic device 500 from the second orientation the third orientation, the first electronic device 500 generates (769) a second tactile output 652 that has a second value for the respective characteristic, the second value different from the first value. The respective characteristic is optionally one of intensity, duration, pattern, or frequency of the tactile output. In some embodiments, the first tactile output is a tactile output generated by the first electronic device in other contexts to indicate to the user an error has been made and the second tactile output is a tactile output generated by the first electronic device in other contexts to indicate a notification or other event (or a successful completion of an initiated task, such as upon successful completion of sharing of content with another electronic device using a respective sharing protocol). For example, the first tactile output is a series of three pulses and the second tactile output is a single tap. In this example, the second tactile output has a different intensity, pattern, and duration from the first tactile output.

The above-described manner of generating the second tactile output in response to detecting the orientation of the first electronic device change from being within the second predetermined range of orientations to being within the first predetermined range of orientations quickly and efficiently informs the user that they have successfully positioned the first electronic device in the first predetermined range of orientations at which the circuitry that determines where the first electronic device is pointing is able to function reliably, which simplifies the interaction between the user and the electronic device and enhances the operability of the electronic device and makes the user-device interface more efficient (e.g., by enabling the user to share the content using the respective representation as soon as the orientation of the electronic device is within the first predetermined range of orientations), which additionally reduces power usage and improves battery life of the electronic device by enabling the user to use the electronic device more quickly and efficiently.

In some embodiments, such as in FIG. 6HH, the reference orientation 640*a* is defined relative to gravity (771). In some embodiments, the first predetermined range of orientations includes orientations in which an angle between the first electronic device (e.g., a plane on which the display of the first electronic device resides) and a reference plane perpendicular to gravity is in the range of 15 to 255 degrees. The first electronic device optionally detects its orientation relative to the reference plane by detecting the direction of gravity with an accelerometer or other sensor.

The above-described manner of determining the reference orientation relative to gravity provides a consistent sharing experience in different situations, which simplifies the interaction between the user and the electronic device and enhances the operability of the electronic device and makes the user-device interface more efficient (e.g., by providing for consistent and predictable operation, which reduces errors in operating the device to share content with other devices), which additionally reduces power usage and improves battery life of the electronic device by enabling the user to use the electronic device more quickly and efficiently.

In some embodiments, such as in FIG. 6II, the reference orientation 650*b*, is defined relative to the different electronic device 610*c* that is available for sharing content with the first electronic device (773). In some embodiments, the first predetermined range of orientations includes orientations in which an angle between the first electronic device (e.g., a plane on which the display of the first electronic device resides) and a reference plane including the first electronic device and the different electronic device is in a predetermined range of angles (e.g., 15 to 255 degrees).

The above-described manner of determining the reference orientation relative to the different electronic device, in some circumstances, provides more accurate feedback about the range of orientations for reliable sharing operation (e.g., because in some embodiments sharing circuitry reliability is defined by the relative orientations of the two devices involved in the sharing), which simplifies the interaction between the user and the electronic device and enhances the operability of the electronic device and makes the user-device interface more efficient (e.g., by further reducing errors related to potentially unreliable sharing operation), which additionally reduces power usage and improves battery life of the electronic device by enabling the user to use the electronic device more quickly and efficiently.

It should be understood that the particular order in which the operations in FIGS. 7K-7P have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 900 and 1100) are also applicable in an analogous manner to method 701 described above with respect to FIGS. 7K-7P. For example, the ways of presenting an indication to change the orientation of the electronic device described above with reference to method 701 optionally have one or more of the characteristics of the ways of updating the sharing option in accordance with the orientation of the electronic device relative to other electronic devices, presenting a sharing user interface within an action user interface of an application running on the electronic device, presenting options for modifying one or more settings for an item of content before sharing the item of content, etc., described herein with reference to other methods described herein (e.g., methods 700, 900 and 1100). For brevity, these details are not repeated here.

The operations in the information processing methods described above are, optionally, implemented by running one or more functional modules in an information processing apparatus such as general purpose processors (e.g., a as described with respect to FIGS. 1A-1B, 3, 5A-5H) or application specific chips. Further, the operations described above with reference to FIGS. 7K-7P are, optionally, implemented by components depicted in FIGS. 1A-1B. For example, displaying operations 703, 713, 715, receiving operations 739 and 743, and generating operations 753, 765, and 769 are, optionally, implemented by event sorter 170, event recognizer 180, and event handler 190. Event monitor 171 in event sorter 170 detects a contact on touch screen 504, and event dispatcher module 174 delivers the event information to application 136-1. A respective event recognizer 180 of application 136-1 compares the event information to respective event definitions 186, and determines whether a first contact at a first location on the touch screen corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Presenting a Sharing User Interface within an Action User Interface of an Application Users interact with electronic devices in many different manners, including sharing content with other users and electronic devices. In some embodiments, an electronic device presents a sharing user interface with a plurality of options for sharing the content within an action user interface of an application that presents the content. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

FIGS. 8A-8J illustrate exemplary ways an electronic device 500 presents a sharing user interface within an action user interface of an application in accordance with some embodiments of the disclosure. The embodiments in these figures are used to illustrate the processes described below, including the processes described with reference to FIGS. 9A-9C.

Figure 8A:
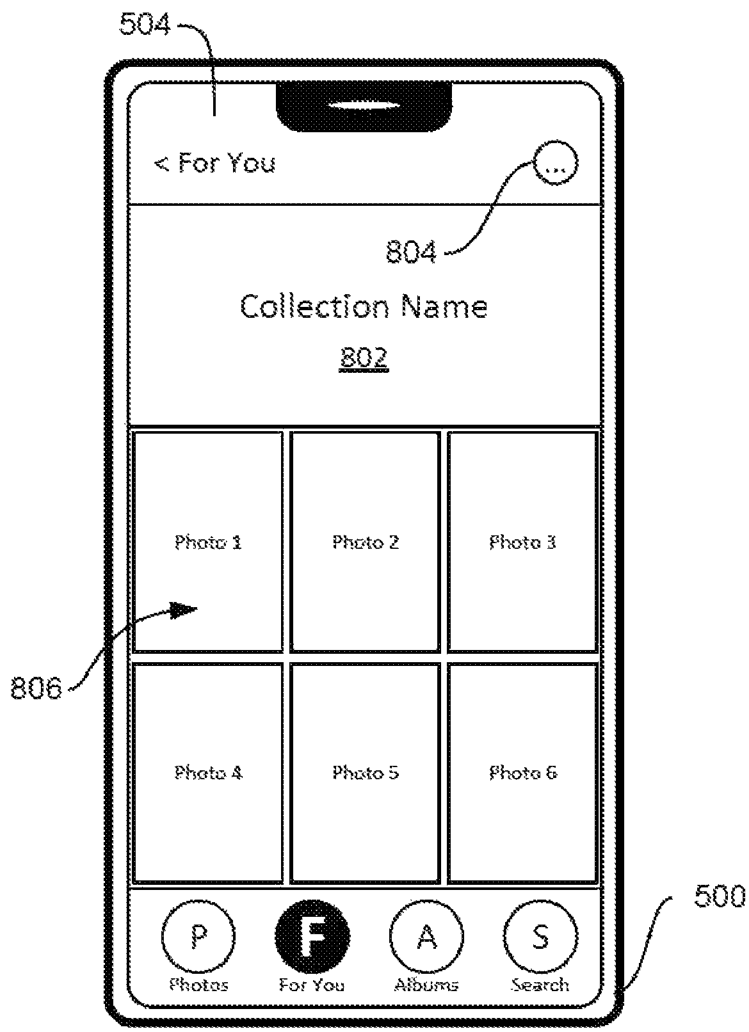
FIGS. 8A-8J illustrate exemplary ways an electronic device presents a sharing user interface within an action user interface of an application in accordance with some embodiments of the disclosure.
Figure 8B:
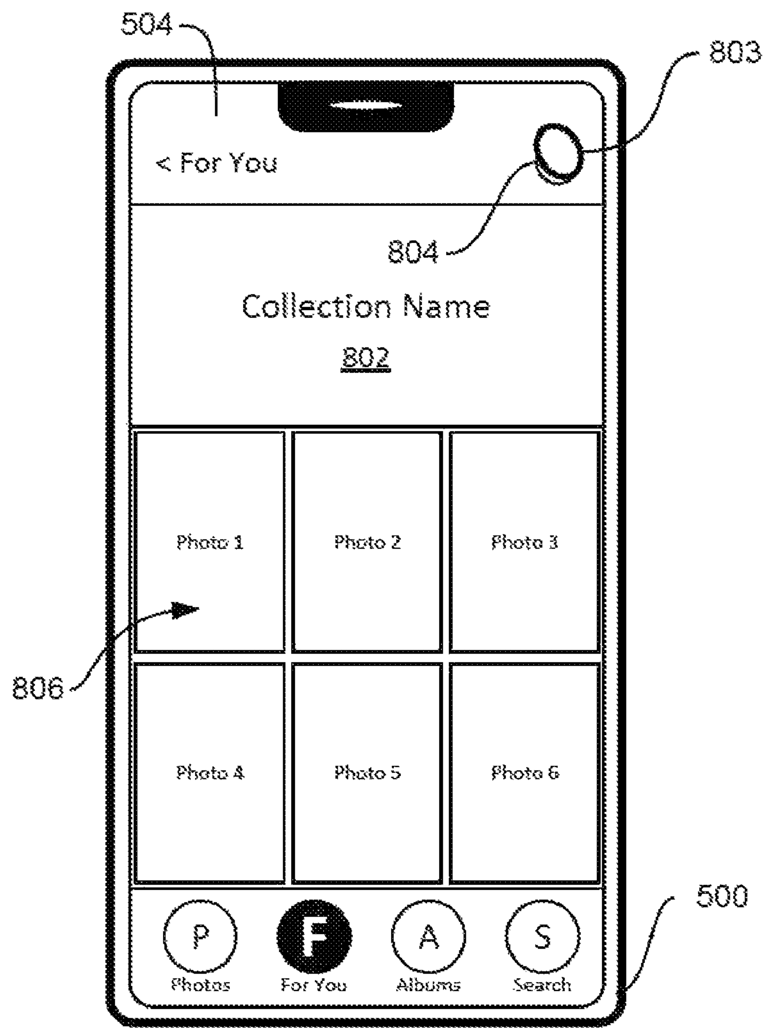

FIGS. 8A-8B illustrate a photos user interface from which the user is able to view and share a collection of photos. As shown in FIG. 8A, the photo user interface includes an indication 802 of the name of a collection of photos, previews 806 of a plurality of photos in the collection, and a selectable option 804 that, when selected, causes the electronic device 500 to present an action user interface of the photo application. As shown in FIG. 8B, the user selects (e.g., with contact 803) the option 804 to present the action user interface of the photos application. In response to the user's selection, the electronic device 500 presents the action user interface of the photos application (e.g., overlaid over the photos application user interface).

Figure 8C:
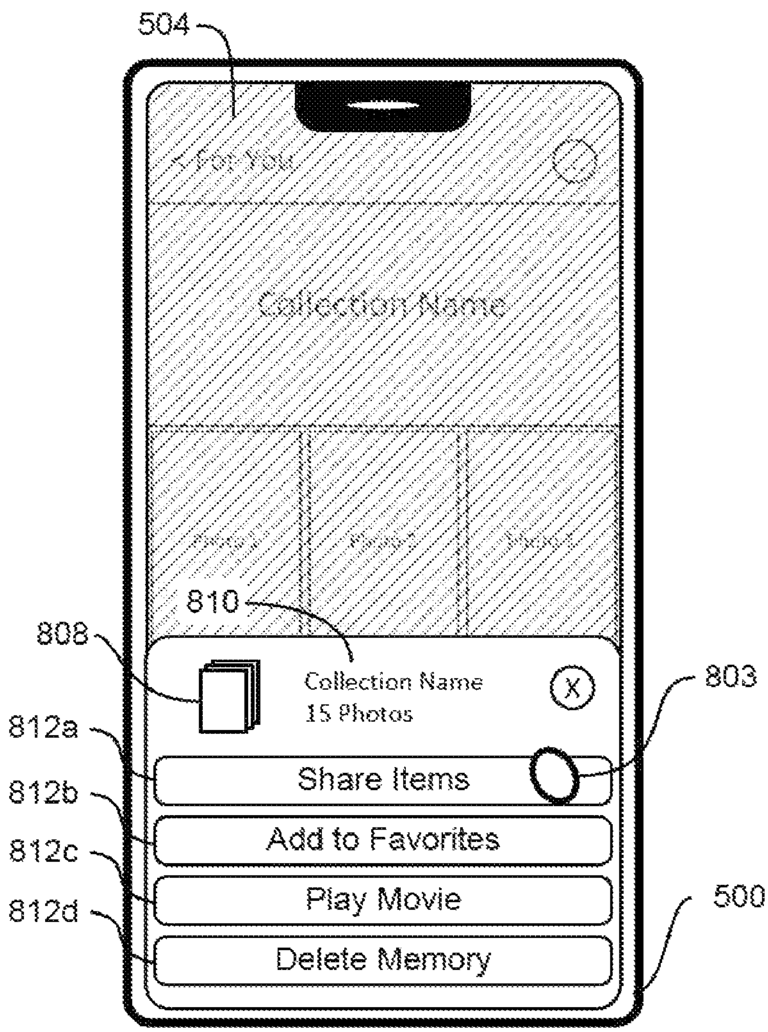

FIG. 8C illustrates the action user interface of the photos application. The action user interface is overlaid on the photo application user interface that includes the collection of photos. The action user interface of the photos application includes a thumbnail 808 representing the collection of photos (e.g., a stack of the photos to be shared), an indication 810 of the name of the collection and number of photos in the collection, and a plurality of selectable options that, when selected, cause the electronic device 500 to perform an associated action related to the collection of photos. More specifically, the "Share Items" option 812*a* is selectable to present a sharing user interface within the action user interface. The "Add to Favorites" option 812*b* is selectable to add the collection to a list of favorite collections of photos on the electronic device 500. The "Play Movie" option 812*c* is selectable to play a movie or slideshow of the photos in the collection. The "Delete Memory" option 812*d* is selectable to delete the collection of photos (but not the photos themselves) from the electronic device.

Figure 8D:
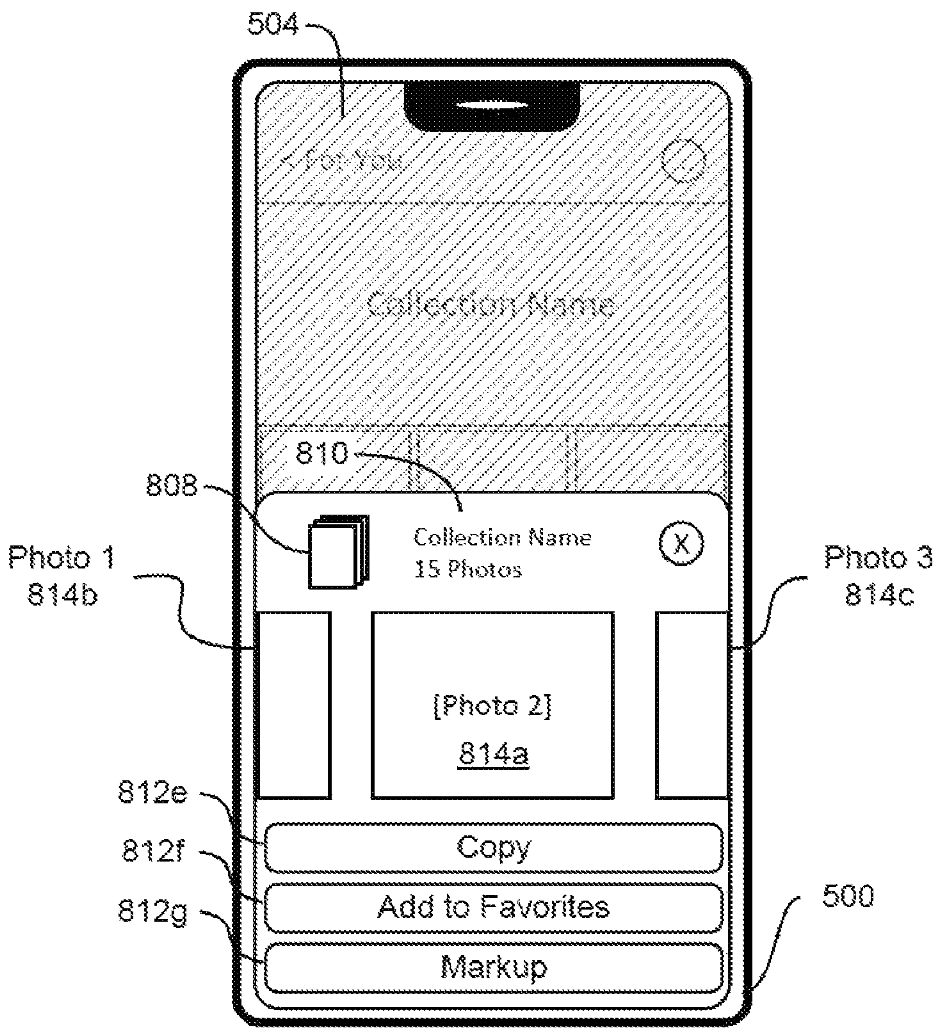

As shown in FIG. 8C, the user selects (e.g., with contact 803) the "Share Items" option 812*a*. In response to the user's selection, the electronic device 500 presents an animation of the action user interface expanding to include the sharing user interface, as shown in FIG. 8D.

Figure 8E:
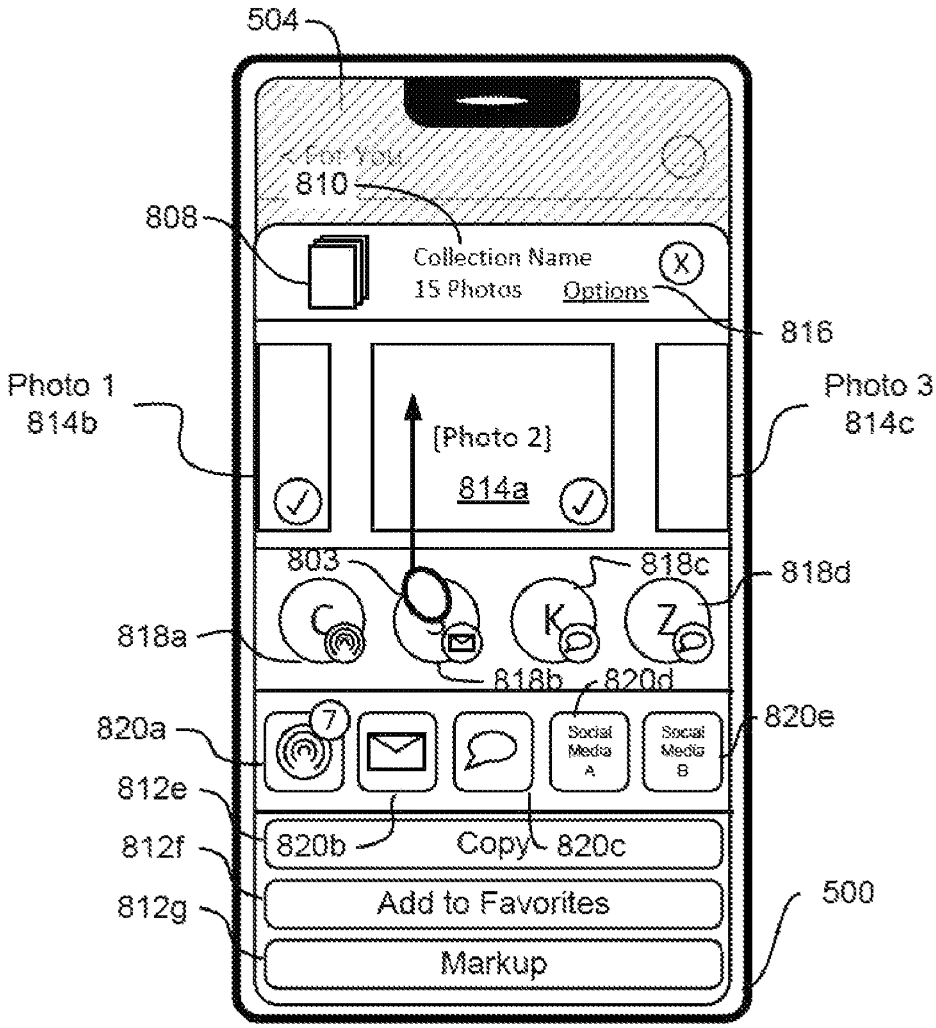

The animation continues until the electronic device 500 presents the sharing user interface within the action user interface, as shown in FIG. 8E. The sharing user interface is presented within the action user interface of the photos application and is overlaid on the user interface of the photos application that includes the collection of photos.

The sharing user interface includes a header region that has the thumbnail 808 representing the collection of photos, the indication 810 of the name of the collection of photos and number of photos in the collection, and a selectable option 816 that, when selected, causes the electronic device 500 to present a settings user interface according to one or more steps of method 1100 described below. The sharing user interface further includes a horizontally scrollable carousel of representations 814*a-c* of photos in the collection of photos that allows the user to de-select one or more photos included in the collection to exclude those photos from being shared (and optionally reselect previously de-selected photos for sharing).

The sharing user interface includes a row of selectable options 818*a-d* that, when selected, causes the electronic device 500 to initiate a process to share the collection of photos with other users and/or other electronic devices. Selectable option 818*a* is selectable to share the content using a wireless network sharing protocol and updates as the orientation of the electronic device 500 changes relative to nearby electronic devices according to one or more steps of method 700, described above. Selectable option 818*b* is selectable to e-mail the collection of photos to another user. Selectable options 818*c-d* are selectable to share the collection of photos with another user via enhanced data-based messaging or text message.

The sharing user interface includes a row of selectable options 820*a-e* that, when selected, cause the electronic device to initiate a process to share the collection of photos using a respective way of sharing the collection of photos. Selectable option 820*a* is selectable to initiate a process to share the collection of photos using the short-range wireless transfer protocol according to one or more steps of method 700. Selectable option 820*b* is selectable to initiate a process to share the collection of photos via e-mail. Selectable option 820*c* is selectable to initiate a process to share the collection of photos via text message or enhanced data-based message. Selectable option 820*d* is selectable to initiate a process to share the collection of photos via a first social media application. Selectable option 820*e* is selectable to initiate a process to share the collection of photos via a second social media application. Unless otherwise stated, the features of options 818*a-d* and 820*a-e* are optionally the same as the features of the corresponding options described in method 700.

The sharing user interface further includes a plurality of selectable options 812*e-g* that, when selected, cause the electronic device 500 to perform a respective non-sharing action with respect to the collection of photos. More specifically, the "Copy" option 812*e* is selectable to copy the collection of photos. The "Add to Favorites" option 812*f* is selectable to add the collection of photos to a list of favorite photo collections. The "Markup" option 812*g* is selectable to add annotations to one or more of the photos in the collection.

As shown in FIG. 8E, the selectable options 812*e-g* included in the sharing user interface are different from the selectable options 812*a-d* illustrated in FIG. 8C in the action user interface. In FIG. 8E, the user scrolls (e.g., with movement of contact 803) the user interface to reveal additional selectable options, as shown in FIG. 8F.

Figure 8F:
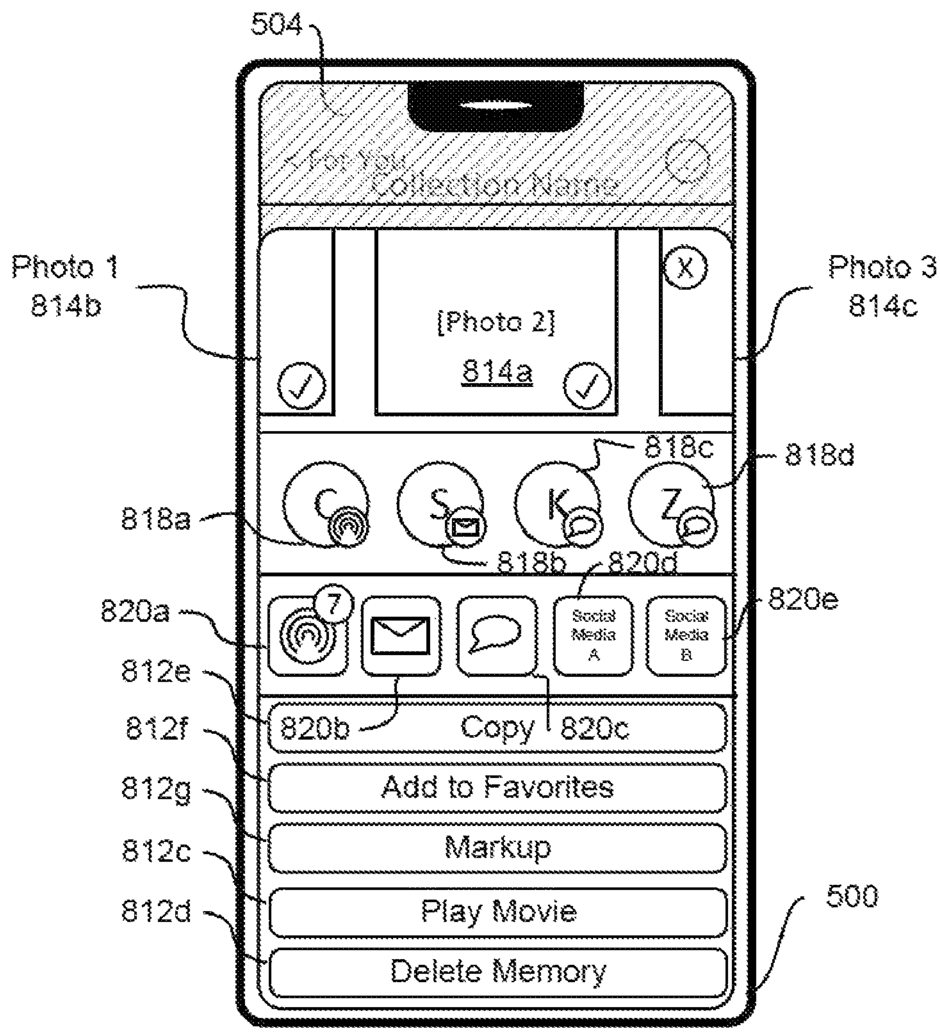

In FIG. 8F, the electronic device 500 presents additional selectable options 812*c-d* in the sharing user interface. More specifically, the electronic device 500 presents the "Play Movie" option 812*c* and the "Delete Memory" option 812*d* described above with reference to FIG. 8C.

In some embodiments, the action user interface and the sharing user interface are system user interfaces that are presented in multiple applications running on the electronic device. Optionally, the various actions included in the action user interfaces and the sharing user interfaces are populated by the application, which enables the actions presented in these user interfaces to be relevant to the application in which these user interfaces are presented.

FIGS. 8G-8J illustrate ways the electronic device 500 presents an action user interface and a sharing user interface in a music browsing application. The action user interface and sharing user interface of the music browsing application share certain characteristics and features of the action user interface and sharing user interface presented in the photo application described above with reference to FIGS. 8A-8F.

Figure 8G:
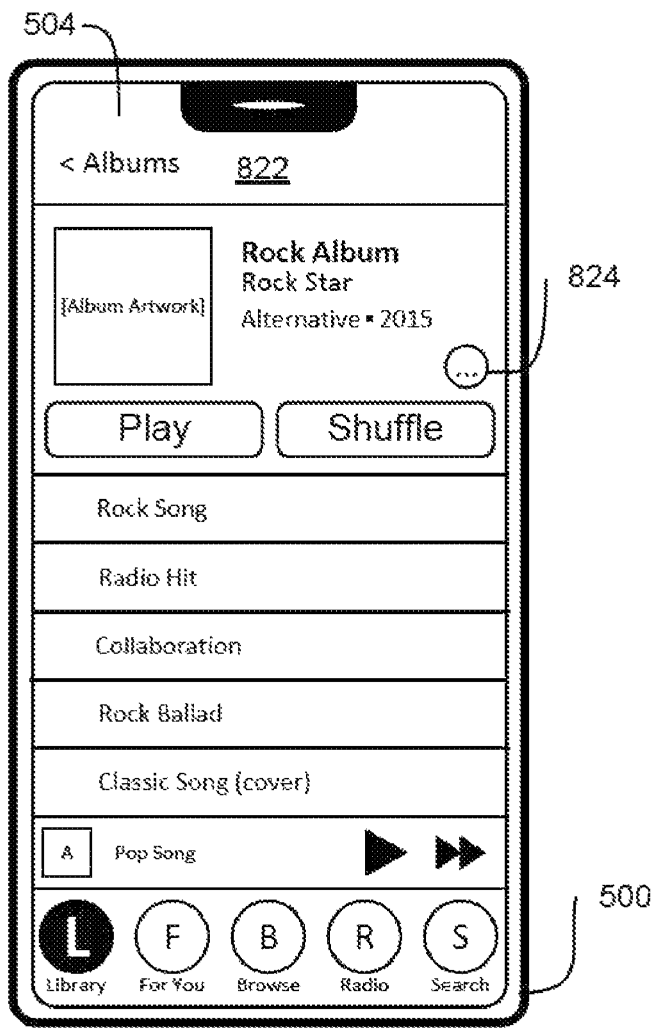
Figure 8H:
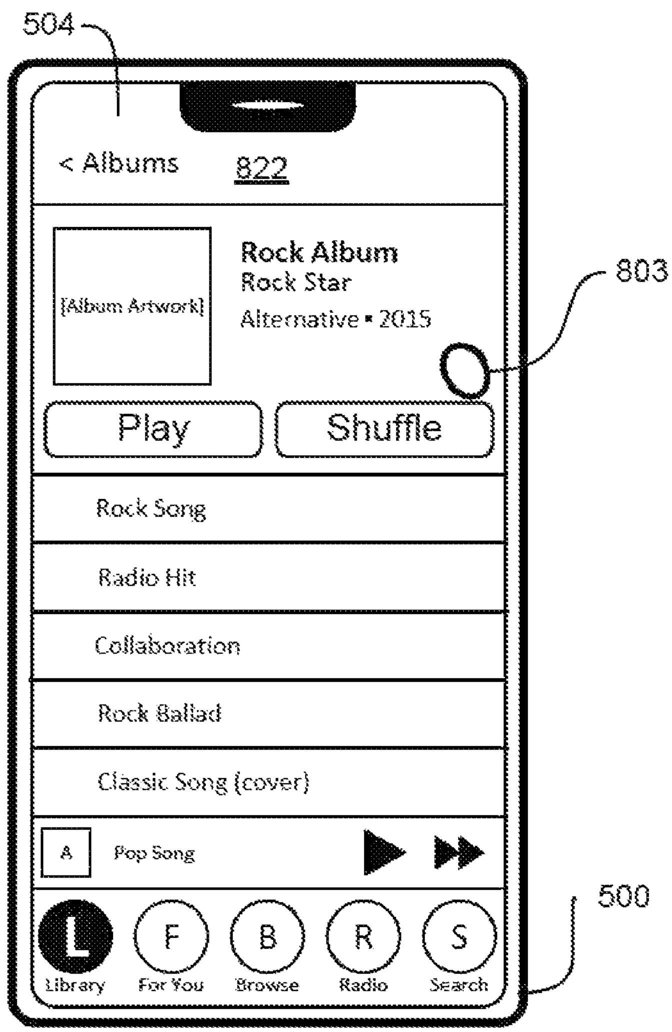

In FIG. 8G, the electronic device 500 presents a music browsing application user interface 822. The user interface 822 includes representations of songs included in an album and selectable options for interacting with the album and the songs in the album. Additionally, the music browsing application user interface 822 includes a selectable option 824 that, when selected, causes the electronic device 500 to present the action user interface of the music application. In FIG. 8H, the user selects (e.g., with contact 803) the option 824 to present the action user interface illustrated in FIG. 8I.

Figure 8I:
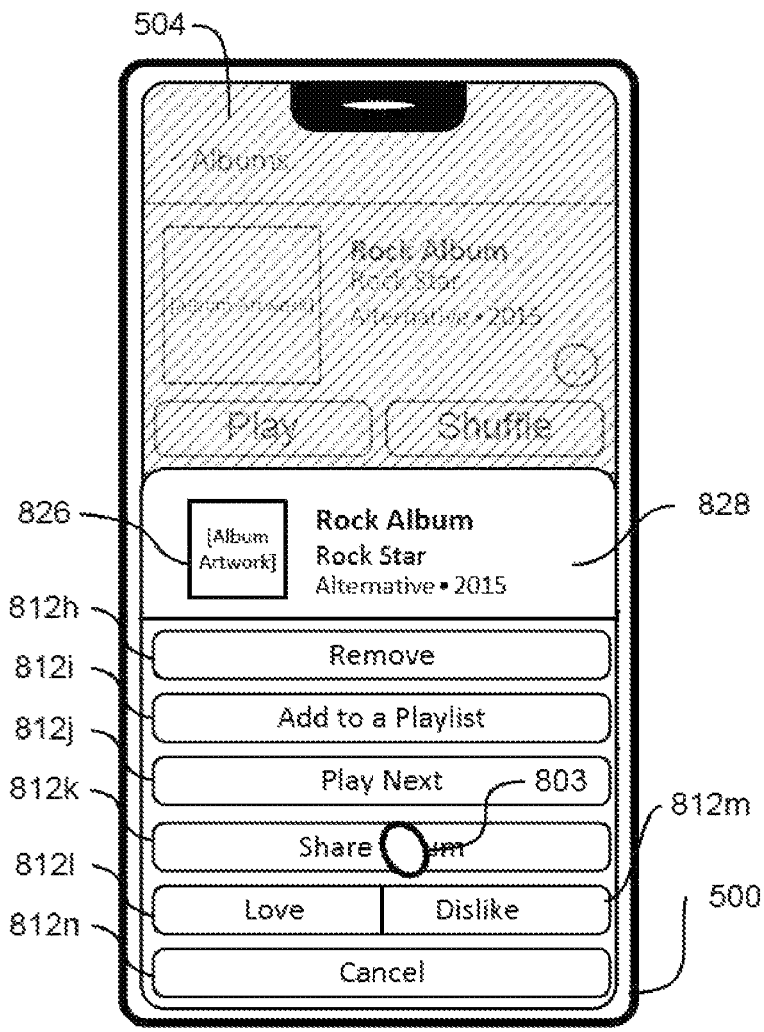

FIG. 8I illustrates the action user interface of the music browsing application, which is displayed overlaid on the music browsing application user interface (e.g., user interface 822 illustrated in FIGS. 8G-8I). The action user interface includes an indication 826 of the album the music browsing application was presenting when the user selected the option 824 to present the action user interface, metadata 828 related to the album, and a plurality of options 812*h*-812*n* that, when selected, causes the electronic device 500 to perform a respective action on the album.

More specifically, the "Remove" option 812*h* is selectable to remove the album from a library of the music browsing application, the "Add to Playlist" option 812*i* is selectable to add the album to a playlist in the music browsing application, the "Play Next" option 812*j* is selectable to play the album next in the music browsing application, the "Share item" option 812*k* is selectable to display the sharing user interface in the music browsing application to share the album, the "Love" option 812*l* is selectable to add the album to a list of music the user loves in the music browsing application, the "Dislike" option 812*m* is selectable to add the album to a list of music the user dislikes in the music browsing application, and the "Cancel" option 812*n* is selectable to stop displaying the action user interface in the music browsing application.

As shown in FIG. 8I, the user selects (e.g., with contact 803) the "Share Item" option 812*k*. In response to the user's selection, the electronic device 500 displays the sharing user interface in the music browsing application, as shown in FIG. 8J.

Figure 8J:
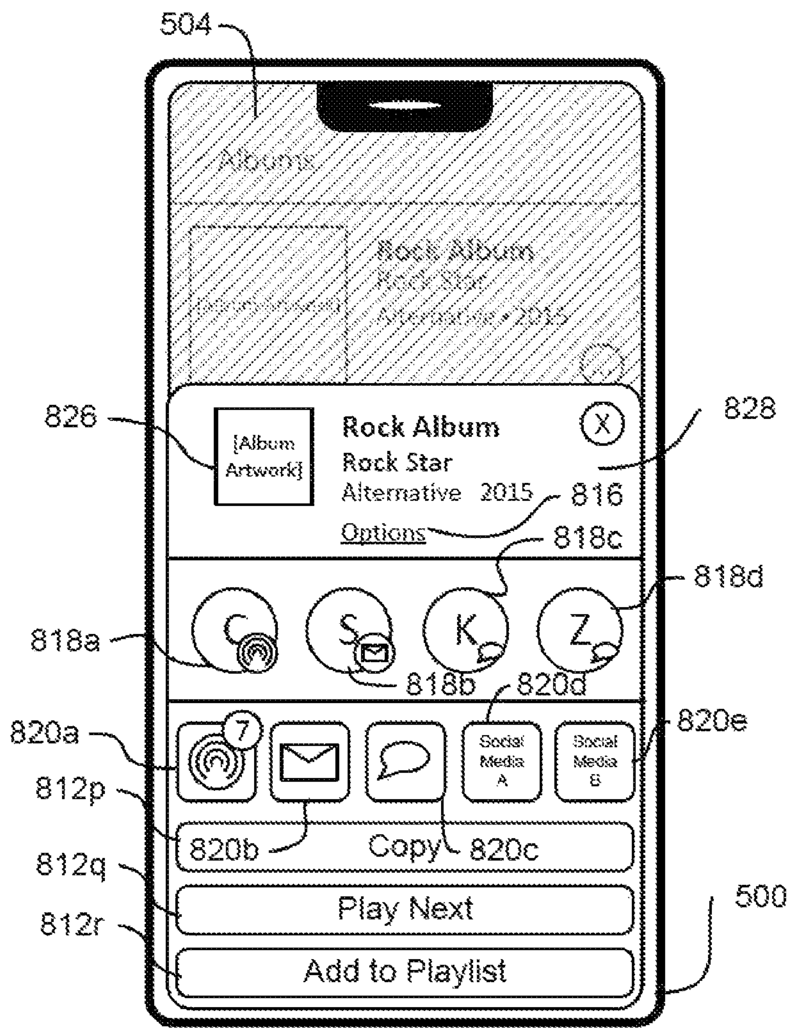

FIG. 8J illustrates the sharing user interface within the music browsing application. The sharing user interface includes a header region including the indication 826 of the album, the metadata 828 related to the album, and the option 816 that is selectable to display the settings user interface according to one or more steps of method 1100 described below. The sharing user interface further includes the sharing options 818*a-d* and 820*a-e* described above with reference to FIGS. 8E-8F and a plurality of options 812*p-r* that, when selected, causes the electronic device 500 to perform a respective action with respect to the album.

More specifically, the "Copy" option 812*p* is selectable to copy the album. The "Play Next" option 812*q* is selectable to play the album next in the music browsing application. The "Add to Playlist" option 812*r* is selectable to add the album to a playlist in the music browsing application.

Figure 9A:
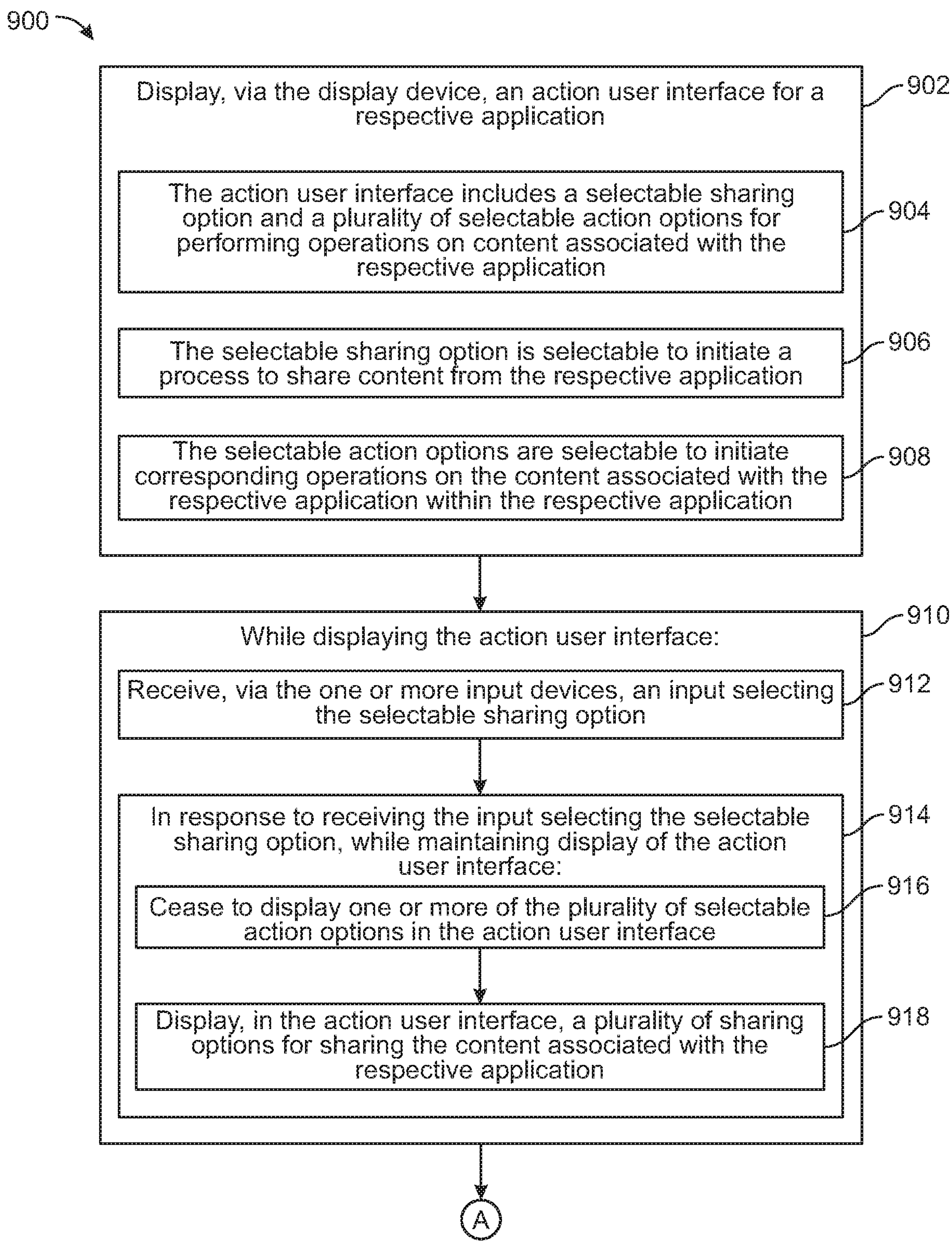
FIGS. 9A-9C are flow diagrams illustrating a method of presenting a sharing user interface within an action user interface of an application in accordance with some embodiments of the disclosure.
Figure 9B:
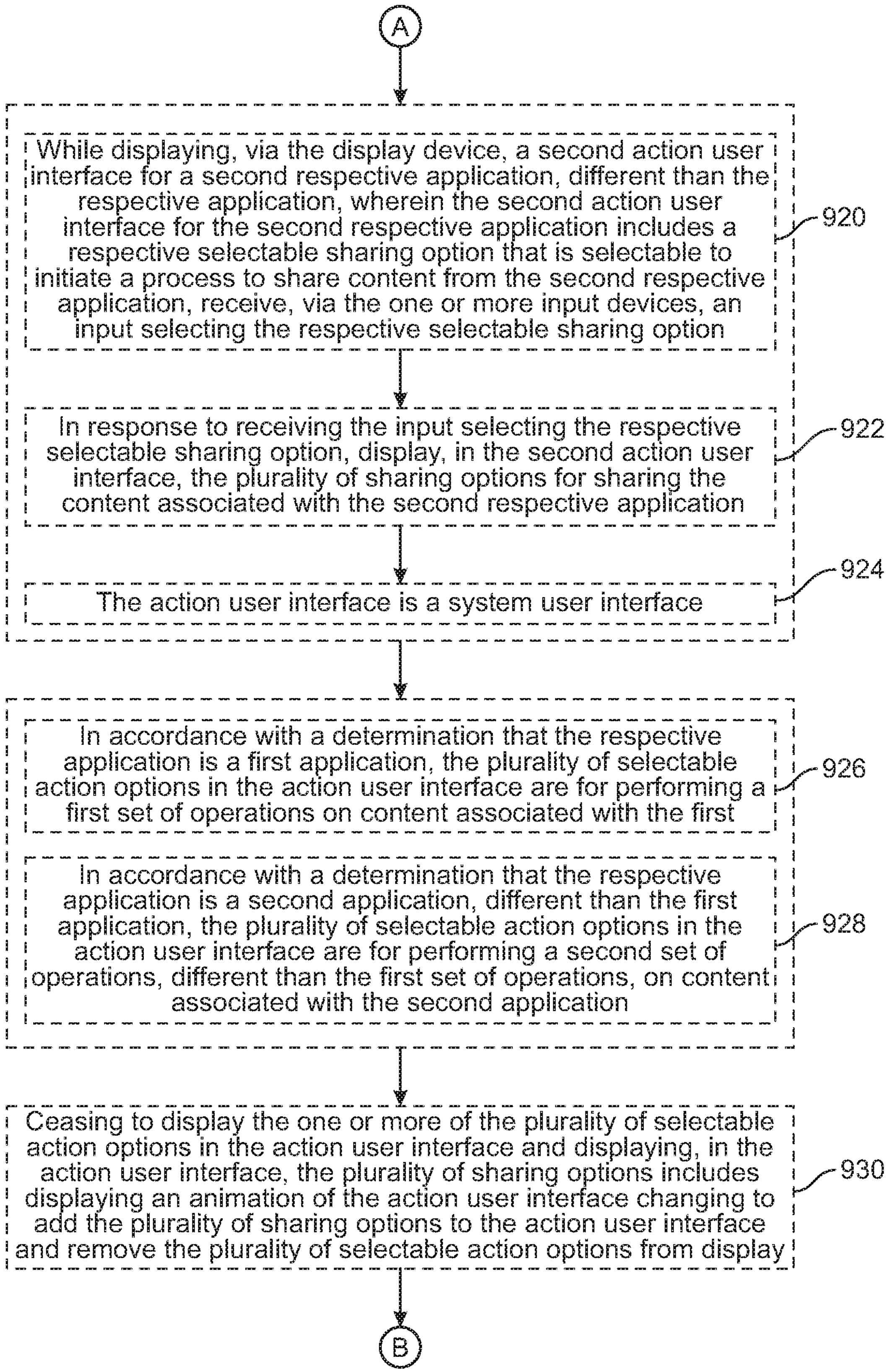
Figure 9C:
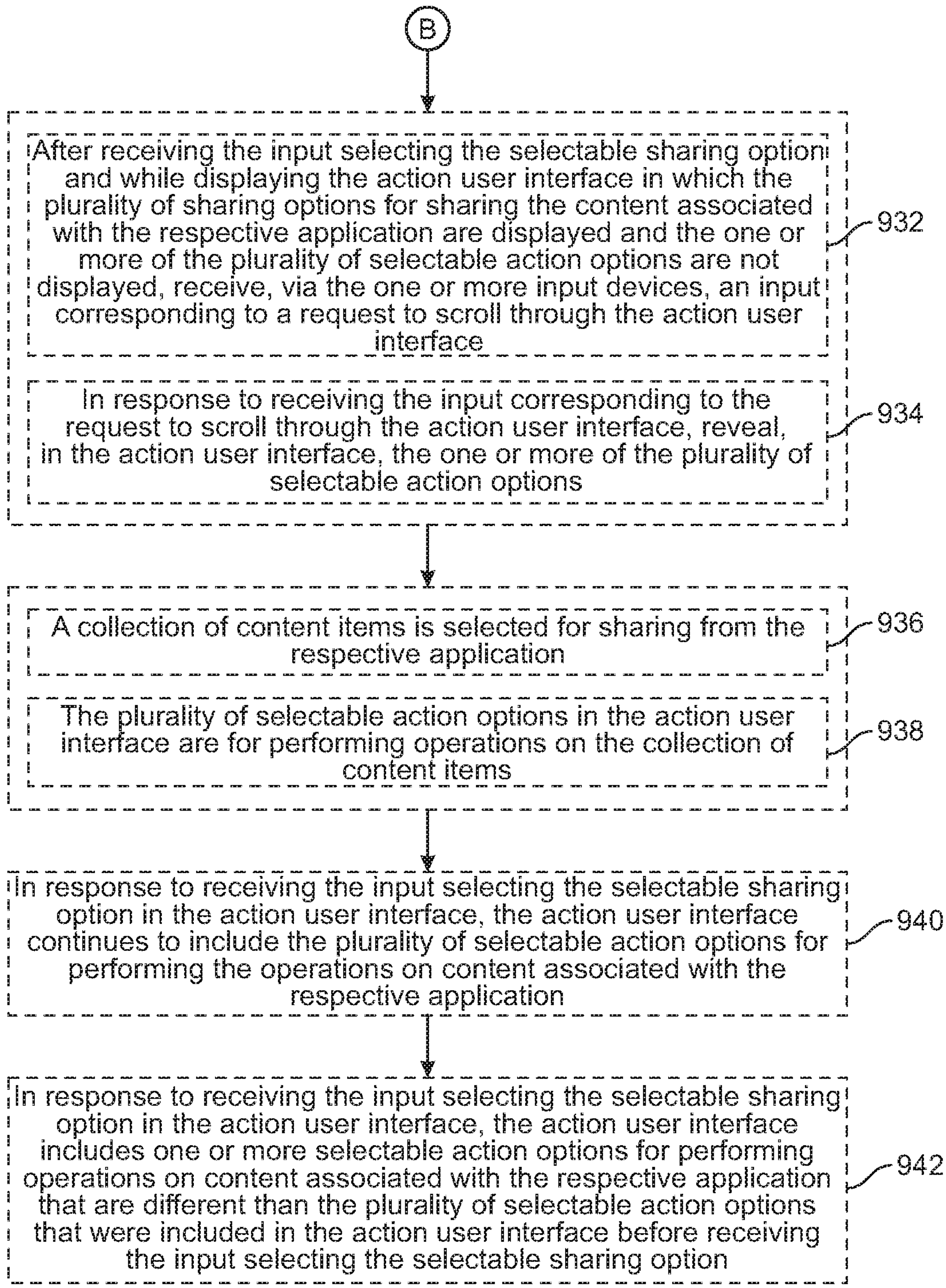

FIGS. 9A-9C are flow diagrams illustrating a method 900 of presenting a sharing user interface within an action user interface of an application in accordance with some embodiments of the disclosure. The method 900 is optionally performed at an electronic device such as device 100, device 300, device 500 as described above with reference to FIGS. 1A-1B, 2-3, 4A-4B and 5A-5H. Some operations in method 900 are, optionally combined and/or order of some operations is, optionally, changed.

In some embodiments, such as in FIG. 8C, a first electronic device 500 in communication with a display device 504 and one or more input devices (e.g., a mobile device (e.g., a tablet, a smartphone, a media player, or a wearable device) including a touch screen or a computer including one or more of a keyboard, mouse, trackpad, and display/touch screen.) displays (902), via the display device 504, an action user interface for a respective application.

In some embodiments, such as in FIG. 8C, the action user interface includes a selectable sharing option 812*b* and a plurality of selectable action options 812*b-d* for performing operations on content associated with the respective application (904).

In some embodiments, such as in FIG. 8C, the selectable sharing option 812*a* is selectable to initiate a process to share content from the respective application (e.g., with a second electronic device or a different user account) (906).

In some embodiments, such as in FIG. 8C, the selectable action options 812*b-d* are selectable to initiate corresponding operations on the content associated with the respective application within the respective application (908). The action user interface is optionally presented in response to a user input received in an application that presents an item of content. In some embodiments, the user input is an input to present a menu of options or an input to perform an action with respect to the content. In some embodiments, the action user interface is overlaid on a user interface of the respective application. For example, an action user interface that is part of a music playing application user interface related to a respective item of content includes selectable options to remove the respective item of content from the music playing application library, add the respective item of content to a playlist, create a station based on the respective item of content, present the lyrics of the respective item of content, add an indication of liking or disliking the respective item of content, present an album or other collection of items of content to which the respective item of content belongs, and initiate a process to share the content.

In some embodiments, such as in FIG. 8C, while displaying the action user interface (910), the first electronic device 500 receives (912), via the one or more input devices, an input selecting the selectable sharing option 812*a*.

In some embodiments, while displaying the action user interface (910), in response to receiving the input selecting the selectable sharing option 812*a* in FIG. 8C, while maintaining display of the action user interface (914), the first electronic device 500 ceases (916) to display one or more of the plurality of selectable action options 812*b-d* in the action user interface and displays (918), in the action user interface, a plurality of sharing options 818*a-d* and 820*a-e* for sharing the content associated with the respective application, such as in FIG. 8E. Optionally, the action user interface is updated to include a plurality of selectable options that, when selected, cause the electronic device to initiate a process to share the respective content with a respective contact of the electronic device, a plurality of selectable options that, when selected, cause the electronic device to initiate a process to share the respective content using a respective transport method (e.g., application or other sharing mechanism), and a plurality of selectable options that, when selected, cause the electronic device to perform a respective non-sharing action with the respective content. As an example, one of the non-sharing actions includes copying the content to a virtual clipboard of the electronic device. As another example, one of the non-sharing actions includes adding the content to a collection of content (e.g., a playlist of media content, an album of photo content, a folder of other content, etc.

The above-described manner of presenting the selectable sharing option within the action user interface allows the electronic device to forgo presenting the one or more options related to sharing the content in the action user interface by presenting the one or more options related to sharing the content in response to detecting selection of the selectable sharing option which simplifies the interaction between the user and the electronic device and enhances the operability of the electronic device and makes the user-device interface more efficient (e.g., by conserving display area of the action user interface for selectable options to perform non-sharing actions), which additionally reduces power usage and improves battery life of the electronic device by enabling the user to use the electronic device more quickly and efficiently. Additionally, the above-described manner of forgoing presenting the sharing options until the input selecting the selectable sharing option is received allows the electronic device to forgo powering up or initiating sharing circuitry (e.g., a wireless transceiver used for Bluetooth or other sharing) until the user input selecting the sharing option is received, which reduces power usage and improves battery life of the electronic device.

In some embodiments, such as in FIG. 8I, while displaying, via the display device 504, a second action user interface for a second respective application, different than the respective application, wherein the second action user interface for the second respective application includes a respective selectable sharing option 812*k* that is selectable to initiate a process to share content from the second respective application, the first electronic device 500 receives (920), via the one or more input devices, an input selecting (e.g., with contact 803) the respective selectable sharing option 812*k*. Optionally, the second action user interface for the second application includes one or more options specific to the second application and one or more options that are the same as one or more options included in the action user interface for the first application. For example, an action user interface of a photos application includes options to share the photos in a respective collection of photos, add the collection of photos to a list of favorite photo collections, play a movie of the collection of photos, and delete the collection of photos. As another example, an action user interface of a music application includes options to remove a collection of songs from the library of the music application, add the collection of songs to another collection of songs, add the collection of songs to a playback queue of the music application, share the collection of songs, add the collection of songs to a list of music the user likes, and add the collection of songs to a list of music the user dislikes. Thus, both action user interfaces optionally include options to share the respective content, add the respective content to a list of collections (e.g., list of favorite photo collections, list of music the user likes), and delete the respective content and each action user interface optionally includes one or more options not included in the other action user interface.

In some embodiments, in response to receiving the input selecting (e.g., with contact 803) the respective selectable sharing option 812*k*, the first electronic device 500 displays (922), in the second action user interface, the plurality of sharing options 818*a-d* and 820*a-e* for sharing the content associated with the second respective application, such as in FIG. 8J. Optionally, the sharing options presented in each action user interface, such as a plurality of options that, when selected, cause the electronic device to share the respective content with a contact stored on the electronic device, and a plurality of options that, when selected, cause the electronic device to initiate a process for sharing the content with a respective application or process. In some embodiments, the sharing user interface displayed in the action user interface and the second action user interface are the same, even though the applications from which the action sheets were displayed are different. In some embodiments, the sharing user interface displayed in the action sheets is a user interface of the operating system of the first electronic device rather than being user interfaces of the various applications (which the action user interfaces optionally are).

The above-described manner of presenting the sharing option in the action user interface of each of the first application and the second application allows the electronic device to present a familiar user interface to the user in response to detecting a user input for initiating a process to share content regardless of in which application the electronic device presented the content, which simplifies the interaction between the user and the electronic device and enhances the operability of the electronic device and makes the user-device interface more efficient (e.g., because the user does not have to take time to learn about how each sharing user interface works), which additionally reduces power usage and improves battery life of the electronic device by enabling the user to use the electronic device more quickly and efficiently.

In some embodiments, such as in FIGS. 8C-8E and 8I-8J, the action user interface is a system user interface (e.g., is not a user interface of the respective application) (924). In some embodiments, the electronic device is able to present an action user interface for each of a plurality of applications that are accessible to the electronic device with selectable options that are populated by the respective application in which the action user interface is displayed. For example, the electronic device presents an action user interface of a music application and an action user interface of a photos application that have the same look and feel and include one or more of the same action options (e.g., sharing content, deleting content, adding the content to another collection)

and one or more application-specific options (e.g., marking up a photo, adding a song to a playback queue, etc.

The above-described manner of presenting an action user interface that is a system user interface allows the electronic device to provide an action user interface including a sharing option for each of a plurality of applications accessible to the electronic device, which reduces power usage and improves battery life of the electronic device by enabling the electronic device to forgo powering up sharing circuitry while presenting an action user interface until the sharing option is selected for each of a plurality of applications accessible to the electronic device.

In some embodiments, such as in FIG. 8C, in accordance with a determination that the respective application is a first application, the plurality of selectable action options 812*a-d* in the action user interface are for performing a first set of operations on content associated with the first application (926). Optionally, the action user interface for the first application includes one or more options not included in an action user interface for a second application. For example, an action user interface of a photos application includes options to share the photos in a respective collection of photos, add the collection of photos to a list of favorite photo collections, play a movie of the collection of photos, and delete the collection of photos. As another example, the action user interface for a music application does not include options to play a movie of a collection of items of content.

In some embodiments, such as in FIG. 8I, in accordance with a determination that the respective application is a second application, different than the first application, the plurality of selectable action options 812*h-m* in the action user interface are for performing a second set of operations, different than the first set of operations, on content associated with the second application (928). Optionally, the action user interface for the second application includes one or more options not included in an action user interface for the first application. For example, an action user interface of a music application includes options to remove a collection of songs from the library of the music application, add the collection of songs to another collection of songs, add the collection of songs to a playback queue of the music application, share the collection of songs, add the collection of songs to a list of music the user likes, and add the collection of songs to a list of music the user dislikes. As another example, the action user interface for a photos application does not include the options to add content to a playback queue.

The above-described manner of presenting, in a respective action user interface, options that are specific to a respective application in which the action user interface is presented allows the electronic device to conserve display area by only including options in the action user interface that are relevant to the application that is currently being displayed by the electronic device, which simplifies the interaction between the user and the electronic device and enhances the operability of the electronic device and makes the user-device interface more efficient (e.g., by enabling the user to find the options that are relevant to the current application with fewer inputs to scroll the action user interface), which additionally reduces power usage and improves battery life of the electronic device by enabling the user to use the electronic device more quickly and efficiently.

In some embodiments, such as in FIG. 8D, ceasing to display the one or more of the plurality of selectable action options 812*b-d* in the action user interface and displaying, in the action user interface, the plurality of sharing options 812*e-g* includes displaying an animation of the action user interface changing to add the plurality of sharing options 812*e-g* to the action user interface and remove the plurality of selectable action options 812*b-d* from display (930). Optionally, the container that includes the one or more selectable action options gradually expands or contracts to fit the size of the sharing user interface while one or more sharing options animate in and one or more non-sharing action options animate out (e.g., are off-display in the action user interface, but can be scrolled to in the action user interface).

The above-described manner of displaying an animation of the action user interface changing to add the plurality of sharing options and remove the plurality of selectable action options allows the electronic device to indicate to the user which options are being added and which options are being removed from the action user interface in response to selection of the share option, which simplifies the interaction between the user and the electronic device and enhances the operability of the electronic device and makes the user-device interface more efficient (e.g., by enabling the user to more quickly locate one or more sharing options that are newly displayed and/or navigate to options that are no longer displayed after the change to the action user interface), which additionally reduces power usage and improves battery life of the electronic device by enabling the user to use the electronic device more quickly and efficiently.

In some embodiments, after receiving the input selecting (e.g., with contact 803) the selectable sharing option 812*a* in FIG. 8C and while displaying the action user interface in which the plurality of sharing options 818*a-d* and 820*a-e* for sharing the content associated with the respective application are displayed and the one or more of the plurality of selectable action options 812-*b-d* are not displayed, such as in FIG. 8E, the first electronic device 500 receives (932), via the one or more input devices, an input corresponding to a request to scroll through the action user interface (e.g., movement of contact 803). Optionally, the electronic device detects selection of the action user interface and a directional user input scrolling the user interface to cease displaying a first portion (e.g., a top portion) of the user interface and begin displaying a second portion (e.g., a bottom portion) of the user interface.

In some embodiments, in response to receiving the input corresponding to the request to scroll through the action user interface (e.g., movement of contact 803), such as in FIG. 8E, the first electronic device 500 reveals (934), in the action user interface, the one or more of the plurality of selectable action options 812*c-d*. Optionally, one or more of the plurality of selectable action options that was displayed in the action user interface before the electronic device received the input selecting the share option are included in the action user interface that includes the sharing options and are accessible by scrolling to the portion of the action user interface that includes the one or more of the plurality of selectable action options.

The above-described manner of presenting the plurality of selectable action options in response to detecting a user input scrolling the user interface allows the electronic device to provide the user with more selectable options in the action user interface that includes the sharing options even if the action options do not fit on the display concurrently with all of the sharing options, which simplifies the interaction between the user and the electronic device and enhances the operability of the electronic device and makes the user-device interface more efficient (e.g., by enabling the user to select one or more of the action options without navigating back in the user interface to the action user interface that does not include the sharing options), which additionally reduces power usage and improves battery life of the electronic device by enabling the user to use the electronic device more quickly and efficiently.

In some embodiments, such as in FIG. 8E a collection of content items (e.g., indicated by thumbnail 808 and text 810) is selected for sharing from the respective application (e.g., a collection of photos in a photos application (e.g., a photo memory collection, a photo album collection), an album of songs in a music application (e.g., an album or playlist)) (936).

In some embodiments, such as in FIG. 8E, the plurality of selectable action options 812*e-g* in the action user interface are for performing operations on the collection of content items (938). Optionally, in response to detecting selection of one of the plurality of selectable action options, the electronic device performs the corresponding action on the collection of content items. For example, in response to detecting selection of a sharing option to share a collection of photos via e-mail, the electronic device initiates a process to share the collection via an email (e.g., as opposed to actions applied to individual content items in the collection).

The above-described manner of performing the selected action on the collection as a whole in response to detecting selection of the action option allows the electronic device to perform the action on all of the items of content in response to one sequence of one or more user inputs, which simplifies the interaction between the user and the electronic device and enhances the operability of the electronic device and makes the user-device interface more efficient (e.g., by reducing the number of inputs needed to apply the action to all of the items of content in the collection compared to applying the action to each item in the collection one-by-one), which additionally reduces power usage and improves battery life of the electronic device by enabling the user to use the electronic device more quickly and efficiently.

In some embodiments, in response to receiving the input selecting (e.g., with contact 803) the selectable sharing option 812*a* in the action user interface, such as in FIG. 8C, the action user interface continues to include the plurality of selectable action options 812*c-d* for performing the operations on content associated with the respective application (940), such as in FIG. 8F. Optionally, portions of the action user interface that are not displayed, but that can be scrolled to, include the same selectable action options that were included before the input selecting the selectable sharing option was received. For example, the action user interface of a music application includes selectable options to remove a collection of songs from the library of the music application, add the collection of songs to another collection of songs, add the collection of songs to a playback queue of the music application, share the collection of songs, add the collection of songs to a list of music the user likes, and add the collection of songs to a list of music the user dislikes prior to detecting selection of the option to share. In response to detecting selection of the option to share the collection of songs, the electronic device optionally presents one or more sharing options in the action user interface but does not initially present the selectable options that had been presented before detecting selection of the option to share the collection of songs. In some embodiments, in response to detecting an input to scroll the action user interface that includes the one or more options for sharing the collection of songs, the electronic device presents one or more of the options to remove a collection of songs from the library of the music application, add the collection of songs to another collection of songs, add the collection of songs to a playback queue of the music application, share the collection of songs, add the collection of songs to a list of music the user likes, and add the collection of songs to a list of music the user dislikes.

The above-described manner of including the plurality of selectable action options in the action user interface that includes the plurality of sharing options allows the electronic device to enable the user to select one of the action options even after the sharing user interface is displayed in the action user interface, which simplifies the interaction between the user and the electronic device and enhances the operability of the electronic device and makes the user-device interface more efficient (e.g., by enabling the user to select one or more of the action options without entering one or more inputs to navigate backward in the action user interface to display the action user interface that does not include the one or more sharing options), which additionally reduces power usage and improves battery life of the electronic device by enabling the user to use the electronic device more quickly and efficiently.

In some embodiments, in response to receiving the input selecting (e.g., with contact 803) the selectable sharing option 812*a* in the action user interface, such as in FIG. 8C, the action user interface includes, such as in FIG. 8E, one or more selectable action options 812*e-g* for performing operations on content associated with the respective application that are different than the plurality of selectable action options 812*b-d* that were included in the action user interface before receiving the input selecting the selectable sharing option 812*a* (942) in FIG. 8C. Optionally, prior to receiving the input selecting the selectable sharing option, the one or more action options are selectable to perform an action on a respective collection of items (e.g., an album of photos or a memory collection of photos) and after receiving the input selecting the selectable sharing option, the one or more action options are selectable to perform an action on the individual items of content (e.g., subsets of content items) in the collection (e.g., the photos in an album or memory collection). For example, prior to receiving the input selecting the selectable sharing option, the electronic device presents options to add the collection of photos to a list of favorite photo collections, play a movie of the collection of photos, and delete the collection of photos, and after detecting selection of the selectable sharing option, the electronic device presents options to copy the photos and mark up one or more of the photos.

The above-described manner of presenting different action options before and after detecting selection of the selectable sharing option allows the electronic device to provide options for managing the content in a non-sharing context before the selectable sharing option is detected and provide options for managing the content in a sharing context after the selectable sharing option is detected which simplifies the interaction between the user and the electronic device and enhances the operability of the electronic device and makes the user-device interface more efficient (e.g., by enabling the user to more quickly find the actions for managing the respective content in a non-sharing context when the user has not selected the option to share the content and enabling the user to more quickly find the actions for managing the respective content in the sharing context when the user has selected the selectable sharing option), which additionally reduces power usage and improves battery life of the electronic device by enabling the user to use the electronic device more quickly and efficiently.

It should be understood that the particular order in which the operations in FIGS. 9A-9C have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 701, and 1100) are also applicable in an analogous manner to method 900 described above with respect to FIGS. 9A-9C. For example, the ways the electronic device presents the sharing user interface within the action user interface of the application described above with reference to method 900 optionally have one or more of the characteristics of updating a sharing option in response to detecting a change in the electronic device's orientation relative to other electronic devices, presenting an indication to change the orientation of the electronic device, presenting one or more options for changing one or more settings before sharing an item of content, etc., described herein with reference to other methods described herein (e.g., methods 700, 701, and 1100). For brevity, these details are not repeated here.

The operations in the information processing methods described above are, optionally, implemented by running one or more functional modules in an information processing apparatus such as general purpose processors (e.g., a as described with respect to FIGS. 1A-1B, 3, 5A-5H) or application specific chips. Further, the operations described above with reference to FIGS. 9A-9F are, optionally, implemented by components depicted in FIGS. 1A-1B. For example, displaying operations 902, 916, and 918 and receiving operations 912, 920, 932 are, optionally, implemented by event sorter 170, event recognizer 180, and event handler 190. Event monitor 171 in event sorter 170 detects a contact on touch screen 504, and event dispatcher module 174 delivers the event information to application 136-1. A respective event recognizer 180 of application 136-1 compares the event information to respective event definitions 186, and determines whether a first contact at a first location on the touch screen corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Presenting Options for Modifying One or More Settings Prior to Sharing Content Users interact with electronic devices in many different manners, including sharing content with other users or electronic devices. The embodiments described below provide ways in which an electronic device presents one or more options for changing one or more settings related to the content before sharing the content. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

FIGS. 10A-10BB illustrate exemplary ways in which an electronic device 500 presents one or more options for changing one or more settings associated with an item of content before sharing the content in accordance with some embodiments of the disclosure. The embodiments in these figures are used to illustrate the processes described below, including the processes described with reference to FIGS. 11A-11F.

FIG. 10A illustrates a photos user interface that presents a plurality of photos in a collection. The photos user interface includes an indication 1004 of the name of a collection of photos presented in the photos user interface, a selectable option 1002 that, when selected, causes the electronic device 500 to display an action user interface of the photos application according to one or more steps of method 900 described above, a selectable option 1006 that, when selected, causes the electronic device 500 to present a sharing user interface, and a selectable option 1008 that, when selected, causes the electronic device 500 to delete the collection of photos (but not the photos themselves).

As shown in FIG. 10A, the user selects (e.g., with contact 1003) the option 1006 to present the sharing user interface. FIG. 10B illustrates the sharing user interface displayed in response to the user's selection.

In FIG. 10B, the electronic device 500 presents a sharing user interface that includes a header region, a carousel of representations 1016*a-c* of photos to be shared, a plurality of options 1018*a-d* for sharing the photo collection with other users, a plurality of options 1020*a-e* for sharing the photo collection using a respective way of sharing, and a plurality of options 1022*a-c* for performing non-sharing actions with the collection of photos. Generally speaking, options 1018*a-d* and 1022*a-e* optionally function similarly to similar options described above with respect to methods 700 and 900.

More specifically, the header region includes a thumbnail image 1010 representing the collection of photos, an indication 1012 of metadata of the photo collection, and a selectable option 1014 that, when selected, causes the electronic device 500 to present a user interface including a plurality of selectable options for modifying one or more characteristics of the collection of photos before sharing the collection of photos. The settings user interface will be described in more detail below.

The selectable options 1018*a-d* for sharing the collection of photos with other users includes an option 1018*a* to share the photo collection using a wireless network sharing protocol, an option 1018*b* to share the photo collection with a respective user via e-mail, and options 1018*c-d* for sharing the photo collection via respective users via text message or enhanced data-based message. selectable option 1018*a* is presented according to one or more steps of method 700 described above.

The selectable options 1020*a-e* include an option 1020*a* to initiate a process to share the collection of photos via the wireless network sharing protocol, an option 1020*b* to initiate a process to share the collection of photos via e-mail, an option 1020*c* to initiate a process to share the collection of photos with text message or enhanced data-based messaging, an option 1020*d* to initiate a process to share the collection of photos with a first social media application, and an option 1020*e* to initiate a process to share the collection of photos with a second social media application. In response to detecting selection of option 1020*a*, the electronic device 500 presents a wireless network sharing protocol user interface according to one or more steps of method 700 described above.

The action options 1022*a-c* include a "Copy" option 1022*a* that is selectable to copy the collection of photos, an "Add to Favorites" option 1022*b* that is selectable to add the collection of photos to a list of favorite photo collections, and a "Markup" option 1022*c* that is selectable to add annotations to one or more of the photos in the collection.

The sharing user interface further includes a carousel of representations 1016*a-c* of the photos in the collection. Each representation 1016*a-c* includes a toggle that enables the user to de-select one or more photos to forgo sharing one or more of the photos when sharing the collection of photos (or subsequently reselect photos for sharing).

As shown in FIG. 10B, the user selects (e.g., with contact 1003) the selectable option 1014 to present the settings user interface. In response to the user's selection, the electronic device 500 presents the settings user interface illustrated in FIG. 10C.

As shown in FIG. 10C, the settings user interface includes a plurality of selectable options 1040*a* that, when selected, causes the electronic device 500 to change a respective setting of the photos in the collection before sharing the collection. The selectable options include a plurality of options 10401*a-e* associated with sharing various metadata along with the photos. More specifically, the "Location Data" option 1040*a* is selectable to toggle sharing of location metadata associated with the photos. The "Overcapture" option 1040*b* is selectable to toggle sharing of all overcapture footage of one or more of the photos in the collection. The "Depth Information" option 1040*c* is selectable to toggle sharing of depth information associated with the photos. The "Edit History" option 1040*d* is selectable to toggle sharing of editing history metadata associated with the photos. The "Keywords" option 1040*e* is selectable to toggle sharing of keyword metadata associated with the photos.

The selectable options include a plurality of options 1040*f*-1040*g* that are selectable to modify the format in which the photos are shared. More specifically, the "Individual Photos" option 1040*f* is selectable to share the photos as individual photos directly with the other electronic device (e.g., transferring the files including each photo from the electronic device 500 to the other electronic device). The "Cloud Link" option 1040*g* is selectable to upload the photos to a server with a web address (if not already on the server) and share a link to the web address with the other electronic device.

The settings user interface further includes a "Done" option 1036 that, when selected, causes the electronic device 500 to save the changes to the one or more settings selected in the settings user interface. Additionally, the settings user interface includes a representation 1038 of the collection of photos. As shown in FIG. 10C, the user selects (e.g., with contact 1003) the option 1040*a* to toggle the sharing of location data associated with the photos.

In response to the user's selection in FIG. 10C, the electronic device 500 updates the representation 1038 of the photos to include an indication 1042*a* that location data will not be shared when the photos are shared. As shown in FIG. 10D, the user selects (e.g., with contact 1003) the "Done" option 1036 to save the change of the location data setting. In response to the user's selection, the electronic device 500 presents the sharing user interface, as shown in FIG. 10E.

FIG. 10E illustrates the settings user interface after the location data setting has been changed by the user. The metadata 1012 in the header region of the user interface has been updated to include an indication that the photos will be shared with the location data removed. As shown in FIG. 10E, the user selects (e.g., with contact 1003) the option 1020*b* to initiate a process to share the photos using e-mail. In response to the user's selection, the electronic device 500 presents an e-mail application illustrated in FIG. 10F.

FIG. 10F illustrates an e-mail application. The e-mail application includes a user interface 1052 from which the user is able to compose a new e-mail with the photos attached. Thus, the user interface 1052 includes images 1054*a-b* of the photos in the body of the e-mail. Although not shown in FIG. 10F, it should be understood that the e-mail optionally includes images of the remaining photos in the collection. The user is able to modify the new e-mail, such as by adding one or more recipients, adding a subject, and modifying the body of the e-mail, before sending the e-mail with the photos attached. Because the user turned off location data sharing, the photos included in the e-mail will not include location metadata.

FIG. 10G illustrates the sharing user interface after the user turns off location sharing for the selected photos as shown in FIG. 10C. Thus, the indication 1012 of the metadata includes an indication that location data will not be shared. As shown in FIG. 10G, the user selects (e.g., with contact 1003) the option 1020*c* to initiate a process to share the photos using text message or enhanced data-based message.

In response to the user's selection in FIG. 10G, the electronic device 500 presents the messaging user interface 1056 illustrated in FIG. 10H. The messaging user interface 1056 includes a draft message including an image 1054*a* of one of the photos. It should be understood that the draft message is scrollable to view images of the other photos in the collection. The user is able to modify the message before sending it to specify one or more recipients and add text to the message. When the user sends the message, the message will include images of each of the photos in the memory with the location metadata removed.

Although the user is able to remove the location data from the photos before sharing them, removing the location data in this way does not remove the location data from the collection of photos or the photos themselves stored on electronic device 500. As shown in FIG. 10I, the electronic device 500 presents the collection of photos in the photos user interface. The user interface includes the indication of the location metadata of the photos. As shown in FIG. 10I, the user selects (e.g., with contact 1003) the option 1006 to present the sharing user interface.

FIG. 10J illustrates the sharing user interface. As shown in FIG. 10J, the user selects one of the toggles on a representation a respective photo. In response to the user's selection, the electronic device 500 configures the sharing user interface to share the other photos in the collection without sharing the respective photo.

Figure 10K:
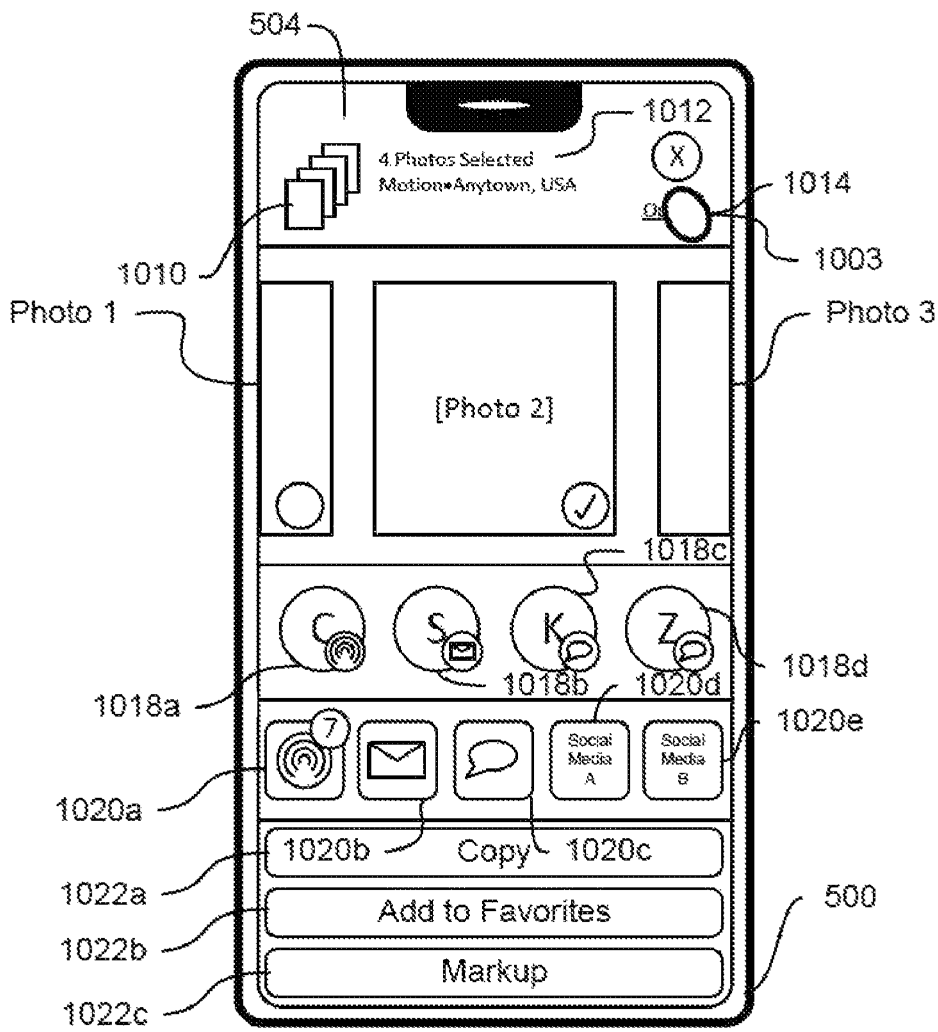

As shown in FIG. 10K, in response to the user's selection, the electronic device 500 updates the header region 1012 to indicate that 4 photos will be shared. The header region 1012 no longer includes an indication of the name of the collection because the full collection will not be shared. The user selects (e.g., with contact 1003) the option 1014 to present the settings user interface.

Figure 10L:
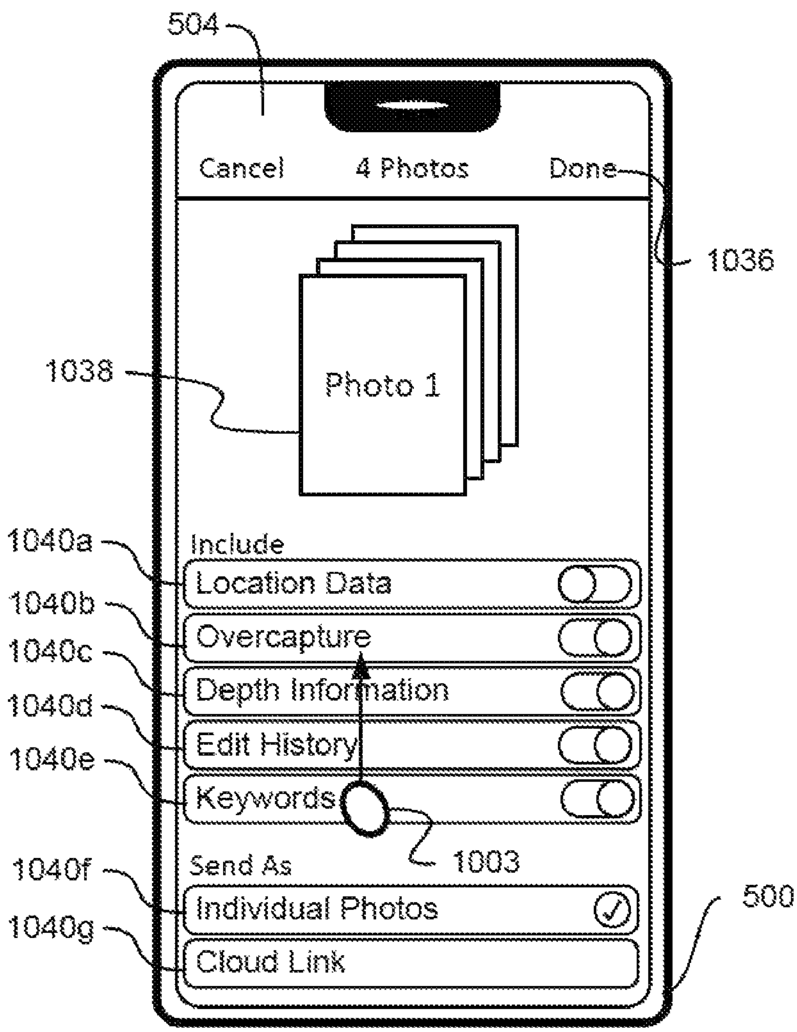

In response to the user's selection in FIG. 10K, the electronic device 500 presents the settings user interface illustrated in FIG. 10L. As shown in FIG. 10L, the user scrolls (e.g., with movement of contact 1003) the user interface. In response to the user's scrolling in FIG. 10L, the electronic device 500 presents an additional portion of the settings user interface shown in FIG. 10M.

Figure 10M:
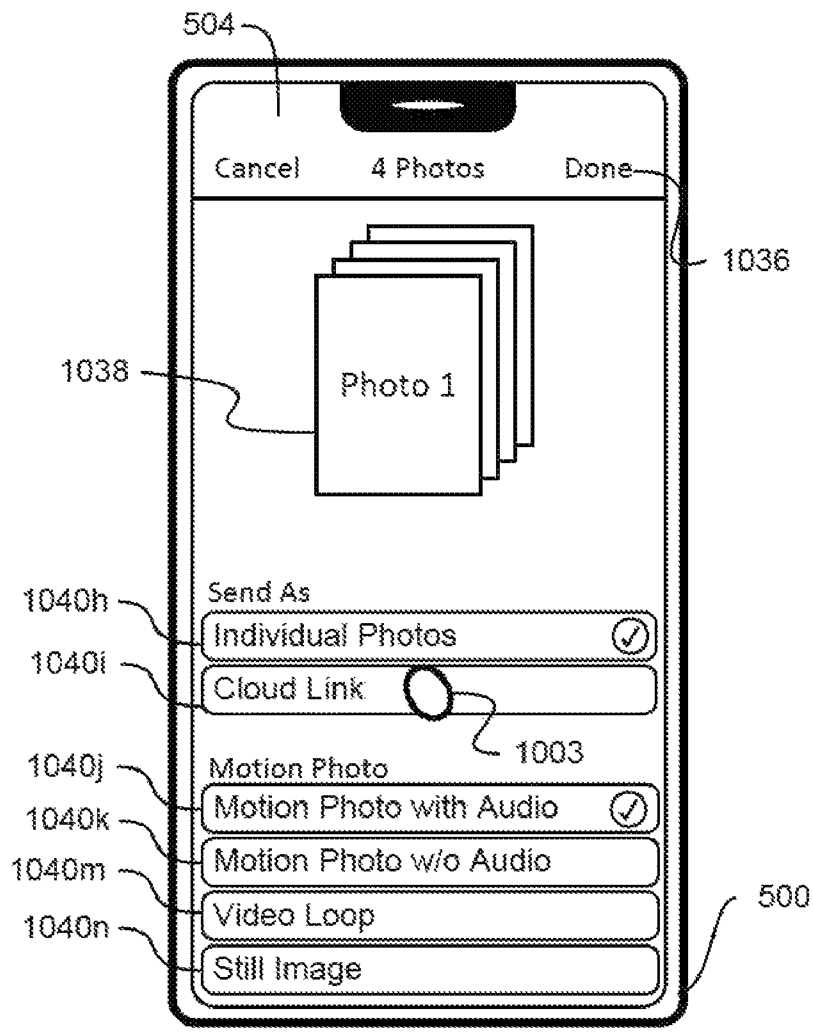

More specifically, as shown in FIG. 10M, the electronic device 500 scrolls to a portion of the user interface that includes selectable options 1040*j-n* that are selectable to modify which content of motion photos will be shared. A motion photo includes a photo that is one of the frames of video content that is also included in the motion photo. The option 1040*j* to share the photo, video content and audio of the motion photo is currently selected. The user interface further includes an option 1040*k* to share the photo and the video content; an option 1040*m* to share the video content only as a looped video, and an option 1040*n* to share the photo only.

Figure 10N:
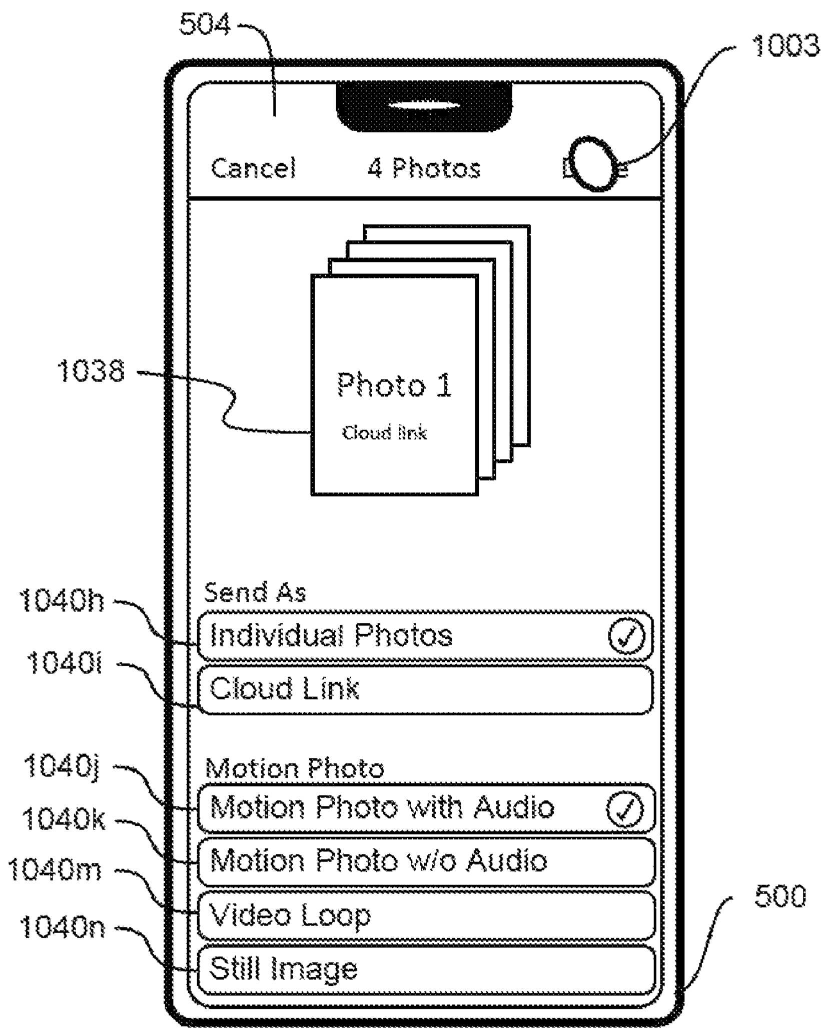

As shown in FIG. 10M, the user selects (e.g., with contact 1003) the option 1040*i* to share the photos as a link to download the photos from cloud storage. In response to the user's selection, the electronic device 500 updates the indication 1038 of the photos to indicate that the photos will be shared as a link to download the photos from cloud storage, as shown in FIG. 10N. The user selects (e.g., with contact 1003) the "Done" option 1036 to save the changes to the settings before proceeding to share the content.

Figure 10O:
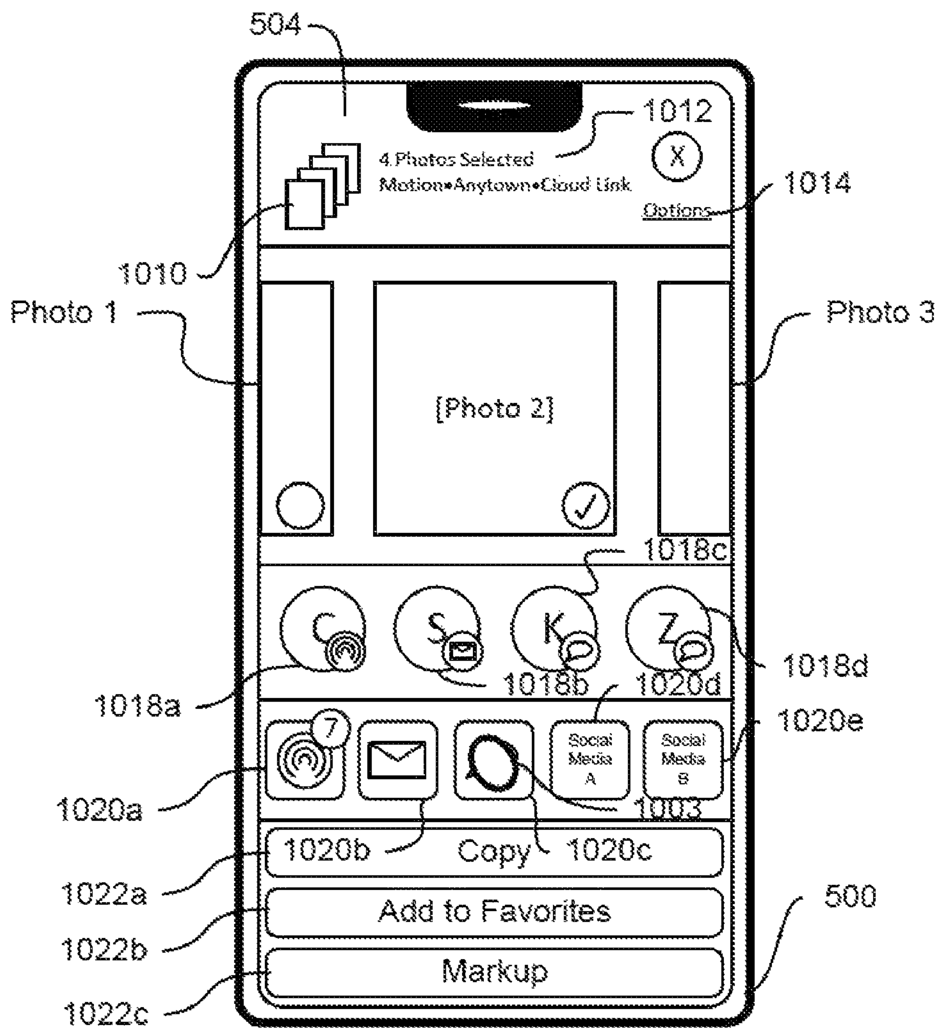

In response to the user's selection in FIG. 10N, the electronic device 500 presents the sharing user interface illustrated in FIG. 10O. The sharing user interface includes an indication in the header region 1012 that the photos will be shared as a cloud link. As shown in FIG. 10O, the user selects (e.g., with contact 1003) the option 1020*c* to share the content as a text message or enhanced data-based message.

Figure 10P:
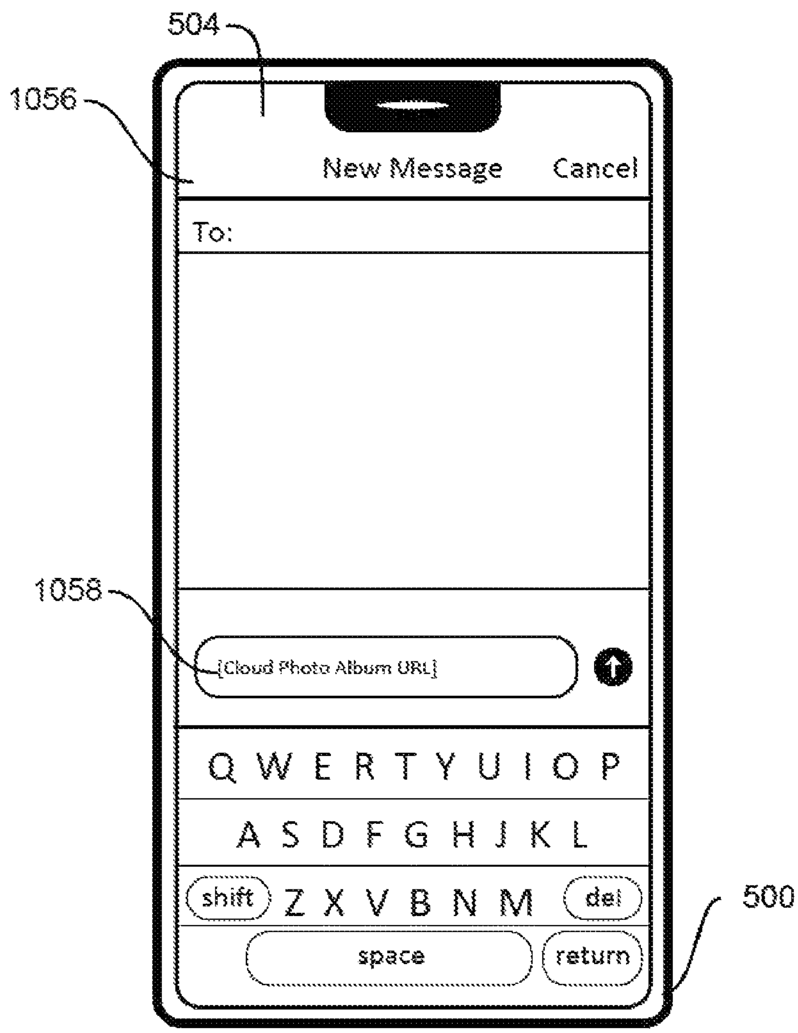

In response to the user's selection in FIG. 10O, the electronic device 500 presents the messaging user interface 1056 illustrated in FIG. 10P. The messaging user interface 1056 includes the message field pre-populated with the link 1058 to download the photos from cloud storage. The user is able to add one or more recipients to the message, add additional text to the body of the message, and send the message including the link to download the photos to the one or more recipients.

Figure 10Q:
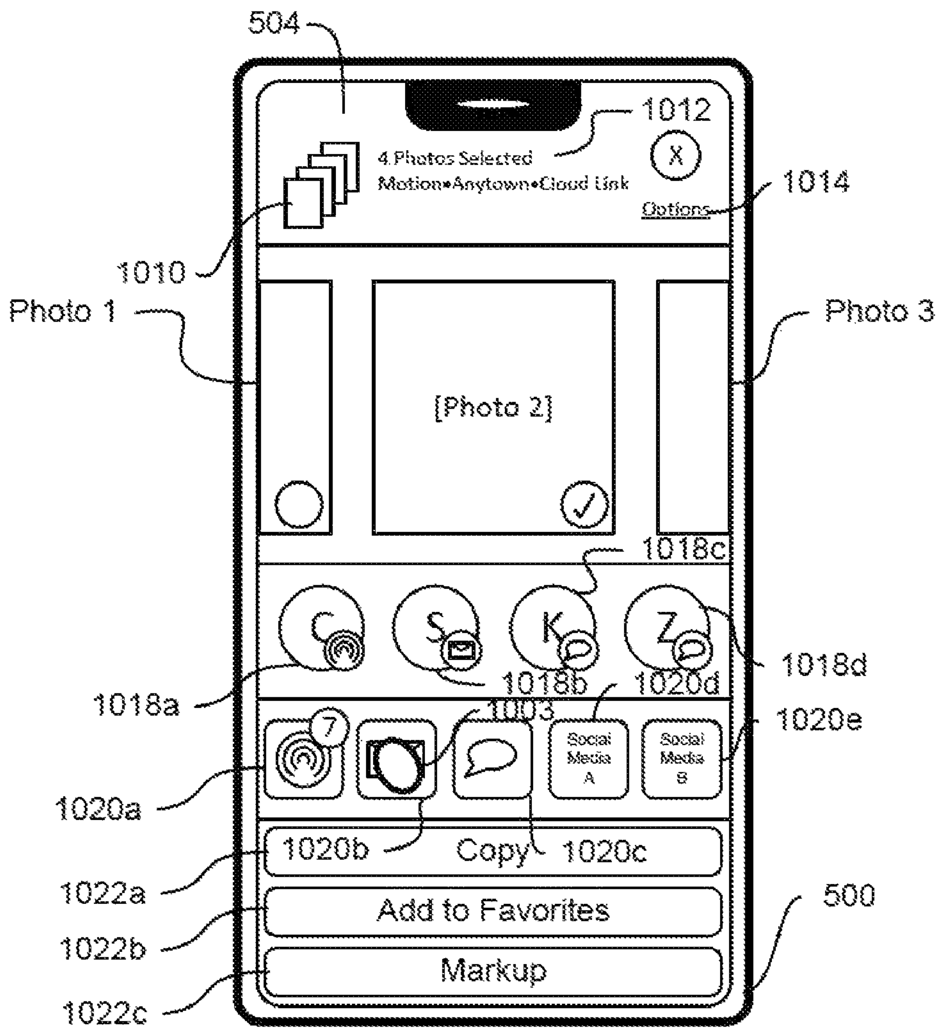
Figure 10R:
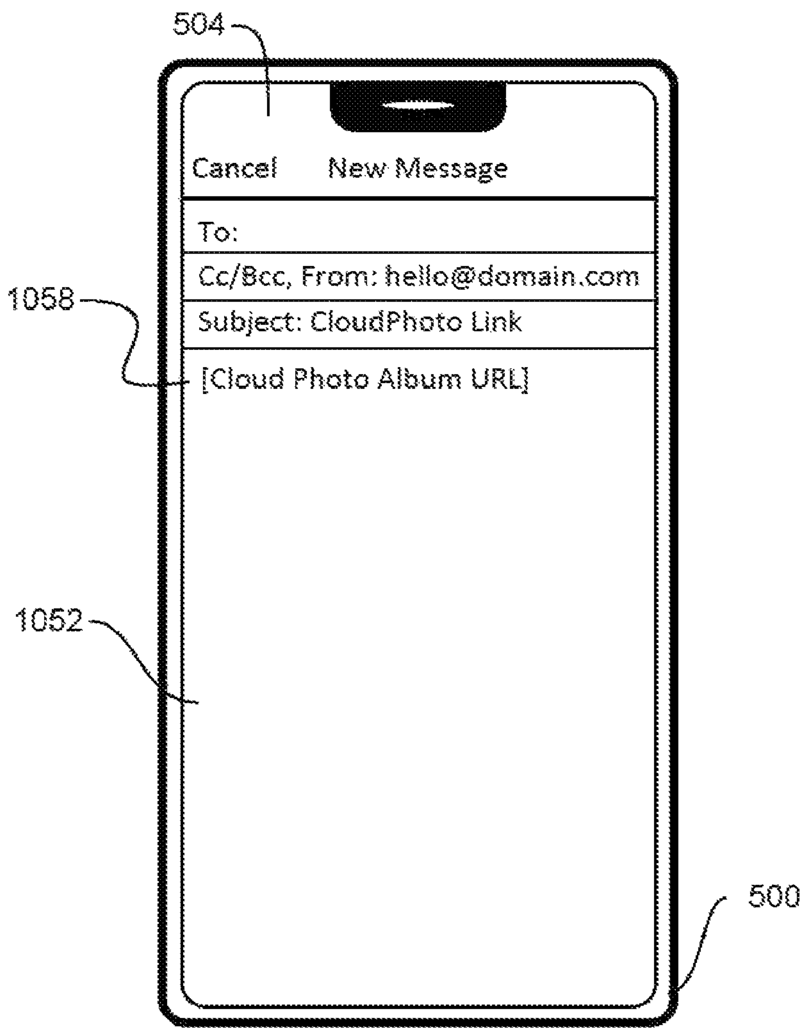

The user is able to share the link to download the photos in ways other than by text message or enhanced data-based messaging, such as via e-mail, as shown in FIGS. 10Q-10R. In FIG. 10Q, the electronic device 500 presents the sharing user interface after the user has changed the sharing options according to FIGS. 10M-10N. In FIG. 10Q, the user selects (e.g., with contact 1003) the option 1020*b* to share the link to download the photos from cloud storage via e-mail.

In response to the user's selection in FIG. 10Q, the electronic device 500 presents the e-mail user interface 1052 illustrated in FIG. 10R. As shown in FIG. 10R, the e-mail user interface 1052 includes, in the body of the e-mail, the URL 1058 to download the photos from cloud storage. The e-mail user interface 1052 also includes a pre-populated subject line (e.g., "CloudPhoto Link"). The user is able to add one or more recipients and edit the subject and body of the e-mail before sending the link to download the photos from cloud storage to the one or more recipients.

Figure 10S:
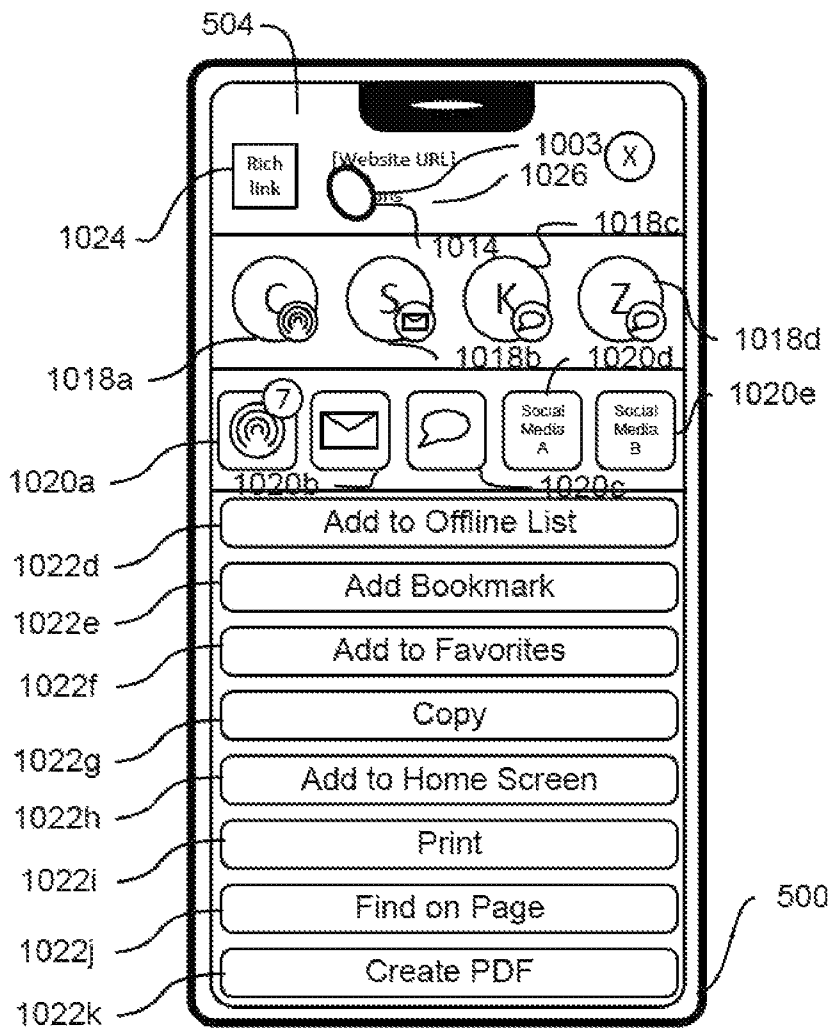

The electronic device 500 is able to present sharing user interfaces with different sharing options for a variety of types of content. FIGS. 10S-10BB illustrate the sharing user interfaces and sharing options for types of content other than photos shared from a photos application on the electronic device 500.

Figure 10T:
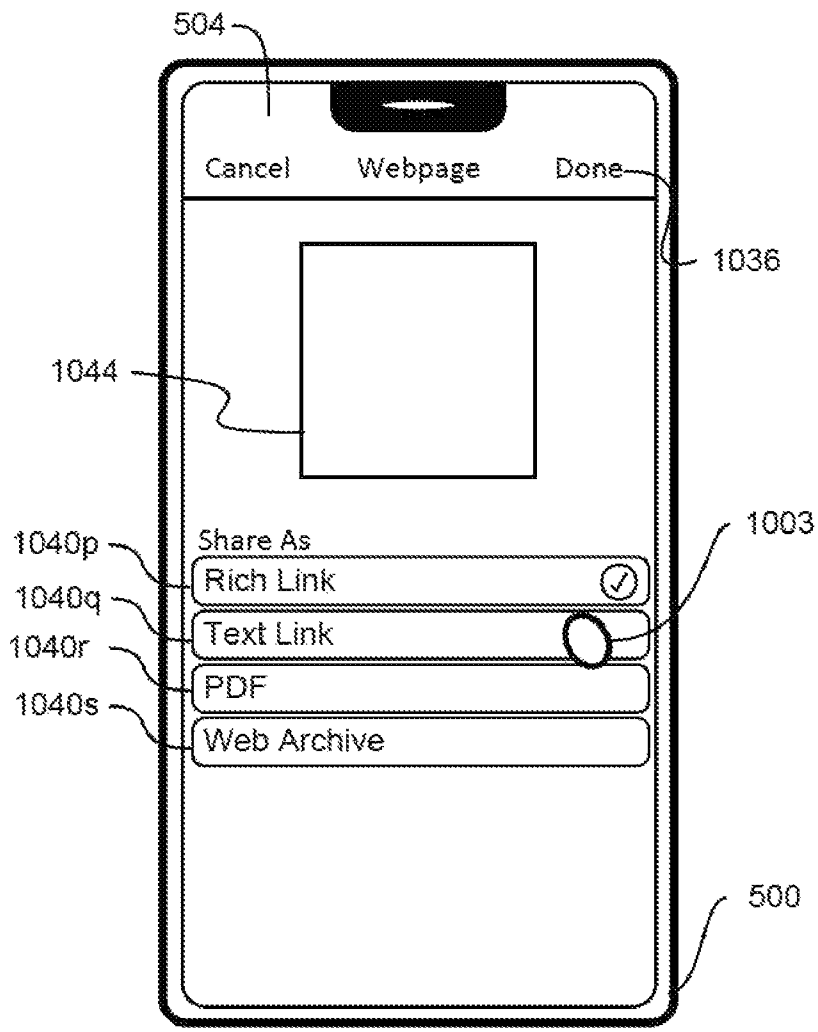
Figure 10U:
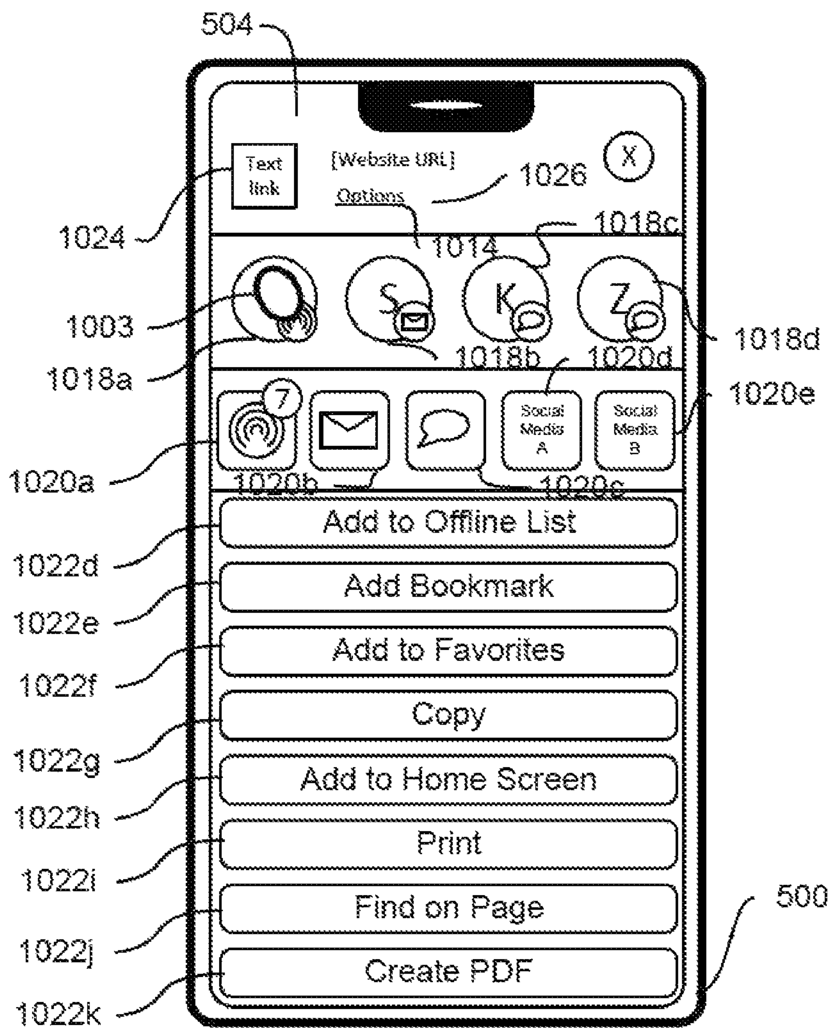

FIGS. 10S-10U illustrate the sharing user interface and settings user interface for sharing a link to a website. In FIG. 10S, the electronic device 500 presents the sharing user interface for sharing a link to a website. The sharing user interface includes an indication 1024 of the website to be shared, and indication 1026 of the website URL, and an option 1014 to view the settings user interface before sharing in the header region of the sharing user interface. The sharing user interface further includes selectable options 1018*a-d* and 1020*a-e* that, when selected, cause the electronic device 500 to initiate a process to share the content in a respective manner and selectable options 1022*d-k* that, when selected, causes the electronic device 500 to perform a respective non-sharing action with respect to the website. More specifically, the sharing user interface includes an option 1022*d* to save the website to a list for offline reading, an option 1022*e* to add a bookmark to the website to a web browsing application on the electronic device 500, an option 1022*f* to add the website to a list of favorite websites in the web browsing application on the electronic device 500, an option 1022*g* to copy the link to the website to a clipboard of the electronic device 500, an option 1022*h* to add an icon to the home screen that links to the website, an option 1022*i* to print the website, an option 1022*j* to search for a term on the webpage, and an option 1022*k* to create a PDF of the website.

As shown in FIG. 10S, the user selects (e.g., with contact 1003) the option 1014 to view the settings user interface to change a setting of the content before sharing the content. In response to the user's selection, the electronic device 500 presents the settings user interface in FIG. 10T.

As shown in FIG. 10T, the settings user interface includes a representation 1044 of the content and options 1040*p-s* for selecting the format in which the website URL will be shared. The options include an option 1040*p* to share the website as a rich link, an option 1040*q* to share the website as a text link, an option 1040*r* to share the website as a PDF, and an option 1040*s* to share the website as a web archive. As shown in FIG. 1040*q*, the user selects (e.g., with contact 1003) the option 1040*q* to share the website as a text link.

FIG. 10U illustrates the sharing user interface after the user has made the setting change illustrated in FIG. 10T. In FIG. 10U, the sharing user interface indicates with indication 1024 that the website will be shared as a text link. The user selects (e.g., with contact 1003) the option 1018*a* to share the content using the wireless network sharing protocol. In response to the user's selection, the electronic device 500 shares the content with the wireless network sharing protocol according to one or more steps of method 700.

Figure 10V:
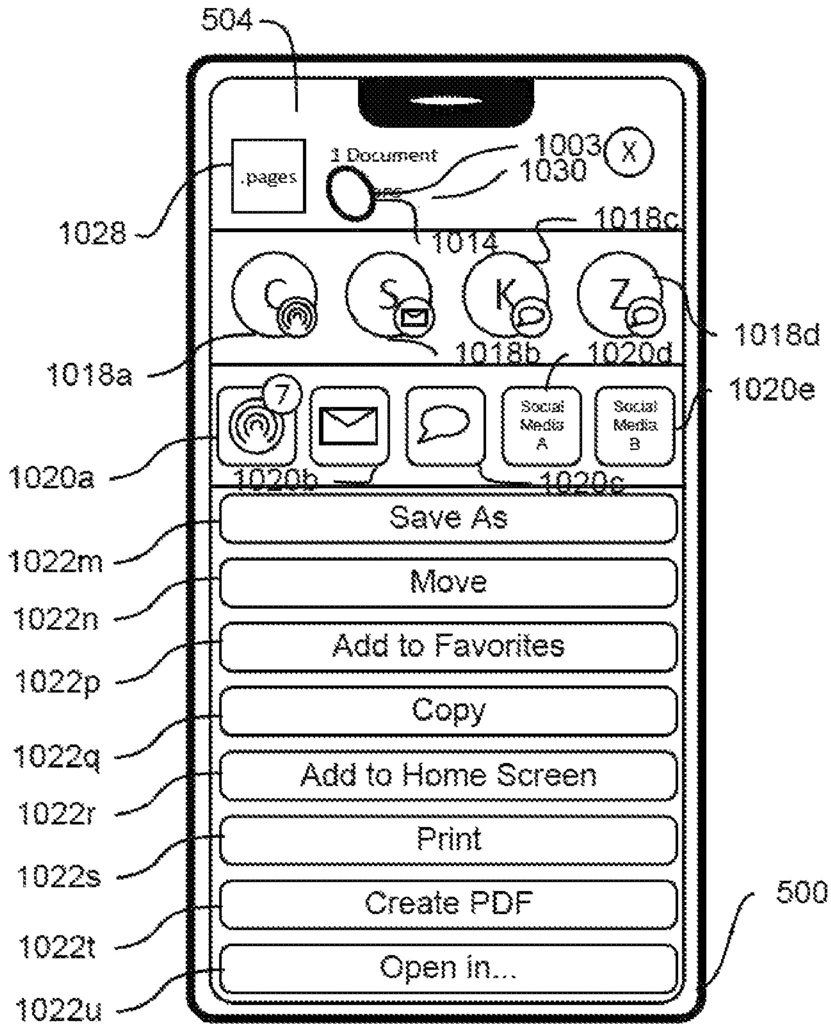
Figure 10W:
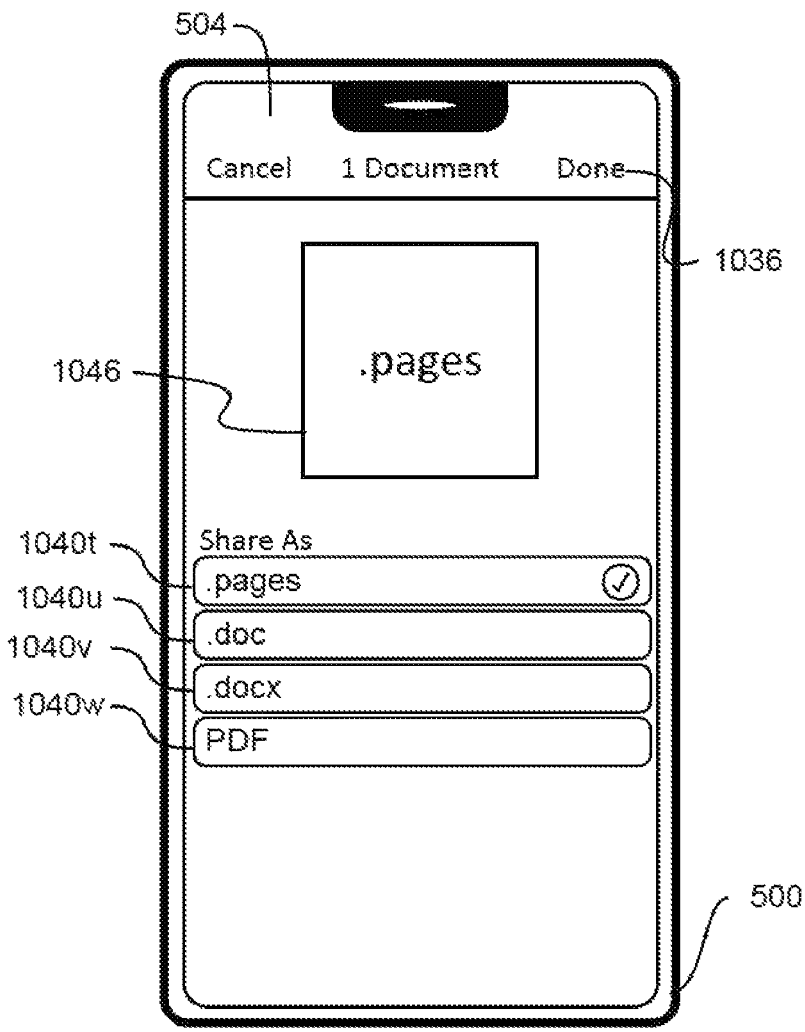

FIGS. 10V-10W illustrate the electronic device 500 displaying the sharing user interface and the settings user interface for sharing a document. In FIG. 10V, the electronic device 500 presents the sharing user interface for sharing the document. The sharing user interface includes a header region that has a thumbnail 1028 representing the document, an indication 1030 of the document, and an option 1014 to view the settings user interface. The sharing user interface also includes the options 1018*a-d* and 1020*a-e* for sharing the document in a variety of ways and a plurality of options 1022*m-u* that, when selected, causes the electronic device 500 to perform a respective non-sharing action with the document. More specifically, the sharing user interface includes an option 1022*m* to save a copy of the document in another location, an option 1022*n* to move the document to a different location, an option 1022*p* to add the document to a list of favorite documents on the electronic device 500, an option 1022*q* to copy the document, an option 1022*r* to add a shortcut to the document to the home screen, an option

1022*s* to print the document, an option 1022*t* to create a PDF of the document, and an option 1022*u* to open the document in another application.

As shown in FIG. 10V, the user selects (e.g., with contact 1003) the option 1014 to view the settings user interface to change one or more settings of the document before sharing the document. In response to the user's selection, the electronic device 500 presents the settings user interface shown in FIG. 10W.

The settings user interface illustrated in FIG. 10W includes a thumbnail 1046 representing the document and a plurality of options 1040*t-w* for changing the file type of the document before sharing the document. More specifically, the settings user interface includes an option 1040*t* to share the document in ".pages" format, an option 1040*u* to share the document in ".doc" format, and an option 1040*v* to share the document in "PDF" format. The user is able to change the file type and share the document in manner similar to the manners described above in FIGS. 10A-10U.

Figure 10X:
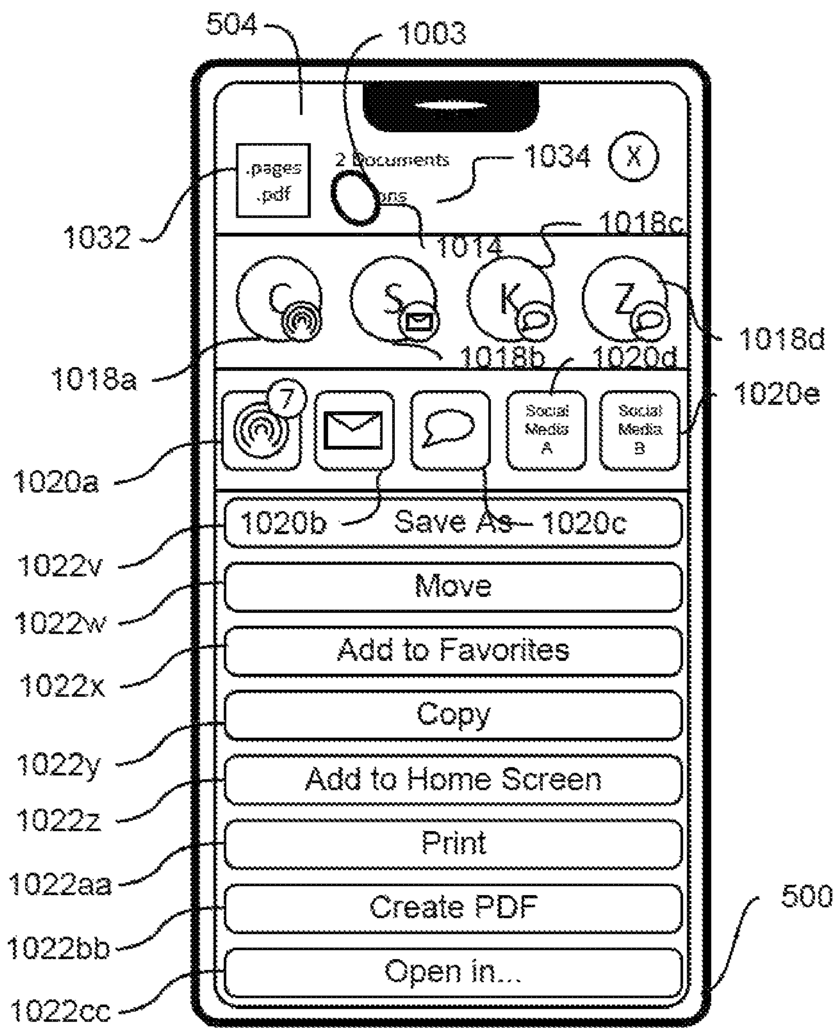

FIG. 10X illustrates the sharing user interface for sharing multiple documents with different file extensions. As shown in FIG. 10X, the sharing user interface includes a header region that includes a thumbnail 1032 representing the documents to be shared, an indication 1034 of the number of documents to be shared, and the option 1014 that is selectable to present the settings user interface. The sharing user interface includes selectable options 1018*a-d* and 1020*a-e* that, when selected, causes the electronic device 500 to share the documents in a respective manner and selectable options 1022*v-cc* that, when selected, causes the electronic device 500 to perform a respective non-sharing action with respect to the documents. More specifically, the sharing user interface includes an option 1022*v* to save a copy of the document in another location, an option 1022*w* to move the document to a different location, an option 1022*x* to add the document to a list of favorite documents on the electronic device 500, an option 1022*y* to copy the document, an option 1022*z* to add a shortcut to the document to the home screen, an option 1022*aa* to print the document, an option 1022*bb* to create a PDF of the document, and an option 1022*cc* to open the document in another application.

Figure 10Y:
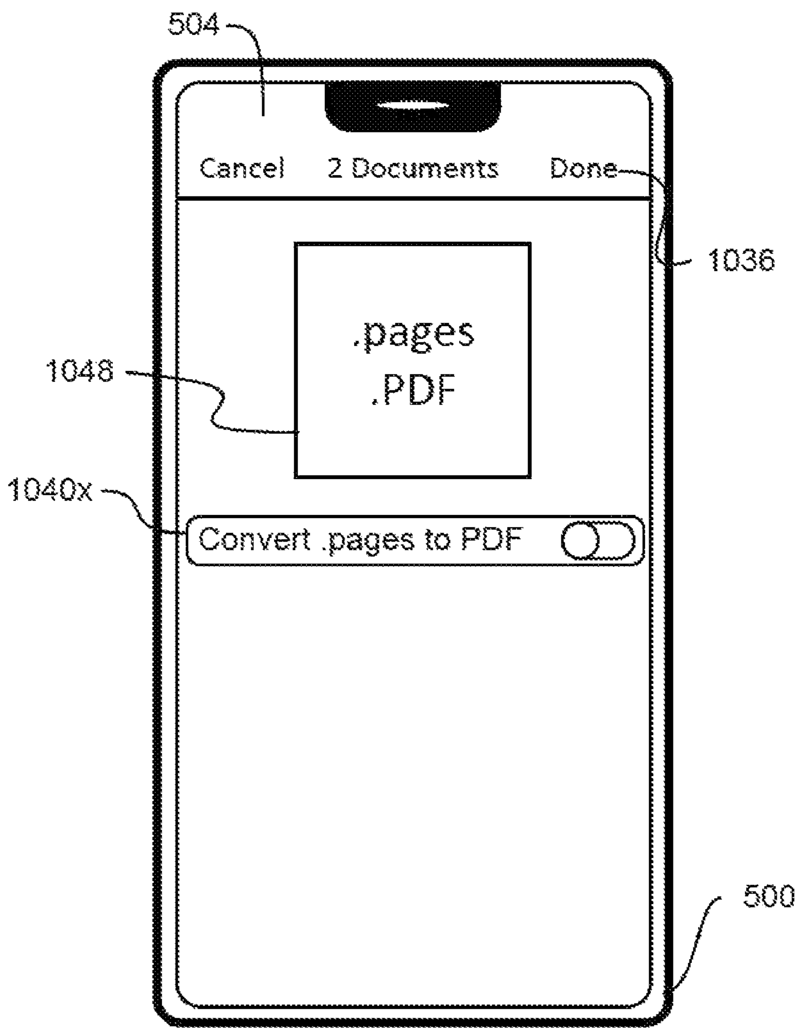

As shown in FIG. 10X, the user selects (e.g., with contact 1003) the option 1014 to view the settings user interface. In response to the user's selection, the electronic device 500 presents the settings user interface illustrated in FIG. 10Y. As shown in FIG. 10Y, the settings user interface includes an option 1040*x* to convert the pages file to a PDF, a thumbnail 1048 representing the documents to be shared, and the "Done" option 1036 that, when selected, causes the electronic device 500 to save the settings and return to the sharing user interface illustrated in FIG. 10X. The settings in the settings user interface are optionally populated based on the types of files to be shared. For example, the electronic device 500 is able to share both the ".pages" and ".pdf" files as a PDF (e.g., ".pdf"), so the electronic device 500 presents the option 1040*x* to share both files as a PDF.

Figure 10Z:
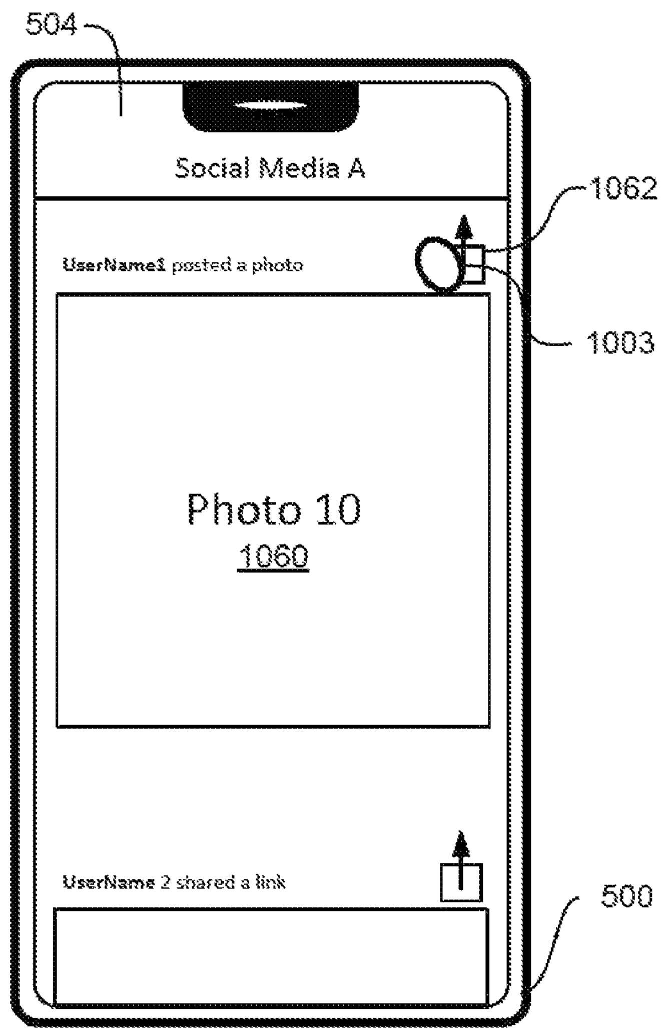
Figure 10A:
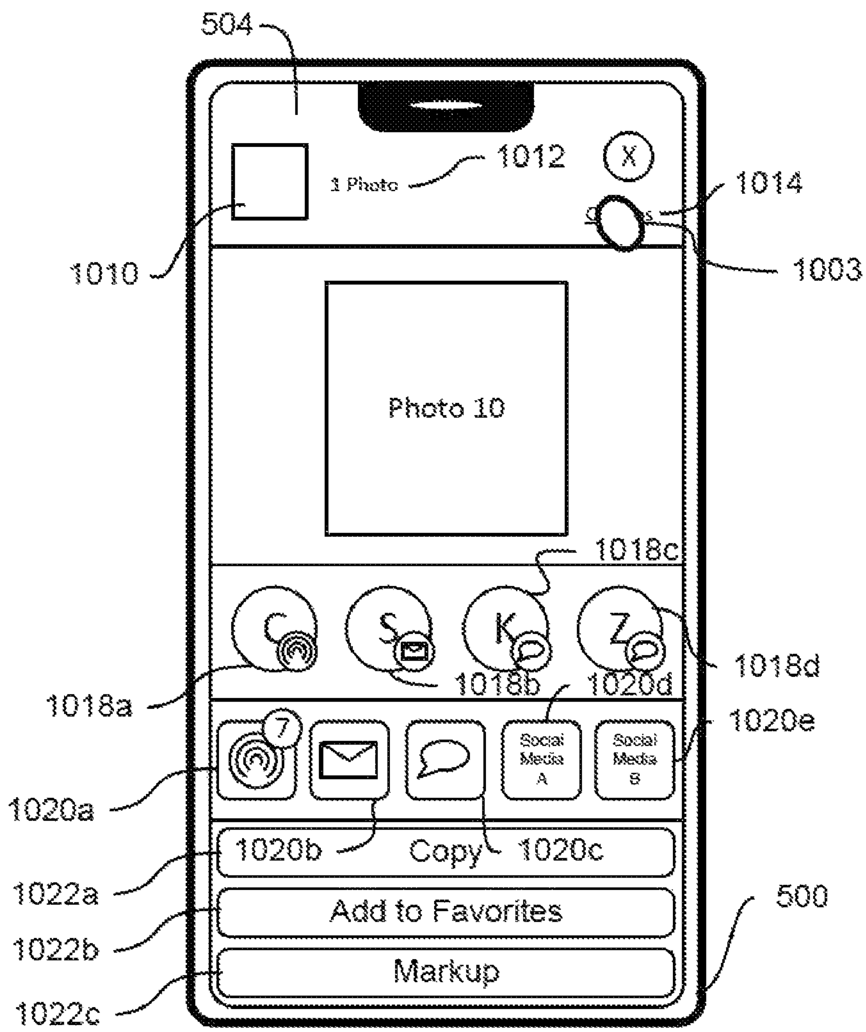
Figure 10B:
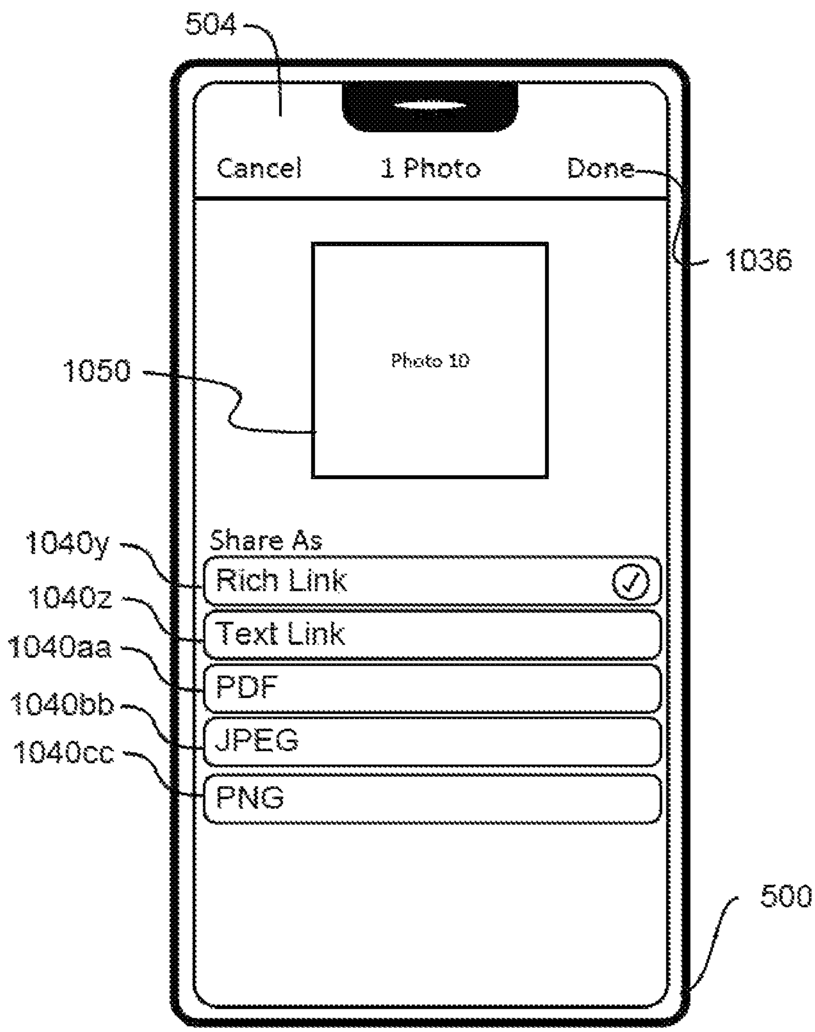
Figure 11A:
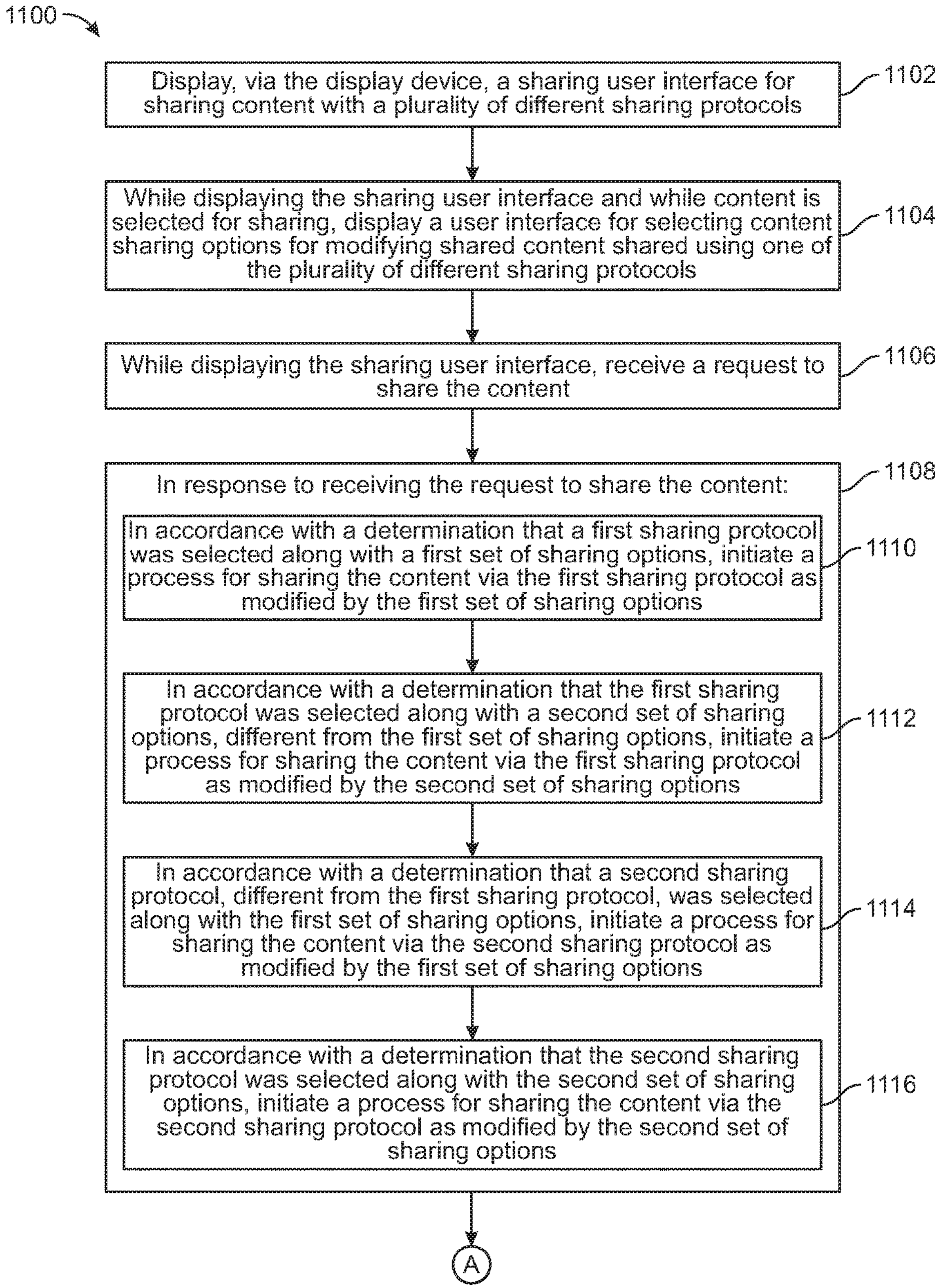
FIGS. 11A-11F are flow diagrams illustrating a method of presenting one or more options for changing one or more settings associated with an item of content before sharing the content in accordance with some embodiments of the disclosure.
Figure 11B:
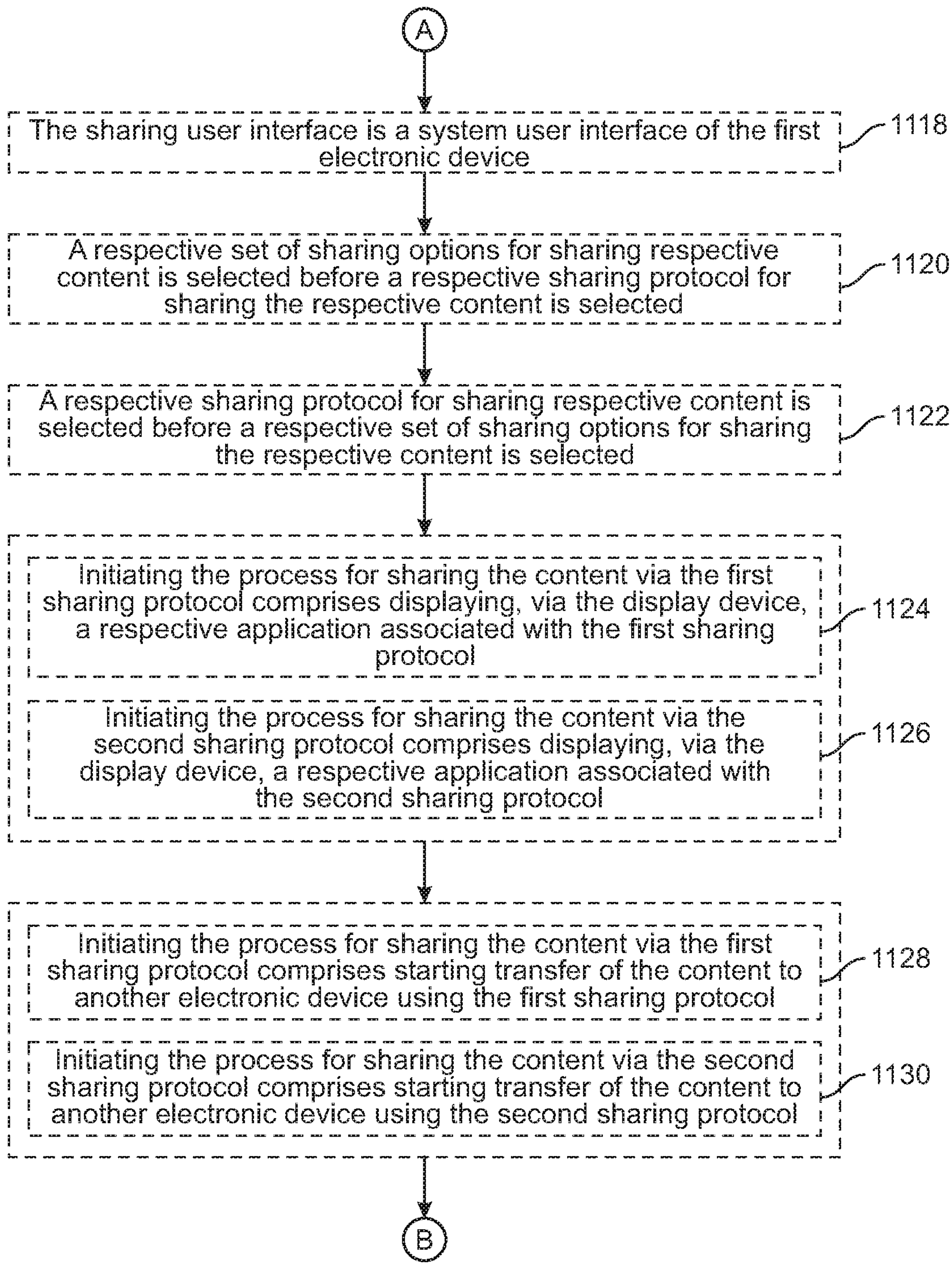
Figure 11C:
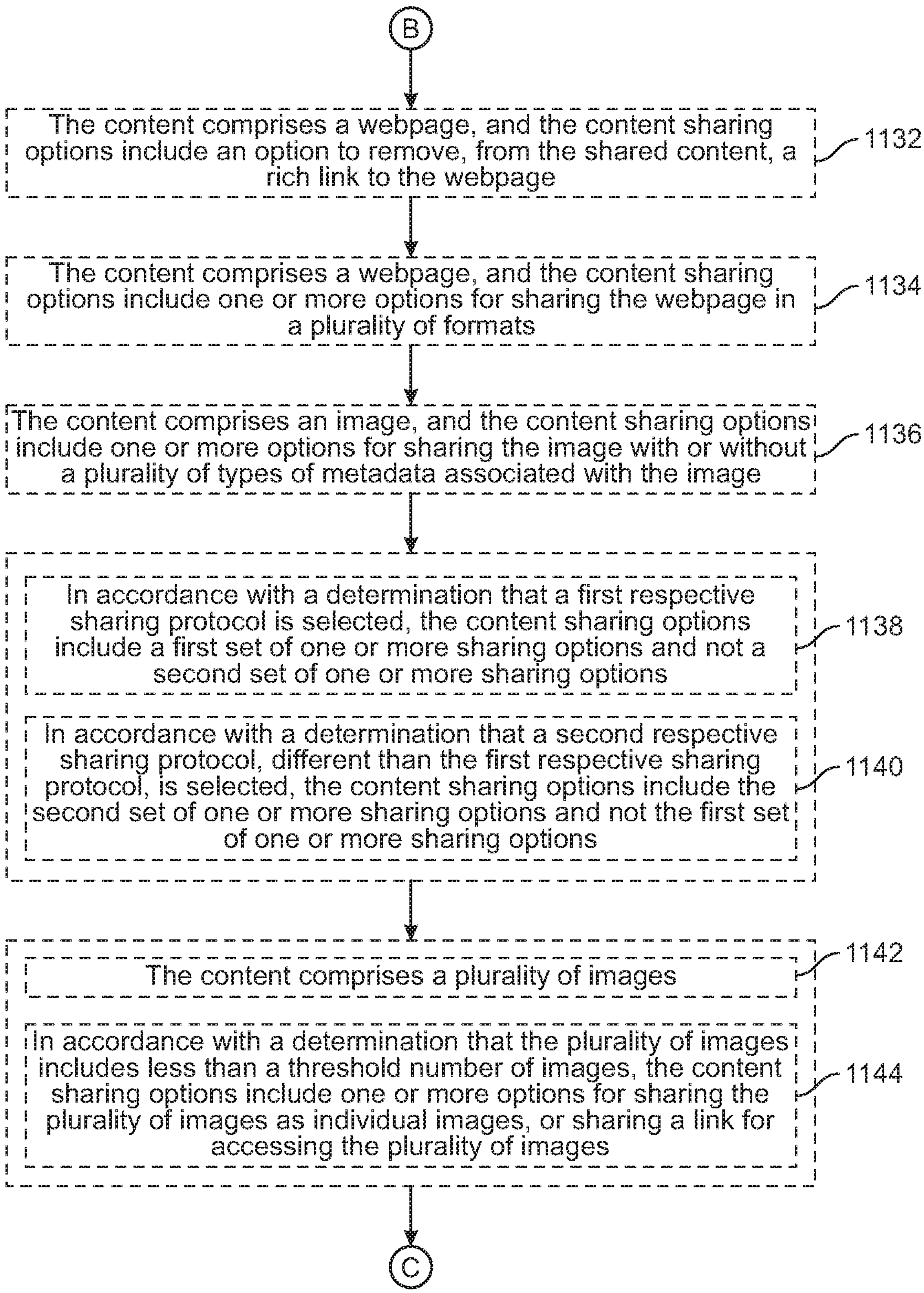
Figure 11D:
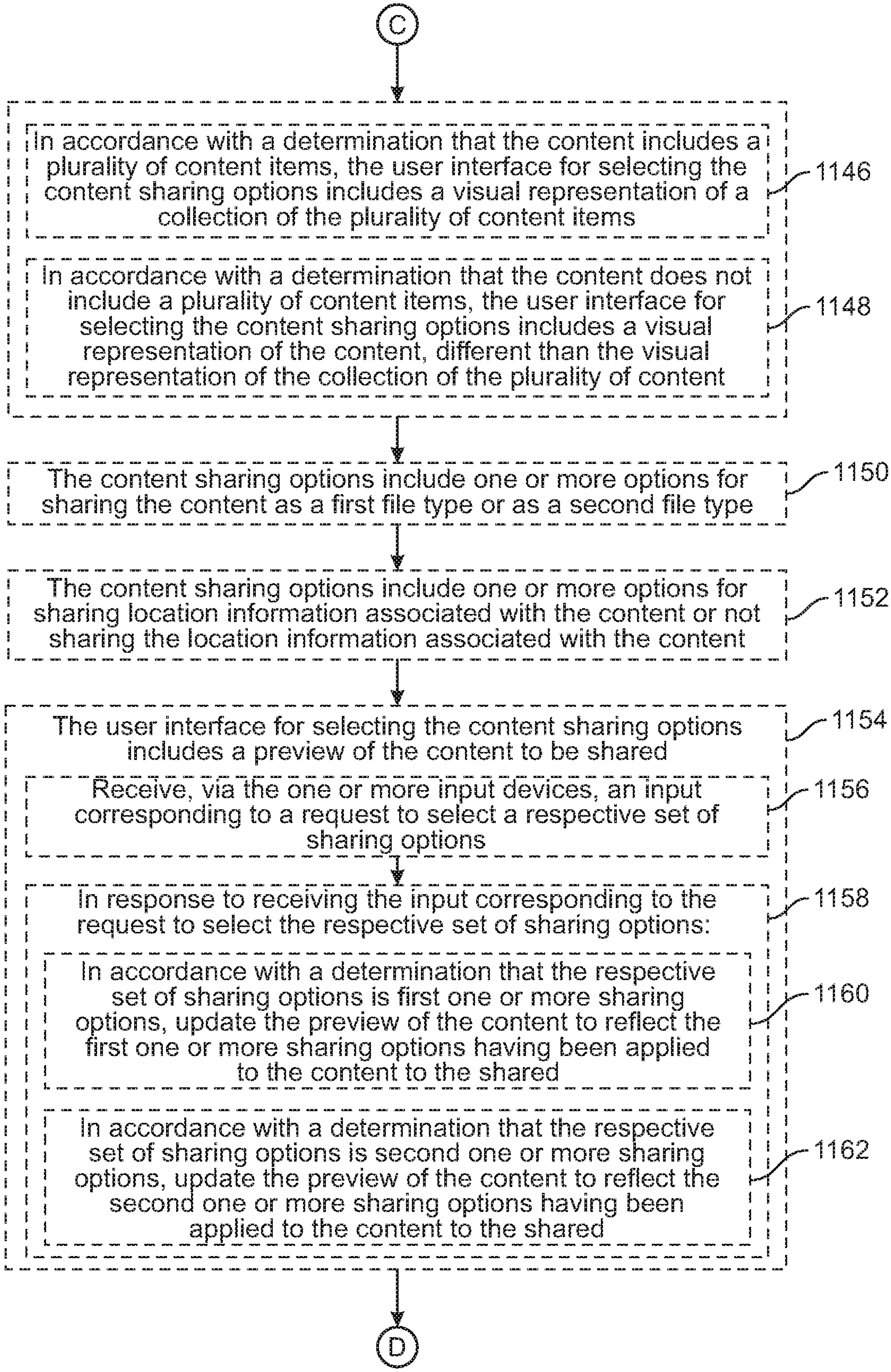
Figure 11E:
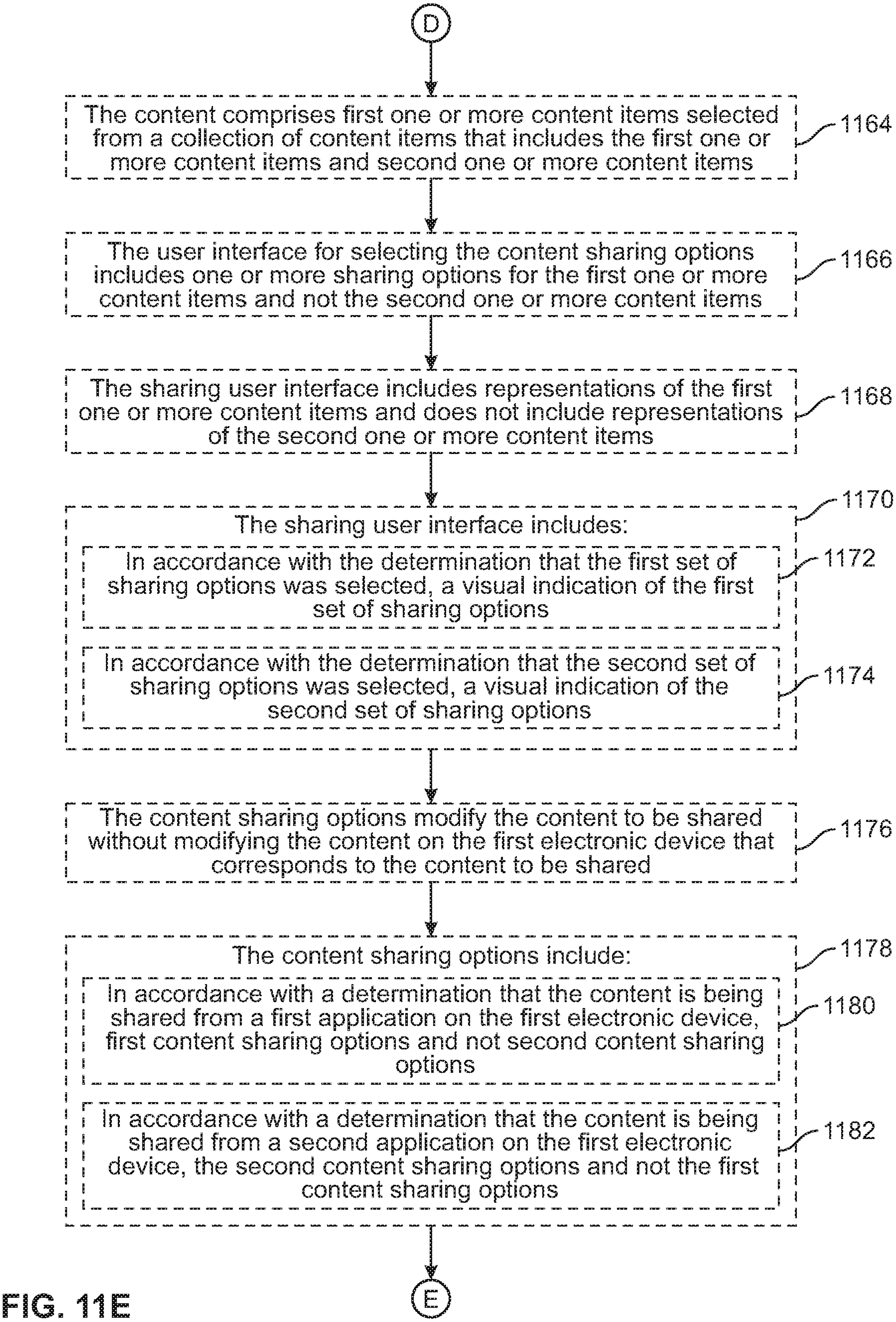
Figure 11F:
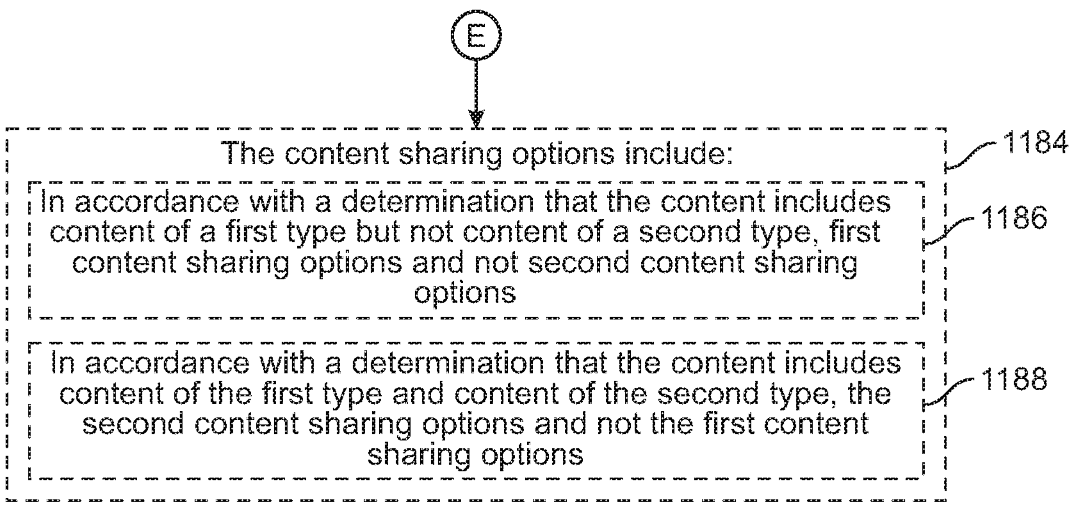

In some embodiments, the electronic device 500 presents different settings in a settings user interface depending on which application the content to be shared was presented in. FIGS. 10Z-10BB illustrate the sharing user interface and settings user interface for sharing a photo from a social media application. As will be described in more detail below, the settings in the settings user interface for sharing the photo from the social media application shown in FIG. 10BB are different than the settings in the settings user interface for sharing the photo from the photos application shown in FIGS. 10L-10M.

FIG. 10Z illustrates a social media application user interface. The social media application user interface includes an image of a photo 1060 and an option 1062 that, when selected, causes the electronic device 500 to open the sharing user interface to share the photo.

As shown in FIG. 10Z, the user selects (e.g., with contact 1003) the option 1062 to open the sharing user interface. In response to the user's selection, the electronic device 500 presents the sharing user interface illustrated in FIG. 10AA.

As shown in FIG. 10AA, the sharing user interface is similar to the sharing user interface described above with reference to FIG. 10B. In FIG. 10AA, the user selects (e.g., with contact 1003) the option 1014 to view the settings user interface. In response to the user's selection, the electronic device 500 presents the settings user interface illustrated in FIG. 10BB.

As shown in FIG. 10BB, the settings user interface includes a thumbnail 1050 of the photo, the "Done" option that, when selected, causes the electronic device 500 to save the changes to the settings and return to the sharing user interface illustrated in FIG. 10AA, and a plurality of options 1040*y-cc* that, when selected, causes the electronic device 500 to change the format in which to share the photo. More specifically, the settings user interface includes an option 1040*y* to share the photo as a rich link to the photo in the social media website, an option 1040*z* to share the photo as a text link to the photo in the social media website, an option 1040*aa* to share the photo in PDF format, an option 1040*bb* to share the photo in JPEG format, and an option 1040*cc* to share the photo in PNG format.

The settings 1040*y*-1040*cc* available when sharing a photo from the social media application are different than the settings available when sharing photo(s) from the photos application, such as options 1040*a-n* illustrated in FIGS. 10L-10M. The available settings are optionally determined based on the functionality of the application from which the content is shared. For example, the photos application has the ability to modify video content associated with an image—thus, the settings user interface includes options 1040*j-n* related to the motion photo settings when the photo(s) is/are shared from the photos application. Optionally, the options 1040*j-n* are not included in the settings user interface when the photo(s) is/are shared from the social media application because the social media application does not have the ability to modify video content associated with photos. The inclusion and exclusion of various other options in the settings user interfaces associated with various applications described herein are optionally similarly determined.

FIGS. 11A-11F are flow diagrams illustrating a method 1100 of presenting one or more options for changing one or more settings associated with an item of content before sharing the content in accordance with some embodiments of the disclosure. The method 1100 is optionally performed at an electronic device such as device 100, device 300, device 500, as described above with reference to FIGS. 1A-1B, 2-3, 4A-4B and 5A-5H. Some operations in method 1100 are, optionally combined and/or order of some operations is, optionally, changed.

In some embodiments, such as in FIG. 10B, a first electronic device 500 in communication with a display device 504 and one or more input devices (e.g., a mobile device (e.g., a tablet, a smartphone, a media player, or a wearable device) including a touch screen or a computer including one or more of a keyboard, mouse, trackpad, and display/touch screen) displays (1102), via the display device, a sharing user interface for sharing content with a plurality of different sharing protocols (e.g., via a mail application, a messaging application, a device to device sharing protocol). In some embodiments, the display device is integrated with the electronic device. In some embodiments, the display device is a separate device from the electronic device with which the electronic device is in communication. In some embodiments, the plurality of different sharing protocols is associated with a plurality of different communication protocols and/or methods (e.g., email, text message, NFC, etc.). In some embodiments, the plurality of different communication protocols are associated with different applications for communicating via the respective communication protocol (e.g., an email application for receiving and transmitting email, a messenger application for receiving and transmitting text messages, etc.). In some embodiments, the sharing user interface is displayed in response to a user selecting a selectable option corresponding to a request to share content. For example, in some embodiments, a user selects one or more photos in a photos application and selects a selectable option to share the selected one or more photos. In some embodiments, other content types are shareable via the sharing user interface such as news articles, multimedia content, and/or websites. In some embodiments, the sharing user interface includes options for selecting the sharing protocol via which the content is shared (e.g., via email using a mail application, via a text message using a messaging application, or via a device-to-device sharing protocol). In some embodiments, not all sharing protocols are compatible to share all types of content. In such embodiments, the incompatible sharing protocols are not displayed (e.g., not presented to the user) or are disabled from selection.

In some embodiments, such as in FIG. 10C, while displaying the sharing user interface and while content is selected for sharing, the first electronic device 500 displays (1104) a user interface for selecting content sharing options 1040*a-g* for modifying shared content shared using one of the plurality of different sharing protocols (e.g., while content is selected for sharing, presenting one or more content sharing options that modifies one or more sharing characteristics). Adjusting the first characteristic of the selected content for sharing optionally adjusts the first characteristic of a copy of the content that is to be shared, rather than adjusting the first characteristic of the content that is stored on the electronic device or in a storage location associated with the electronic device (e.g., a cloud storage server). In some embodiments, the electronic device presents the one or more sharing settings for the selected content in response to detecting selection of a selectable option in a sharing user interface that, when selected, causes the electronic device to present the one or more sharing settings. For example, the electronic device is able to change the format of web content to be shared (e.g., rich link, text link, pdf, web archive). As another example, the electronic device is able to change a file format of a document that is being shared. As another example, the electronic device is able to change a number of characteristics of a photo that is being shared, such as whether or not to share the photo with video or audio content captured with the photo, depth information about the photo, edit history of the photo, location of the photo, and other metadata and other characteristics. In some embodiments, the user interface on which the sharing options are displayed is only displayed on the sharing user interface when the user selects a selectable option to view the sharing options. In some embodiments, a subset of the sharing options are displayed on the sharing user interface even without activating display of the full set of sharing options (e.g., the most commonly used sharing options). In some embodiments, the user interface for selecting content sharing options is a region on the sharing user interface. In some embodiments, the user interface for selecting sharing options is a user interface separate from the sharing user interface that is displayed when the user requests to change the sharing options and retracted after the user finishes selection of the sharing options (e.g., in which case the sharing user interface is re-displayed).

In some embodiments, such as in FIGS. 10E, 10G, 100, and 10Q, while displaying the sharing user interface, the first electronic device 500 receives (1106) a request to share the content (e.g., an input confirming or causing sharing of the content via the selected sharing protocol). In some embodiments, the request includes selecting a selectable option on the sharing user interface.

In some embodiments, in response to receiving the request to share the content (1108), such as in FIG. 10E, in accordance with a determination that a first sharing protocol was selected along with a first set of sharing options such as in FIG. 10D, the first electronic device 500 initiates (1110) a process for sharing the content via the first sharing protocol as modified by the first set of sharing options, such as in FIG. 10F (e.g., sharing the selected content with the selected options). In some embodiments, sharing content includes transmitting content (e.g., modified by the sharing options or unmodified) to a recipient or destination that is separate from the first electronic device via the selected sharing protocol. In some embodiments, sharing via the first sharing protocol includes converting the content to a content type that is compatible with the first sharing protocol. For example, if the first sharing protocol may be compatible with certain file types but not others, then the process for sharing the content includes converting from the original file type to a compatible file type. In some embodiments, the process for sharing the content includes applying the first set of sharing options. For example, if the user opts to reduce the resolution of the content, the resolution is reduced before sharing the content via the first sharing protocol. In some embodiments, if the user opts to change the file format, then the file format is changed before sharing the content via the first sharing protocol. In some embodiments, the process for sharing the content via the first sharing protocol includes launching an application associated with the first sharing protocol. In some embodiments, the process for sharing the content via the first sharing protocol includes initiating a process for sharing the content on the launched application. For example, if a user selects to share a picture via text messaging, the process for sharing the content via text messaging includes launching a text messaging application, initiating composition of a new text message, and attaching the picture to the text message composition. In some embodiments, modifications that are applied to the content are not saved and/or do not overwrite the original content. In some embodiments, one or more temporary files are created including the modifications and the temporary files are shared. In some embodiments, the user is given the option to save the modified files.

In some embodiments, in response to receiving the request to share the content (1108), such as in FIG. 10O, in accordance with a determination that the first sharing protocol was selected along with a second set of sharing options, such as in FIG. 10N, different from the first set of sharing options in FIG. 10D, the first electronic device 500 initiates (1112) a process for sharing the content via the first sharing protocol as modified by the second set of sharing options, such as in FIG. 10P. Optionally, if the user selects a different set of options, then apply the second set of options instead of the first set of options before sharing the content via the first sharing protocol. In some embodiments, the first sharing protocol supports multiple modification options. In some embodiments, certain modification options are not supported by the first sharing protocol and the unsupported options are either not presented to the user or disabled from being selected. In some embodiments, default options are selected for the user based on the sharing protocol used. For example, in some embodiments, the default option for sharing a picture via a text messaging protocol includes reducing the resolution of a picture, while the default option for sharing a picture via an email protocol includes sharing the picture at the full (e.g., original) resolution.

In some embodiments, in response to receiving the request to share the content (1108), such as in FIG. 10E, in accordance with a determination that a second sharing protocol, different from the first sharing protocol, was selected along with the first set of sharing options, such as in FIG. 10D, the first electronic device 500 initiates (1114) a process for sharing the content via the second sharing protocol as modified by the first set of sharing options (e.g., the user selects a different sharing protocol), such as in FIG. 10F. In some embodiments, the second sharing protocol supports and/or is compatible with the same set of sharing options as the first sharing protocol. In some embodiments, the process for sharing the content via the second sharing protocol performs the same modifications to the content because the same sharing options are selected.

In some embodiments, in response to receiving the request to share the content (1108), such as in FIG. 10Q, in accordance with a determination that the second sharing protocol was selected along with the second set of sharing options, such as in FIG. 10N, the first electronic device 500 initiates (1116) a process for sharing the content via the second sharing protocol as modified by the second set of sharing options, such as in FIG. 10R. Optionally, the user selects a different sharing protocol than the first sharing protocol and selects a second set of sharing options. In some embodiments, the second sharing protocol is not compatible with all options that are available to the first sharing protocol. In such embodiments, the incompatible options are disabled or not presented to the user. In some embodiments, the default sharing options for the second sharing protocol are different than the default sharing options for the first sharing protocol. In some embodiments, even if the same options are available to the first and second sharing protocols, different default sharing options are automatically selected for the user based on what is more appropriate for the respective sharing protocol.

The above-described manner of sharing content (e.g., by presenting a plurality of sharing protocols and sharing options and modifying the content based on the selected sharing options and sharing via the selected sharing protocol) allows the electronic device to provide the user with the ability to control what and how content is shared (e.g., by providing the user with options for modifying the content before sharing and providing the user with options of what sharing protocol to use), which simplifies the interaction between the user and the electronic device and enhances the operability of the electronic device and makes the user-device interface more efficient (e.g., by allowing the user to modify content and select what protocol to use to share the content without requiring the user to navigate to a separate user interface to perform modifications and navigate to separate applications to share via the corresponding protocols), which additionally reduces power usage and improves battery life of the electronic device by enabling the user to use the electronic device more quickly and efficiently.

In some embodiments, such as in FIGS. 10S-10Z, the sharing user interface is a system user interface of the first electronic device (1118). Optionally, the sharing user interface is a native user interface to the operating system of the first electronic device. In some embodiments, the same sharing user interface is displayed when the user requests to share content, regardless of the application from where the user requested to share content. In other words, multiple different applications have access to the sharing user interface and are able to instantiate the sharing user interface to share content in response to a user's request. In some embodiments, the options provided by the sharing user interface change based on the context (e.g., the content being shared, the available sharing protocols, etc.).

The above-described manner of displaying a sharing user interface (e.g., presenting a sharing user interface that is a system user interface) allows the electronic device to provide the user with a consistent user experience when requesting to share content (e.g., by natively providing a sharing user interface and using the same core sharing user interface across a plurality of applications), which simplifies the interaction between the user and the electronic device and enhances the operability of the electronic device and makes the user-device interface more efficient (e.g., by presenting the same sharing user interface (e.g., modified as appropriately for context and content) whenever the user requests to share content, without requiring the user to familiarize themselves with a potentially different sharing user interface for each application and without requiring application developers to develop a custom sharing interface to share content), which additionally reduces power usage and improves battery life of the electronic device by enabling the user to use the electronic device more quickly and efficiently while reducing errors in the usage of the device.

In some embodiments, a respective set of sharing options for sharing respective content is selected, such as in FIG. 10D, before a respective sharing protocol for sharing the respective content is selected (1120), such as in FIG. 10E. In some embodiments, the user adjusts the set of sharing options and the user selects the sharing options before the user selects the sharing protocol to be used. In some embodiments, the set of sharing options and the sharing protocol options are displayed on the same user interface and the set of sharing options is displayed earlier (e.g., before or otherwise in front of) than the sharing protocol options. In such embodiments, the user is able to navigate back and forth between the set of sharing options and the sharing protocol options. In some embodiments, the set of sharing options and the sharing protocol options are displayed on separate user interfaces and the user is first presented with the sharing options and must complete selection of the sharing options before the sharing protocol options are presented to the user. In some embodiments, based on the set of sharing options selected by the user, one or more sharing protocols are not presented to the user as options (e.g., because the one or more sharing protocols do not support the sharing options selected by the user). In some embodiments, the one or more sharing protocols that do not support the sharing options selected by the user are displayed as disabled options.

The above-described manner of selecting sharing options (e.g., by selecting sharing options before selecting the sharing protocol) allows the electronic device to provide the user with a streamlined process of selecting sharing options (e.g., by requiring that the user select sharing options before selecting options for which sharing protocol to use), which simplifies the interaction between the user and the electronic device and enhances the operability of the electronic device and makes the user-device interface more efficient (e.g., by presenting the user with available sharing protocol options after receiving the user's selection of the sharing options without requiring the user to navigate to a separate user interface or independently determine what sharing protocols are available for the selected sharing options), which additionally reduces power usage and improves battery life of the electronic device by enabling the user to use the electronic device more quickly and efficiently while reducing errors in the usage of the device.

In some embodiments, a respective sharing protocol for sharing respective content is selected before a respective set of sharing options for sharing the respective content is selected (1122). For example, after selecting option 1020*b*, such as in FIG. 10E, the user is able to navigate to the settings user interface illustrated in FIG. 10D to change one or more settings before sharing the content. In some embodiments, the user selects the sharing protocol to use before the user sets the sharing options. In some embodiments, the set of sharing options and the sharing protocol options are displayed on the same user interface and the sharing protocol options is displayed earlier (e.g., before or otherwise in front of) than the set of sharing options. In such embodiments, the user is able to navigate back and forth between the set of sharing options and the sharing protocol options. In some embodiments, the set of sharing options and the sharing protocol options are displayed on separate user interfaces and the user is first presented with the sharing protocol options and must complete selection of the sharing protocol before the sharing options are presented to the user. For example, in some embodiments, the available sharing options depend on the selected sharing protocol and selection of the sharing protocol changes the set of sharing options that are presented to the user.

The above-described manner of selecting sharing options (e.g., by selecting sharing options after selecting the sharing protocol) allows the electronic device to provide the user with a streamlined process of selecting sharing options (e.g., by requiring that the user select the sharing protocol to use before selecting sharing options), which simplifies the interaction between the user and the electronic device and enhances the operability of the electronic device and makes the user-device interface more efficient (e.g., by presenting the user with available sharing options after receiving the user's selection of the sharing protocol without requiring the user to navigate to a separate user interface or independently determine what sharing options are available for the selected sharing protocol), which additionally reduces power usage and improves battery life of the electronic device by enabling the user to use the electronic device more quickly and efficiently while reducing errors in the usage of the device.

In some embodiments, such as in FIG. 10F, initiating the process for sharing the content via the first sharing protocol comprises displaying, via the display device 504, a respective application associated with the first sharing protocol (e.g., launching a respective application that is associated with the first sharing protocol) (1124). For example, in some embodiments, the electronic device includes applications for communicating via different protocols. For example, an email application receives and transmits communications over email, a messenger application receives and transmits communications over text message, etc. In some embodiments, applications are associated with multiple sharing protocols. In some embodiments, multiple applications are associated with a given sharing protocol. In some embodiments, a default application is selected to share via a given sharing protocol. In some embodiments, if multiple applications are available, the user is presented with a plurality of options to select which application to launch to communicate via the selected sharing protocol. In some embodiments, after launching the respective application, the respective application prepares to share the content. For example, if the sharing protocol is email and an email application is launched, then the email application optionally opens a new email composition user interface and attaches the content or embeds the content into the body of the email.

In some embodiments, such as in FIG. 10H, initiating the process for sharing the content via the second sharing protocol comprises displaying, via the display device 504, a respective application associated with the second sharing protocol (e.g., launching an application that is associated with the second sharing protocol) (1126). In some embodiments, the application associated with the second sharing protocol is different from the application that is associated with the first sharing protocol. In some embodiments, the application associated with the second sharing protocol is the same as the application that is associated with the first sharing protocol and is capable of sharing via the first and second sharing protocols.

The above-described manner of sharing content (e.g., by launching an application associated with the selected sharing protocol) allows the electronic device to provide the user with a streamlined process of sharing content (e.g., by launching the appropriate application that is capable of transmitting content via the selected sharing protocol), which simplifies the interaction between the user and the electronic device and enhances the operability of the electronic device and makes the user-device interface more efficient (e.g., by launching the respective application that is capable of sharing the content via the selected sharing protocol without requiring the user to navigate to a separate user interface or independently determine which application is appropriate to share via the selected sharing protocol), which additionally reduces power usage and improves battery life of the electronic device by enabling the user to use the electronic device more quickly and efficiently.

In some embodiments, such as in FIG. 10F, initiating the process for sharing the content via the first sharing protocol comprises starting transfer of the content to another electronic device using the first sharing protocol (e.g., transfer the content externally from the first electronic device to another electronic device using the first sharing protocol) (1128). In some embodiments, the content is transferred directly to another mobile device (e.g., another user's smartphone, tablet, laptop, etc.). In some embodiments, the content is transferred to a server, which is accessible by a user (e.g., the same user, a different user, the same device, or a different device). For example, in some embodiments, the sharing protocol is email and transferring the content includes sending an email with the content attached or embedded into the body of the email to a given recipient. In some embodiments, the content is automatically transferred without further user involvement. In some embodiments, the user is presented with further options and/or the ability to review before confirming transfer of the content. For example, in some embodiments, the user is presented with a new email composition user interface, the content is attached to the email, and the user is able to edit the email message (e.g., add recipients, provide the subject or other body text) before sending the email.

In some embodiments, such as in FIG. 10H, initiating the process for sharing the content via the second sharing protocol comprises starting transfer of the content to another electronic device using the second sharing protocol (e.g., transfer the content using the second sharing protocol) (1130). In some embodiments, transferring the content using the second sharing protocol involves using a different application than the application that is used to transfer the content using the first sharing protocol. In some embodiments, transferring the content using the second sharing protocol involves using the same application as the application that is used to transfer the content using the first sharing protocol.

The above-described manner of sharing content (e.g., by using a single user interface to transfer of content via the selected sharing protocol) allows the electronic device to provide the user with a method of sharing content to another electronic device (e.g., by initiating transfer of the content via the selected sharing protocol), which simplifies the interaction between the user and the electronic device and enhances the operability of the electronic device and makes the user-device interface more efficient (e.g., by transferring the content via the selected sharing protocol without requiring the user to navigate to separate user interfaces to transfer via different sharing protocols), which additionally reduces power usage and improves battery life of the electronic device by enabling the user to use the electronic device more quickly and efficiently while reducing errors in the usage of the device.

In some embodiments, such as in FIG. 10T, the content comprises a webpage, and the content sharing options include an option 1040*p* to remove, from the shared content, a rich link to the webpage (e.g., removing embedded metadata or embedded content associated with a shared website (e.g., JSON tags, HTML meta tags, etc.)) (1132). For example, in some embodiments, when a website is shared, the shared object includes one or more metadata that provides a preview of the shared website. In some embodiments, removing the rich link to the shared website involves removing the embedded sharing metadata or embedded content. In some embodiments, after removing the rich link to the shared website, the shared content includes a text URL of the shared website. In some embodiments, the text URL is a hyperlink, selection of which causes access of the URL.).

The above-described manner of modifying the shared content (e.g., by providing an option to remove a rich link to a webpage from the shared content) allows the electronic device to provide the user with an easy method to modify the shared content (e.g., by providing the option to remove a rich link when sharing a webpage for which a rich link to the webpage is available), which simplifies the interaction between the user and the electronic device and enhances the operability of the electronic device and makes the user-device interface more efficient (e.g., by presenting the user interface with a single user interface in which the user can modify the content and remove a rich link without requiring the user to navigate to a separate user interface or otherwise separately edit the content to remove the rich link before sharing the content), which additionally reduces power usage and improves battery life of the electronic device by enabling the user to use the electronic device more quickly and efficiently.

In some embodiments, such as in FIG. 10T, the content comprises a webpage, and the content sharing options include one or more options 1040*p-s* for sharing the webpage in a plurality of formats (e.g., as a rich link, as a text link, as a PDF, as a web archive) (1134). In some embodiments, a plurality of selectable options is presented to the user to select the format by which the link is shared. In some embodiments, selecting a particular format causes the content to be converted into the selected format.

The above-described manner of selecting sharing a website (e.g., by providing multiple formats in which to share a webpage) allows the electronic device to provide the user with different options by which to share a website or other web content (e.g., by providing different formats via which the web content is shared), which simplifies the interaction between the user and the electronic device and enhances the operability of the electronic device and makes the user-device interface more efficient (e.g., by presenting a single user interface that allows a user to share content via different formats without requiring the user to navigate to a separate user interface to share the content in the desired format or manually convert the web content to the desired format), which additionally reduces power usage and improves battery life of the electronic device by enabling the user to use the electronic device more quickly and efficiently.

In some embodiments, such as in FIG. 10L, the content comprises an image, and the content sharing options include one or more options 1040*a-e* for sharing the image with or without a plurality of types of metadata associated with the image (e.g., removing one or more types of metadata that are embedded into an image file) (1136). In some embodiments, a short video clip is embedded in the metadata of the image. In some embodiments, the short video clip comprises video content before the image and after the image. In some embodiments, the short video clip is automatically captured by the camera when taking an image. In some embodiments, the short video clip includes an audio track. In some embodiments, the content sharing options include preserving or removing the short video clip embedded to the image. In some embodiments, the content sharing options include preserving or removing the audio track from the short video clip. In some embodiments, the metadata of the image includes depth and/or focus information. In some embodiments, the metadata of the image includes history of the image (e.g., date of creation, modification, and/or last viewing date). In some embodiments, the metadata of the image includes location information (e.g., GPS coordinates, geotagging, etc.). In some embodiments, the metadata of the image includes one or more keyboards associated with the image (e.g., to improve search-ability). In some embodiments, the metadata of the image includes overcapture content (e.g., a 360-degree image or video which can be cropped or modified to fit a traditional image size). In some embodiments, any or all of the above-described metadata types can be enabled (e.g., preserved) or disabled. In some embodiments, only the metadata that exists in the image are presented as options for the user to disable. In some embodiments, metadata that has been selected to be removed is removed from the image before sharing the updated (e.g., filtered) image.).

The above-described manner of selecting options for sharing an image (e.g., by providing multiple options for removing certain metadata from the image) allows the electronic device to provide the user with options for what metadata is shared with an image (e.g., by providing the user with options of what metadata to remove from the image), which simplifies the interaction between the user and the electronic device and enhances the operability of the electronic device and makes the user-device interface more efficient (e.g., by presenting a single user interface that allows a user to remove certain metadata from an image without requiring the user to navigate to a separate user interface to manually remove metadata from images before sharing), which additionally reduces power usage and improves battery life of the electronic device by enabling the user to use the electronic device more quickly and efficiently.

In some embodiments, such as in FIG. 10L, in accordance with a determination that a first respective sharing protocol is selected, the content sharing options include a first set of one or more sharing options 1040*a-e* and 1040*f-g* and not a second set of one or more sharing options 1040*y-cc* (e.g., different sharing options are available for different sharing protocols) (1138), such as in FIG. 10BB. In some embodiments, only the sharing options that are available for the selected sharing protocol are presented.

In some embodiments, such as in FIG. 10BB, in accordance with a determination that a second respective sharing protocol, different than the first respective sharing protocol, is selected, the content sharing options include the second set of one or more sharing options 1040*y-cc* and not the first set of one or more sharing options 1040*a-e* (1140), such as in FIG. 10L. In some embodiments, if the second sharing protocol is compatible with a second set of sharing options, only the second sharing options are presented to the user. For example, in some embodiments a device-to-device sharing protocol is not compatible with sending and receiving a link to access an album of images. Thus, in such example, the option to upload a set of images as an album and to share a link to the album is not presented to the user if the user is sharing via a device-to-device sharing protocol. In some embodiments, sending and receiving a link to access an album of images is compatible with the email sharing protocol. Thus, in some embodiments, the option to upload a set of images as an album and to share a link to the album is presented to the user if the user is sharing via an email sharing protocol. In some embodiments, the options that are not compatible are displayed but are disabled.

The above-described manner of providing content sharing options for modifying the content (e.g., by providing only the sharing options that are available over the respective sharing protocol) allows the electronic device to provide the user with only options that are available (e.g., by presenting a first set of options that is compatible with the first protocol and a second set of options that is compatible with the second protocol), which simplifies the interaction between the user and the electronic device and enhances the operability of the electronic device and makes the user-device interface more efficient (e.g., by only presenting options that are available over the respective sharing protocol without requiring the user to navigate to a separate user interface or independently determine what sharing options are available over the selected sharing protocol), which additionally reduces power usage and improves battery life of the electronic device by enabling the user to use the electronic device more quickly and efficiently while reducing errors in the usage of the device.

In some embodiments, such as in FIG. 10M, the content comprises a plurality of images (e.g., the user has selected a plurality of images to share) (1142). In some embodiments, the plurality of images is all images in a given photo album. In some embodiments, the plurality of images is all images in a memory (e.g., an automatically generated album associated with a particular event and/or geographical location). In some embodiments, the plurality of images are images that have been individually selected by the user to form a set of images to share.

In some embodiments, such as in FIG. 10M, in accordance with a determination that the plurality of images includes less than a threshold number of images, the content sharing options include one or more options for sharing the plurality of images as individual images 1040*h*, or sharing a link for accessing the plurality of images 1040*i* (1144). In some embodiments, based on the number of images selected and/or the file size of the group of images, the first electronic device presents an option for sharing the images themselves. In some embodiments, an option is presented to upload the images to an album and share a link for accessing the album to the recipient. In some embodiments, if the number of images selected and/or the file size is above a threshold, then do not present the option to share the images themselves and only provide the only to share a link for accessing an album of the selected images. In some embodiments, the album is a private album and accessible only to the recipients of the sharing. In some embodiments, the album is accessible to anyone who has the link. In some embodiments, the album is accessible publicly.

The above-described manner of providing content sharing for a set of images (e.g., by providing the option to share each image or to share a link to access the images) allows the electronic device to provide the user with different methods of sharing images (e.g., by presenting the user the option to share each image or to upload the images to an online location and sharing a link to the online location to access the images), which simplifies the interaction between the user and the electronic device and enhances the operability of the electronic device and makes the user-device interface more efficient (e.g., by presenting the user with options for how to share multiple images without requiring the user to navigate to different user interfaces to share the images individually or to upload the images and share a link to the images), which additionally reduces power usage and improves battery life of the electronic device by enabling the user to use the electronic device more quickly and efficiently.

In some embodiments, such as in FIG. 10M, in accordance with a determination that the content includes a plurality of content items, the user interface for selecting the content sharing options includes a visual representation 1038 of a collection of the plurality of content items (e.g., display the plurality of content items in a group) (1146). In some embodiments, if the plurality of content items is a group of images, display a stack of images. In some embodiments, if a plurality of items are being shared, then the content sharing options apply to all items in the plurality of items.

In some embodiments, such as in FIG. 10BB, in accordance with a determination that the content does not include a plurality of content items, the user interface for selecting the content sharing options includes a visual representation 1050 of the content, different than the visual representation of the collection of the plurality of content items (e.g., if the content is not a group of content items, then display only the selected content item and do not display a group of content items.) (1148).

The above-described manner of sharing a set of content items (e.g., by visually displaying a group of items) allows the electronic device to provide the user with a visual indication that the user is sharing a set of items rather than a single item (e.g., by displaying a representation of a collection of items when the user is sharing multiple items), which simplifies the interaction between the user and the electronic device and enhances the operability of the electronic device and makes the user-device interface more efficient (e.g., alerting the user that the user is sharing multiple items and that the content sharing items apply to all selected items), which additionally reduces power usage and improves battery life of the electronic device by enabling the user to use the electronic device more quickly and efficiently, while reducing errors in the usage of the device.

In some embodiments, such as in FIG. 10BB, the content sharing options include one or more options 1040*bb* and 1040*cc* for sharing the content as a first file type or as a second file type (1150). In some embodiments, certain file types are capable of being converted into other file types (e.g., file extensions). For example, a JPG image is capable of being converted into a BMP image. In some embodiments, converting from one file type to another file type results in loss of certain data. In some embodiments, converting from one file type to another file type does not result in any loss of data. In some embodiments, converting from one file type to another is performed by the application from which the sharing was initiated. In some embodiments, sharing content comprises converting raw data into a compatible file type. In some embodiments, a plurality of possible file types are presented to the user and selection of a given file type causes conversion of the content into the selected file type before sharing.

The above-described manner of sharing content (e.g., by sharing the content as compatible file types and converting the content to the desired file type if necessary) allows the electronic device to provide the user with options for the file type to share (e.g., by providing the user with options of what file type to share the content as), which simplifies the interaction between the user and the electronic device and enhances the operability of the electronic device and makes the user-device interface more efficient (e.g., by providing the user with one user interface to select from different file types to share the content without requiring the user to navigate to separate user interfaces to share the content as the desired file type and without requiring the user to separately determine what file types are available or compatible), which additionally reduces power usage and improves battery life of the electronic device by enabling the user to use the electronic device more quickly and efficiently, while reducing errors in the usage of the device.

In some embodiments, such as in FIG. 10L the content sharing options include one or more options 1040*a* for sharing location information associated with the content or not sharing the location information associated with the content (1152). In some embodiments, the content is associated with location data. In some embodiments, the location data refers to the location in which the content was created. In some embodiments, the location data refers to the location that is described, captured, or represented in the content. In some embodiments, the location data is embedded into the content as metadata. In some embodiments, when the content is associated with location data, the content sharing options include an option to enable (e.g., preserve) or disable (e.g., remove) location data from the content before sharing.

The above-described manner of sharing content (e.g., by providing options for whether to share location data associated with the content) allows the electronic device to provide the user with options for what data share along with the content (e.g., by determining that location data exists in the content and providing the user with the option to remove the location data from the content before sharing), which simplifies the interaction between the user and the electronic device and enhances the operability of the electronic device and makes the user-device interface more efficient (e.g., by providing the user with one user interface to preserve or remove location data from the content without requiring the user to navigate to a separate interface or manually edit the content to remove location data), which additionally reduces power usage and improves battery life of the electronic device by enabling the user to use the electronic device more quickly and efficiently, while reducing errors in the usage of the device.

In some embodiments, such as in FIG. 10L the user interface for selecting the content sharing options includes a preview 1038 of the content to be shared (e.g., an image, video, or other representation of the content to be shared) (1154). For example, if the content is an image, the preview is the image to be shared. In some embodiments, the preview of the content includes a text label describing the metadata that is shared along with the content. For example, if location metadata is shared along with the image, then an icon indicating that the location metadata is included in the image.

In some embodiments, such as in FIG. 10M, the first electronic device 500 receives (1156), via the one or more input devices, an input corresponding to a request to select (e.g., with contact 1003) a respective set of sharing options 1040*i* (e.g., an input or a series of inputs selecting or modifying the sharing options). For example, in some embodiments, the user is able to disable sharing of the location metadata for an image.

In some embodiments, in response to receiving the input corresponding to the request to select the respective set of sharing options (1158), in accordance with a determination that the respective set of sharing options is first one or more sharing options, such as in FIG. 10M, the first electronic device 500 updates (1160) the preview 1038 of the content to reflect the first one or more sharing options having been applied to the content to the shared (e.g., updating the visual representation of the content to be shared and/or the text labels associated with the content to be shared to reflect changes in the sharing options), such as in FIG. 10N. For example, as described above, if an image to be shared includes location metadata, the preview of the content includes an icon or text label indicating that location metadata is included. In some embodiments, if the user disables sharing of the location metadata, the icon or text label indicating that location metadata is included is removed from the preview of the content. In some embodiments, the preview of the content includes an icon or text label indicating that the location metadata is not included in the image or has been removed from the image.

In some embodiments, in response to receiving the input corresponding to the request to select the respective set of sharing options (1158), in accordance with a determination that the respective set of sharing options is second one or more sharing options, such as in FIG. 10C, the first electronic device 500 updates (1162) the preview 1038 of the content to reflect the second one or more sharing options having been applied to the content to the shared, such as in FIG. 10D. In some embodiments, if the user selects a second set of sharing options, the preview of the content is updated to reflect the selected options in the second set of sharing options.

The above-described manner of sharing content (e.g., by displaying a preview of the content modified by the sharing options that are selected by the user) allows the electronic device to provide the user with a preview of the content to be shared (e.g., by updating the preview of the content using the sharing options selected by the user), which simplifies the interaction between the user and the electronic device and enhances the operability of the electronic device and makes the user-device interface more efficient (e.g., by allowing the user to preview the final result of the content modified by the user's selected sharing options before sharing the content and without requiring the user to separately edit the content to preview the modified content), which additionally reduces power usage and improves battery life of the electronic device by enabling the user to use the electronic device more quickly and efficiently, while reducing errors in the usage of the device.

In some embodiments, such as in FIG. 10K, the content comprises first one or more content items selected from a collection of content items that includes the first one or more content items 1016*b* and second one or more content items 1016*a* (e.g., a subset of images from the available shareable images) (1164). In some embodiments, the subset of images is an album of images. In some embodiments, the subset of images is an automatically generated album (e.g., collection) based on a particular event or location. In some embodiments, the subset of images includes images that have been individually selected by the user from a set of images. In some embodiments, the user provides input to share the entire collection of images, and after the input and while the sharing user interface is displayed, the user provides input in the sharing user interface to remove one or more images from the collection from the sharing.

The above-described manner of sharing content (e.g., by sharing a subset of content from a collection of content items) allows the electronic device to provide the user with options for selecting what content item to share (e.g., by providing the user with options for selecting some or all content items from a set of content items to share and only sharing the items that were selected to be shared), which simplifies the interaction between the user and the electronic device and enhances the operability of the electronic device and makes the user-device interface more efficient (e.g., by providing a user interface in which the user can select a subset of items to be shared from a collection of content items without requiring the user to separately edit the collection of content items to remove content items that are not desired to be shared or to create a separate collection with only content items that are desired to be shared), which additionally reduces power usage and improves battery life of the electronic device by enabling the user to use the electronic device more quickly and efficiently.

In some embodiments, the user interface for selecting the content sharing options, such as in FIG. 10L, includes one or more sharing options 1040*a-g* for the first one or more content items 1040*b* and not the second one or more content items 1040*a* (1166). Optionally, the sharing options presented to the user are applied to the subset of content items selected to be shared and not to the entire set of content items. For example, if the user selects to share five images out of an album of ten images, then the sharing options are applied to the five selected images and not to all ten images in the album.

The above-described manner of providing sharing options (e.g., by applying the sharing options to only items that have been selected to be shared) allows the electronic device to provide the user with a streamlined method to select sharing options (e.g., by providing one set of sharing options and applying the options to all content items to be shared), which simplifies the interaction between the user and the electronic device and enhances the operability of the electronic device and makes the user-device interface more efficient (e.g., by providing a user interface in which the user can select sharing options for all of the content items selected to be shared without requiring the user to navigate to a separate user interface or individually set the sharing options for each content item), which additionally reduces power usage and improves battery life of the electronic device by enabling the user to use the electronic device more quickly and efficiently.

In some embodiments, the sharing user interface includes representations of the first one or more content items and does not include representations of the second one or more content items (1168), such as by removing Photo 1 from the user interface illustrated in FIG. 10K. Optionally, the sharing user interface includes a preview or other representation of all the content that has been selected to be shared. In some embodiments, if multiple items have been selected to be shared, the sharing user interface includes a marquee, rotating carousel, scrollable list, or scrollable grid of each item that has been selected to be shared. In some embodiments, each item in the marquee, rotating carousel, scrollable list, or scrollable list includes a selectable option to de-select (or reselect) the respective item from sharing. For example, in some embodiments, each image in a scrollable grid of all images that have been selected to be shared includes a check-mark icon which is selectable to un-check the image from sharing. In some embodiments, the content item that has been de-selected remains in the marquee, rotating carousel, scrollable list, or scrollable grid such that the user can re-select the respective content item for sharing. In some embodiments, content items that have been de-selected are no longer modified by the sharing options and only those content items that are ultimately shared (e.g., finalized and/or confirmed by the user) are modified by the sharing options. In some embodiments, only certain types of items are displayed as a marquee, rotating carousel, scrollable list or scrollable grid. For example, in some embodiments, multiple images that have been selected to be shared are displayed in a rotating carousel, but multiple text documents and/or multiple webpages are not displayed in a rotating carousel. In some embodiments, only multimedia content (e.g., images, photos, videos) are displayed as a marquee, rotating carousel, scrollable list or scrollable grid.).

The above-described manner of displaying items to be shared (e.g., by displaying only the items that have been selected to be shared and not the ones that have not been selected to be shared) allows the electronic device to provide the user with a preview of the items are to be shared (e.g., by displaying representations of the items that have been selected to be shared), which simplifies the interaction between the user and the electronic device and enhances the operability of the electronic device and makes the user-device interface more efficient (e.g., by providing the user with a visual indication of all the items that are to be shared before the content is shared without requiring the user to navigate to a separate user interface to confirm all the items that have been selected to be shared), which additionally reduces power usage and improves battery life of the electronic device by enabling the user to use the electronic device more quickly and efficiently while reducing errors in the usage of the device.

In some embodiments, the sharing user interface includes (1170), in accordance with the determination that the first set of sharing options was selected, such as in FIG. 10D, a visual indication 1012 of the first set of sharing options (e.g., icons or text labels indicating the sharing options that are or will be applied to the content to be shared) (1172), such as in FIG. 10E. For example, if location metadata is included in the content (e.g., not removed), then the sharing user interface includes an icon indicating that location metadata will be shared along with the content. In some embodiments, a text label of the location metadata is provided indicating the exact location metadata that will be shared. In some embodiments, if the content includes a short video associated with an image (e.g., a short video of a time before and after the image), then the sharing user interface includes an icon associated with the short video feature. In some embodiments, the first set of sharing options was selected in a different user interface than the sharing user interface. In some embodiments, the sharing user interface includes a preview of the content item(s) to be shared. In some embodiments, the preview of the content item(s) is a still image, a video, an animation, or a visual stack of items (e.g., stack of images). In some embodiments, the preview of the content item(s) is modified based on the sharing options that have been selected. In some embodiments, the preview of the content item(s) is in its original form and not modified.

In some embodiments, the sharing user interface includes (1170), in accordance with the determination that the second set of sharing options was selected, such as in FIG. 10N, a visual indication 1012 of the second set of sharing options (1174), such as in FIG. 10O. In some embodiments, based on the options that are selected or de-selected, the sharing user interface includes or does not include icons, representations, and/or text labels associated with the selected or de-selected options, respectively. In some embodiments, the second set of sharing options was selected in a different user interface than the sharing user interface.

The above-described manner of displaying items to be shared (e.g., by displaying a visual indication of the sharing options to be applied to the content) allows the electronic device to provide the user with an indication of what sharing options will be applied to the content (e.g., by displaying a visual indication of the sharing options that will be applied to the user), which simplifies the interaction between the user and the electronic device and enhances the operability of the electronic device and makes the user-device interface more efficient (e.g., without requiring that the user navigate to a separate user interface to verify the set of sharing options that will be applied), which additionally reduces power usage and improves battery life of the electronic device by enabling the user to use the electronic device more quickly and efficiently.

In some embodiments, the content sharing options 1040*a* modify the content to be shared, such as in FIG. 10C, without modifying the content on the first electronic device that corresponds to the content to be shared (1176), such as in FIG. 10I. Optionally, the content sharing options are applied to a temporary copy of the content and/or the content sharing options are applied as the content is shared, without modifying the original copy of the content. For example, if the user opts to remove location metadata, the original copy of the content retains the location metadata and only the content that is shared (e.g., the file that is transferred) is modified to remove location metadata. In some embodiments, a temporary file and modified by the sharing options and the temporary file is shared. Thus, the state of the original content is not affected by the content sharing options.

The above-described manner of applying sharing options (e.g., by only modifying the content that is being shared rather than the original content files) allows the electronic device to apply sharing options to content without modifying the original content (e.g., modifying only the content to be shared and not the original content saved on the first electronic device), which simplifies the interaction between the user and the electronic device and enhances the operability of the electronic device and makes the user-device interface more efficient (e.g., by providing a method of modifying the content without requiring the user to separately make a copy of the content, edit the content, and share the edited copy of the content), which additionally reduces power usage and improves battery life of the electronic device by enabling the user to use the electronic device more quickly and efficiently, while reducing errors in the usage of the device.

In some embodiments, such as in FIG. 10L, the content sharing options include (1178), in accordance with a determination that the content is being shared from a first application on the first electronic device, first content sharing options 1040*a-g* and not second content sharing options 1040*y-cc* (1180), such as in FIG. 10BB. Optionally, the available content sharing options is based on the application from which the content is shared. For example, in some embodiments, if the content is images and the images have been selected to be shared from a photo album application, then the options are specific to images. In some embodiments, the application performs the modification of the content according to the content sharing options. In some embodiments, the application provides the sharing user interface with the available content sharing options. In some embodiments, only the available content sharing options are presented to the user.

In some embodiments, such as in FIG. 10BB, the content sharing options include (1178), in accordance with a determination that the content is being shared from a second application on the first electronic device, the second content sharing options 1040*y*-1040*cc* and not the first content sharing options 1040*a-g* (1182), such as in FIG. 10L. In some embodiments, if the content is shared from a second application, then present a second set of sharing options based on what is available from the second application. In some embodiments, even if the first and second applications are capable of sharing images (e.g., the same type of content or even the same content), the first and second application provide different sets of content sharing options. For example, in some embodiments, a native image viewing application is compatible with sharing images with any included video data, whereas a third party application, though able to view and share images, is optionally not compatible with sharing images with any included video data. Thus, in such embodiments, when images from the native image viewing application are shared, the option to share the image along with any captured video or audio data that is available, while sharing images from the third party application does not provide the option to share the image along with any captured video or audio data that is available. In some embodiments, different word processing applications are able to convert to different file types and the content file type options that are presented to the user are based on what file types are capable of being converted into by the respective word processing application.

The above-described manner of providing sharing options (e.g., by displaying only the sharing options that are available for the application from which the content is shared) allows the electronic device to provide the user with the appropriate sharing options (e.g., by providing only the available sharing options and not any sharing options that are not supported by the application from which the content is shared), which simplifies the interaction between the user and the electronic device and enhances the operability of the electronic device and makes the user-device interface more efficient (e.g., by providing a single user interface that displays only the available sharing options to the user without requiring the user to separately determine what options are available or navigating to a separate user interface to share content from different applications), which additionally reduces power usage and improves battery life of the electronic device by enabling the user to use the electronic device more quickly and efficiently.

In some embodiments, such as in FIG. 10T, the content sharing options include (1184), in accordance with a determination that the content includes content of a first type but not content of a second type, first content sharing options 1040*p-s* and not second content sharing options 1040*t-w* (1186), such as in FIG. 10W. Optionally, the available sharing options are based on the type of file being shared. In some embodiments, one type of file supports a first set of sharing options while a second type of file supports a second set of sharing options. In some embodiments, the first set of sharing options includes options that are included in the second set of sharing options (e.g., the first and second set completely or partially overlap). In some embodiments, only the options that are supported by the file type that has been selected to be shared are presented to the user.

In some embodiments, such as in FIG. 10W, the content sharing options include (1184), in accordance with a determination that the content includes content of the first type and content of the second type, the second content sharing options 1040*t-w* and not the first content sharing options 1040*p-s* (1188), such as in FIG. 10T. In some embodiments, if files of a first type and files of a second type are selected to be shared together, the available sharing content are those that are supported by both types of files. For example, if the first type of content supports a first set of sharing options and the second type of content supports a second set of sharing options and the first and second set of sharing share a set of common sharing options, then the sharing options that are presented to the user are those that are the set of common sharing options. For example, in some embodiments, both videos and images include location metadata. Thus, in such examples, if a user selects to share a video and an image, the user is presented with an option to include or remove location metadata. In some embodiments, images are able to be shared with captured video and/or audio content, whereas videos do not include separately captured video and/or audio content. Thus, in some embodiments, the user is not presented with the option to include or remove captured video and/or audio content. In some embodiments, the system automatically determines that captured video and/or audio content from images should be removed.

The above-described manner of providing sharing options (e.g., by displaying only the sharing options that are available for all content types when the content consists of multiple content types) allows the electronic device to provide the user with the appropriate sharing options (e.g., by providing only the available sharing options that are compatible with all of the content to be shared and not any sharing options that are not supported by one or more of the content items), which simplifies the interaction between the user and the electronic device and enhances the operability of the electronic device and makes the user-device interface more efficient (e.g., by providing a single user interface that displays only the available sharing options to the user without requiring the user to separately determine what options are available for all of the selected content types or without requiring the user to separately modify each content type as desired), which additionally reduces power usage and improves battery life of the electronic device by enabling the user to use the electronic device more quickly and efficiently.

It should be understood that the particular order in which the operations in FIGS. 11A-11F have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 701, and 900) are also applicable in an analogous manner to method 1100 described above with respect to FIGS. 11A-11F. For example, the ways of presenting one or more options for changing one or more settings prior to sharing content described above with reference to method 1100 optionally have one or more of the characteristics of the updating a sharing option in response to detecting a change in the orientation of the electronic device relative to other electronic devices, presenting an indication to change the orientation of the electronic device, presenting a sharing user interface in an action user interface of an application, etc., described herein with reference to other methods described herein (e.g., methods 700, 701, and 900). For brevity, these details are not repeated here.

The operations in the information processing methods described above are, optionally, implemented by running one or more functional modules in an information processing apparatus such as general purpose processors (e.g., a as described with respect to FIGS. 1A-1B, 3, 5A-5H) or application specific chips. Further, the operations described above with reference to FIGS. 11A-11F are, optionally, implemented by components depicted in FIGS. 1A-1B. For example, displaying operations 1102, 1104, and 1124, receiving operations 1106 and 1156, and initiating operations 1110, 1112, and 1114, optionally, implemented by event sorter 170, event recognizer 180, and event handler 190. Event monitor 171 in event sorter 170 detects a contact on touch screen 504, and event dispatcher module 174 delivers the event information to application 136-1. A respective event recognizer 180 of application 136-1 compares the event information to respective event definitions 186, and determines whether a first contact at a first location on the touch screen corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

As described above, one aspect of the present technology is the gathering and use of data available from specific and legitimate sources to present content of relevance to the user. The present disclosure contemplates that in some instances, this gathered data may include personal information data that uniquely identifies or can be used to identify a specific person. Such personal information data can include demographic data, location-based data, online identifiers, telephone numbers, e-mail addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, determining contact information associated with one or more other electronic devices enables the electronic device to share content with the one or more other electronic devices. Likewise, sharing the contact information associated with the electronic device enables the electronic device to receive content from one or more other electronic devices. Accordingly, use of such personal information data enables users to share and receive content with/from other electronic devices. Further, other uses for personal information data that benefit the user are also contemplated by the present disclosure. For instance, location data may be used, in accordance with the user's preferences to recommend and locate other electronic devices with which to share various content.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominent and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations that may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. For example, users can select not to enable location services that determine the location of the electronic device. As another example, users are able to disable settings that allow the electronic device to be discoverable by others and that allow the electronic device to transfer data with another electronic device.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users based on aggregated non-personal information data or a bare minimum amount of personal information, such as the content being handled only on the user's device or other non-personal information available to the content delivery services The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed as new and desired to be protected by Letters Patent of the United States is:

1. A method comprising:

at a first electronic device in communication with a display device and one or more input devices:

displaying, via the display device, a sharing user interface for sharing selected content comprising a first set of content with a plurality of different sharing protocols;

while displaying the sharing user interface and while the first set of content is selected for sharing, displaying a user interface for selecting content sharing options for modifying metadata associated with shared content shared using one of the plurality of different sharing protocols;

while displaying the user interface for selecting content sharing options and while the first set of content is selected for sharing, receiving, via the one or more input devices, a first set of one or more inputs corresponding to a selection of a respective set of sharing options;

after selecting the respective set of sharing options based on the first set of one or more inputs, receiving, via the one or more input devices, a second set of one or more inputs corresponding to a request to select additional content to be shared;

while displaying the sharing user interface with the additional content selected for sharing, receiving a request to share a selected set of content that includes the additional content; and in response to receiving the request to share the selected set of content:

in accordance with a determination that a first sharing protocol was selected along with a first set of sharing options, initiating a process for sharing the selected set of content that includes the additional content via the first sharing protocol with the metadata associated with the shared selected set of content modified by the first set of sharing options;

in accordance with a determination that the first sharing protocol was selected along with a second set of sharing options, different from the first set of sharing options, initiating a process for sharing the selected set of content that includes the additional content via the first sharing protocol with the metadata associated with the shared selected set of content modified by the second set of sharing options;

in accordance with a determination that a second sharing protocol, different from the first sharing protocol, was selected along with the first set of sharing options, initiating a process for sharing the selected set of content that includes the additional content via the second sharing protocol with the metadata associated with the shared selected set of content modified by the first set of sharing options; and in accordance with a determination that the second sharing protocol was selected along with the second set of sharing options, initiating a process for sharing the selected set of content that includes the additional content via the second sharing protocol with the metadata associated with the shared selected set of content modified by the second set of sharing options.

2. The method of claim 1, wherein the sharing user interface is a system user interface of the first electronic device.

3. The method of claim 1, wherein the respective set of sharing options for sharing respective content is selected before a respective sharing protocol for sharing the respective content is selected.

4. The method of claim 1, wherein a respective sharing protocol for sharing respective content is selected before a respective set of sharing options for sharing the respective content is selected.

5. The method of claim 1, wherein:

initiating the process for sharing the selected set of content via the first sharing protocol comprises displaying, via the display device, a respective application associated with the first sharing protocol, and initiating the process for sharing the selected set of content via the second sharing protocol comprises displaying, via the display device, a respective application associated with the second sharing protocol.

6. The method of claim 1, wherein:

initiating the process for sharing the selected set of content via the first sharing protocol comprises starting transfer of the selected set of content to another electronic device using the first sharing protocol, and initiating the process for sharing the selected set of content via the second sharing protocol comprises starting transfer of the selected set of content to another electronic device using the second sharing protocol.

7. The method of claim 1, wherein the selected set of content comprises a webpage, and the content sharing options include an option to remove, from the metadata associated with the selected set of shared content, a rich link to the webpage.

8. The method of claim 1, wherein the selected set of content comprises a webpage, and the content sharing options include one or more options for sharing the webpage in a plurality of formats.

9. The method of claim 1, wherein the selected set of content comprises an image, and the content sharing options include one or more options for sharing the image with or without a plurality of types of metadata associated with the image, wherein the plurality of types of metadata associated with the image are removed prior to sharing the image.

10. The method of claim 1, wherein:

in accordance with a determination that a first respective sharing protocol is selected, the content sharing options include a first set of one or more sharing options and not a second set of one or more sharing options, and in accordance with a determination that a second respective sharing protocol, different than the first respective sharing protocol, is selected, the content sharing options include the second set of one or more sharing options and not the first set of one or more sharing options.

11. The method of claim 1, wherein:

the selected set of content comprises a plurality of images, and in accordance with a determination that the plurality of images includes less than a threshold number of images, the content sharing options include one or more options for sharing the plurality of images as individual images, or sharing a link for accessing the plurality of images.

12. The method of claim 1, wherein:

in accordance with a determination that the selected content includes a plurality of content items, the user interface for selecting the content sharing options includes a visual representation of a collection of the plurality of content items, and in accordance with a determination that the selected content does not include a plurality of content items, the user interface for selecting the content sharing options includes a visual representation of the selected content, different than the visual representation of the collection of the plurality of content items.

13. The method of claim 1, wherein the content sharing options include one or more options for sharing the content as a first file type or as a second file type.

14. The method of claim 1, wherein the content sharing options include one or more options for sharing location metadata associated with the selected set of content or not sharing the location metadata associated with the selected set of content.

15. The method of claim 1, wherein the user interface for selecting the content sharing options includes a preview of the selected set of content to be shared, the method further comprising:

receiving, via the one or more input devices, an input corresponding to a request to select a second respective set of sharing options; and in response to receiving the input corresponding to the request to select the second respective set of sharing options:

in accordance with a determination that the second respective set of sharing options is first one or more sharing options, updating the preview of the selected set of content to reflect the first one or more sharing options having been applied to the selected set of content to the shared; and in accordance with a determination that the second respective set of sharing options is second one or more sharing options, updating the preview of the selected set of content to reflect the second one or more sharing options having been applied to the selected set of content to the shared.

16. The method of claim 1, wherein the selected set of content comprises first one or more content items selected from a collection of content items that includes the first one or more content items and second one or more content items.

17. The method of claim 16, wherein the user interface for selecting the content sharing options includes one or more sharing options for the first one or more content items and not the second one or more content items.

18. The method of claim 16, wherein the sharing user interface includes representations of the first one or more content items and does not include representations of the second one or more content items.

19. The method of claim 1, wherein the sharing user interface includes:

in accordance with the determination that the first set of sharing options was selected, a visual indication of the first set of sharing options, and in accordance with the determination that the second set of sharing options was selected, a visual indication of the second set of sharing options.

20. The method of claim 1, wherein the content sharing options modify the selected set of content and/or the metadata to be shared without modifying the selected set of content and/or the metadata on the first electronic device that corresponds to the selected set of content to be shared.

21. The method of claim 1, wherein the content sharing options include:

in accordance with a determination that the selected set of content is being shared from a first application on the first electronic device, first content sharing options and not second content sharing options; and in accordance with a determination that the selected set of content is being shared from a second application on the first electronic device, the second content sharing options and not the first content sharing options.

22. The method of claim 1, wherein the content sharing options include:

in accordance with a determination that the selected set of content includes content of a first type but not content of a second type, first content sharing options and not second content sharing options; and in accordance with a determination that the selected set of content includes content of the first type and content of the second type, the second content sharing options and not the first content sharing options.

23. An electronic device, comprising:

one or more processors;

memory; and one or more programs, wherein the one or more programs are stored in the memory and configured to be executed by the one or more processors, the one or more programs including instructions for:

displaying, via a display device, a sharing user interface for sharing selected content comprising a first set of content with a plurality of different sharing protocols;

while displaying the sharing user interface and while the first set of content is selected for sharing, displaying a user interface for selecting content sharing options for modifying metadata associated with shared content shared using one of the plurality of different sharing protocols;

while displaying the user interface for selecting content sharing options and while the first set of content is selected for sharing, receiving, via one or more input devices, a first set of one or more inputs corresponding to a selection of a respective set of sharing options;

after selecting the respective set of sharing options based on the first set of one or more inputs, receiving, via the one or more input devices, a second set of one or more inputs corresponding to a request to select additional content to be shared;

while displaying the sharing user interface with the additional content selected for sharing, receiving a request to share a selected set of content that includes the additional content; and in response to receiving the request to share the selected set of content:

in accordance with a determination that a first sharing protocol was selected along with a first set of sharing options, initiating a process for sharing the selected set of content that includes the additional content via the first sharing protocol with the metadata associated with the shared selected set of content modified by the first set of sharing options;

in accordance with a determination that the first sharing protocol was selected along with a second set of sharing options, different from the first set of sharing options, initiating a process for sharing the selected set of content that includes the additional content via the first sharing protocol with the metadata associated with the shared selected set of content modified by the second set of sharing options;

in accordance with a determination that a second sharing protocol, different from the first sharing protocol, was selected along with the first set of sharing options, initiating a process for sharing the selected set of content that includes the additional content via the second sharing protocol with the metadata associated with the shared selected set of content modified by the first set of sharing options; and in accordance with a determination that the second sharing protocol was selected along with the second set of sharing options, initiating a process for sharing the selected set of content that includes the additional content via the second sharing protocol with the metadata associated with the shared selected set of content modified by the second set of sharing options.

24. The device of claim 23, wherein the sharing user interface is a system user interface of the electronic device.

25. The device of claim 23, wherein the respective set of sharing options for sharing respective content is selected before a respective sharing protocol for sharing the respective content is selected.

26. The device of claim 23, wherein a respective sharing protocol for sharing respective content is selected before a respective set of sharing options for sharing the respective content is selected.

27. The device of claim 23, the one or more programs including further instructions for:

initiating the process for sharing the selected set of content via the first sharing protocol comprises displaying, via the display device, a respective application associated with the first sharing protocol, and initiating the process for sharing the selected set of content via the second sharing protocol comprises displaying, via the display device, a respective application associated with the second sharing protocol.

28. The device of claim 23, the one or more programs including further instructions for:

initiating the process for sharing the selected set of content via the first sharing protocol comprises starting transfer of the selected set of content to another electronic device using the first sharing protocol, and initiating the process for sharing the selected set of content via the second sharing protocol comprises starting transfer of the selected set of content to another electronic device using the second sharing protocol.

29. The device of claim 23, wherein the selected set of content comprises a webpage, and the content sharing options include an option to remove, from the metadata associated with the selected set of shared content, a rich link to the webpage.

30. The device of claim 23, wherein the selected set of content comprises a webpage, and the content sharing options include one or more options for sharing the webpage in a plurality of formats.

31. The device of claim 23, wherein the selected set of content comprises an image, and the content sharing options include one or more options for sharing the image with or without a plurality of types of metadata associated with the image, wherein the plurality of types of metadata associated with the image are removed prior to sharing the image.

32. The device of claim 23, the one or more programs including further instructions for:

in accordance with a determination that a first respective sharing protocol is selected, the content sharing options include a first set of one or more sharing options and not a second set of one or more sharing options, and in accordance with a determination that a second respective sharing protocol, different than the first respective sharing protocol, is selected, the content sharing options include the second set of one or more sharing options and not the first set of one or more sharing options.

33. The device of claim 23, the one or more programs including further instructions for:

the selected set of content comprises a plurality of images, and in accordance with a determination that the plurality of images includes less than a threshold number of images, the content sharing options include one or more options for sharing the plurality of images as individual images, or sharing a link for accessing the plurality of images.

34. The device of claim 23, the one or more programs including further instructions for:

in accordance with a determination that the selected content includes a plurality of content items, the user interface for selecting the content sharing options includes a visual representation of a collection of the plurality of content items, and in accordance with a determination that the selected content does not include a plurality of content items, the user interface for selecting the content sharing options includes a visual representation of the selected content, different than the visual representation of the collection of the plurality of content items.

35. The device of claim 23, wherein the content sharing options include one or more options for sharing the content as a first file type or as a second file type.

36. The device of claim 23, wherein the content sharing options include one or more options for sharing location metadata associated with the selected set of content or not sharing the location metadata associated with the selected set of content.

37. The device of claim 23, wherein the user interface for selecting the content sharing options includes a preview of the selected set of content to be shared, the one or more programs including further instructions for:

receiving, via the one or more input devices, an input corresponding to a request to select a second respective set of sharing options; and in response to receiving the input corresponding to the request to select the second respective set of sharing options:

in accordance with a determination that the second respective set of sharing options is first one or more sharing options, updating the preview of the selected set of content to reflect the first one or more sharing options having been applied to the selected set of content to the shared; and in accordance with a determination that the second respective set of sharing options is second one or more sharing options, updating the preview of the selected set of content to reflect the second one or more sharing options having been applied to the selected set of content to the shared.

38. The device of claim 23, wherein the selected set of content comprises first one or more content items selected from a collection of content items that includes the first one or more content items and second one or more content items.

39. The device of claim 38, wherein the user interface for selecting the content sharing options includes one or more sharing options for the first one or more content items and not the second one or more content items.

40. The device of claim 38, wherein the sharing user interface includes representations of the first one or more content items and does not include representations of the second one or more content items.

41. The device of claim 23, wherein the sharing user interface includes:

in accordance with the determination that the first set of sharing options was selected, a visual indication of the first set of sharing options, and in accordance with the determination that the second set of sharing options was selected, a visual indication of the second set of sharing options.

42. The device of claim 23, wherein the content sharing options modify the selected set of content and/or the metadata to be shared without modifying the selected set of content and/or the metadata on the electronic device that corresponds to the selected set of content to be shared.

43. The device of claim 23, wherein the content sharing options include:

in accordance with a determination that the selected set of content is being shared from a first application on the electronic device, first content sharing options and not second content sharing options; and in accordance with a determination that the selected set of content is being shared from a second application on the electronic device, the second content sharing options and not the first content sharing options.

44. The device of claim 23, wherein the content sharing options include:

in accordance with a determination that the selected set of content includes content of a first type but not content of a second type, first content sharing options and not second content sharing options; and in accordance with a determination that the selected set of content includes content of the first type and content of the second type, the second content sharing options and not the first content sharing options.

45. A non-transitory computer readable storage medium storing one or more programs, the one or more programs comprising instructions, which when executed by one or more processors of an electronic device, cause the electronic device to perform:

displaying, via a display device, a sharing user interface for sharing selected content comprising a first set of content with a plurality of different sharing protocols;

while displaying the sharing user interface and while the first set of content is selected for sharing, displaying a user interface for selecting content sharing options for modifying metadata associated with shared content shared using one of the plurality of different sharing protocols;

while displaying the user interface for selecting content sharing options and while the first set of content is selected for sharing, receiving, via one or more input devices, a first set of one or more inputs corresponding to a selection of a respective set of sharing options;

after selecting the respective set of sharing options based on the first set of one or more inputs, receiving, via the one or more input devices, a second set of one or more inputs corresponding to a request to select additional content to be shared;

while displaying the sharing user interface with the additional content selected for sharing, receiving a request to share a selected set of content that includes the additional content; and in response to receiving the request to share the selected set of content:

in accordance with a determination that a first sharing protocol was selected along with a first set of sharing options, initiating a process for sharing the selected set of content that includes the additional content via the first sharing protocol with the metadata associated with the shared selected set of content modified by the first set of sharing options;

in accordance with a determination that the first sharing protocol was selected along with a second set of sharing options, different from the first set of sharing options, initiating a process for sharing the selected set of content that includes the additional content via the first sharing protocol with the metadata associated with the shared selected set of content modified by the second set of sharing options;

in accordance with a determination that a second sharing protocol, different from the first sharing protocol, was selected along with the first set of sharing options, initiating a process for sharing the selected set of content that includes the additional content via the second sharing protocol with the metadata associated with the shared selected set of content modified by the first set of sharing options; and in accordance with a determination that the second sharing protocol was selected along with the second set of sharing options, initiating a process for sharing the selected set of content that includes the additional content via the second sharing protocol with the metadata associated with the shared selected set of content modified by the second set of sharing options.

46. The non-transitory computer readable storage medium of claim 45, wherein the sharing user interface is a system user interface of the electronic device.

47. The non-transitory computer readable storage medium of claim 45, wherein the respective set of sharing options for sharing respective content is selected before a respective sharing protocol for sharing the respective content is selected.

48. The non-transitory computer readable storage medium of claim 45, wherein a respective sharing protocol for sharing respective content is selected before a respective set of sharing options for sharing the respective content is selected.

49. The non-transitory computer readable storage medium of claim 45, further storing instructions which, when executed by the one or more processors, further cause the electronic device to perform:

initiating the process for sharing the selected set of content via the first sharing protocol comprises displaying, via the display device, a respective application associated with the first sharing protocol, and initiating the process for sharing the selected set of content via the second sharing protocol comprises displaying, via the display device, a respective application associated with the second sharing protocol.

50. The non-transitory computer readable storage medium of claim 45, further storing instructions which, when executed by the one or more processors, further causes the electronic device to perform:

initiating the process for sharing the selected set of content via the first sharing protocol comprises starting transfer of the selected set of content to another electronic device using the first sharing protocol, and initiating the process for sharing the selected set of content via the second sharing protocol comprises starting transfer of the selected set of content to another electronic device using the second sharing protocol.

51. The non-transitory computer readable storage medium of claim 45, wherein the selected set of content comprises a webpage, and the content sharing options include an option to remove, from the metadata associated with the selected set of shared content, a rich link to the webpage.

52. The non-transitory computer readable storage medium of claim 45, wherein the selected set of content comprises a webpage, and the content sharing options include one or more options for sharing the webpage in a plurality of formats.

53. The non-transitory computer readable storage medium of claim 45, wherein the selected set of content comprises an image, and the content sharing options include one or more options for sharing the image with or without a plurality of types of metadata associated with the image, wherein the plurality of types of metadata associated with the image are removed prior to sharing the image.

54. The non-transitory computer readable storage medium of claim 45, further storing instructions which, when executed by the one or more processors, further causes the electronic device to perform:

in accordance with a determination that a first respective sharing protocol is selected, the content sharing options include a first set of one or more sharing options and not a second set of one or more sharing options, and in accordance with a determination that a second respective sharing protocol, different than the first respective sharing protocol, is selected, the content sharing options include the second set of one or more sharing options and not the first set of one or more sharing options.

55. The non-transitory computer readable storage medium of claim 45, further storing instructions which, when executed by the one or more processors, further causes the electronic device to perform:

the selected set of content comprises a plurality of images, and in accordance with a determination that the plurality of images includes less than a threshold number of images, the content sharing options include one or more options for sharing the plurality of images as individual images, or sharing a link for accessing the plurality of images.

56. The non-transitory computer readable storage medium of claim 45, further storing instructions which, when executed by the one or more processors, further causes the electronic device to perform:

in accordance with a determination that the selected content includes a plurality of content items, the user interface for selecting the content sharing options includes a visual representation of a collection of the plurality of content items, and in accordance with a determination that the selected content does not include a plurality of content items, the user interface for selecting the content sharing options includes a visual representation of the selected content, different than the visual representation of the collection of the plurality of content items.

57. The non-transitory computer readable storage medium of claim 45, wherein the content sharing options include one or more options for sharing the content as a first file type or as a second file type.

58. The non-transitory computer readable storage medium of claim 45, wherein the content sharing options include one or more options for sharing location metadata associated with the selected set of content or not sharing the location metadata associated with the selected set of content.

59. The non-transitory computer readable storage medium of claim 45, wherein the user interface for selecting the content sharing options includes a preview of the selected set of content to be shared, the non-transitory computer readable storage medium further storing instructions which, when executed by the one or more processors, further causes the electronic device to perform:

receiving, via the one or more input devices, an input corresponding to a request to select a second respective set of sharing options; and in response to receiving the input corresponding to the request to select the second respective set of sharing options:

in accordance with a determination that the second respective set of sharing options is first one or more sharing options, updating the preview of the selected set of content to reflect the first one or more sharing options having been applied to the selected set of content to the shared; and in accordance with a determination that the second respective set of sharing options is second one or more sharing options, updating the preview of the selected set of content to reflect the second one or more sharing options having been applied to the selected set of content to the shared.

60. The non-transitory computer readable storage medium of claim 45, wherein the selected set of content comprises first one or more content items selected from a collection of content items that includes the first one or more content items and second one or more content items.

61. The non-transitory computer readable storage medium of claim 60, wherein the user interface for selecting the content sharing options includes one or more sharing options for the first one or more content items and not the second one or more content items.

62. The non-transitory computer readable storage medium of claim 60, wherein the sharing user interface includes representations of the first one or more content items and does not include representations of the second one or more content items.

63. The non-transitory computer readable storage medium of claim 45, wherein the sharing user interface includes:

in accordance with the determination that the first set of sharing options was selected, a visual indication of the first set of sharing options, and in accordance with the determination that the second set of sharing options was selected, a visual indication of the second set of sharing options.

64. The non-transitory computer readable storage medium of claim 45, wherein the content sharing options modify the selected set of content and/or the metadata to be shared without modifying the selected set of content and/or the metadata on the electronic device that corresponds to the selected set of content to be shared.

65. The non-transitory computer readable storage medium of claim 45, wherein the content sharing options include:

in accordance with a determination that the selected set of content is being shared from a first application on the electronic device, first content sharing options and not second content sharing options; and in accordance with a determination that the selected set of content is being shared from a second application on the electronic device, the second content sharing options and not the first content sharing options.

66. The non-transitory computer readable storage medium of claim 45, wherein the content sharing options include:

in accordance with a determination that the selected set of content includes content of a first type but not content of a second type, first content sharing options and not second content sharing options; and in accordance with a determination that the selected set of content includes content of the first type and content of the second type, the second content sharing options and not the first content sharing options.

* * * * *